US009852388B1

(12) United States Patent
Swieter et al.

(10) Patent No.: US 9,852,388 B1
(45) Date of Patent: Dec. 26, 2017

(54) METHOD AND SYSTEM FOR LOCATING RESOURCES AND COMMUNICATING WITHIN AN ENTERPRISE

(71) Applicant: Steelcase Inc., Grand Rapids, MI (US)

(72) Inventors: Timothy D Swieter, Grand Rapids, MI (US); Robert Scheper, Grand Rapids, MI (US); Darrin Sculley, Byron Center, MI (US)

(73) Assignee: Steelcase, Inc., Grand Rapids, MI (US)

( * ) Notice: Subject to any disclaimer, the term of this patent is extended or adjusted under 35 U.S.C. 154(b) by 0 days.

(21) Appl. No.: 15/179,140

(22) Filed: Jun. 10, 2016

Related U.S. Application Data

(63) Continuation-in-part of application No. 15/170,550, filed on Jun. 1, 2016, and a continuation-in-part of application No. 14/871,097, filed on Sep. 30, 2015, now Pat. No. 9,766,079.

(60) Provisional application No. 62/328,339, filed on Apr. 27, 2016, provisional application No. 62/171,401, filed on Jun. 5, 2015, provisional application No. 62/059,602, filed on Oct. 3, 2014.

(51) Int. Cl.
*G06Q 10/06* (2012.01)
*H04Q 9/00* (2006.01)

(52) U.S. Cl.
CPC ......... *G06Q 10/06313* (2013.01); *H04Q 9/00* (2013.01)

(58) Field of Classification Search
CPC .......................... G06Q 10/06313; H04Q 9/00
USPC ....................................................... 701/454
See application file for complete search history.

(56) References Cited

U.S. PATENT DOCUMENTS

| 4,751,399 A | 6/1988 | Koehring |
| 5,050,077 A | 9/1991 | Vincent |

(Continued)

FOREIGN PATENT DOCUMENTS

| AU | 2011203137 A1 | 7/2011 |
| AU | 2013203919 A1 | 5/2013 |

(Continued)

OTHER PUBLICATIONS

Citrix, GoToMeeting User Guide, Copyright 2015 Citrix Systems.

(Continued)

*Primary Examiner* — Yazan Soofi
(74) *Attorney, Agent, or Firm* — Quarles & Brady LLP

(57) ABSTRACT

An algorithm formulating system for use with a sensing ecosystem for identifying enterprise space states, the sensing ecosystem including a plurality of sensor devices mounted within an enterprise space wherein each sensor device is capable of sensing a plurality of parameters within the enterprise space, the system comprising a processor programmed to perform the steps of accessing a rule set that specifies a first parameter value set that corresponding to a perceived state within a first enterprise space, receiving sensor data from sensor devices within the first enterprise space, comparing the sensor data to the rule set to identify instances of the perceived state, examining sensor data to identify a second parameter value set that occurs at least a threshold percentage of time for the identified instances of the perceived state and using the second parameter value set as the basis for a new rule set to be associated with the perceived state.

30 Claims, 78 Drawing Sheets

(56) References Cited

U.S. PATENT DOCUMENTS

| | | |
|---|---|---|
| 5,086,385 A | 2/1992 | Launey |
| 5,097,672 A | 3/1992 | Takenaka |
| 5,293,097 A | 3/1994 | Elwell |
| 5,406,176 A | 4/1995 | Sugden |
| 5,455,487 A | 10/1995 | Mix |
| 5,476,221 A | 12/1995 | Seymour |
| 5,489,827 A | 2/1996 | Xia |
| 5,898,579 A | 4/1999 | Boys |
| 5,915,091 A | 6/1999 | Ludwig |
| 6,038,542 A | 3/2000 | Ruckdashel |
| 6,100,663 A | 8/2000 | Boys |
| 6,140,921 A | 10/2000 | Baron |
| 6,144,942 A | 11/2000 | Ruckdashel |
| 6,177,905 B1 | 1/2001 | Welch |
| 6,266,612 B1 | 7/2001 | Dussell |
| 6,266,691 B1 | 7/2001 | Watanabe |
| 6,288,716 B1 | 9/2001 | Humpleman |
| 6,297,621 B1 | 10/2001 | Hui |
| 6,304,068 B1 | 10/2001 | Hui |
| 6,342,906 B1 | 1/2002 | Kumar |
| 6,360,101 B1 | 3/2002 | Irvin |
| 6,361,173 B1 | 3/2002 | Vlahos |
| 6,424,623 B1 | 7/2002 | Borgstahl |
| 6,434,158 B1 | 8/2002 | Harris |
| 6,434,159 B1 | 8/2002 | Woodward |
| 6,466,234 B1 | 10/2002 | Pyle |
| 6,487,180 B1 | 11/2002 | Borgstahl |
| 6,501,364 B1 | 12/2002 | Hui |
| 6,532,218 B1 | 3/2003 | Shaffer |
| 6,546,419 B1 | 4/2003 | Humpleman |
| 6,548,967 B1 | 4/2003 | Dowling |
| 6,587,782 B1 | 7/2003 | Nocek |
| 6,691,029 B2 | 2/2004 | Hughes |
| 6,724,159 B2 | 4/2004 | Gutta |
| 6,760,412 B1 | 7/2004 | Loucks |
| 6,760,749 B1 | 7/2004 | Dunlap |
| 6,803,744 B1 | 10/2004 | Sabo |
| 6,839,417 B2 | 1/2005 | Weisman |
| 6,850,837 B2 | 2/2005 | Paulauskas |
| 6,888,438 B2 | 5/2005 | Hui |
| 6,906,495 B2 | 6/2005 | Cheng |
| 7,000,660 B2 | 2/2006 | Chen |
| 7,003,728 B2 | 2/2006 | Berque |
| 7,027,995 B2 | 4/2006 | Kaufman |
| 7,042,196 B2 | 5/2006 | Ka Lai |
| 7,043,532 B1 | 5/2006 | Humpleman |
| 7,084,758 B1 | 8/2006 | Cole |
| 7,124,164 B1 | 10/2006 | Chemtob |
| 7,139,976 B2 | 11/2006 | Kausik |
| 7,149,776 B1 | 12/2006 | Roy |
| 7,163,263 B1 | 1/2007 | Kurrasch |
| 7,180,503 B2 | 2/2007 | Burr |
| 7,212,414 B2 | 5/2007 | Baarman |
| 7,221,937 B2 | 5/2007 | Lau |
| 7,239,110 B2 | 7/2007 | Cheng |
| 7,248,017 B2 | 7/2007 | Cheng |
| 7,266,383 B2 | 9/2007 | Anderson |
| 7,268,682 B2 | 9/2007 | Bialecki, Jr. |
| 7,340,769 B2 | 3/2008 | Baugher |
| 7,370,269 B1 | 5/2008 | Prabhu |
| 7,393,053 B2 | 7/2008 | Kurrasch |
| 7,394,405 B2 | 7/2008 | Godden |
| 7,421,069 B2 | 9/2008 | Vernon |
| 7,474,058 B2 | 1/2009 | Baarman |
| 7,475,078 B2 | 1/2009 | Kiilerich |
| 7,495,414 B2 | 2/2009 | Hui |
| 7,499,462 B2 | 3/2009 | MacMullan |
| 7,518,267 B2 | 4/2009 | Baarman |
| 7,519,664 B2 | 4/2009 | Karaki |
| 7,522,878 B2 | 4/2009 | Baarman |
| 7,525,283 B2 | 4/2009 | Cheng |
| 7,526,525 B2 | 4/2009 | Hagale |
| 7,554,316 B2 | 6/2009 | Stevens |
| 7,554,437 B2 | 6/2009 | Axelsen |
| 7,576,514 B2 | 8/2009 | Hui |
| 7,577,522 B2 | 8/2009 | Rosenberg |
| 7,590,941 B2 | 9/2009 | Wee |
| 7,605,496 B2 | 10/2009 | Stevens |
| 7,612,528 B2 | 11/2009 | Baarman |
| 7,615,936 B2 | 11/2009 | Baarman |
| 7,619,366 B2 | 11/2009 | Diederiks |
| 7,622,891 B2 | 11/2009 | Cheng |
| 7,634,533 B2 | 12/2009 | Rudolph |
| 7,639,110 B2 | 12/2009 | Baarman |
| 7,639,514 B2 | 12/2009 | Baarman |
| 7,639,994 B2 | 12/2009 | Greene |
| 7,643,312 B2 | 1/2010 | Vanderelli |
| 7,649,454 B2 | 1/2010 | Singh |
| 7,664,870 B2 | 2/2010 | Baek |
| 7,689,655 B2 | 3/2010 | Hewitt |
| 7,693,935 B2 | 4/2010 | Weber |
| 7,707,249 B2 | 4/2010 | Spataro |
| 7,714,537 B2 | 5/2010 | Cheng |
| 7,715,831 B2 | 5/2010 | Wakefield |
| 7,734,690 B2 | 6/2010 | Moromisato |
| 7,735,918 B2 | 6/2010 | Beck |
| 7,741,734 B2 | 6/2010 | Joannopoulos |
| 7,810,025 B2 | 10/2010 | Blair |
| 7,825,543 B2 | 11/2010 | Karalis |
| 7,844,306 B2 | 11/2010 | Shearer |
| 7,847,675 B1 | 12/2010 | Thyen |
| 7,849,135 B2 | 12/2010 | Agrawal |
| 7,863,861 B2 | 1/2011 | Cheng |
| 7,868,482 B2 | 1/2011 | Greene |
| 7,868,587 B2 | 1/2011 | Stevens |
| 7,869,941 B2 | 1/2011 | Coughlin |
| 7,881,233 B2 | 2/2011 | Bieselin |
| 7,885,925 B1 | 2/2011 | Strong |
| 7,893,953 B2 | 2/2011 | Krestakos |
| 7,896,436 B2 | 3/2011 | Kurrasch |
| 7,898,105 B2 | 3/2011 | Greene |
| 7,904,209 B2 | 3/2011 | Podgorny |
| 7,915,858 B2 | 3/2011 | Liu |
| D636,333 S | 4/2011 | Kulikowski |
| 7,925,308 B2 | 4/2011 | Greene |
| 7,925,525 B2 | 4/2011 | Chin |
| 7,932,618 B2 | 4/2011 | Baarman |
| 7,941,133 B2 | 5/2011 | Aaron |
| 7,941,753 B2 | 5/2011 | Meisels |
| 7,952,324 B2 | 5/2011 | Cheng |
| 7,953,369 B2 | 5/2011 | Baarman |
| 7,965,859 B2 | 6/2011 | Marks |
| 7,973,635 B2 | 7/2011 | Baarman |
| 7,973,657 B2 | 7/2011 | Ayed |
| 7,989,986 B2 | 8/2011 | Baarman |
| 7,999,669 B2 | 8/2011 | Singh |
| 8,004,235 B2 | 8/2011 | Baarman |
| 8,021,164 B2 | 9/2011 | Epstein |
| 8,022,576 B2 | 9/2011 | Joannopoulos |
| 8,024,661 B2 | 9/2011 | Bibliowicz |
| 8,026,908 B2 | 9/2011 | Ku |
| 8,028,020 B2 | 9/2011 | Huck |
| 8,032,705 B2 | 10/2011 | Klitsner |
| 8,035,255 B2 | 10/2011 | Kurs |
| 8,035,340 B2 | 10/2011 | Stevens |
| 8,039,995 B2 | 10/2011 | Stevens |
| 8,040,103 B2 | 10/2011 | Hui |
| 8,041,586 B2 | 10/2011 | Jethani |
| 8,049,301 B2 | 11/2011 | Hui |
| 8,054,854 B2 | 11/2011 | Poslinski |
| 8,055,310 B2 | 11/2011 | Beart |
| 8,055,644 B2 | 11/2011 | Crowley |
| 8,057,069 B2 | 11/2011 | Mangiardi |
| 8,061,864 B2 | 11/2011 | Metcalf |
| 8,069,100 B2 | 11/2011 | Taylor |
| 8,069,465 B1 | 11/2011 | Bartholomay |
| 8,073,614 B2 | 12/2011 | Coughlin |
| 8,076,800 B2 | 12/2011 | Joannopoulos |
| 8,076,801 B2 | 12/2011 | Karalis |
| 8,081,083 B2 | 12/2011 | Hinterlong |
| 8,084,889 B2 | 12/2011 | Joannopoulos |
| 8,091,029 B1 | 1/2012 | Gay |
| 8,093,758 B2 | 1/2012 | Hussmann |
| 8,097,983 B2 | 1/2012 | Karalis |

(56) References Cited

U.S. PATENT DOCUMENTS

| | | |
|---|---|---|
| 8,097,984 B2 | 1/2012 | Baarman |
| 8,102,235 B2 | 1/2012 | Hui |
| 8,106,539 B2 | 1/2012 | Schatz |
| 8,112,100 B2 | 2/2012 | Frank |
| 8,115,448 B2 | 2/2012 | John |
| 8,116,681 B2 | 2/2012 | Baarman |
| 8,116,683 B2 | 2/2012 | Baarman |
| 8,117,262 B2 | 2/2012 | Kumar |
| 8,120,311 B2 | 2/2012 | Baarman |
| 8,126,974 B2 | 2/2012 | Lyle |
| 8,127,155 B2 | 2/2012 | Baarman |
| 8,129,864 B2 | 3/2012 | Baarman |
| 8,138,875 B2 | 3/2012 | Baarman |
| 8,140,701 B2 | 3/2012 | Rajan |
| 8,141,143 B2 | 3/2012 | Lee |
| 8,149,104 B2 | 4/2012 | Crum |
| 8,150,449 B2 | 4/2012 | Onozawa |
| 8,159,090 B2 | 4/2012 | Greene |
| 8,164,222 B2 | 4/2012 | Baarman |
| 8,170,946 B2 | 5/2012 | Blair |
| 8,174,152 B2 | 5/2012 | Baumann |
| 8,180,663 B2 | 5/2012 | Tischhauser |
| 8,188,856 B2 | 5/2012 | Singh |
| 8,200,520 B2 | 6/2012 | Chen |
| 8,204,272 B2 | 6/2012 | Marks |
| 8,204,935 B2 | 6/2012 | Vernon |
| 8,209,618 B2 | 6/2012 | Garofalo |
| 8,214,061 B2 | 7/2012 | Westrick, Jr. |
| 8,219,115 B1 | 7/2012 | Nelissen |
| 8,222,827 B2 | 7/2012 | Kuennen |
| 8,223,508 B2 | 7/2012 | Baarman |
| 8,228,025 B2 | 7/2012 | Ho |
| 8,228,026 B2 | 7/2012 | Johnson |
| 8,234,189 B2 | 7/2012 | Taylor |
| 8,238,125 B2 | 8/2012 | Fells |
| 8,239,890 B2 | 8/2012 | Kooman |
| 8,259,428 B2 | 9/2012 | Mollema |
| 8,262,244 B2 | 9/2012 | Metcalf |
| 8,266,535 B2 | 9/2012 | Brown |
| 8,269,456 B2 | 9/2012 | Hui |
| 8,270,320 B2 | 9/2012 | Boyer |
| 8,280,453 B2 | 10/2012 | Beart |
| 8,280,948 B1 | 10/2012 | Chen |
| 8,290,479 B2 | 10/2012 | Aaron |
| 8,296,669 B2 | 10/2012 | Madonna |
| 8,299,753 B2 | 10/2012 | Hui |
| 8,300,784 B2 | 10/2012 | Choi |
| 8,301,077 B2 | 10/2012 | Xue |
| 8,301,079 B2 | 10/2012 | Baarman |
| 8,301,080 B2 | 10/2012 | Baarman |
| 8,304,935 B2 | 11/2012 | Karalis |
| 8,315,561 B2 | 11/2012 | Baarman |
| 8,315,621 B2 | 11/2012 | Lau |
| 8,315,650 B2 | 11/2012 | Lau |
| 8,324,759 B2 | 12/2012 | Karalis |
| 8,327,410 B2 | 12/2012 | Andersen |
| 8,338,990 B2 | 12/2012 | Baarman |
| 8,339,274 B2 | 12/2012 | Van De Sluis |
| 8,341,532 B2 | 12/2012 | Ryan |
| 8,346,166 B2 | 1/2013 | Baarman |
| 8,346,167 B2 | 1/2013 | Baarman |
| 8,350,971 B2 | 1/2013 | Malone |
| 8,351,856 B2 | 1/2013 | Baarman |
| 8,352,296 B2 | 1/2013 | Taneja |
| 8,354,821 B2 | 1/2013 | Cheng |
| 8,362,651 B2 | 1/2013 | Hamam |
| 8,364,400 B2 | 1/2013 | Coughlin |
| 8,370,516 B2 | 2/2013 | Salesky |
| 8,373,310 B2 | 2/2013 | Baarman |
| 8,373,386 B2 | 2/2013 | Baarman |
| 8,375,103 B2 | 2/2013 | Lin |
| 8,380,255 B2 | 2/2013 | Shearer |
| 8,380,786 B2 | 2/2013 | Hoffert |
| 8,385,894 B2 | 2/2013 | Takehara |
| 8,390,669 B2 | 3/2013 | Catchpole |
| 8,395,282 B2 | 3/2013 | Joannopoulos |
| 8,395,283 B2 | 3/2013 | Joannopoulos |
| 8,400,017 B2 | 3/2013 | Kurs |
| 8,400,018 B2 | 3/2013 | Joannopoulos |
| 8,400,019 B2 | 3/2013 | Joannopoulos |
| 8,400,020 B2 | 3/2013 | Joannopoulos |
| 8,400,021 B2 | 3/2013 | Joannopoulos |
| 8,400,022 B2 | 3/2013 | Joannopoulos |
| 8,400,023 B2 | 3/2013 | Joannopoulos |
| 8,400,024 B2 | 3/2013 | Joannopoulos |
| 8,407,289 B2 | 3/2013 | Chen |
| 8,410,636 B2 | 4/2013 | Kurs |
| 8,415,897 B2 | 4/2013 | Choong |
| 8,421,407 B2 | 4/2013 | Johnson |
| 8,423,288 B2 | 4/2013 | Stahl |
| 8,432,062 B2 | 4/2013 | Greene |
| 8,438,333 B2 | 5/2013 | Edwards, III |
| 8,441,154 B2 | 5/2013 | Karalis |
| 8,441,354 B2 | 5/2013 | Padmanabhan |
| 8,443,035 B2 | 5/2013 | Chen |
| 8,446,046 B2 | 5/2013 | Fells |
| 8,446,450 B2 | 5/2013 | Mauchly |
| 8,450,877 B2 | 5/2013 | Baarman |
| 8,456,509 B2 | 6/2013 | Khot |
| 8,457,888 B2 | 6/2013 | Ranford |
| 8,461,719 B2 | 6/2013 | Kesler |
| 8,461,720 B2 | 6/2013 | Kurs |
| 8,461,721 B2 | 6/2013 | Karalis |
| 8,461,722 B2 | 6/2013 | Kurs |
| 8,461,817 B2 | 6/2013 | Martin |
| 8,466,583 B2 | 6/2013 | Karalis |
| 8,471,410 B2 | 6/2013 | Karalis |
| 8,473,571 B2 | 6/2013 | Penner |
| 8,476,788 B2 | 7/2013 | Karalis |
| 8,482,158 B2 | 7/2013 | Kurs |
| 8,482,160 B2 | 7/2013 | Johnson |
| 8,484,494 B2 | 7/2013 | Siegel |
| 8,487,480 B1 | 7/2013 | Kesler |
| 8,489,329 B2 | 7/2013 | Coughlin |
| 8,494,143 B2 | 7/2013 | DeJana |
| 8,497,601 B2 | 7/2013 | Hall |
| 8,499,119 B2 | 7/2013 | Balraj |
| 8,504,663 B2 | 8/2013 | Lowery |
| 8,508,077 B2 | 8/2013 | Stevens |
| 8,510,255 B2 | 8/2013 | Fadell |
| 8,519,668 B2 | 8/2013 | Hui |
| 8,527,549 B2 | 9/2013 | Cidon |
| 8,527,610 B2 | 9/2013 | Koike |
| 8,528,014 B2 | 9/2013 | Reynolds |
| 8,531,153 B2 | 9/2013 | Baarman |
| 8,531,294 B2 | 9/2013 | Slavin |
| 8,533,268 B1 | 9/2013 | Vernon |
| 8,538,330 B2 | 9/2013 | Baarman |
| D692,010 S | 10/2013 | Verghese |
| 8,552,592 B2 | 10/2013 | Schatz |
| 8,554,476 B2 | 10/2013 | Coughlin |
| 8,554,477 B2 | 10/2013 | Coughlin |
| 8,558,411 B2 | 10/2013 | Baarman |
| 8,558,693 B2 | 10/2013 | Martin |
| 8,560,024 B2 | 10/2013 | Beart |
| 8,560,128 B2 | 10/2013 | Ruff |
| 8,560,232 B2 | 10/2013 | Coughlin |
| 8,567,048 B2 | 10/2013 | Singh |
| 8,569,914 B2 | 10/2013 | Karalis |
| 8,587,153 B2 | 11/2013 | Schatz |
| 8,587,154 B2 | 11/2013 | Fells |
| 8,587,155 B2 | 11/2013 | Giler |
| 8,593,105 B2 | 11/2013 | Baarman |
| 8,594,291 B2 | 11/2013 | Bieselin |
| 8,598,721 B2 | 12/2013 | Baarman |
| 8,598,743 B2 | 12/2013 | Hall |
| 8,600,670 B2 | 12/2013 | Kim |
| 8,604,714 B2 | 12/2013 | Mohan |
| 8,610,400 B2 | 12/2013 | Stevens |
| 8,610,530 B2 | 12/2013 | Singh |
| 8,618,696 B2 | 12/2013 | Kurs |
| 8,618,749 B2 | 12/2013 | Kuennen |
| 8,618,770 B2 | 12/2013 | Baarman |
| 8,620,484 B2 | 12/2013 | Baarman |

(56) References Cited

U.S. PATENT DOCUMENTS

| | | | |
|---|---|---|---|
| 8,620,841 B1 * | 12/2013 | Filson | H04L 12/1895 706/12 |
| 8,621,245 B2 | 12/2013 | Shearer | |
| D697,477 S | 1/2014 | Jonas, III | |
| 8,622,314 B2 | 1/2014 | Fisher | |
| 8,629,578 B2 | 1/2014 | Kurs | |
| 8,629,755 B2 | 1/2014 | Hashim-Waris | |
| 8,630,741 B1 | 1/2014 | Matsuoka | |
| 8,631,126 B2 | 1/2014 | Veiseh | |
| 8,638,062 B2 | 1/2014 | Baarman | |
| 8,643,326 B2 | 2/2014 | Campanella | |
| 8,650,600 B2 | 2/2014 | Ogle | |
| 8,653,927 B2 | 2/2014 | Singh | |
| 8,659,417 B1 | 2/2014 | Trundle | |
| 8,660,790 B2 | 2/2014 | Stahl | |
| 8,665,310 B2 | 3/2014 | Verthein | |
| 8,666,051 B2 | 3/2014 | Gilzean | |
| 8,667,401 B1 | 3/2014 | Lozben | |
| 8,667,452 B2 | 3/2014 | Verghese | |
| 8,669,676 B2 | 3/2014 | Karalis | |
| 8,669,844 B2 | 3/2014 | Walker | |
| 8,680,960 B2 | 3/2014 | Singh | |
| 8,683,345 B2 | 3/2014 | Lee | |
| 8,686,598 B2 | 4/2014 | Schatz | |
| 8,686,647 B2 | 4/2014 | Ono | |
| 8,687,452 B2 | 4/2014 | Kishibe | |
| 8,688,100 B2 | 4/2014 | Aaron | |
| 8,690,362 B2 | 4/2014 | Wendt | |
| 8,692,410 B2 | 4/2014 | Schatz | |
| 8,692,412 B2 | 4/2014 | Fiorello | |
| 8,692,639 B2 | 4/2014 | Baarman | |
| 8,692,641 B2 | 4/2014 | Singh | |
| 8,692,642 B2 | 4/2014 | Singh | |
| 8,694,026 B2 | 4/2014 | Forstall | |
| 8,694,165 B2 | 4/2014 | Smith | |
| 8,694,597 B1 | 4/2014 | Raj | |
| 8,698,590 B2 | 4/2014 | Singh | |
| 8,698,591 B2 | 4/2014 | Singh | |
| 8,700,060 B2 | 4/2014 | Huang | |
| 8,707,546 B2 | 4/2014 | Singh | |
| 8,710,948 B2 | 4/2014 | Singh | |
| 8,712,858 B2 | 4/2014 | Blair | |
| 8,713,112 B2 | 4/2014 | Hewitt | |
| D705,745 S | 5/2014 | Kurs et al. | |
| 8,716,903 B2 | 5/2014 | Kurs | |
| 8,717,400 B2 | 5/2014 | Ranganath | |
| 8,719,070 B2 | 5/2014 | Jabbour | |
| 8,723,366 B2 | 5/2014 | Fiorello | |
| 8,729,737 B2 | 5/2014 | Schatz | |
| 8,731,116 B2 | 5/2014 | Norconk | |
| 8,742,625 B2 | 6/2014 | Baarman | |
| 8,743,171 B2 | 6/2014 | Hiller | |
| 8,743,198 B2 | 6/2014 | Padmanabh | |
| 8,756,348 B2 | 6/2014 | Beel | |
| 8,760,007 B2 | 6/2014 | Joannopoulos | |
| 8,760,008 B2 | 6/2014 | Joannopoulos | |
| 8,760,265 B2 | 6/2014 | Krueger | |
| 8,766,484 B2 | 7/2014 | Baarman | |
| 8,766,485 B2 | 7/2014 | Joannopoulos | |
| 8,766,487 B2 | 7/2014 | Dibben | |
| 8,767,032 B2 | 7/2014 | Rodman | |
| 8,768,309 B2 | 7/2014 | Robbins | |
| 8,772,971 B2 | 7/2014 | Joannopoulos | |
| 8,772,972 B2 | 7/2014 | Joannopoulos | |
| 8,772,973 B2 | 7/2014 | Kurs | |
| 8,782,527 B2 | 7/2014 | Karlson | |
| 8,788,448 B2 | 7/2014 | Fadell | |
| 8,797,159 B2 | 8/2014 | Kirkpatrick | |
| 8,810,379 B2 | 8/2014 | Murphy | |
| 8,812,028 B2 | 8/2014 | Yariv | |
| 8,813,196 B2 | 8/2014 | Weller | |
| 8,819,136 B1 | 8/2014 | Vernon | |
| 8,819,138 B2 | 8/2014 | Houston | |
| 8,825,597 B1 | 9/2014 | Houston | |
| 8,838,681 B2 | 9/2014 | Motes | |
| 8,842,153 B2 | 9/2014 | Ranganath | |
| 8,843,816 B2 | 9/2014 | Stull | |
| 8,849,914 B2 | 9/2014 | Bove | |
| 8,856,256 B1 | 10/2014 | Srinivasan | |
| 8,866,619 B2 | 10/2014 | Knibbe | |
| 8,872,432 B2 | 10/2014 | Kercso | |
| 8,875,195 B2 | 10/2014 | Ogle | |
| 8,878,439 B2 | 11/2014 | Noguchi | |
| 8,887,069 B2 | 11/2014 | Tipirneni | |
| 8,896,656 B2 | 11/2014 | Epstein | |
| 8,898,231 B2 | 11/2014 | Crawford | |
| 8,904,293 B2 | 12/2014 | Bastide | |
| 8,909,702 B2 | 12/2014 | Golovchinsky | |
| 9,380,682 B2 | 6/2016 | Mead | |
| 2001/0051885 A1 | 12/2001 | Nardulli | |
| 2002/0015097 A1 | 2/2002 | Martens | |
| 2002/0130834 A1 | 9/2002 | Madarasz | |
| 2003/0097284 A1 | 5/2003 | Shinozaki | |
| 2003/0103075 A1 | 6/2003 | Rosselot | |
| 2003/0218537 A1 | 11/2003 | Hoch | |
| 2004/0001095 A1 | 1/2004 | Marques | |
| 2004/0051813 A1 | 3/2004 | Marmaropoulos | |
| 2004/0141605 A1 | 7/2004 | Chen | |
| 2004/0153504 A1 | 8/2004 | Hutchinson | |
| 2004/0210933 A1 | 10/2004 | Dresti | |
| 2004/0215694 A1 | 10/2004 | Podolsky | |
| 2005/0018826 A1 | 1/2005 | Benco | |
| 2005/0027581 A1 | 2/2005 | Kjesbu | |
| 2005/0071213 A1 | 3/2005 | Kumhyr | |
| 2005/0218739 A1 | 10/2005 | Maddin | |
| 2005/0235329 A1 | 10/2005 | Karaoguz | |
| 2005/0273372 A1 | 12/2005 | Bowne | |
| 2005/0273493 A1 | 12/2005 | Buford | |
| 2006/0009215 A1 | 1/2006 | Bogod | |
| 2006/0015376 A1 | 1/2006 | Sattler | |
| 2006/0026502 A1 | 2/2006 | Dutta | |
| 2006/0045107 A1 | 3/2006 | Kucenas | |
| 2006/0080432 A1 | 4/2006 | Spataro | |
| 2006/0168618 A1 | 7/2006 | Choi | |
| 2006/0218027 A1 | 9/2006 | Carrion | |
| 2007/0094065 A1 | 4/2007 | Wu | |
| 2007/0118415 A1 | 5/2007 | Chen | |
| 2007/0136095 A1 | 6/2007 | Weinstein | |
| 2007/0162315 A1 | 7/2007 | Hodges | |
| 2007/0197239 A1 | 8/2007 | Sane | |
| 2007/0198744 A1 | 8/2007 | Wensley | |
| 2007/0226034 A1 | 9/2007 | Khan | |
| 2007/0282661 A1 | 12/2007 | Franco | |
| 2007/0288291 A1 | 12/2007 | Earle | |
| 2008/0028323 A1 | 1/2008 | Rosen | |
| 2008/0091503 A1 | 4/2008 | Schirmer | |
| 2008/0162198 A1 | 7/2008 | Jabbour | |
| 2008/0184115 A1 | 7/2008 | Back | |
| 2008/0239994 A1 | 10/2008 | Xiong | |
| 2008/0244417 A1 | 10/2008 | Simpson | |
| 2008/0288355 A1 | 11/2008 | Rosen | |
| 2008/0291021 A1 | 11/2008 | Bhogal | |
| 2008/0300660 A1 | 12/2008 | John | |
| 2009/0019367 A1 | 1/2009 | Cavagnari | |
| 2009/0055234 A1 | 2/2009 | Li | |
| 2009/0066486 A1 | 3/2009 | Kiekbusch | |
| 2009/0094533 A1 | 4/2009 | Bozionek | |
| 2009/0106567 A1 | 4/2009 | Baarman | |
| 2009/0146982 A1 | 6/2009 | Thielman | |
| 2009/0164581 A1 | 6/2009 | Bove | |
| 2009/0210822 A1 | 8/2009 | Schindler | |
| 2009/0212637 A1 | 8/2009 | Baarman | |
| 2009/0271713 A1 | 10/2009 | Stull | |
| 2009/0327227 A1 | 12/2009 | Chakra | |
| 2010/0017245 A1 | 1/2010 | Kristiansen | |
| 2010/0037151 A1 | 2/2010 | Ackerman | |
| 2010/0070334 A1 | 3/2010 | Monteverde | |
| 2010/0088239 A1 | 4/2010 | Blair | |
| 2010/0102640 A1 | 4/2010 | Joannopoulos | |
| 2010/0127575 A1 | 5/2010 | Joannopoulos | |
| 2010/0133918 A1 | 6/2010 | Joannopoulos | |
| 2010/0133919 A1 | 6/2010 | Joannopoulos | |
| 2010/0133920 A1 | 6/2010 | Joannopoulos | |
| 2010/0153983 A1 | 6/2010 | Philmon | |

(56) References Cited

U.S. PATENT DOCUMENTS

| | | |
|---|---|---|
| 2010/0179854 A1 | 7/2010 | Shafer |
| 2010/0187911 A1 | 7/2010 | Joannopoulos |
| 2010/0207458 A1 | 8/2010 | Joannopoulos |
| 2010/0219694 A1 | 9/2010 | Kurs |
| 2010/0219791 A1 | 9/2010 | Cheng |
| 2010/0231340 A1 | 9/2010 | Fiorello |
| 2010/0235216 A1 | 9/2010 | Hehmeyer |
| 2010/0256823 A1 | 10/2010 | Cherukuri |
| 2010/0259110 A1 | 10/2010 | Kurs |
| 2010/0274855 A1 | 10/2010 | Wassingbo |
| 2010/0277121 A1 | 11/2010 | Hall |
| 2010/0283600 A1 | 11/2010 | Herbert |
| 2010/0308939 A1 | 12/2010 | Kurs |
| 2010/0315483 A1 | 12/2010 | King |
| 2010/0319066 A1 | 12/2010 | Berry |
| 2011/0043049 A1 | 2/2011 | Karalis |
| 2011/0072482 A1 | 3/2011 | Lau |
| 2011/0074346 A1 | 3/2011 | Hall |
| 2011/0088056 A1 | 4/2011 | Ansari |
| 2011/0095618 A1 | 4/2011 | Schatz |
| 2011/0121920 A1 | 5/2011 | Kurs |
| 2011/0126127 A1 | 5/2011 | Mariotti |
| 2011/0149809 A1 | 6/2011 | Narayanaswamy |
| 2011/0153738 A1 | 6/2011 | Bedingfield |
| 2011/0223899 A1 | 9/2011 | Hiraide |
| 2011/0225563 A1 | 9/2011 | Kim |
| 2011/0231216 A1 | 9/2011 | Fyke |
| 2011/0270952 A1 | 11/2011 | Ray |
| 2011/0295392 A1 | 12/2011 | Cunnington |
| 2011/0296465 A1 | 12/2011 | Krishnan |
| 2012/0007441 A1 | 1/2012 | John |
| 2012/0022909 A1 | 1/2012 | Ayatollahi |
| 2012/0032522 A1 | 2/2012 | Schatz |
| 2012/0062345 A1 | 3/2012 | Kurs |
| 2012/0068549 A1 | 3/2012 | Karalis |
| 2012/0068832 A1 | 3/2012 | Feldstein |
| 2012/0072030 A1 | 3/2012 | Elliott |
| 2012/0078676 A1 | 3/2012 | Adams |
| 2012/0086284 A1 | 4/2012 | Capanella |
| 2012/0086867 A1 | 4/2012 | Kesler |
| 2012/0091794 A1 | 4/2012 | Campanella |
| 2012/0091795 A1 | 4/2012 | Fiorello |
| 2012/0091796 A1 | 4/2012 | Kesler |
| 2012/0091797 A1 | 4/2012 | Kesler |
| 2012/0091819 A1 | 4/2012 | Kulikowski |
| 2012/0091820 A1 | 4/2012 | Campanella |
| 2012/0091949 A1 | 4/2012 | Campanella |
| 2012/0091950 A1 | 4/2012 | Campanella |
| 2012/0098350 A1 | 4/2012 | Campanella |
| 2012/0112531 A1 | 5/2012 | Kesler |
| 2012/0112532 A1 | 5/2012 | Kesler |
| 2012/0112534 A1 | 5/2012 | Kesler |
| 2012/0112535 A1 | 5/2012 | Karalis |
| 2012/0112536 A1 | 5/2012 | Karalis |
| 2012/0112538 A1 | 5/2012 | Kesler |
| 2012/0112691 A1 | 5/2012 | Kurs |
| 2012/0119569 A1 | 5/2012 | Karalis |
| 2012/0119575 A1 | 5/2012 | Kurs |
| 2012/0119576 A1 | 5/2012 | Kesler |
| 2012/0119698 A1 | 5/2012 | Karalis |
| 2012/0136572 A1 | 5/2012 | Norton |
| 2012/0139355 A1 | 6/2012 | Ganem |
| 2012/0184338 A1 | 7/2012 | Kesler |
| 2012/0192084 A1 | 7/2012 | Dura |
| 2012/0204272 A1 | 8/2012 | Svensson |
| 2012/0206050 A1 | 8/2012 | Spero |
| 2012/0206096 A1 | 8/2012 | John |
| 2012/0223573 A1 | 9/2012 | Schatz |
| 2012/0228952 A1 | 9/2012 | Hall |
| 2012/0228953 A1 | 9/2012 | Kesler |
| 2012/0228954 A1 | 9/2012 | Kesler |
| 2012/0228960 A1 | 9/2012 | Karalis |
| 2012/0233205 A1 | 9/2012 | McDermott |
| 2012/0235500 A1 | 9/2012 | Ganem |
| 2012/0235501 A1 | 9/2012 | Kesler |
| 2012/0235503 A1 | 9/2012 | Kesler |
| 2012/0235504 A1 | 9/2012 | Kesler |
| 2012/0235505 A1 | 9/2012 | Schatz |
| 2012/0235566 A1 | 9/2012 | Karalis |
| 2012/0235633 A1 | 9/2012 | Kesler |
| 2012/0235634 A1 | 9/2012 | Hall |
| 2012/0239117 A1 | 9/2012 | Kesler |
| 2012/0239202 A1 | 9/2012 | Voysey |
| 2012/0242159 A1 | 9/2012 | Lou |
| 2012/0243158 A1 | 9/2012 | Gentil |
| 2012/0248886 A1 | 10/2012 | Kesler |
| 2012/0248887 A1 | 10/2012 | Kesler |
| 2012/0248888 A1 | 10/2012 | Kesler |
| 2012/0248981 A1 | 10/2012 | Karalis |
| 2012/0254909 A1 | 10/2012 | Serdiuk |
| 2012/0256494 A1 | 10/2012 | Kesler |
| 2012/0274586 A1 | 11/2012 | Southworth |
| 2012/0284672 A1 | 11/2012 | Madonna |
| 2012/0313449 A1 | 12/2012 | Kurs |
| 2012/0313742 A1 | 12/2012 | Kurs |
| 2012/0324589 A1 | 12/2012 | Nukala |
| 2012/0331108 A1 | 12/2012 | Ferdowsi |
| 2012/0331394 A1 | 12/2012 | Trombley-Shapiro |
| 2013/0007949 A1 | 1/2013 | Kurs |
| 2013/0013750 A1 | 1/2013 | Butler |
| 2013/0018952 A1 | 1/2013 | McConnell |
| 2013/0018953 A1 | 1/2013 | McConnell |
| 2013/0020878 A1 | 1/2013 | Karalis |
| 2013/0033118 A1 | 2/2013 | Karalis |
| 2013/0038402 A1 | 2/2013 | Karalis |
| 2013/0041973 A1 | 2/2013 | Zhou |
| 2013/0054863 A1* | 2/2013 | Imes .................. H04L 12/2827 710/304 |
| 2013/0057364 A1 | 3/2013 | Kesler |
| 2013/0062966 A1 | 3/2013 | Verghese |
| 2013/0069441 A1 | 3/2013 | Verghese |
| 2013/0069543 A1 | 3/2013 | Mohan |
| 2013/0069753 A1 | 3/2013 | Kurs |
| 2013/0073094 A1 | 3/2013 | Knapton |
| 2013/0088154 A1 | 4/2013 | Van Hoof |
| 2013/0099587 A1 | 4/2013 | Lou |
| 2013/0157509 A1 | 6/2013 | Srivastava |
| 2013/0167039 A1 | 6/2013 | Howell |
| 2013/0171981 A1 | 7/2013 | Woo |
| 2013/0175874 A1 | 7/2013 | Lou |
| 2013/0181541 A1 | 7/2013 | Karalis |
| 2013/0198653 A1 | 8/2013 | Tse |
| 2013/0200721 A1 | 8/2013 | Kurs |
| 2013/0208186 A1 | 8/2013 | Malone |
| 2013/0218829 A1 | 8/2013 | Martinez |
| 2013/0221744 A1 | 8/2013 | Hall |
| 2013/0234481 A1 | 9/2013 | Johnson |
| 2013/0234531 A1 | 9/2013 | Budgett |
| 2013/0241439 A1 | 9/2013 | Nishigaki et al. |
| 2013/0246901 A1 | 9/2013 | Massand |
| 2013/0249410 A1 | 9/2013 | Thompson |
| 2013/0262687 A1 | 10/2013 | Avery |
| 2013/0278073 A1 | 10/2013 | Kurs |
| 2013/0278074 A1 | 10/2013 | Kurs |
| 2013/0278075 A1 | 10/2013 | Kurs |
| 2013/0283325 A1 | 10/2013 | Chiniara |
| 2013/0300353 A1 | 11/2013 | Kurs |
| 2013/0304924 A1 | 11/2013 | Dhara |
| 2013/0307349 A1 | 11/2013 | Hall |
| 2013/0314543 A1* | 11/2013 | Sutter .................. G06F 3/011 348/159 |
| 2013/0320773 A1 | 12/2013 | Schatz |
| 2013/0334892 A1 | 12/2013 | Hall |
| 2013/0334973 A1 | 12/2013 | Wagenaar Cacciola |
| 2014/0002012 A1 | 1/2014 | McCauley |
| 2014/0021798 A1 | 1/2014 | Kesler |
| 2014/0028112 A1 | 1/2014 | Hui |
| 2014/0035378 A1 | 2/2014 | Kesler |
| 2014/0035704 A1 | 2/2014 | Efe |
| 2014/0044281 A1 | 2/2014 | Ganem |
| 2014/0044293 A1 | 2/2014 | Ganem |
| 2014/0049118 A1 | 2/2014 | Karalis |
| 2014/0054961 A1 | 2/2014 | Metcalf |
| 2014/0062211 A1 | 3/2014 | Hamam |

(56) References Cited

U.S. PATENT DOCUMENTS

| | | |
|---|---|---|
| 2014/0067865 A1 | 3/2014 | Kirigin |
| 2014/0074930 A1 | 3/2014 | Kumashio |
| 2014/0084703 A1 | 3/2014 | Hall |
| 2014/0084859 A1 | 3/2014 | Hall |
| 2014/0091636 A1 | 4/2014 | Ofstein |
| 2014/0091756 A1 | 4/2014 | Ofstein |
| 2014/0103738 A1 | 4/2014 | Campanella |
| 2014/0108956 A1 | 4/2014 | Varenhorst |
| 2014/0109210 A1 | 4/2014 | Borzycki |
| 2014/0111304 A1 | 4/2014 | Hashim-Waris |
| 2014/0135648 A1 | 5/2014 | Holoien |
| 2014/0139426 A1 | 5/2014 | Kryze |
| 2014/0150059 A1 | 5/2014 | Uchida |
| 2014/0159589 A1 | 6/2014 | Pandharipande |
| 2014/0159652 A1 | 6/2014 | Hall |
| 2014/0167618 A1 | 6/2014 | Wang |
| 2014/0175898 A1 | 6/2014 | Kurs |
| 2014/0181704 A1 | 6/2014 | Madonna |
| 2014/0181935 A1 | 6/2014 | Beckmann |
| 2014/0195149 A1 | 7/2014 | Yang et al. |
| 2014/0195291 A1 | 7/2014 | Aaron |
| 2014/0195805 A1 | 7/2014 | Koo |
| 2014/0203659 A1 | 7/2014 | Madawala |
| 2014/0203921 A1 | 7/2014 | Baker |
| 2014/0215551 A1 | 7/2014 | Allain |
| 2014/0229578 A1 | 8/2014 | Chu |
| 2014/0236659 A1 | 8/2014 | Hapse |
| 2014/0244043 A1 | 8/2014 | Foster |
| 2014/0253813 A1 | 9/2014 | Bakar |
| 2014/0259047 A1 | 9/2014 | Bakar |
| 2014/0269531 A1 | 9/2014 | Luna |
| 2014/0274005 A1 | 9/2014 | Luna |
| 2014/0277757 A1 | 9/2014 | Wang |
| 2014/0277763 A1 | 9/2014 | Ramachandran |
| 2014/0278057 A1 | 9/2014 | Berns |
| 2014/0282013 A1 | 9/2014 | Amijee |
| 2014/0285113 A1 | 9/2014 | Huang |
| 2014/0297758 A1 | 10/2014 | Kidron |
| 2014/0300277 A1 | 10/2014 | Ono |
| 2014/0302795 A1 | 10/2014 | Chacon |
| 2015/0035440 A1 | 2/2015 | Spero |
| 2015/0069915 A1 | 3/2015 | Ogawa |
| 2015/0201480 A1 | 7/2015 | Ogawa |
| 2015/0330780 A1 | 11/2015 | Yuzawa et al. |
| 2015/0370272 A1 | 12/2015 | Reddy et al. |
| 2016/0327922 A1* | 11/2016 | Sekiguchi .............. G05B 15/02 |

FOREIGN PATENT DOCUMENTS

| | | |
|---|---|---|
| AU | 2013203947 A1 | 5/2013 |
| CN | 102239633 A | 11/2011 |
| CN | 102439669 A | 5/2012 |
| CN | 102870338 A | 1/2013 |
| EP | 0935263 A2 | 8/1999 |
| EP | 2367146 A1 | 9/2011 |
| EP | 2388977 A1 | 11/2011 |
| EP | 2439686 A1 | 4/2012 |
| KR | 20140007006 A | 1/2014 |
| WO | 2007008646 A2 | 1/2007 |
| WO | 2008118178 A1 | 10/2008 |
| WO | 2009085896 A1 | 7/2009 |
| WO | 2009108958 A1 | 9/2009 |
| WO | 2009108959 A1 | 9/2009 |
| WO | 2010093997 A1 | 8/2010 |
| WO | 2011034759 A2 | 3/2011 |
| WO | 2011099873 A1 | 8/2011 |
| WO | 2011112795 A1 | 9/2011 |
| WO | 2012037279 A1 | 3/2012 |
| WO | 2012170278 A3 | 12/2012 |
| WO | 2013008252 A2 | 1/2013 |
| WO | 2013059441 A1 | 4/2013 |
| WO | 2013112185 A2 | 8/2013 |
| WO | 2013122483 A1 | 8/2013 |
| WO | 2014007656 A1 | 1/2014 |
| WO | 2014011059 A1 | 1/2014 |
| WO | 2014035260 A1 | 3/2014 |
| WO | 2014035263 A1 | 3/2014 |
| WO | 2014038966 A1 | 3/2014 |
| WO | 2014054953 A1 | 4/2014 |
| WO | 2014094107 A1 | 6/2014 |
| WO | 2014139781 A2 | 9/2014 |

OTHER PUBLICATIONS join.me forum and FAQ, Apr. 3, 2014.
Cisco, WebEx Meeting Center User Guide for Hosts, Presenters, and Participants, Version 8.23, Copyright 1997-2011 Cisco and/or its affiliates.
Krumm, et al., The NearMe Wireless Proximity Server, UbiComp 2004, The Sixth International Conference on Ubiquitous Computing, pp. 283-300, Sep. 7-10, 2004.
NFS Technology Group, Rendezvous—Technology for Meeting Room, Desk Scheduling and Event Management, http://myrendezvous.net/rendezvous-event-booking-software/calendar-management/.
Citrix, GoToWebinar User Guide, Copyright 2015 Citrix Systems.
CiviCRM Books: User and Administrator Guide for Version 4.5, Published Sep. 2014, http://book.civicrm.org/user/current/email/scheduled-reminders/.
Lee, TechnicLee—My Thoughts on Technology, Business, and Innovation, Posted in Outlook, Scripting, Jan. 20, 2012, http://techniclee.wordpress.com/2012/01/20/sending-a-meeting-reminder-email-in-outlook/.
Events and Room Reserve Scheduled Task Setup for Email Notifications, Article No. 268, Apr. 22, 2013, http://kb.evanced.info/article.php?id=268.
Oracle Communications, Oracle Data Sheet—Calendar Server, Copyright 2015 Oracle and/or its affiliates, http://www.oracle.com/us/industries/communications/communications-calendar-server-ds-071728.pdf.
Stirworks, Inc., The Height-Adjustable, Standing Stir Kinetic Desk, http://www.stirworks.com/, Copyright 2015 Stirworks, Inc., 6 pages.

\* cited by examiner

Dashboard

Select raw data, observations and other conclusions to highlight data that justify the new conclusion.

New conclusion: Should add a second electronic whiteboard to the conference space.

Conference Room A1 (Time 09:12)
Raw Data

| | | |
|---|---|---|
| Chair XX1 | Temp - | 78 degrees |
| | Motion - | No |
| | Sound - | Yes |
| Chair XX2 | Temp - | 79 degrees |
| | Motion - | Yes |
| | Sound - | Yes |
| Chair XX3 | Temp - | 78 degrees |
| | Motion - | Yes |
| | Sound - | Yes |
| Chair XX10 | Temp - | 77 degrees |
| | Motion - | No |
| | Sound - | No |
| Whiteboard WB2 | Motion - | Yes |
| | Number - | 2 |
| | Sound - | Yes |
| | Tech Use | Yes |
| Threshold 1 | Motion - | No |
| | Sound - | No |
| Threshold 2 | Motion - | No |
| | Sound - | Yes |

Current Session
Observations
-Occupied (6 occupants)
-Scheduled occupants – 8
-Occupants on time - 4
-Whiteboard in use
-2 occupants at whiteboard
-2 current speakers
-3 occupants routine speakers
-2 occupants minimal speakers
-1 occupant in/out Persistent Observations
-Average occupied – 78%
-Ave. occupants - 9
-Ave. scheduled occupants – 5
-Whiteboard use – 70%
-Electronic WB use – 88%
-Multiple occupants at WB board – 12%
-Ave. occupants routine speakers 28%
-Occupant in/out – 5%
-Space score – 8/10

Conclusions
-Add conference space – 12 occupant
-Employees routinely attend unscheduled meetings Submit

METHOD AND SYSTEM FOR LOCATING RESOURCES AND COMMUNICATING WITHIN AN ENTERPRISE

CROSS-REFERENCE TO RELATED APPLICATIONS

This application is a continuation in part of U.S. patent application Ser. No. 15/170,550 which is titled "Space Guidance And Management System And Method" which was filed on Jun. 1, 2016 and claims priority through the 15/170,550 application to U.S. provisional patent application Ser. No. 62/328,339 which was filed Apr. 27, 2016 and which is entitled "Space Guidance And Management System And Method" as well as to U.S. provisional patent application Ser. No. 62/171,401 which was filed on Jun. 5, 2015 and which is titled "Space Guidance And Management System And Method", each of which is incorporated herein in its entirety by reference.

U.S. patent application Ser. No. 14/730,996 which was filed on Jun. 4, 2015 and which is titled "Environment Optimization For Space Based On Presence And Activities" and U.S. provisional application No. 62/008,283 which was filed on Jun. 5, 2014 and which also is titled "Environment Optimization For Space Based On Presence And Activities", are each incorporated herein in its entirety by reference.

U.S. patent application Ser. No. 15/170,550 is also a continuation in part of U.S. patent application Ser. No. 14/871,097 which is titled "Method And System For Locating Resources And Communicating Within An Enterprise" which was filed on Sep. 30, 2015 and claims priority through the 14/871,097 application to U.S. provisional patent application Ser. No. 62/059,602 which was filed on Oct. 3, 2014 and which is titled "Method And System For Locating Resources And Communicating Within An Enterprise", each of which is incorporated herein in its entirety by reference.

STATEMENT REGARDING FEDERALLY SPONSORED RESEARCH OR DEVELOPMENT

Not application applicable.

BACKGROUND OF THE DISCLOSURE

The field of the invention is resource tracking and more specifically systems and methods for identifying available resources including, among other things, space, people and equipment associated with an enterprise and obtaining access to those resources.

BRIEF SUMMARY OF THE DISCLOSURE

Years ago, most companies were regional or, where they were national, had one or more offices in each region of the country to service relatively local clients. Employees lived near the facilities they worked in and often had dedicated offices adjacent other employees they routinely worked with and had access to local resources such as conference spaces, video communication systems, printers, etc. One advantage in these cases was that employees became familiar with all available resources within a facility through routine use. Each employee knew office layouts, locations of and affordances in conference spaces, and in many cases even knew general schedules of fellow employees in their facilities (e.g., that staffing meetings were held every Monday morning from 8 AM to 9 AM in conference room AAA).

Another advantage was that the employees could quickly determine availability of resources including conference spaces and other employees. An employee could see if a light or a computer was on in another employee's office and determine if the other employee was in a facility that day. An employee could visually determine if a conference space was available.

One other advantage was that teams of people that worked on specific projects were often located in the same facility. Co-location meant that team members were able to see each other routinely and to find other team members in between team conferences to move team tasks along. To this end, with employees co-located, short impromptu meetings when two employees had open space in their schedules could happen naturally. For instance, two employees could bump into each other in a hallway and have a short conference regarding a pressing issue. As another instance, one employee could pop her head into another employee's office and, if the other employee was available, could have a short discussion about some topic or could identify a time when the short discussion could occur.

Yet another advantage was that employee's could sense availability of other employees based on non-verbal tell tale signs. For instance, if a first employee had her door shut during morning hours, other employees could sense that the first employee was busy during that time even though the first employee's schedule may have indicated availability. As another instance, based on personal conversations, employees in one facility may have known well in advance when a first employee from that facility was going to be traveling to a different facility in a different time zone and therefore that the first employee would likely be out of pocket during certain periods of the day due to the time change.

Times have changed and so have the staffing models at many large companies so that now many employees routinely travel among many different facilities nationally and internationally to attend meetings and conferences. Many employees are routinely located in unfamiliar facilities without knowledge about facility layout and affordances, locations of other employees within facilities, or any tools for assessing real time schedules of enterprise resources (e.g., conference or personal spaces, affordances within spaces, other employees, etc.). For example, an employee visiting a large Tokyo facility for the first time would be unfamiliar with locations of conference spaces within the facility as well as options for space that could be used for personal focused work as well as affordances (e.g., video capabilities, printers, etc.) within the spaces. Here, the employee also generally would not be aware of locations of personal offices of other employees within the space or of spaces temporarily (e.g., for a day) used by other specific employees within the space. Even if the employee had a map of different spaces within the facility, the employee would have no way to determine availability of the spaces for personal or group use or the locations of other employees in the facility located outside their assigned personal spaces.

Problems associated with lack of insight into resources and schedules are exacerbated by un-scheduled on the fly changes to resource schedules that are unknown to employees. For instance, a conference space may be claimed for an impromptu 25 minute meeting between two colleagues that unexpectedly bump into each other in a hall way. In this case, the conference space as well as each of the conferencing colleagues are out of pocket during the 25 minute meeting. As another instance, a conference scheduled for 60 minutes including 7 employees may be completed early after 25 minutes so that the space used for the conference as well as the 7 employees are freed up earlier than expected. Here, even if a first employee had access to an electronically maintained schedule of another employee in a conference, the unexpected schedule change would not be detected and an opportunity to communicate or inability to communicate as a function of a schedule change would not be perceived by the first employee.

To support a fluid set of employees within enterprise facilities, enterprises are routinely seeking to provide space optimized for specific uses. For instance, where employees within a facility or a section of a facility routinely engage in focused individual activities, space should be optimized for individual activities and in another section of a facility where employees routinely work in large groups (e.g., 5 or more employees), the space should be optimized to facilitate large group activities. Current systems for identifying optimized employee supporting resources are not very good.

Thus, there is a need for tools that enable employees of an enterprise to identify resources within one or more enterprise facilities as well as affordances associated with those resources and current and future availability of those resources. There is also a need for employees to be able to set notifications for themselves or for other employees to indicate status changes (e.g., a change from available to busy or vice versa) for specific enterprise resources. There is further a need for a system that enables tracking of resource use in a simple and cost effective manner using hardware that already exists for other purposes, especially in facility areas where wireless access points or the like are not provided.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 65 is similar to FIG. 63, albeit enabling an analyst to select a set of raw data, observations and conclusions that should be used as support for the new conclusion that was entered by the analyst using the FIG. 64 interface;

DETAILED DESCRIPTION OF THE DISCLOSURE

Figure 1:
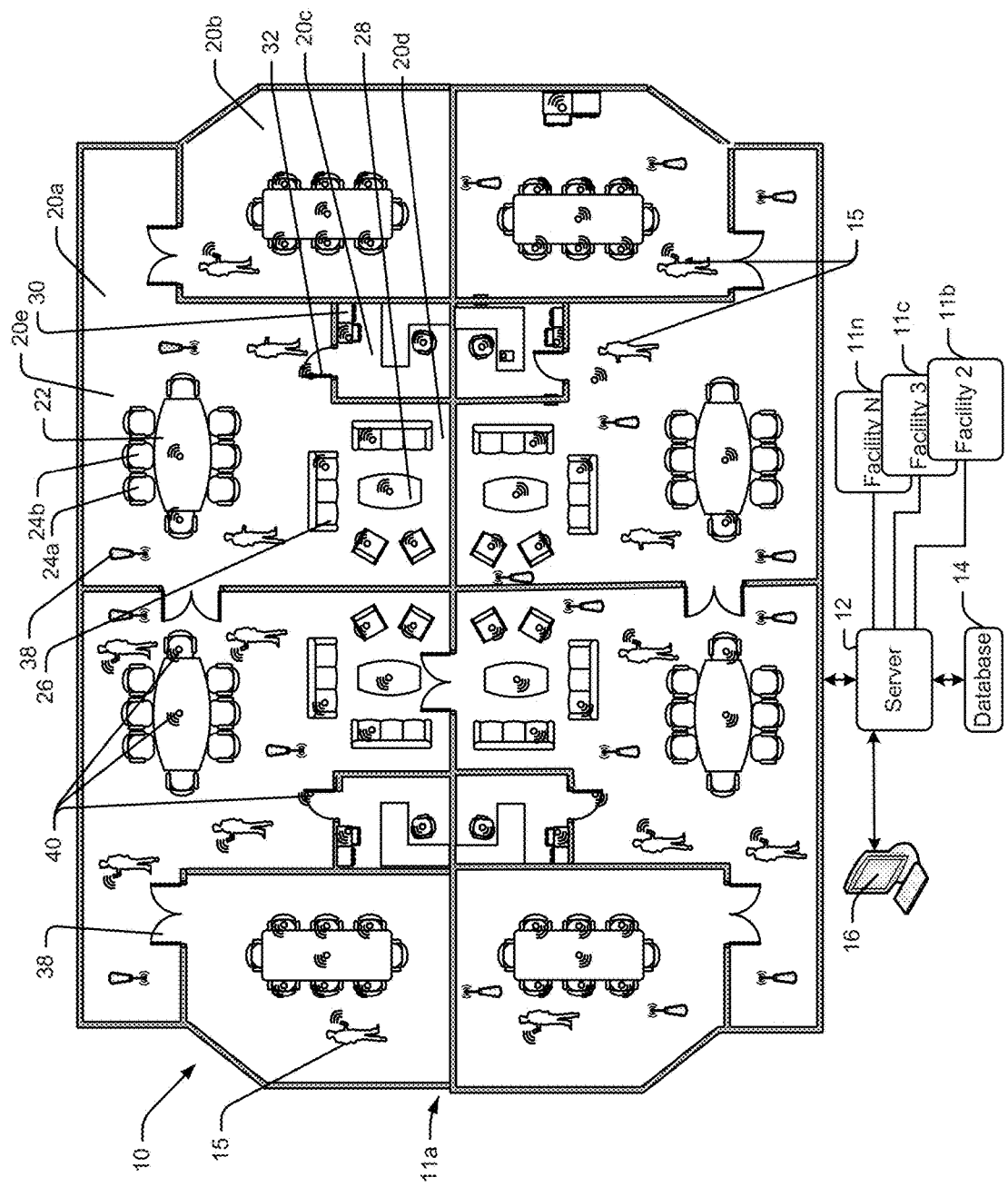
FIG. 1 is a schematic view showing a system associated with an enterprise that is capable of performing at least some aspects of various embodiments of the present disclosure.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

In the description that follows, various system components and features are described in the context of different embodiments. It should be appreciated that different systems may have different complexities and therefore that some systems may only have a subset of the described components and may only provide a subset of the described features. In addition, while one or another feature may be described in the context of a specific embodiment, any of the features may be used in any of the embodiments.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present disclosure will be described in the context of an exemplary enterprise system 10 for managing facility resources including resources associated with one or more enterprise spaces 11a, 11b, 11c, . . . 11n. Among other components, the system 10 includes a server 12, a database 14 (e.g., a computer readable medium) and, in at least some cases, employee computer devices(s) or work station(s) 16.

Herein, an "enterprise" is a business or entity that includes resources including, among other things, conference tables, desks, credenza's, stationary or moveable wall structures, doors, video conferencing subassemblies, projectors, printers, computers, etc. In addition, resources may also include employees that work for an enterprise and/or employee time.

In still other cases resources may include non-employee personnel located in or on an enterprise property such as, for instance, third party contractors, customers, clients, service providers, etc. Herein, unless indicated otherwise the term "employee" will be used generally to refer to an actual employee of an enterprise or some other non-employee person that is at least temporarily located on an enterprise property. In at least some embodiments different resource information may be made available to employees and non-employees. For instance, while employees may be able to view locations of all employees and non-employees in an enterprise facility, non-employees may not and may be restricted to identify a subset of available personal and conference spaces reserved for use by visiting non-employees. In other cases non-employees may have the ability to access all resource information that is accessible to employees.

In order to effectively use resources, employees need to know the resources that they have available for use, locations of the resources and, in many cases, whether or not those resources have been prescheduled or are currently occupied and therefore cannot be used during various time periods. The present disclosure describes exemplary systems and processes that may be used to track and report resource locations and use and to enable enterprise employees to access resources efficiently.

Referring still to FIG. 1, server 12 includes one or more computers that cooperate to perform various processes and methods that are consistent with at least some aspects of the present invention. While server 12 is shown as a single component in system 10, it should be appreciated that server 12 may include two or more servers and other computing and networked devices that cooperate to perform processes or that divide up tasks and processes to be performed. Server 12 is linked to database 14.

Database 14 includes one or more computer readable medium and stores programs run by server 12 as well as data and other information used by server 12 to facilitate programs and methods and data that is generated through use of the programs run by server 12. Types of data stored in database 14 depend on which of several different applications are performed by server 12. For instance, some applications may only be useful for identifying locations of non-human resources (e.g., spaces, video conferencing equipment, etc.), other applications may only be useful for identifying locations of enterprise employees or non-employees, and still other applications may be used to manage all (e.g., human and non-human) resources. Where non-human resource locations are to be reported, in some cases simple descriptions of the resources suitable to distinguish one from others may suffice. In other cases where views of resources are to be provided, 2D or 3D CAD or other resource representations may be stored for generating views of spaces. Where employee locations are tracked, records for each employee may be stored including name, title, an image, etc. In addition, in some cases employee tracking or privacy preferences may be stored such as, for instance, limitations related to which other employees can track an employee's location, spaces in which location can and cannot be tracked, time periods during which locations can and cannot be tracked, activities during which locations can and cannot be tracked, etc.

In still other cases, applications may allow employees to view and modify schedules of all or a subset of enterprise resources. Here, for each resource that can be scheduled, either database 14 will store scheduling software and schedule information or server 12 will have access to scheduling applications maintained by another linked server for obtaining schedule information and manipulating resource schedules.

In still other applications it is contemplated that alarms or notifications related to various resource activities, statuses, circumstances, etc., may be rendered by server 12 to enterprise employees. For instance, an employee may want to know when another employee has entered a specific enterprise facility. As another instance, an employee may want to know when a specific conference room becomes available for use. In these and other cases, database 14 may store notification specifications for each resource indicating circumstances to track and other employees to notify. In some cases all of the above applications may be integrated into a single system package in which case relatively complex records for each resource may be stored in database 14. Other types of data required to support applications described hereafter are contemplated.

Workstation 16 is linked to server 12 for accessing output of various of the programs run by server 12 and to allow input for controlling various aspects of the programs. While workstation 16 may be stationary, in some embodiments the work station 16 may be portable and include a laptop, a table type computing device, a smart phone, etc. Server 12 is also linked to various other system components as described in greater detail hereafter.

Referring still to FIG. 1, each space 11*a* through 11*n* is shown as a separate facility. In other embodiments, however, each space may include a floor of a facility, all of the floors that comprise a multi floor facility, or a subset of floors or spaces, or any other space subset associated with an enterprise. The exemplary space 11*a* in FIG. 1 includes common or open spaces (e.g., 20*a*), subspaces including conference spaces (e.g., 20*b*, 20*d*, 20*e*) and personal or individual work spaces (20*c*), etc., that form a map when viewed in top plan view as in FIG. 1. FIG. 1 indicates real time locations of various resources in at least some of the subspaces including enterprise employees 15, conference tables 22, 28 or desks, task chairs 24*a*, 24*b*, etc., credenzas or file cabinets 30, lounges or sofas 26, doors 32 and other resources including printers, portable video conferencing equipment, etc. Other resources may include moveable wall structures and other portable equipment useable in one or multiple of the subspaces.

Figure 2:
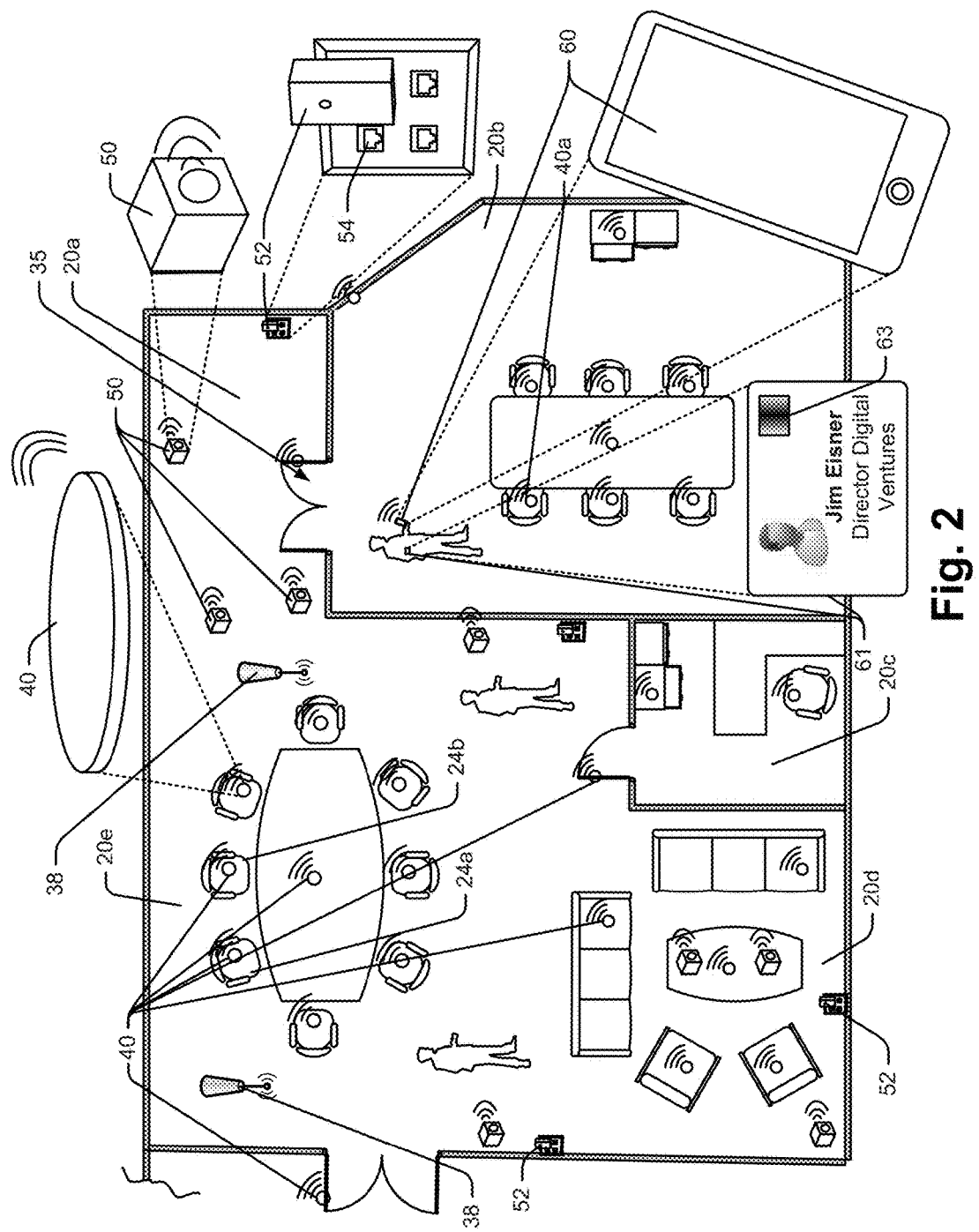
FIG. 2 is a schematic view illustrating a subset of the system components shown in FIG. 1 and associated with a sub-portion of the space shown in FIG. 1.

Referring still to FIG. 1 and now also to FIG. 2, a portion of space 11*a* in FIG. 1 is shown in a larger and more detailed view in FIG. 2. The enlarged space in FIG. 2 includes subspaces 20*a* through 20*e* where wall structure separates space 20*b* from the other spaces and separates space 20*c* from the other spaces but where space 20*a* opens into space 20*e* and space 20*d* also opens into space 20*e*. Thus, in at least some cases, spaces recognized as distinct from other spaces may be portions of larger spaces without any mechanical dividing wall or other structure.

Referring again FIG. 1, digital maps of each of the enterprise spaces 11*a* through 11*n* are stored within database 14 for use by server 12 to perform various applications useful in managing the enterprise. The walls and other permanent dividing structure in the maps may be identified using a floor or architectural plan for each of the facility spaces as known in the art. In at least some cases all or at least a subset of the maps are dynamic in that they are routinely updated to reflect changes in the locations of resources within facility spaces. For instance, if a conference table and a set of chairs is moved from one facility space to another, the locations of the table and chairs on a facility map may be updated to reflect the movements.

In at least some embodiments it is contemplated that portable personal computing devices like smart phones, tablet type devices 60 and even laptop computers may be used as the primary interface tools by system administrators and enterprise employees generally for accessing many different types of information related to enterprise resources. Hereinafter, the phrase "portable computing device" will be used to refer to portable computing devices generally.

It is contemplated that a "corporate maps" application may be stored on a device that is accessible via a corporate maps icon. To this end, see FIG. 3 that shows a portable computing device 60 including a display screen 160 that includes a plurality of application icons including a corporate maps icon 162, a compass icon 163 and a room peak icon 165. The icons 162, 163 and 165 correspond to three separate applications that may be used to manage enterprise resources. While the applications are shown as distinct, each has at least some similar capabilities and each, in at least some aspects, is only different from the others in how resource information is accessed or presented to a device user. In other embodiments various aspects of each of the applications may be provided as part of any of the other two applications.

Figure 4:
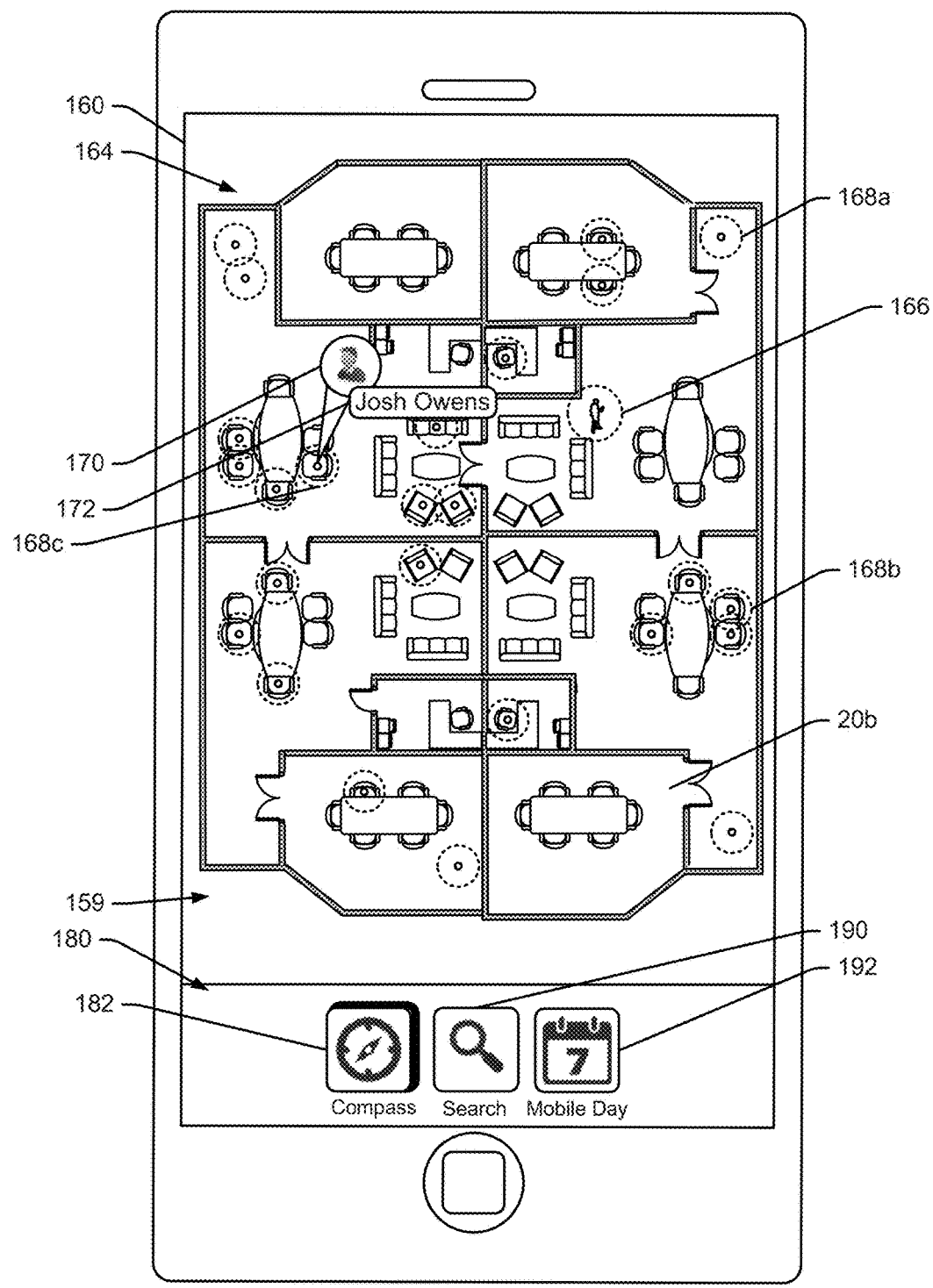
FIG. 4 is similar to FIG. 3, albeit showing a graphical map screen shot view of a facility.

Hereinafter, unless indicated otherwise, an employee using a portable computing device will be referred to as a device 60 user. When icon 162 is selected by a device 60 user, any of several different initial default screen shots of a subset of enterprise resources may be presented. For instance, in at least some embodiments, when icon 162 is selected, a screen shot 164 as shown in FIG. 4 may be presented as an initial application screen. Screen shot 164 includes a content field 159 and a toolbar field 180. The tool bar field 180 includes a set of tool icons that are generally persistently presented while the application is open for selecting different application functions associated with the corporate maps application. The exemplary field 180 includes a "compass" icon 182, a "search" icon 190 and a "mobile day" icon 192. Other icons for other functionality are contemplated, some of which are descried hereafter. Each of icons 182, 190 and 192 and related functionality will be descried hereafter.

Initially the compass icon 182 is highlighted to indicate that a compass functionality is an initial default function. Compass functionality will, it is believed, be the most routinely used functionality associated with the corporate maps application and therefore the default is to that functionality. An image of a facility map (e.g., a resource representation) is presented in field 159 which shows the location of device 60 at 166 on a graphical top plan view map of at least a portion of a facility in which the employee using device 60 is located along with the current locations of other employees within the facility subspace associated with the map to help a device 60 user locate other employees and spaces. Here, the locations of other persons within the space corresponding to the map are each indicated via a phantom circle 168*a*, 168*b*, 168*c*, etc.

In addition to showing employees within the mapped space near the device user 166, the view 159 also shows other resources including tables, chairs, sofas, printers, video conferencing system, etc. Here, in at least some cases, the virtual view 159 indicates real time locations of other (e.g., non-personnel) resources within the facility spaces. Thus, for instance, if a portable videoconferencing system has been moved from space 20*b* into second space 20*e* (see again FIG. 2), the real time location of the conferencing system in space 20*e* may be graphically represented so that a device 60 user can access current resource location information.

Referring again to FIGS. 1 and 2, to track locations of enterprise resources, in at least some cases, tracking devices 40 may be provided for each of at least a subset of resources that are located within each or at least a subset of the facility subspaces. An exemplary tracking device 40 stores and transmits a unique device identifier that can be used to distinguish one device 40 from all others. For instance, device 40 may transmit a wireless low energy Bluetooth advertising signal including a device specific identifier. In some cases, the signal may be periodically transmitted (e.g., every 40 seconds). In some cases the period between transmitted signals may be change as a function of sensed movement of a resource or a resource component. For instance, if a chair movement (e.g., a change in location) is currently sensed, the beacon signal may be transmitted every five seconds until movement is no longer sensed. As another instance, if the backrest of a chair recliners, the beacon signal may be transmitted every two seconds until the recline angle is stabilized, after which the signal may again be transmitted every 40 seconds.

Figure 5:
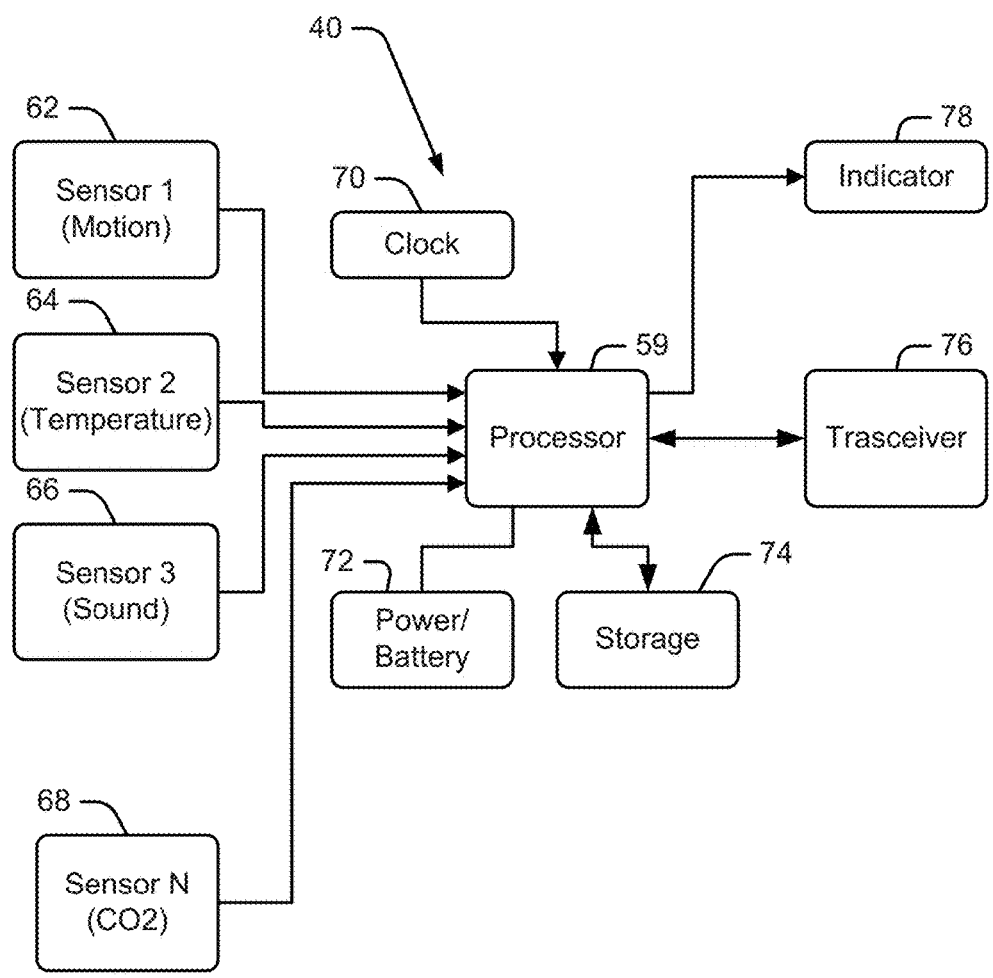
FIG. 5 is a schematic view showing the components of one of the tracking devices shown in FIG. 2.

Referring to FIG. 5, an exemplary tracking device 40 is shown in schematic view and includes a processor 59, a clock 70, a power source or battery 72, a data storage device 74, a transceiver 76 and an indicator 78. Clock 70 is linked to processor 59 and generates a time signal that can be used to determine when to transmit signals to server 12 as well as for generating time stamps for various purposes. While shown as a separate component, clock 70 may be provided by processor 59 itself. Battery 72 is linked to processor 59 and, in at least some embodiments, may store energy sufficient to drive the device 40 for ten or more years. To this end, in at least some cases it is contemplated that device 40 will be a low energy Bluetooth or other type of low energy wireless transmitting device that will only sporadically transmit data to data collector devices. Indicator 78 may indicate when data is being transmitted (e.g., a heartbeat signal) or may indicate when the battery 72 needs to be replaced or recharged. In some cases devices 40 will be so inexpensive that after the battery discharges, the device can be thrown out and replaced.

Figure 8:
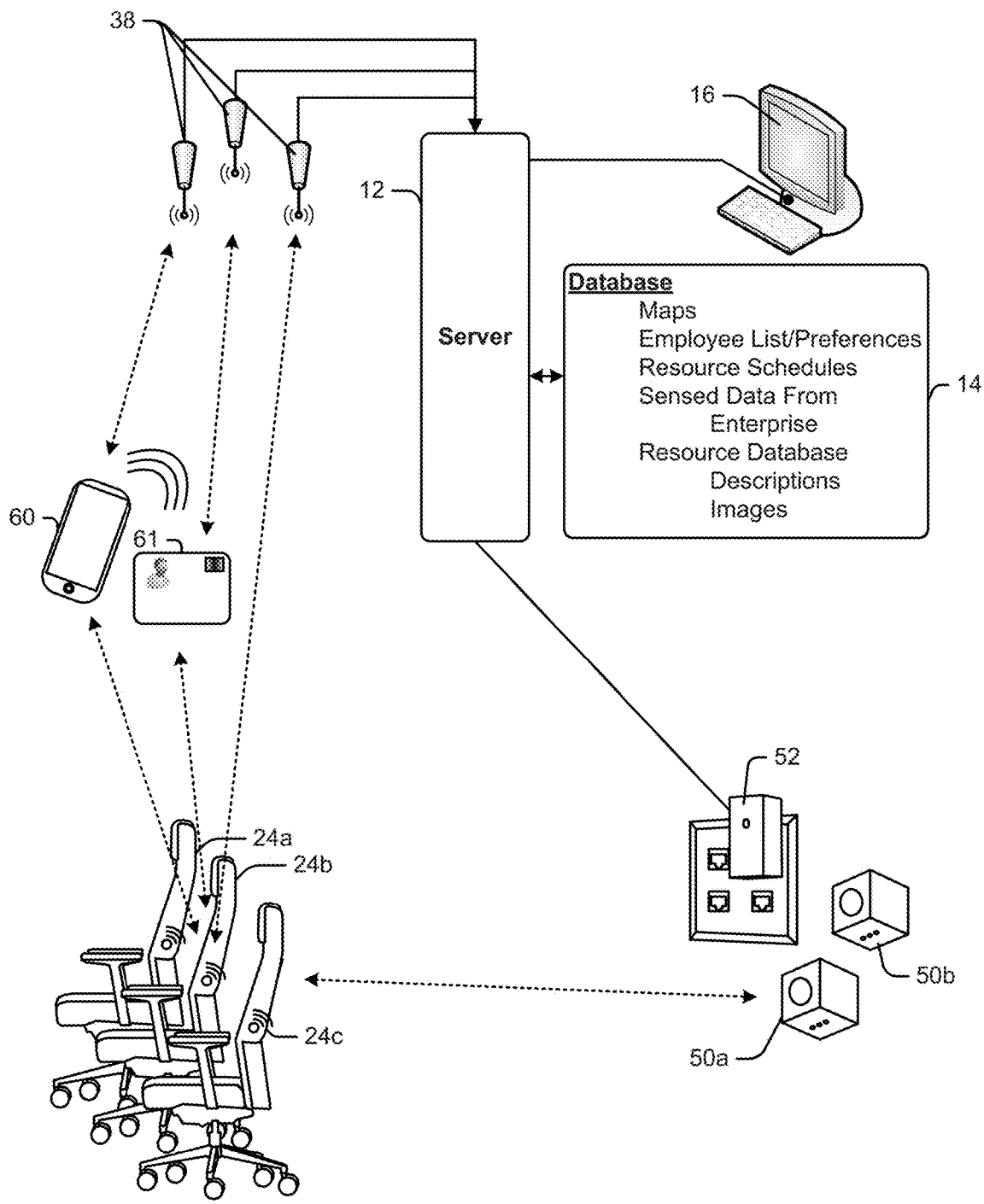
FIG. 8 is a schematic view showing another representation of a subset of the system components from FIG. 1 to show communication paths between system devices in a simplified view.

Referring again to FIGS. 1 and 2 and also to FIG. 8, in some cases wireless access points 38 that are built into a facility structure and that link to server 12 for providing wireless communication with computing and other devices may be used to track locations of at least some of the devices 40 and hence the locations of resources associated with each device. To this end, where access points 38 are located relatively proximate tracking devices 40, when devices 40 transmit their identification signals, one or more access points may receive the transmitted signals and use the strengths of those signals to identify general or precise locations of the devices 40. For instance, where several access points receive a signal from one device 40, the strengths of the received signals may be used to triangulate the location of the device 40 within a space using algorithms known in the wireless tracking art generally.

In many cases there are spaces within facilities that are poorly served by access points or that are positioned such that signals received at access points are unable to be used to identify device 40 location accurately enough for at least some useful applications contemplated in the present disclosure. For instance, metal and other structures that form facility walls or other affordances may interfere with device 40 signals so that any signal received by an access point from a device 40 would be highly inaccurate.

Where access points are unable to receive particularly accurate signals from devices 40 but where resource locations are desirable, some other system must be used to detect resource locations. Two other data collecting systems are contemplated in this disclosure. A first system includes semi-stationary Ethernet linked data collector subassemblies and a second system includes portable computing devices 60 programmed to collect and report information from devices 40 to server 12.

Figure 6:
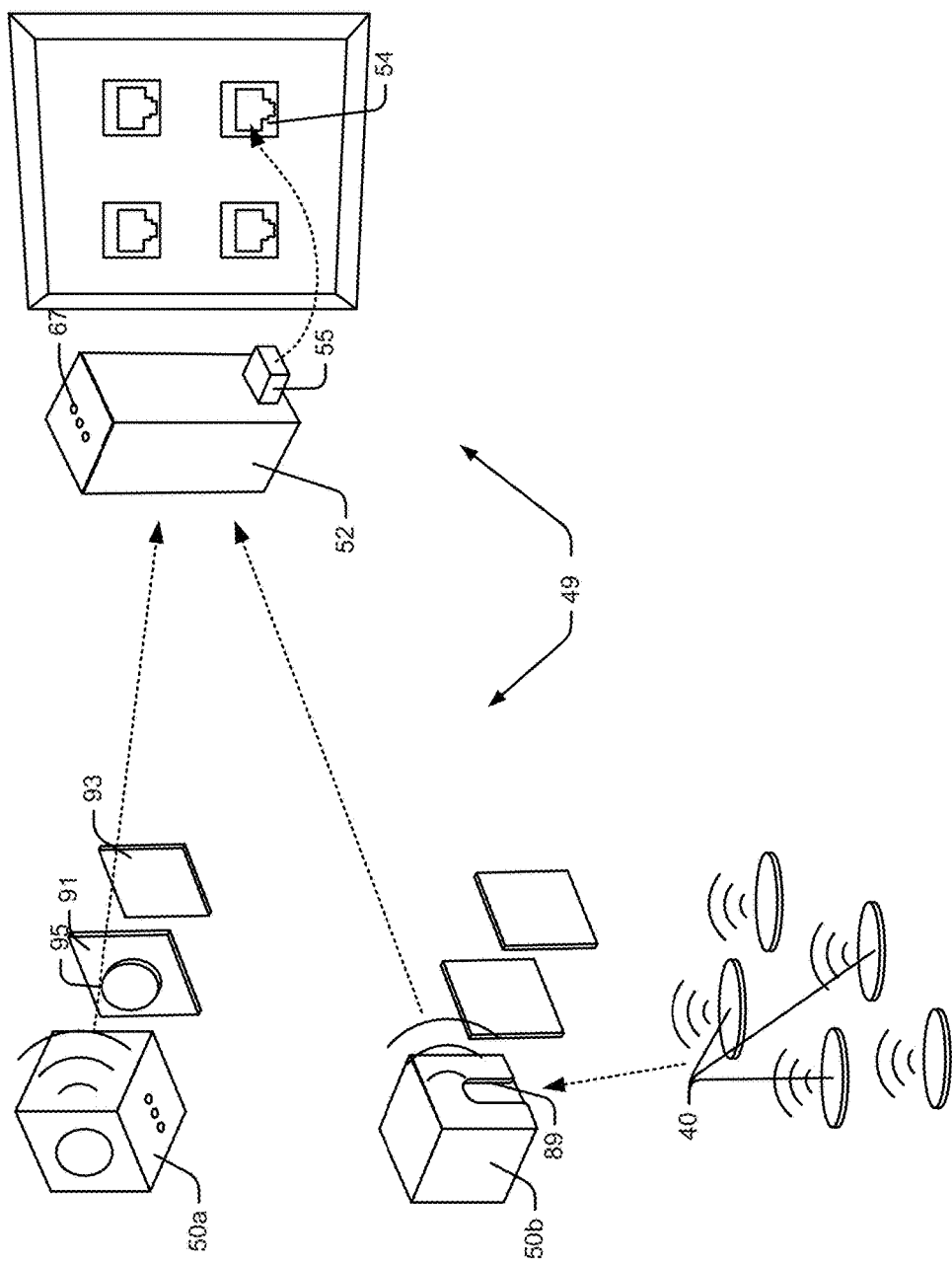
FIG. 6 is a schematic view showing a data collector subassembly that is consistent with at least some aspects of the present disclosure.
Figure 7:
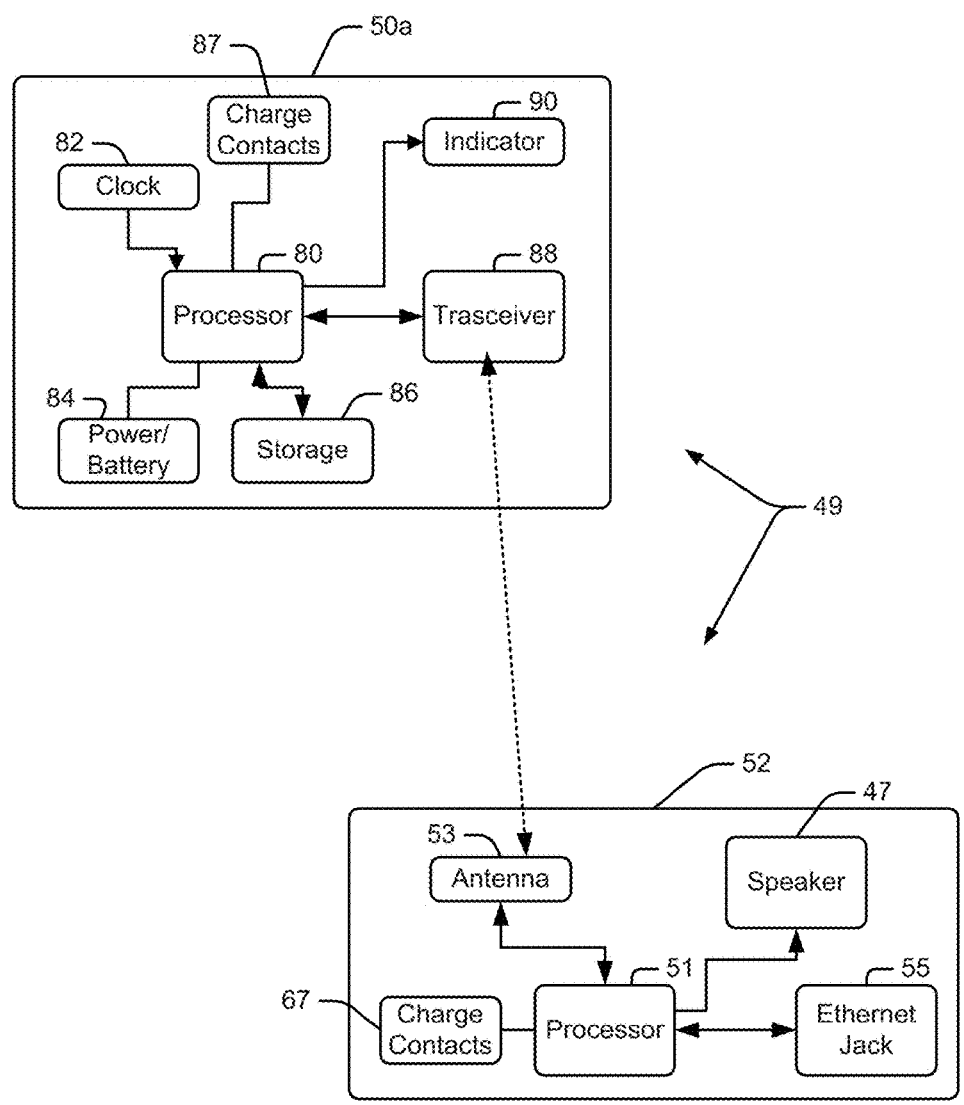
FIG. 7 is a schematic showing internal components of at least some of the components shown in FIG. 6.

Regarding the first system, FIGS. 6 and 7 illustrate a semi-stationary collector subassembly 49 including a base assembly 52 (hereinafter "base") and first and second satellite assemblies 50*a* and 50*b* (hereinafter "satellites"). The base 52 includes a processor 51, an antenna 53 and an Ethernet jack 55. The antenna 53 is linked to processor 51 and tuned to receive information transmitted by satellites 50*a* and 50*b*. Jack 55 is linked to processor 51 and plugs into a standard wall mounted Ethernet receptacle 54 to link with server 12. Thus, data received by base 52 via antenna 53 can be provided to server 12.

Referring to FIG. 7, an exemplary satellite 50*a* includes a processor 80, a clock 82, a battery 84, a data storage device 86, an indicator 90 and a transceiver 88. Each of the clock 80, battery 82, device 86, transceiver 88 and indicator 90 are linked to processor 80.

Prior to use, satellites 50*a*, 50*b*, etc., are positioned or mounted within a facility space at locations selected to optimally obtain information transmitted by devices 40 within the space via transceivers 88. To this end, in many spaces Ethernet receptacles 54, while present, are often located at relatively low positions (e.g., at the locations of traditional power receptacles) within a space and therefore are often not well positioned for obtaining information transmitted via low energy signals from devices 40 as furniture, wall structures, or the like within a space often blocks a direct transmission path. Satellites 50*a* and 50*b* may be mounted at relatively optimal locations within a space for collecting data from devices 40. For instance, first satellite 50*a* may be mounted to a wall at a relatively high location within a space to have a substantially direct transmission path from many of the devices 40 located within a space and to also have a substantially direct transmission path to a base unit 52 connected at an Ethernet receptacle at a low location. Second satellite 50*b* may be similarly mounted, albeit at a different position within the space so that different transmission paths from devices 40 are covered within the space. To better enable communications with the base 52, the satellites 50*a*, 50*b*, etc., will, in at least some embodiments, transmit signals using higher power than tracking devices 40 so that even if furniture or the like is located within the path between a satellite and a base 52, the signal should be strong enough to be received by the base 52.

To mount a satellite 50a, in at least some embodiments each satellite will include a mounting sub-configuration. For instance, in FIG. 6 the mounting components include a downwardly opening channel 89 formed in a rear surface of a satellite housing structure, a mounting bracket 91 and an adhesive mounting pad 93. The bracket 91 includes front and rear surfaces and a member 95 that extends from the front surface that includes a reduced diameter neck portion and an enlarged distal end head portion. The channel 89 forms a circumferential rim for receiving the enlarged head portion of member 95 via a sliding action. Adhesive pad 95 adheres to the rear surface of bracket 91 and also to a supporting ambient wall or other surface (not shown). Thus, bracket 91 adheres at least semi-permanently to a mounting location within a space and satellite 50a mounts via reception of head member 95 within channel 89 in a releasable fashion. Although not shown some mechanical fastener may also be provided to lock satellite 50a to bracket 91 unless affirmative steps are taken to release the satellite 50a from the bracket 91.

Referring again to FIG. 4, while battery 84 may be replaceable, in some cases battery 84 may be rechargeable and may need to be recharged periodically (e.g., every month, every quarter, etc.). To this end, device 50a may also include charging contacts 87 (see also FIGS. 6 and 7) and base 52 may also include charging contacts 67. Here, satellite 50a may be periodically removed from bracket 91 and placed on the top surface of base 52 so that contacts 67 and 87 connect for charging purposes. A magnet may be provided in the top surface of base 52 and a metal or magnetic plate may be provided in the undersurface of satellite 50a that help to automatically align satellite contacts 87 with the base contacts 67. Other mechanical alignment features are contemplated.

In at least some cases it is contemplated that one or the other of the base 52 and a satellite 50a may generate some signal to indicate when a rechargeable battery 84 needs to be recharged. In this regard, for instance, see again FIG. 7 where indicator 90 may include an LED that processor 80 may illuminate when battery 84 needs to be recharged. Again, to recharge battery 84, satellite 50a may be slid off bracket 91 and placed on base 52 with contacts 67 and 87 in communication. As another instance, base 51 may include a speaker 47 and may, when the signal from a satellite 50a becomes relatively weak or is no longer received, be programmed to generate a sound (e.g., a periodic chirp) to indicate a need for recharging.

Although not shown, in at least some embodiments the subassembly 49 may include a third or more satellites like 50a and one of the satellites may always be mounted to the base 52 for charging. The satellite mounted to the base 52 may receive transmissions from devices 40 for use by the system while charging. Here, if a remote satellite needs to be charged, the satellite mounted to the base can be swapped with the satellite that needs charging so that all satellites can remain functional at all times. In addition to providing consistent space coverage, having a system where all satellites remain functional all the time means the sensing algorithms for a subassembly 49 can be set once and be generally valid thereafter.

In some cases the subassembly 49 may cooperate to help an installer place the satellites 50a and 50b in locations where signals therefrom are receivable by the base 52. To this end, for instance, during an installation process, with base 52 connected to an Ethernet receptacle for power and with a satellite 50a fully charged, device 50a may transmit a periodic heartbeat signal to base 52. Satellite 50a can be mounted in a desired location within a space. Here, if satellite 50a is mounted in a location at which sufficiently strong signals from the satellite 50a cannot reach the base 52, the base will miss heartbeat signals from satellite 50a and can generate a chirp (or the satellite 50a can generate a chirp) sound to indicate that the mounting location is not suitable. If the chirp sound is generated, the installer can change the mounting position of the satellite until the chirping sound ceases. Thus, an installer can apply personal knowledge about a facility space to optimally position satellites for receiving device 40 signals while being guided by the base to select only locations that will work well given the mounting location of the base 52.

In cases where collector subassemblies 49 are employed, locations of the satellites 50a, 50b, etc., within a facility need to be added to the maps stored in database 16 either manually or in some automatic fashion. Manual indication may be facilitated by accessing a facility map via workstation 16 and indicating the locations of satellites 50a, 50b, etc., on the map and entering satellite unique identifiers for each indicated location. An automatic determination of satellite locations is described hereafter.

Once locations of satellites 50a, 50b are known, in at least some cases, triangulation methods may be used to determine locations of tracking devices 40 within a space. In other cases signal strength from devices 40 may be so low that only satellites 50 within a space associated with one of the devices 40 will be able to receive a signal there from. Here, locations of devices 40 will be identifiable at at least a room or separate space level.

While the system described with respect to FIGS. 6 and 7 uses Ethernet to link to a system server, other embodiments are contemplated where WiFi or cellular connection is used instead of Ethernet. In other cases it is contemplated that at least some bases 52 may be linked to other bases in adjacent spaced via a Bluetooth or other type of mesh network so that information collected thereby can be wirelessly transmitted from one base to the next until delivered to the system server. Here, it may be that a last base operating as a mesh network gateway is linked via Ethernet to the server.

Regarding the second system type that includes portable computing devices 60 programmed to collect and report information from devices 40, it has been recognized that many enterprise employees use devices 60 for work and even for personal communication that have the capability to collect, retransmit and even analyze information obtained or generated by devices 40. To this end, many people now routinely use electronic devices like smart phones, tablet type devices and even laptops that are essentially always on and that include transceivers that can obtain information transmitted by devices 40 when in the general vicinity of those devices 40.

In at least some embodiments it is contemplated that portable computing devices 60 may be used to automatically obtain information from devices 40 when in an area associated with the devices 40. For instance, when device 60 is proximate device 40a in space 20b in FIG. 2, device 60 may collect data packets transmitted from device 40a within space 20b. Upon receiving a data packet from device 40a, device 60 may run some application that uses or consumes that information. For instance, where device 60 is used by a facilities manager, device 60 may run an application that enables the manager to determine resource locations within a space. Many other applications run on device 60 based on information from devices 40 are contemplated.

In at least some other cases, when information is obtained by device 60 from devices 40, the obtained information may be wirelessly passed on to server 12 either immediately if device 60 is capable of broadcasting to an access point 38 or at some subsequent time when device 60 is within a receiving range of one of the access points or a satellite 50*a*, 50*b*, etc. Where information is transmitted to an access point or satellite subsequent to collection, device 60 may store the information received from devices 40 until subsequent transmission occurs. Thus, movement of resources associated with devices 40 that are remotely located from wireless access points can be detected, stored and used to drive applications run by server 12. This type of sporadic data collection from devices 40 is particularly useful in applications that do not require a complete or immediate history of resource use or states.

In cases where collector subassemblies 49 are employed, locations of satellites 50*a*, 50*b* may be automatically determined in several ways. For instance, where a base 52 associated with a satellite 50*a* is linked to a specific Ethernet receptacle and the location of the receptacle is known to be within a specific facility space, it may be assumed that the satellite 50*a* associated with the base is in the same facility space (e.g., the same conference room). In other cases, where locations of Ethernet receptacles 54 are known and signals generated by a satellite 50*a* are received by more than one Ethernet linked base 52, signal strengths of the signals received by several bases 52 may be used to determine the location of the satellite 50*a* via triangulation or some type of statistical analysis of the signals received and the locations of the receptacles 54.

In still other cases where employees use portable electronic devices 60 within a facility, devices 60 may be programmed to collect information from satellites 50*a*, 50*b*, etc., within their vicinity and to perform a location determining program to identify locations of the satellites. Here, each device 60 would have to be able to determine its own location based on communication with access points or other signal generators (e.g., base 52 that can transmit signals from known locations of receptacles 54) or with other satellites 50*a* that have known locations. Then, each device 60 may run a program to assess the locations of other satellites based on signal strengths of signals received from the satellites and its own location.

The location determining process may be repeated each time a device 60 is near a satellite 50*a* and satellite location may routinely be rendered more precise over time. For instance, where a device 60 is initially within a space including a satellite 50*a* but is not near the satellite (e.g., is on the other side of a conference room), the system may only be able to accurately determine that the satellite 50*a* is located within one half of the space but no more. A next time a device 60 is in the space, the device may be located relatively closer to the satellite and the signals from the satellite 50*a* may be relatively strong. Here, the stronger signal may be useable to more precisely identify the location of the satellite. The strengths of multiple sequential signals received by one or more devices 60 may be used to triangulate and further refine the location of a satellite 50*a*. Here, for instance, where eight devices 60 are located within a space and their positions are known, signal strength of signals from a satellite 50*a* received by the eight devices 60 may be used in a triangulation process. In a similar fashion where a single device 60 is moved within a space to eight different locations over time, signal strengths associated with the eight different locations may be used to triangulate the location of the satellite.

Referring to FIG. 8, in at least some cases electronic identification badges 61 may be provided instead of or in addition to portable computing devices to operate as data collection devices or as Bluetooth beacons, or both. Here, a badge would operate in the same or in a similar fashion to the computing devices described above.

Referring to FIG. 8, an exemplary system for managing resources may include any one or more of the three different ways to collect information from tracking devices 40 associated with enterprise resources including access points 38, supplemental collector subassemblies 49 and portable computing devices 60 and 61. In some cases each of the three information collection systems may be used together. For instance, where access points 38 and assemblies 49 can collect information from devices 40, that information may be routinely collected. Periodically when a portable computing device 60 is located within a space, the device 60 may collect resource information from devices 40 that is more accurate than the information collected using the access points 38 and collector assemblies 49 and that information may be used to supplement or replace some of the information obtained using the collector subassemblies and access points.

In many cases a set of enterprise employees will not use portable computing devices 60 or may not have their portable devices turned on at some times. In these cases, other devices may be required to track employee locations. For instance, referring again to FIG. 2, each employee may be issued an exemplary electronic identification badge 61 that stores a unique employee identification number in a badge memory and that includes a transmitter 63 that transmits the identifier to data collector devices located within the enterprise facilities. Here, as in the case of devices 40, each badge 61 may transmit lower power signals so that a battery charge can last several years. Location of the badge 61 can be determined via proximity of the badge 61 to data collecting devices and knowledge about the locations of the collecting devices. For instance, signals transmitted by device 63 may be received by satellites 50*a*, 50*b* and used to determine location of an associated badge 61 and employee.

In at least some embodiments of the present disclosure it is also contemplated that each or at least a subset of tracking devices 40 may be programmed to sense other information that may be useful for driving different system applications. For instance, in cases where at least some employees do not use trackable devices (e.g., portable electronic devices or trackable badges) or where an enterprise does not include systems for tracking employee locations, it may still be useful to know if and when spaces within a facility are utilized. For example, a facility manager may want to know how often and for how long specific spaces are utilized, how many employees utilize the spaces, etc. As another example, an employee searching for an unoccupied space for use may want to access a list of available and unoccupied conference spaces.

According to at least one aspect of some embodiments of the present disclosure, each device 40 may also include one or more sensors that can be used to sense state for status changes associated with resources or the environments in which those resources are deployed. For instance, referring again to FIG. 5, in addition to the components described above, each device 40 may also include any one or more of a motion sensor 62, a temperature sensor 64, a sound sensor 66, an Nth sensor 68 (e.g., a $CO_2$ sensor), etc. Motion sensor 62 may be any type of motion sensing device including one or more accelerometers, tilt sensors, inclinometers, gyroscopes, or other devices capable of sensing movement of a resource through or within space. For instance, an accelerometer may be mounted to the undersurface of a chair seat and may be able to detect movement within a space or changes in relative juxtaposition of a resource to other affordances within a space. An accelerometer may also sense any slight movement of a desk or a table such as, for example, when a person touches a top surface of the desk or table during use, opening of a file cabinet drawer, closing of a door in an egress, etc. As another instance, a device 40 including a tilt sensor may be placed in the backrest portion of a chair assembly and may measure tilt of the backrest with respect to a seat member.

Temperature sensor 64 may measure temperature within a space (e.g., 20*b*) or may be positioned to detect temperature change on the surface of a chair seat or backrest member. When a person enters a space the temperature of the space will often change as the person's body heat dissipates within the space. When a person sits on a chair and contacts a chair surface, the temperature of the surface typically changes and can be sensed by a temperature sensor mounted to the chair.

Sound sensor 66 may include a microphone for detecting sound within a space proximate the device 40. The sound sensor may be tunes to the pitch and tone range of typical human voices so as to be able to distinguish human voices from other sounds.

Other sensor types are contemplated and sensor N may include, for instance, a carbon dioxide sensor to detect the level of carbon dioxide within a space, one or more pressure sensors, position sensors, etc. Here, when people enter a space, the amount of carbon dioxide typically increases and therefore a change in carbon dioxide level within a space may, in at least some cases, be used to sense use of a space by one or more people. A pressure sensor may be used to sense when a person sits within a specific seat. Each sensor is linked to processor 59 and provides information to processor 59 related to the sensed parameter.

Processor 59 is programmed to either report the sensed parameter values to server 12 or, in some cases, to analyze the sensed parameter values and report some result associated with the analyzed values. For instance, in some cases processor 59 may simply recognize when a chair (e.g., a resource) moves via a motion sensor and may report the period since the most recently detected motion to server 12. In this case, server 12 would be programmed to use the received data to determine if a space associated with the resource is occupied. For instance, one simple rule may be that if a chair moved in the last 20 seconds within a conference room, that the conference room is presumed to be occupied. In this case, if any of ten chairs within a conference space moved in the last 20 seconds, occupancy may be presumed. Where duration since last movement is provided to server 12, a single received signal may be used to identify occupancy without requiring any historical data about previous locations of resources, previous movements, etc.

Another rule may be that at least one chair must move within a space and at least one sound that is consistent with the range of a human voice needs to be detected and reported to server 12 within some threshold period for the server 12 to determine that the related space is occupied. Many other more complex rules are contemplated.

In another case processor 59 may maintain several separate rolling state change event time buckets or counters where state changes that occur in a specific time period associated with a bucket are counted. For instance, in one case a processor 59 may maintain short, intermediate and long term counts corresponding to one minute, one hour, and six hour periods. When a state change occurs, the device processor may add a count to each of the counts to maintain rolling one minute, one hour and six hour counts. The three counts may be transmitted periodically to server 12. Where the counts reflect substantially the same rate of state changes over all periods tracked, server 12 may be programmed to determine that the sensed state changes are associated with ambient noise in an associated space. However, where the counts reflect an increase in state rate changes in the short and/or intermediate duration buckets, server 12 may be programmed to determine that the sensed state change(s) is associated with true movement or some other parameter associated with occupancy of a space.

In still other cases server 12 may be programmed to use sensed state changes from multiple sensor devices 40 within a space to discern whether or not some condition (e.g., occupancy) occurs within a space. For instance, where substantially similar movements are sensed by each of ten sensor devices 40 on ten chairs within a space, server 12 may be programmed to determine that the similar movements are attributable to noise as opposed to individual movements of chairs and therefore to determine that an associated space is unoccupied. Many other occupancy determining protocols are contemplated. In addition, many other protocols for detecting other activities or conditions (e.g., other than occupancy) using data from sensor devices 40 are contemplated.

In at least some embodiments each device 40 cobbles together device identifying information as well as state conditions into data packets that are transmitted to server 12 via data collectors. Thus, for instance, a low energy Bluetooth data packet including device identifying information and state conditions may be transmitted periodically by each device 40. In other cases data packets may only be transmitted when a change in a sensed state is detected by a device 40. For instance, in a case where occupancy is assumed when a chair is moved within a space, device 40 may only transmit a packet once movement is detected so that satellite battery power can be conserved.

Figure 9:
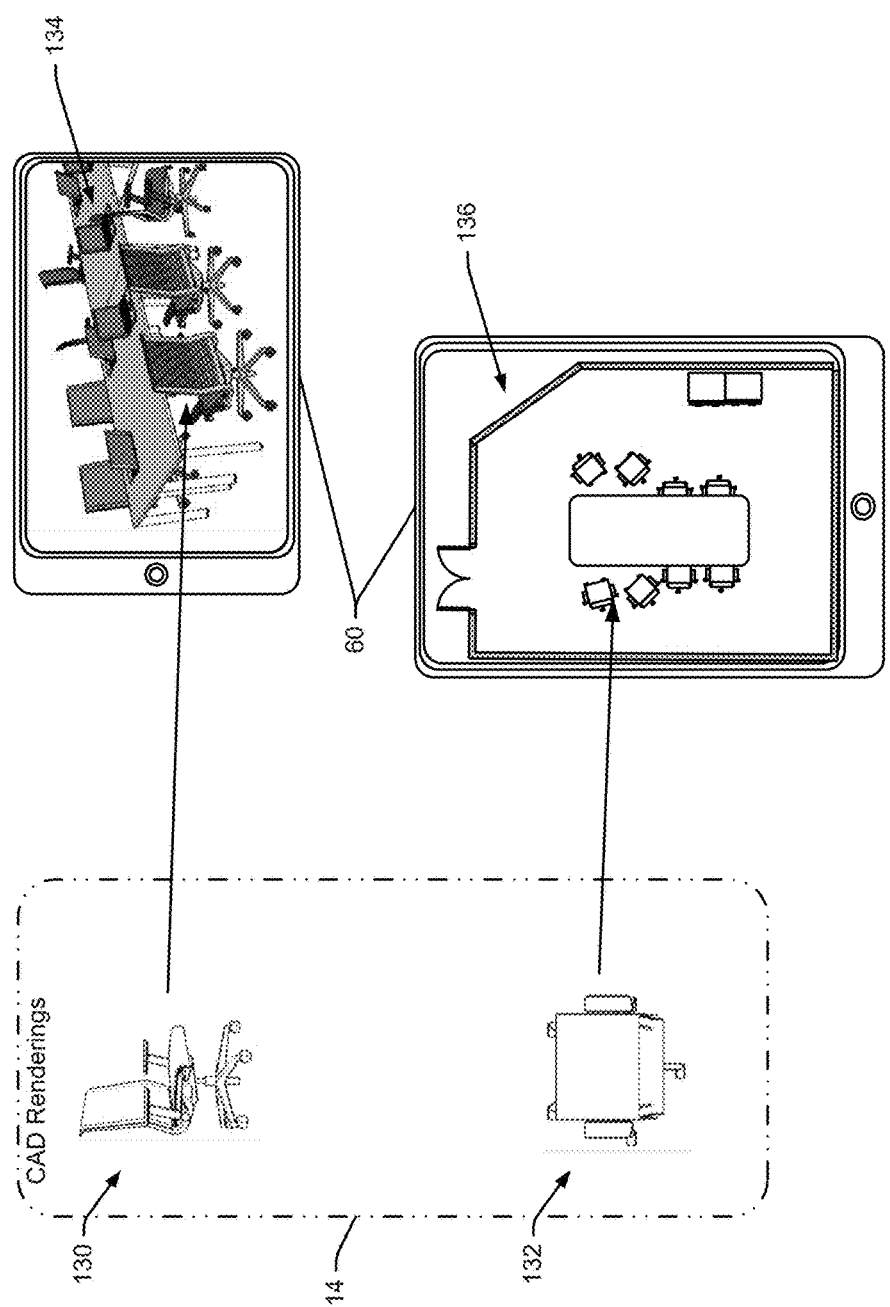
FIG. 9 is a schematic view illustrating exemplary CAD models and CAD renderings on portable electronic devices that are consistent with at least some aspects of the present disclosure.

To generate dynamic virtual views of resources within facility spaces as those resources are moved within the spaces, in at least some embodiments, server 12 may have access to 2D and 3D CAD renderings of each resource used within facility spaces. For instance, in at least some cases, a 3D view of a space may be generated for use by an enterprise employee that wants to obtain a general understanding of resources within and the layout of a space prior to use. Referring to FIG. 9, to generate dynamic virtual views of facility spaces, graphical 3D and 2D CAD models 130 and 132, respectively, of each resource available within a facility are stored in database 14 (see again FIG. 1) that can be used by server 12. In at least some embodiments, each 3D CAD model 130 includes data that enables an exemplary resource to be shown from any vantage point. For instance, a model corresponding to a specific chair type may be used to present an instance of the chair type from a front perspective view, from a side perspective view, from a rear perspective view, etc.

In some cases detail within a virtual space view will be relatively granular in the sense that resources within a space may be represented generally without showing exact real life orientations and juxtapositions of the resources within the space. For instance, where a conference table and ten chairs of a specific type are located within a space to be shown in a view, the chairs may simply be virtually represented in an equispaced and aligned pattern about a conference table without showing actual locations of the chairs, orientations of the chairs, etc. Thus, a chair that is spaced from a conference table by eight feet in reality may be shown adjacent the table edge. These general virtual images may be required where only general resource location information (e.g., which space a chair is located in) can be obtained due to sensing and processing limitations.

In other cases it is contemplated that resource state information that is sensed and collected may be much more detailed including not just which space a resource is located in but also precise location within a space, precise orientation (e.g., facing the edge of a table, facing a wall, etc.). Where more detailed information is available, that information may be used by server 12 to generate a more accurate virtual view of a space by, for instance, showing precise locations of resources within a space as well as relative juxtapositions of resources. To this end, see the exemplary image 134 in FIG. 9 where some chairs are shown oriented away from the edge of a table representation to reflect actual real life orientations. An exemplary 2D virtual image is shown at 136 where chairs are shown in actual orientations to reflect the arrangement shown in the 3D view 134.

Figure 10:
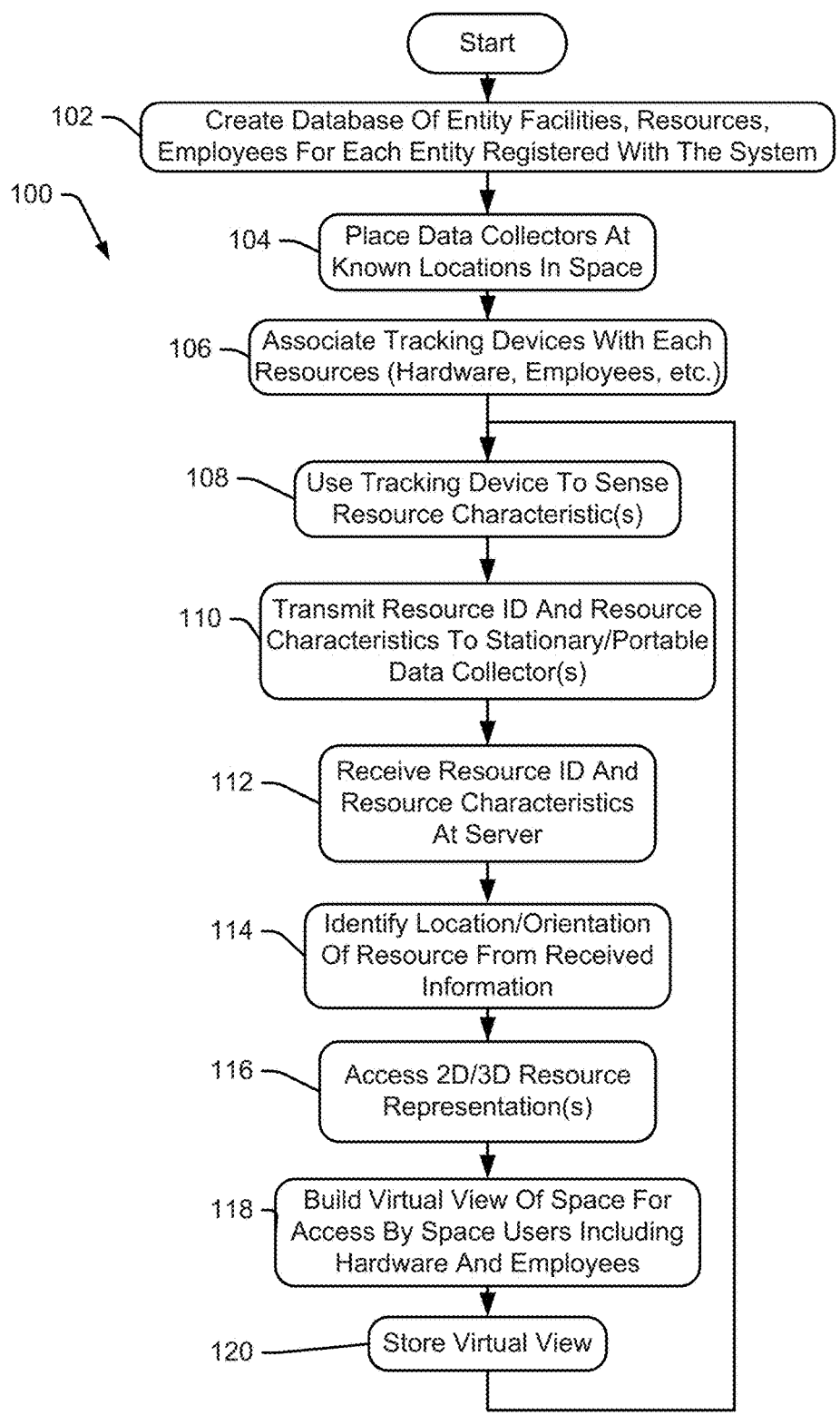
FIG. 10 is a flow chart illustrating a commissioning procedure for generating virtual views of enterprise space according to at least some aspects of the present disclosure.

Referring to FIG. 10, a process 100 that may be performed by server 12 to commission a resource management system and generate virtual views (e.g., 3D or 2D) of spaces is illustrated. At block 102, a database of entity facilities, resources and employees registered with a system is created and stored in database 14 (see again FIG. 1). Here, each resource would include a resource identifier number as well as some description of the resource itself which may include, for instance, the 3D or 2D models as shown in FIG. 9. In this case, resources include space affordances such as tables, desks, chairs, videoconferencing systems, printers, etc., as well as enterprise employees. At block 104, data collectors including access points and/or collector assemblies 49 are places about the facility space and their locations are identified and stored in database 14. Here, again, the locations may be manually identified and stored or an automated process using one or more personal portable computing devices 60 may be employed.

At block 106 tracking devices 40 are associated with each resource to be tracked within an enterprise facility. Here, association includes both physical association (e.g., attachment to a chair) and virtual by correlation of a resource identity to a unique resource identifier in database 14.

At block 108, resource characteristics are sensed by devices 40. Here, it is assumed that the virtual views to be generated will include precise location and orientation of resources. Because the application is simply for generating virtual space views, the data required to drive the application is only presence, location and orientation information indicating specific locations of resources in spaces as well as orientations (e.g., no occupancy data or data that can be used to determine occupancy state) is required in this application). At block 110, devices 40 transmits data packets including resource ID, location and orientation data. At block 112 one or more data collectors 38, 49, 60 in the vicinity of a transmitting device 40 receives the transmitted data packets and provides the received packets to server 12.

At block 114, the received packets are analyzed by server 12 to identify each resource (e.g., via the device 40 identifier), resource location and orientation. At block 116, server 12 accesses the 2D and 3D resource renderings 132 and 130, respectively, in database 14 and at block 118, server 12 uses the renderings to generate 2D and 3D views. At block 120 the views are stored for subsequent use.

Although not illustrated in detail, other data for supporting other applications may be generating using a process similar to that shown in FIG. 10. For instance, where statistical and historical space occupancy data is required by a facility administrator or the like, that information can be generated by sensing resource movement, $CO_2$ levels, temperature, etc., at block 108 which is transmitted to the server at block 110 and which would then be used to assess occupancy of different facility spaces. The occupancy information would be used to generate an occupancy view of a facility at block 118. Similarly, current space occupancy or use views may be generated and stored at blocks 118 and 120. Virtual views, occupancy views and other view types may be generated routinely and regularly or they may be generated only when a specific view is requested by a system user.

Other circumstances in addition to occupancy maybe detected using information sensed via devices 40. For instance, the number of employees using a space may be determined by sensing movement of a subset of chairs within the space. For example, where five out of twelve chairs move routinely during a one hour meeting in a conference room, server 12 may be programmed to determine that five employees attended the meeting. Discerning other circumstances based on sensed data is contemplated.

Figure 11:
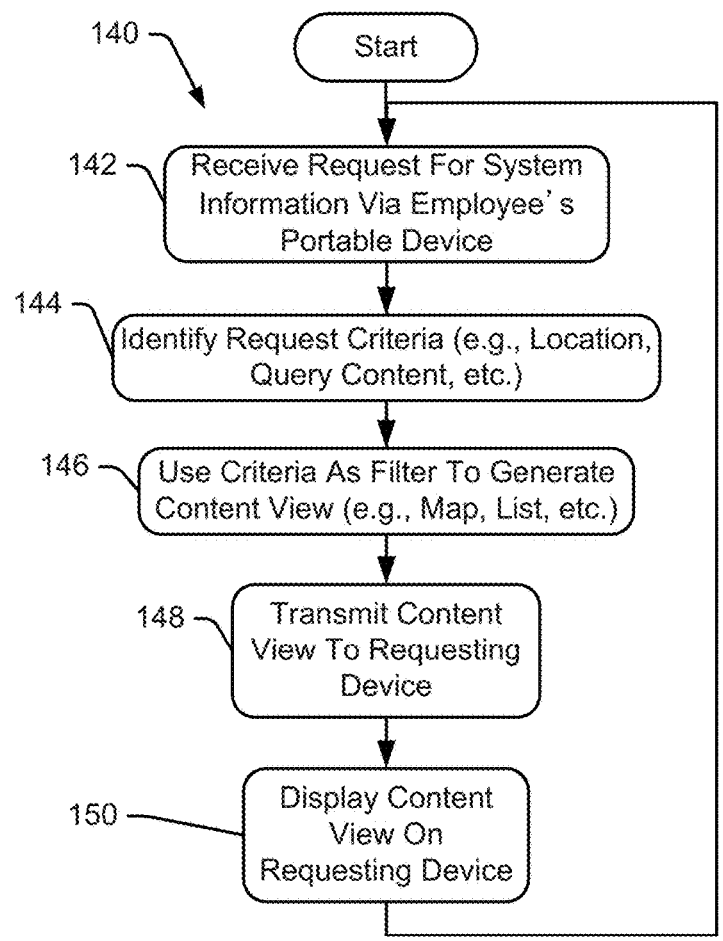
FIG. 11 is a flow chart illustrating a process whereby an electronic device can be used to render representations of enterprise space.

Referring to FIG. 11, a process 140 for obtaining information related to a facility space is shown. Here it is assumed that an enterprise employee uses a portable smart device 60 to request space information and that the information is to be presented to the employee via a display screen 160 on the portable device. In this regard an information request may be a direct request or may be automatically generated by a user's portable computer device 60. For instance, a user may request information related to a specific facility space to generate a direct request. In other cases the same user may move through a facility space and device 60 may change the requested information based on the current location of the employee within the space (e.g., if the employee is displaying information related to proximate space and the employee's location changes, the information displayed to the employee may change to track the current location).

At block 142, a portable computing device 60 is used to generate a request that is received by server 12. At block 144, server 12 identifies the request criteria including, for instance, location (e.g., selected by an employee or automatically determined as a function of location of a device 60) of the space for which the request has been generated, query content (e.g., 3D view, 2D view, current occupancy, etc.) etc. At block 146, server 12 uses the request criteria to identify information to present and generates a view that is most consistent with the request criteria. The generated view is transmitted at 148 to the requesting computing device 60 and at block 150, the requesting device 60 displays the generated view on the device display.

Referring again to FIG. 4, the exemplary screen shot includes a dynamic virtual map view 159 of space proximate a device 60 user that shows the general layout of the space including divider walls as well as the current locations of facility resources including the employee using device 60 at 166, desks, chairs, tables, doors and other non-human resources useable by the device user and locations 168a through 168c, etc., of other enterprise employees within the represented space (each other employee is indicated by a phantom circle in the illustrated example). The device user 166 may observe view 159 to determine locations of proximate resources including space, employees and affordances and thus, the overhead view operates like a compass to orient the device user.

Again, where access points 38 (see again FIG. 2) are proximate the location of one of the portable computing devices 60 or one of the detectable employee badges 61, triangulation of signals therefrom may be used to determine the location of the device 60 or badge 61. In spaces where hard wired access points do not exist as in space 20b, one or more collector assemblies 49 (see again FIGS. 6 and 7) may be installed and used to determine the locations of devices 60 and badges 61 therein. In still other cases sensor devices may be installed in doorways, hallways or other locations intermediate conference or personal spaces to determine employee locations as employees move through those transition spaces from one space to another. Known locations prior to movement through the intermediate spaces (e.g., a doorway) that transition between other spaces can be used to determine in which space an employee is located. For instance, in FIG. 2, if it is know that a device 60 user was initially in space 20a based on access point information prior to moving through the doorway 35 separating space 20a from space 20b, it can be determined that the device 60 and an employee using the device is located in space 20b after movement through doorway 35.

Other system signals may be useable to determine device 60 and/or badge 61 locations. For instance, where it is know that a tracking device 40 is in space 20b in FIG. 2 and device 60 obtains a signal from the tracking device 40 and passes that signal on to a single access point 38 outside space 20b, while the single signal from device 60 would be insufficient for triangulating a location, the fact that device 60 obtained a low power signal from the tracking device 40 may be enough to determine that the device 60 is located in the same space as the tracking device 40.

Thus, the access points 38, collector subassemblies 49, portable devices 60 and tracking devices 40 together may form a web for collecting signals useable by server 12 to determine locations and other characteristics of enterprise resources using one or a plurality of different algorithms.

In at least some embodiments it is contemplated that each or at least a subset of the resource representations in view 159 may be selectable to obtain additional information about that resource. For instance, as seen in FIG. 4, a representation 168c of one employee in the view 159 may be selected (e.g., via touch) causing an image 170 of the employee as well as a name field 172 to be presented in a manner that associates the image and name field 172 with the employee representation and location in the presented view.

Figure 12:
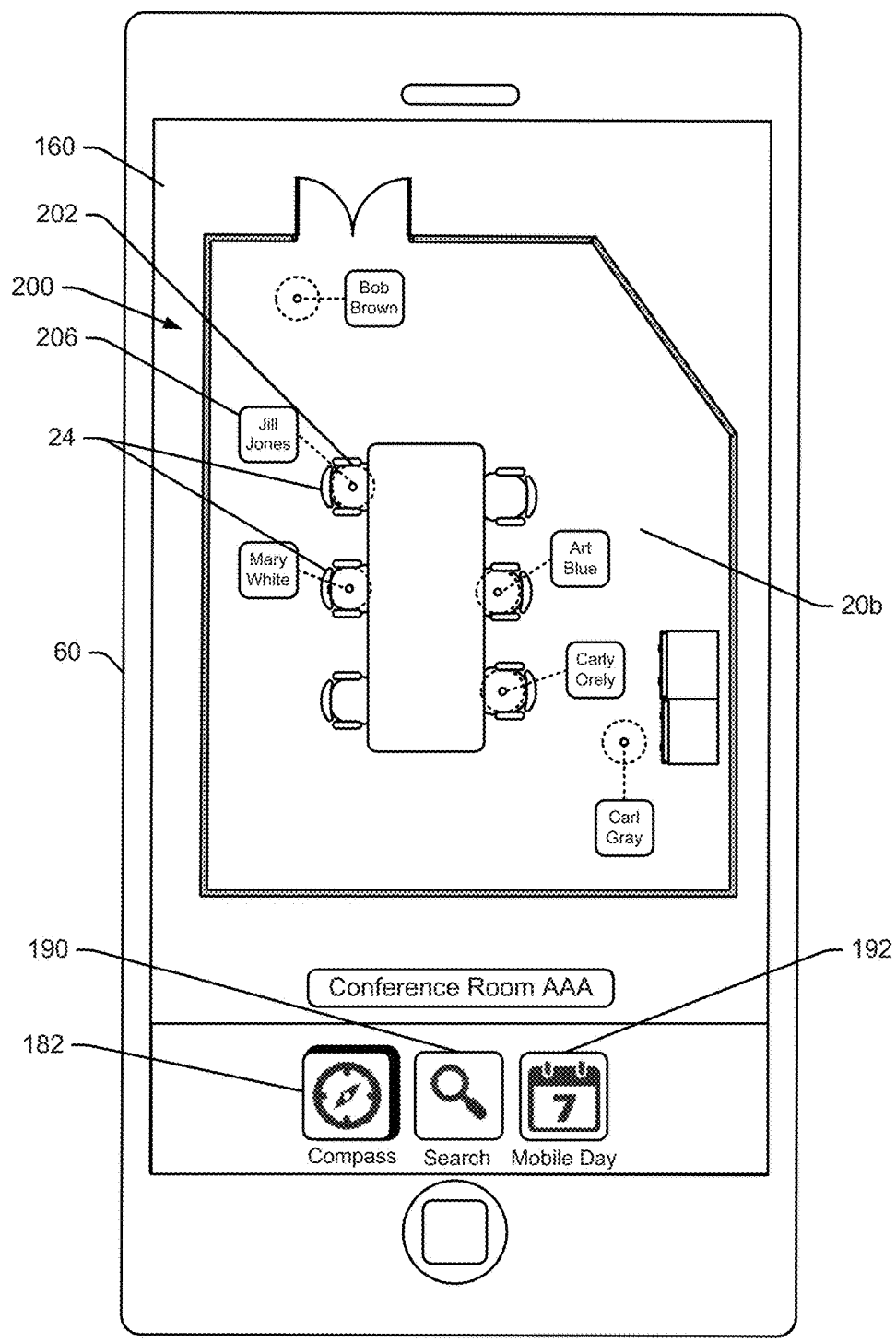
FIG. 12 is similar to FIG. 3, albeit illustrating a screen shot of a graphical map of a specific facility space.

As another example, the device 60 user may select one of the spaces presented in view 159 to obtain additional information about the space and resources or affordances located therein. For instance, where space 20b in FIG. 4 is selected via touch or the like, the image of space 20b may be enlarged as in FIG. 12 and presented as a screen shot 200 showing a larger version of the 2D representation (e.g., another resource representation) of space 20b. In FIG. 12 additional detail including the names of employees currently located in the space 20b is added to the image to help the device 60 user better understand current use of space 20b. Thus, for instance, the name "Jill Jones" has been spatially associated with employee representation icon 202 to indicate identity of the represented employee.

Figure 13:
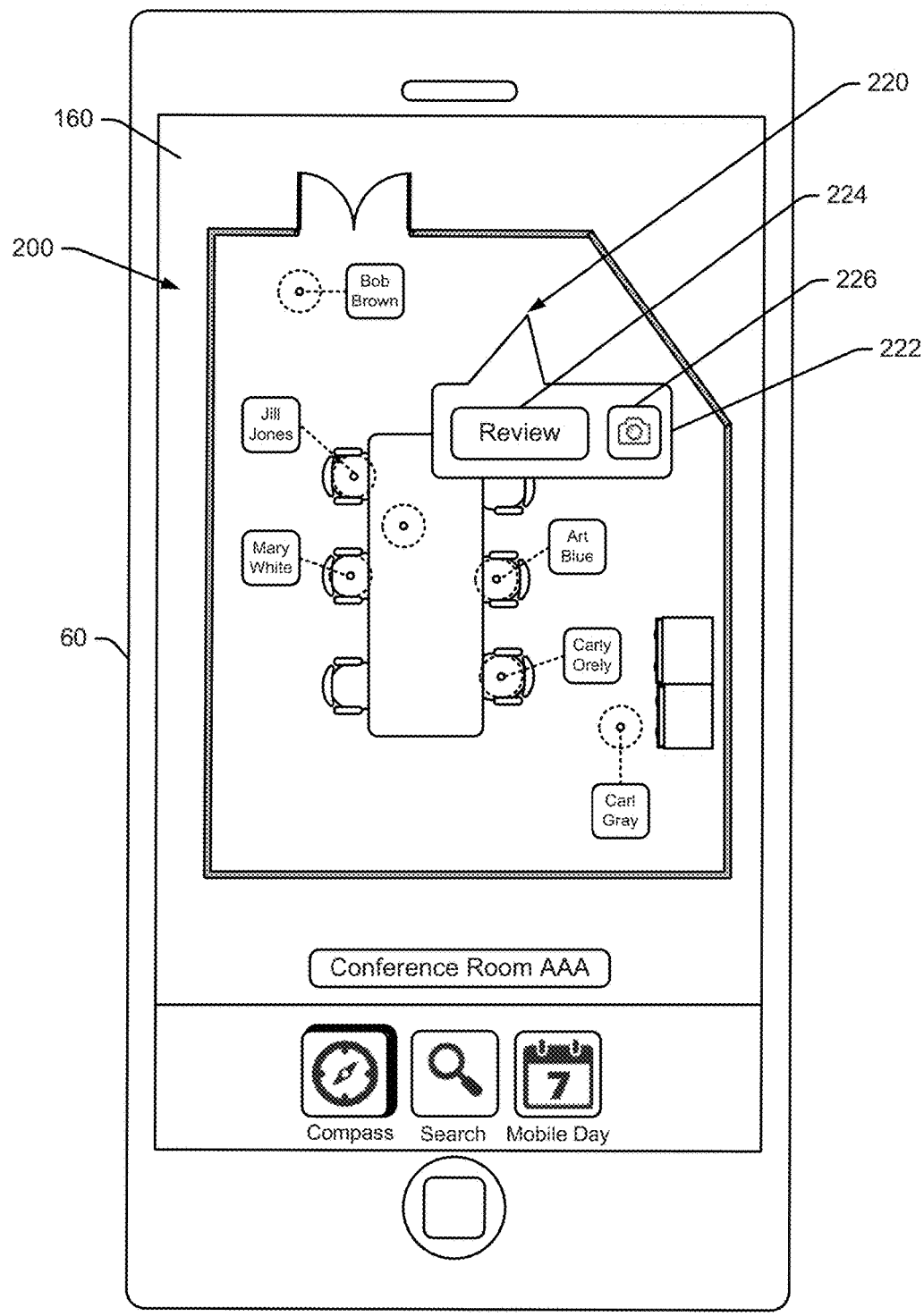
FIG. 13 is similar to FIG. 12, albeit showing a different screen shot.

When employees use a resource, often times the employee develops an impression of the resource that she would like to share with others such as, for instance, a facility administrator, other employees, etc. For instance, an employee may have determined that a specific space with specific affordances was particularly attractive or useful and may want to issue a review of the space including an image(s) and comments. To this end, referring to FIG. 13, it is contemplated that in some cases when an open portion (e.g., 220) of a space view is selected, an option to review the space may be presented as at 222 including a "Review" icon 224 and a camera icon 226. Here, selection of the review icon 224 would open up a comment field in which a system user could enter a comment related to the selected space.

Figure 14:
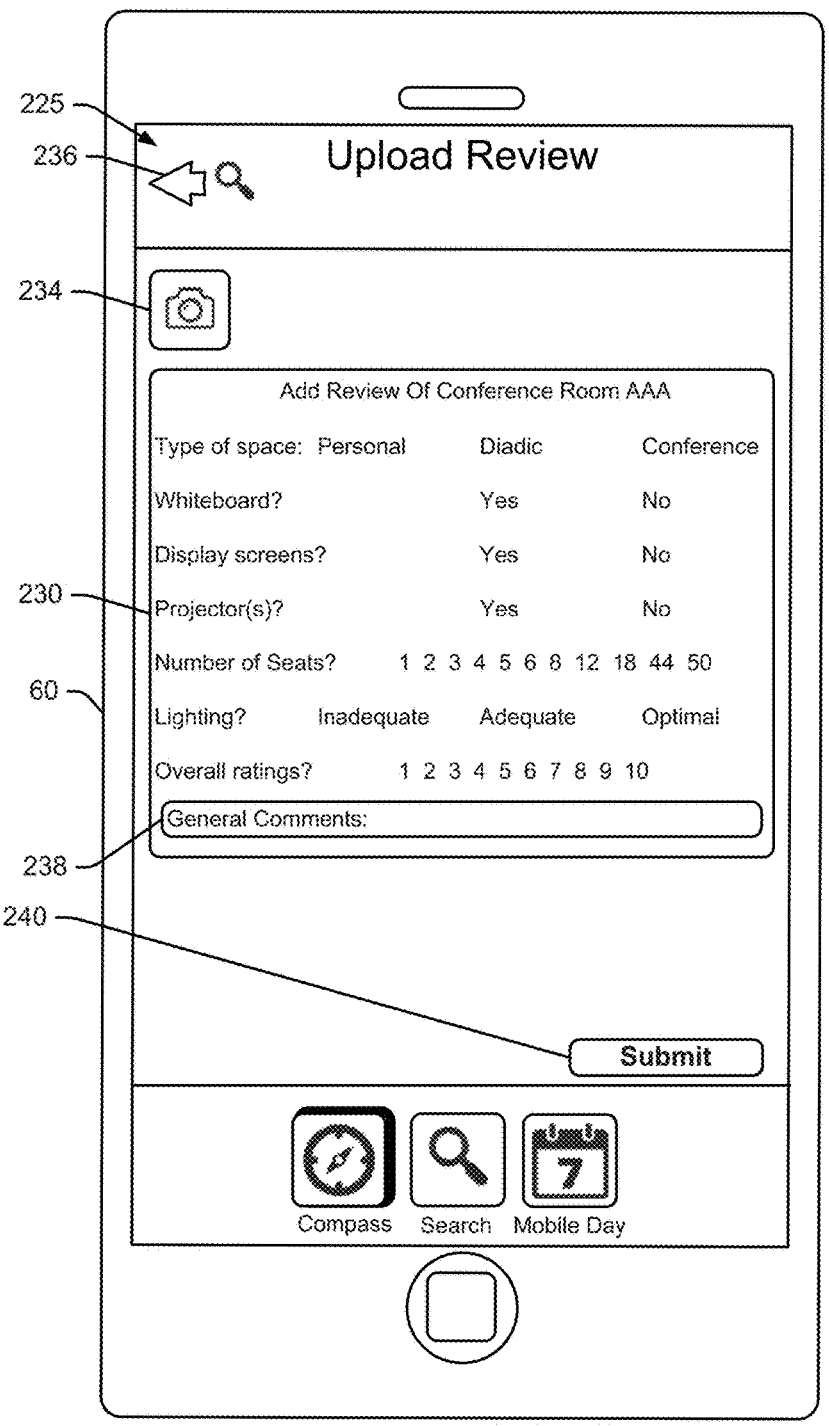
FIG. 14 is similar to FIG. 12, albeit showing yet another screen shot for generating a review of an enterprise space.

An exemplary review screen shot 235 is shown in FIG. 14 which includes a review field 230 including questions and a pre-canned set of answers that can be selected to provide useful information. For instance, an employee may be able to indicate resources that are available within a space by selecting different options in field 230 if the system does not already include that information. Some of the questions require judgment such as, for instance, if the lighting in the space is adequate, an overall rating value, etc. A field 238 is also provided so that a personalized comment can be issued. A camera icon 234 is provided for adding an image to the review. Once a review is completed, a submit icon 240 may be selected to add the review information to database 14 for subsequent access by the employee that generated the review as well as by others. A back icon 236 is also provided for returning to a previous view if the employee does not want to issue a review.

Figure 15:
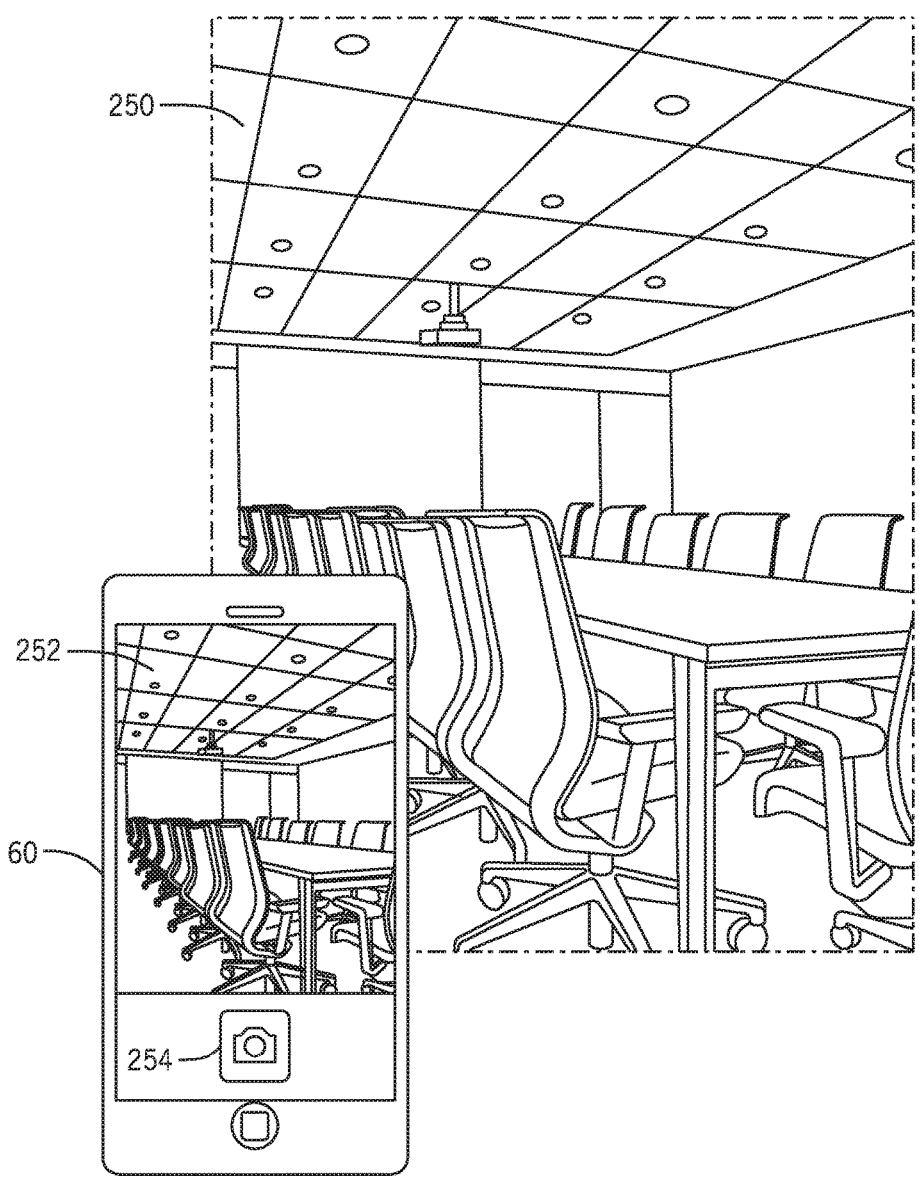
FIG. 15 is a schematic showing an image taking aspect related to a space review process that is consistent with at least some aspects of the present disclosure.

Referring again to FIG. 13, selection of camera icon 226 opens up a camera application as in FIG. 15 so that an employee can view an image 252 of a space 250 and snap a picture via virtual button 254 to obtain an image of the space to be added to a subset of data associated with the space in database 14. Space images may be subsequently access in at least some embodiments by other employees to obtain a sense of a space prior to reversing the space for subsequent use, prior to arriving at the space for a conference, etc.

Figure 16:
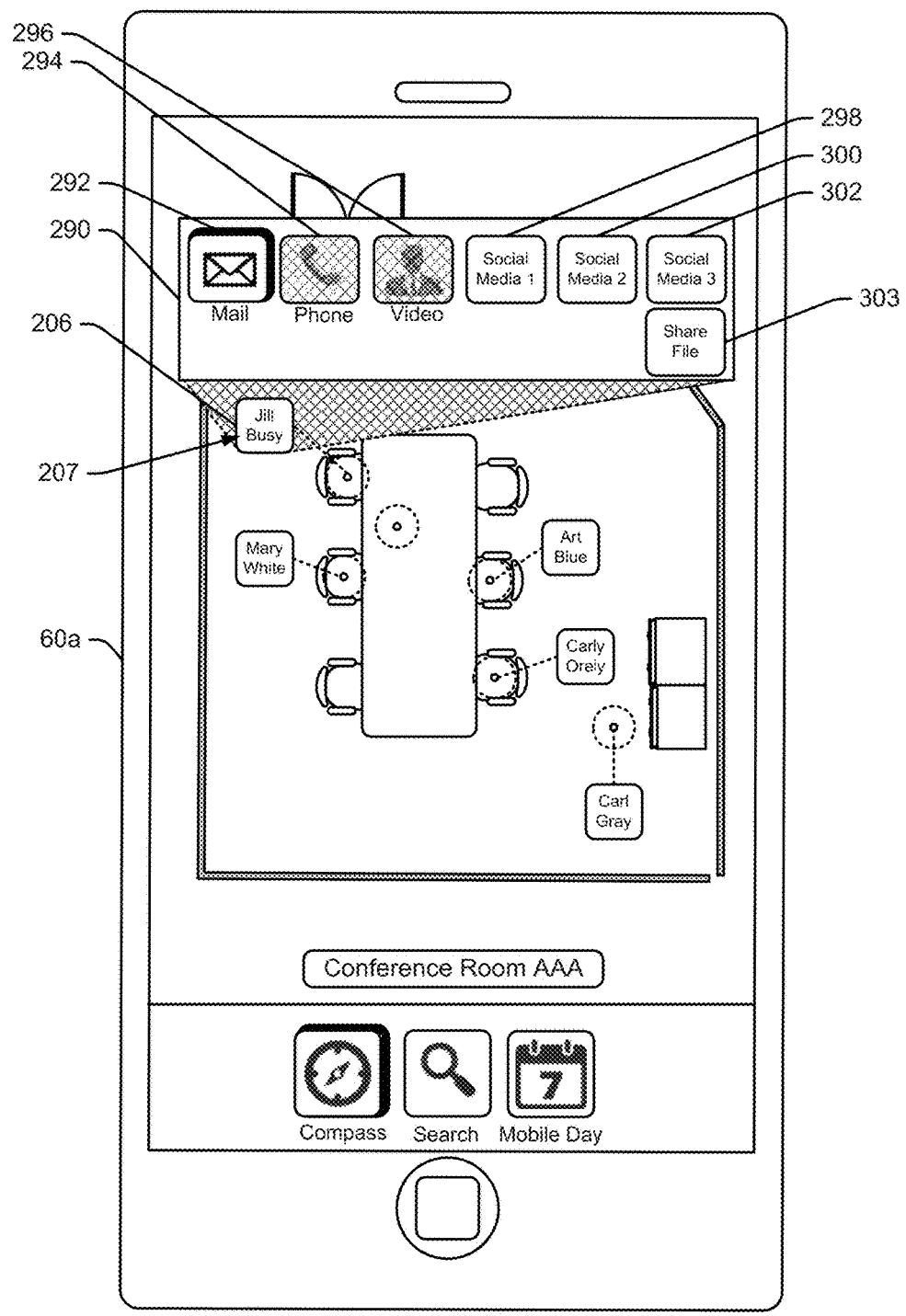
FIG. 16 is similar to FIG. 12, albeit illustrating another screen shot for facilitating communication between a device user and another enterprise employee represented via the screen shot.

In at least some embodiments a device 60 user may be able to select an employee's name from a name field associated with an employee representation on a space map view in order to establish communication with that employee. For instance, see FIG. 16 where a user has selected the "Jill Jones" field or icon 206 to open up a communication type selection field 290 including a set of icons associated with different ways of communicating with the selected employee. Here, for instance, the icon set includes a "mail" icon 292, a "phone" icon 294, a "video" icon 296, and first, second and third social media icons 298, 300 and 302 that are associated with an e-mail application, a phone application, a video application and other types of media applications, respectively. Selection of any of the icons in field 290 causes device 60 to start an associated communication process with the selected employee.

Figure 17:
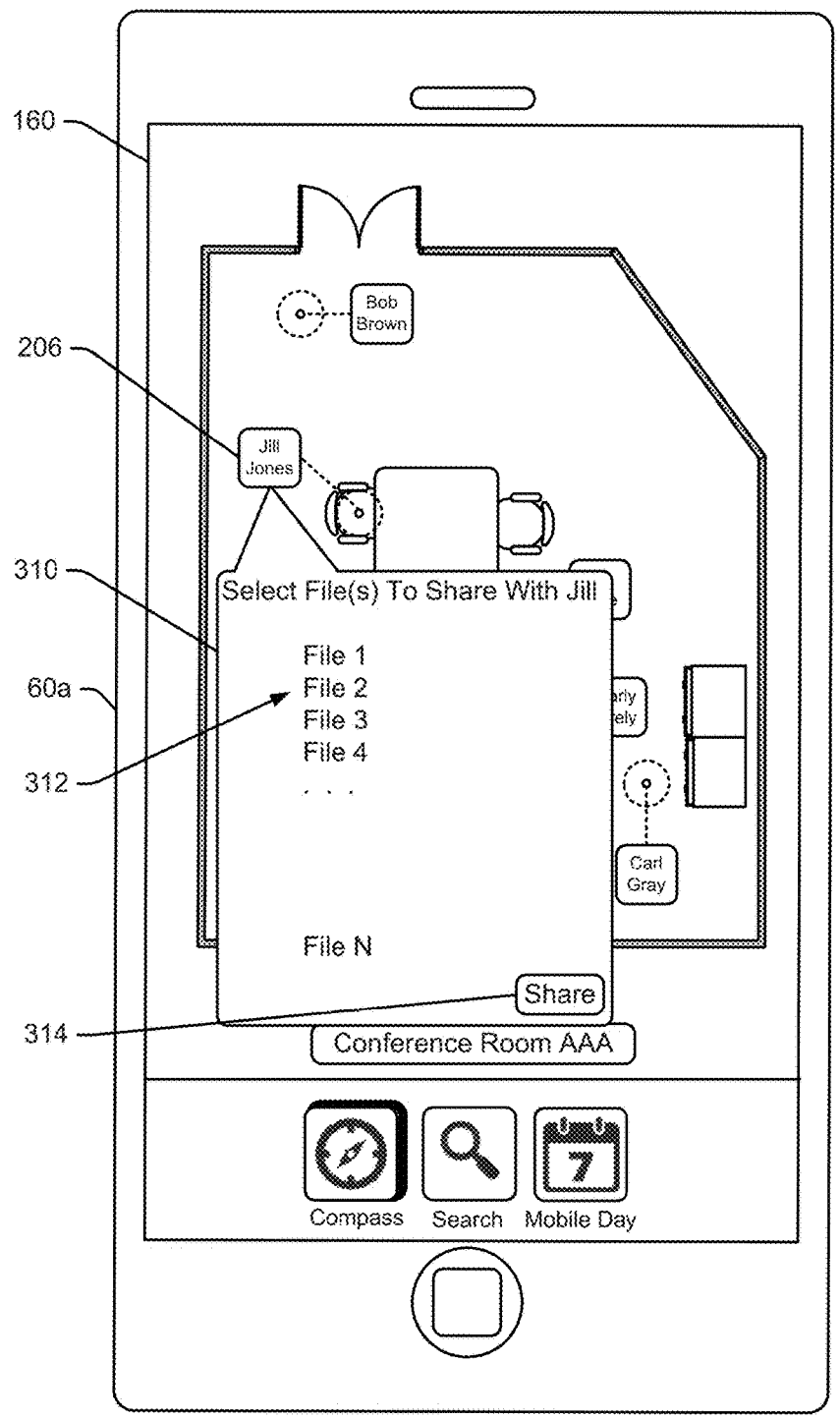
FIG. 17 is similar to FIG. 12, albeit illustrating a screen shot that enables file sharing with an employee that is represented on a graphical map on a device display.

Referring again to FIG. 16, in at least some cases field 290 will also include a file share icon 303 that is selectable to share one or more files with an employee shown on a map view. In this regard, once icon 303 is selected, referring also to FIG. 17, a file sharing window 310 may be presented in relation to the identified employee's icon 206 to enable the device 60 user to select one or more files from a list 312 to be shared with the selected employee at 206. Once files to share have been selected, a "Share" icon 314 may be selectee to complete the sharing process. In response to selection of icon 314, server 12 obtains the selected files, places the selected files in an e-mail or other electronic communication (e.g., a text message) and sends the selected files to the target recipient.

In at least some embodiments when an employee icon like icon 206 is selected, at least some information about the employee's current status (e.g., an employee status indicator) may be presented in addition to the communication selection field 290. For instance, referring again to FIGS. 13 and 16, when icon 206 is selected, the icon 206 may be changed as indicated to show that Jill is "Busy" as at 207. Here, Jill's status may be determined by accessing Jill's schedule maintained by electronic scheduling software used by Jill and other enterprise employees. In the alternative, Jill's status may be determined in real time by sensing Jill's current activities and discerning whether or not Jill is likely available by applying a rule set maintained in database 14. For instance, where server 12 can determine that Jill is in a conference space with four other employees and that the employees are having a discussion, the server 12 may be programmed to determine that Jill is in a meeting and not available.

In still other cases a combination of appointments entered into an electronic scheduling program and real time sensing of employee activities may be used to determine if an employee is available or busy or has some other status. For instance, where Jill has a scheduled meeting in 45 minutes (e.g., a meeting on an electronic schedule) and is travelling toward a conference room that is 30 minutes away (sensed real time conditions), server 12 may be programmed to detect that Jill is busy and should not be disturbed. Many other rules for automatically determining current employee status are contemplated. Other statuses and related indicators are also contemplated such as "Sleep", 'Vacation", etc.

Referring yet again to FIG. 16, where an employee (e.g., Jill represented at 206) is occupied/busy, in at least some cases certain applications for communicating with that employee may be disabled or at least indicated as less desirable options because the would disturb the employee if used. For example, see that the phone and video icons 294 and 296 are shaded with double-cross hatching to indicate that they are either disabled or less desirable ways to communicate with Jill who is indicated as busy at 207. By visually distinguishing communication options 294 and 296 from other options, device 60 steers the device 60 user toward more optimal options to communicate given the status of an associated employee.

Other initial or default corporate map screens are contemplated. For example, in many cases an employee may routinely work or socialize with a subset of enterprise employees on a team and the employee may desire to receive information related to each team member when the corporate maps application is first accessed. Hereinafter, the list of employees on a team will be referred to generally as a "favorites list" and the employees on the list will be referred to as "favorites".

Figure 18:
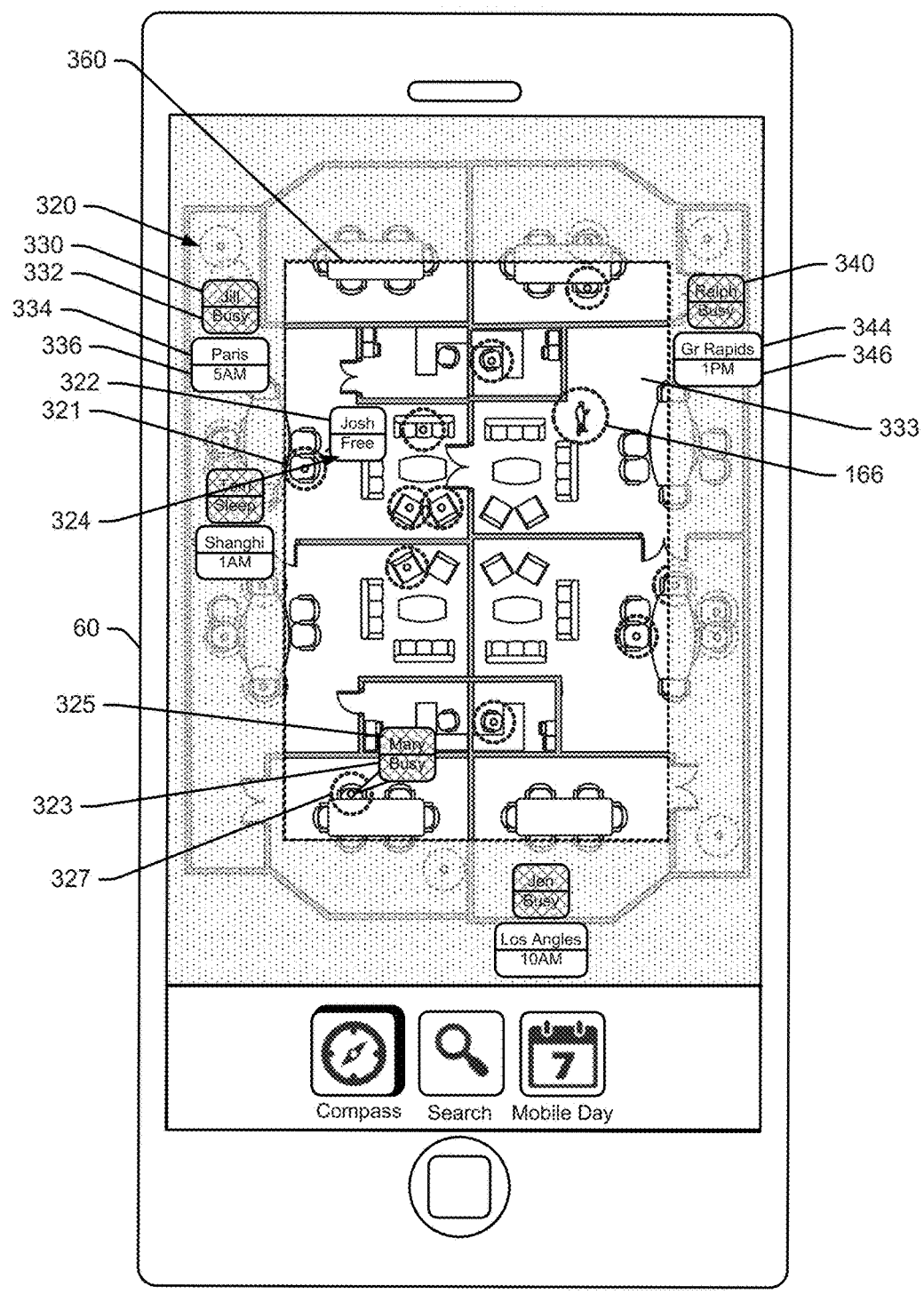
FIG. 18 is similar to FIG. 12, albeit illustrating another screen shot including a dual view to show local and remote employees at the same time.

Referring to FIG. 18, an exemplary initial "dual map" screen shot 320 showing information about employees (e.g., another resource representation) on a favorites list is illustrated. The view is referred to as a "dual map" view because the view includes one representation overlying another. In this regard, it has been recognized that often times employees on a favorites list will be located at many different locations so that all favorites cannot be presented in a single facility map view. For instance, in the exemplary view in FIG. 18, six employee's are on the favorites list of the employee using device 60 including Jill, Tom, Josh, Mary, Jen and Ralph. Of the six favorites, only Josh and Mary are at locations within the same facility as the device 60 user while the others are at other locations. For instance, Jill is in Paris, Tom is in Shanghai, Jen is in Los Angeles and Ralph is in Grand Rapids. Because Josh and Mary are in the same facility as the device 60 user, each of Josh and Mary can be represented in the facility map view (see phantom circles at 321 and 327) along with the device 60 user at 166. Because the other favorites are not in the same facility, they cannot be represented in the facility map view. Instead, the remote favorites are presented in a shaded frame "remote" view space 360 that overlies the facility map view.

Locations of remote employees are determined by systems in occupied facilities as described above and are provided to server 12. In some cases employee locations outside enterprise facilities may also be tracked using GPS or some other type of system and those locations may be used by server 12 to drive one or more applications along with facility location information for other employees.

Even inside a facility space, in some cases, a GPS system may be able to provide somewhat accurate position information for a portable user computing device. In this case, information from an external GPS system may be combined with signals from a transmitting device within a facility to more accurately determine location of the transmitting device. Many different algorithms for combining GPS and facility sensed information from stationary sensors as well as portable computing devices that obtain information from transmitting devices are contemplated.

In still other cases other systems that can indicate locations of persons outside facilities with sensing devices may be used to determine employee and other locations. For instance, where an employee is scheduled to be on a flight from Europe to the United States, a plane tracking system that identifies the location of the flight over the Ocean may be used to determine the location of the employee on the flight.

As shown, in at least some embodiments the remote view will be at least somewhat transparent so that the device 60 user can see therethrough to perceive underlying aspects of the graphical local facility map view. For instance, space defining walls, chairs, tables, etc., as well as phantom circles showing other employees may be observable under the remote view frame. Where remote favorites are represented in the remote view space 360, they may be located at locations where minimal or relatively unimportant information is represented in the underlying facility map view. For instance, remote favorites representations may, where possible, be placed in space 360 at locations where they do not overlap phantom circle representations of other employees. Remote employee representations may be presented at locations in space 360 that show employee locations relative to the graphical map view presented. Thus, in FIG. 18 where North is up, if Shanghai is to the West of the map view and Grand Rapids is to the East, Shanghai and Grand Rapids representations would be shown in the left and right portions of the border space 360 as illustrated.

In at least some cases the portion of the facility map view represented in FIG. 18 may be modified to include a space just large enough to show locations of favorites within a local facility in which the device 60 user resides. For instance, in FIG. 18, if Josh and Mary were both located in the same space (e.g., 333) as employee 166, the facility map view may automatically be zoomed in to include only space 333. In some cases the portion of the map view shown with boundary 360 which is not shaded may be zoomed in or out as a function of location of favorites so that any local favorites are within the space defined by boundary 360.

In the FIG. 18 example, each favorite's name and current status are indicated. For instance, see the name fields at 330, 322, 325 and 340. Josh is indicated as "Free" at 324 while Mary is indicated as "Busy" at 323. Here, again, the status designations may be determined in any of several ways including accessing scheduling software, by using real time sensed information about employees and their surrounding environments or a combination of both scheduled activities and sensed real time information.

For remote employees identified in the frame 360, in addition to name and status indications, location and time indicators are presented to help the device 60 user have some context in which to consider the favorite's current status. For instance, for Jill, the location and time indicators at 334 and 336 indicate that she is in Paris and that the local time is 5 PM while for Ralph the indicators at 344 and 346 indicate that he is in Grand Rapids and that the current time is 1 PM. Although not shown, other information about employees may be presented such as, for instance, additional information about their environments. For example, the current weather in Paris may be indicated and spatially associated with Jill or Jill's general availability or lack thereof during the next eight hours may be indicated (e.g., "Available next from 10 AM to 11 AM your time").

Referring yet again to FIG. 18, in some cases the favorites representation may be color coded or otherwise visually distinguished in some fashion to indicate current status. For instance, because Jill is busy, the square 330 representation of Jill may be shaded red. Similarly, the square 325 associated with Mary may be shaded red to indicate a busy status while Josh's square 322 may be shaded green. Other colors for other statuses are contemplated such as, for instance, a yellow shading to indicate that an employee is scheduled to be free in the next 15 minutes. Color coding is particularly advantageous as it can be used to quickly sort out statuses of favorites or other resources as described hereafter.

Thus, the FIG. 18 dual map view is a simple way for an employee to ascertain the immediate status of and other information related to all other employee's on the employee's favorites list. In at least some cases it is contemplated that an employee will be able to customize the types of information presented for each favorite or for all favorites and may be able to add and delete other employees to and from the favorites list.

In at least some embodiments the corporate maps application will enable an employee to search for any enterprise resources including space, affordances and other employees to determine locations and current status (e.g., available, busy, etc.). To this end, see again FIG. 4 that includes search icon 190. When icon 190 is selected, in at least some embodiments a screen shot as in FIG. 19 may be presented that queries the employee to indicate the type of resource sought. The exemplary screen shot includes a proximate facility field 271, a person icon 179 and a facility selection icon 273. The facility selection icon 273 can be selected to access a list of other (e.g., remote) enterprise facilities in which the employee would like to search for a resource. For instance, when icon 273 is selected, the screen shot in FIG. 20 may be presented that shows enterprise facilities graphically along with locations of the facilities for selection by the user. The exemplary graphical representations in FIG. 20 include representations 350, 352, 354 and 356, each of which is selectable to indicate a facility for which a search should be focused. Once a facility is selected, a screen shot akin to the one shown in FIG. 19 may again be presented, albeit where the proximate facility field 271 is replaced by a similar field for the selected remote facility.

Referring again to FIG. 19, the proximate facility field 271 indicates the facility that the device 60 user currently resides in and, in the present example, indicates the Palo Alto facility. The facility in which the device 60 user currently resides my be automatically determined and set as a default if device 60 is currently located in an enterprise facility. Where a device 60 user is not currently in an enterprise facility, device 60 and/or server 12 may access a device 60 user's schedule and determine the next enterprise facility that the device 60 user will be visiting and may set that facility as the searching default. For instance, if device 60 user is at a hotel (determined via GPS or the like) near the Palo Alto facility and is scheduled to be at that facility all day, the Palo Alto facility may be set as the default in field 271.

Within field 271, a set of most commonly searched for resources may be presented to help a conferee quickly select search criteria. For instance, the FIG. 19 view includes a "conference space" icon 275, a "personal space" icon 277, a "printer" icon 279, and a "projector" icon 283, that are selectable to search for different space types and printers and projectors, respectively. An "other" icon 285 is also provided to enable the device user to specify some other resource or affordance that the user would like to locate.

Figure 19:
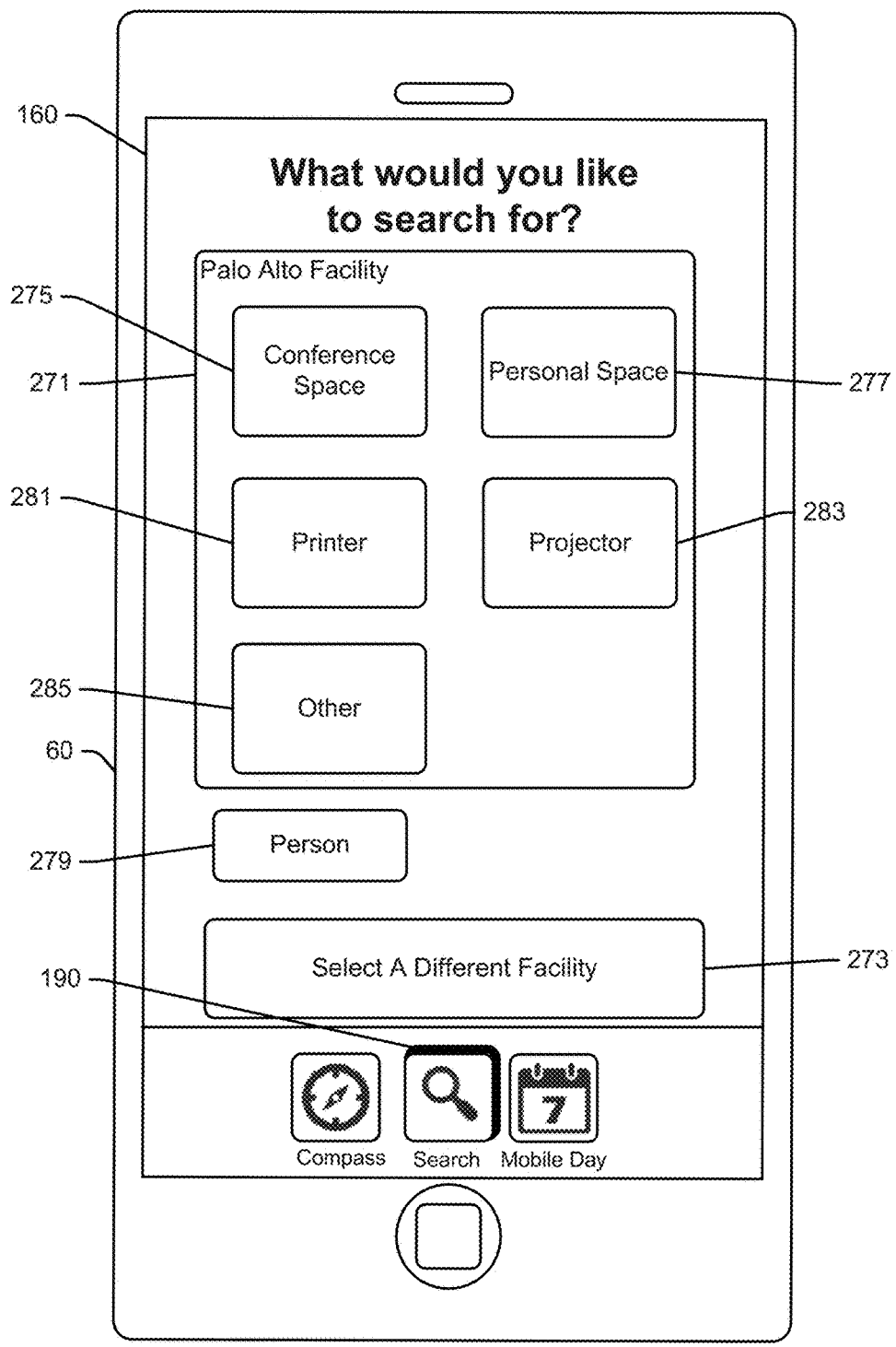
FIG. 19 is similar to FIG. 12, albeit illustrating another screen shot for expediting a resource search function.
Figure 20:
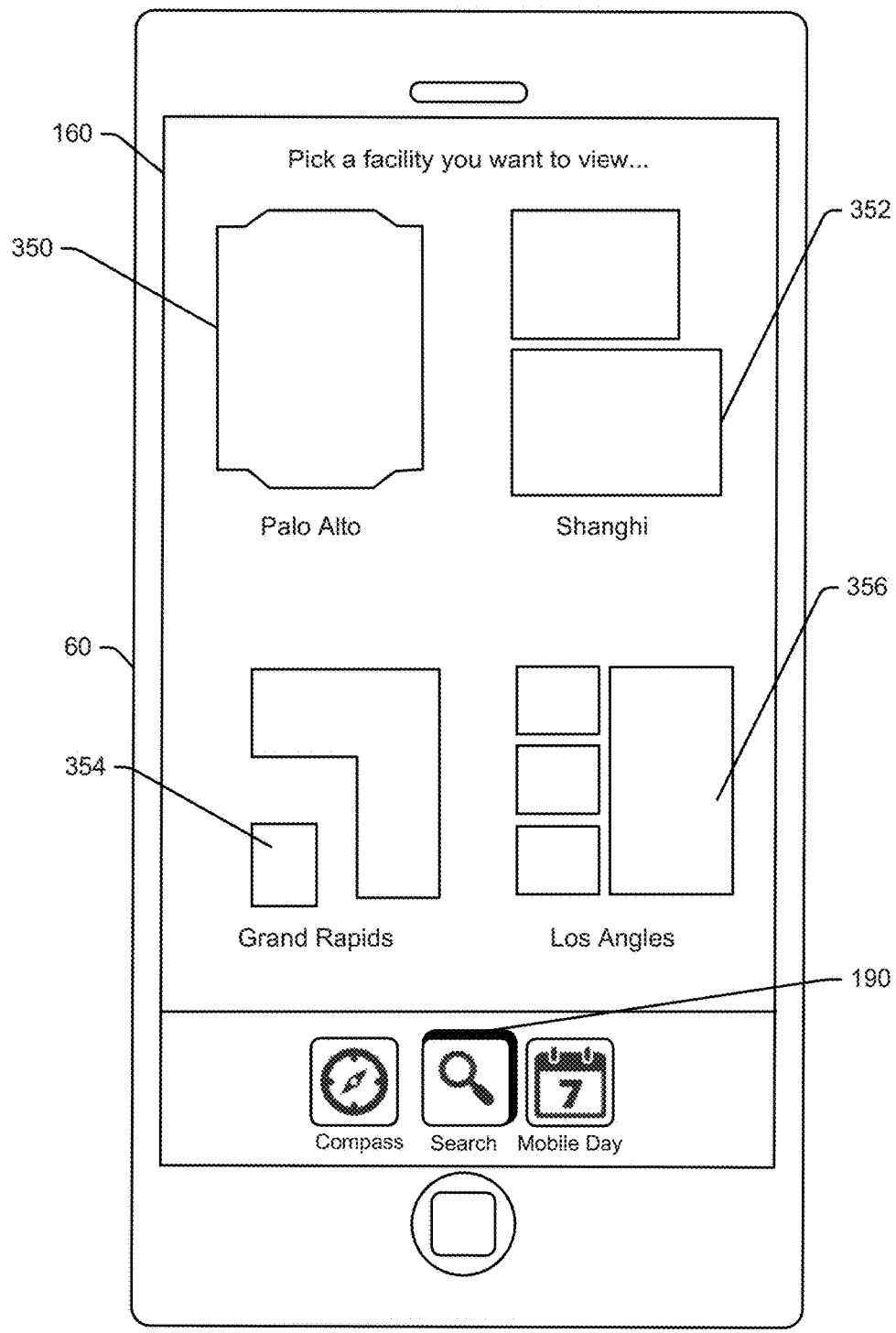
FIG. 20 is similar to FIG. 12, albeit illustrating another screen shot for selecting a facility in which to search for resources.
Figure 21:
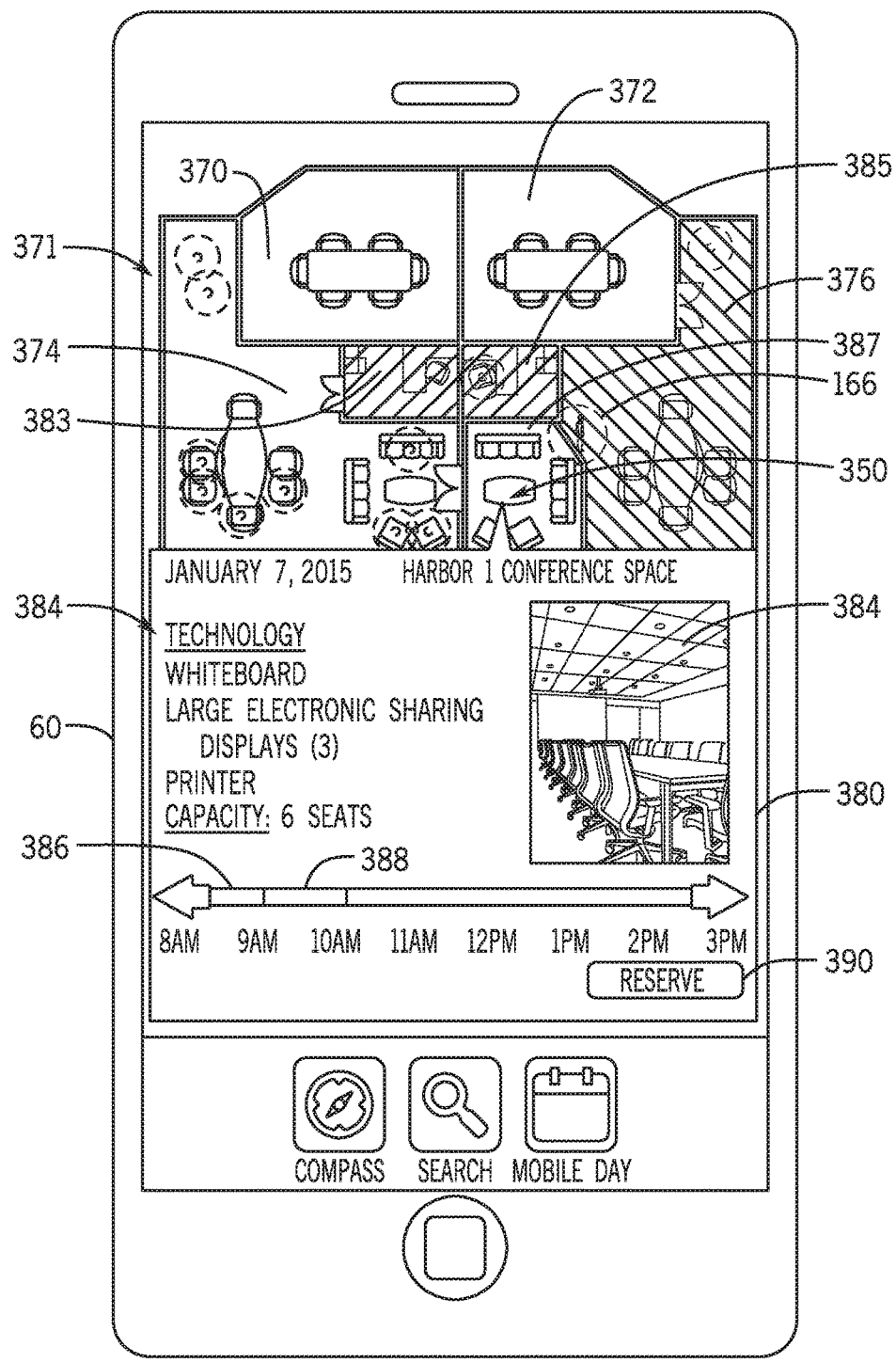
FIG. 21 is similar to FIG. 12, albeit illustrating another screen shot useful for reviewing affordances and a schedule corresponding to a specific facility space.

Referring still to FIG. 19 and also to FIG. 21, when conference space icon 275 is selected, server 12 generates screen shot 371 including a map view of the Palo Alto facility showing all conference spaces and, in at least some cases, may visually distinguish the spaces as a function of their current status. For instance, available conference spaces may be shaded (e.g., see spaces 370, 372 and 374) differently than spaces that are currently occupied and in use (see space 376 that is double-cross hatched). Spaces that will become available in the next 15 minutes may be distinguished in some other visual fashion (see spaces 383 and 385) and spaces that will be occupied within the next 30 minutes may be visually distinguished in yet another fashion. For instance, available spaces 370, 372, 374 may be shaded green, occupied spaces 376 may be shaded red, shortly available spaces 383, 385 may be shaded yellow and shortly occupied spaces may be shaded blue.

Where a space (e.g., a conference room) on the view is selected (e.g., via touch at 350 in FIG. 21), a space information window 380 may be opened that is spatially associated with the selected space and that presents information related to the selected space. The exemplary space information window 380 in FIG. 21 associated with space 387 includes an image 382 of the space, a list of affordances 384 associated with the space and a tool 386/388 for selecting a time on a schedule associated with the space during which the space can be reserved. Image 382 may be a virtual image generated by server 12 using sensed affordances within the selected space as described above or may be an image generated by an employee during a review process as described above. Similarly, the list of affordances 384 may be automatically updated as resources are moved into and out of the selected space to reflect real time affordances within the space or may be based on a review by a prior space user. Thus, for example, where additional chairs with tracking devices are moved into the space, the capacity number may be increased to reflect the additional chairs in the space in a real time and automatic fashion.

The reservation tool includes a time line 386 and a sliding icon 388 for selecting a time to reserve. Although not shown, already reserved time may be indicated on the time line 386 and would not be selectable by the device user. Once a time to reserve has been selected on time line 386, the device 60 user can select icon 390 to provide the reservation request to scheduling software via server 12.

Figure 22:
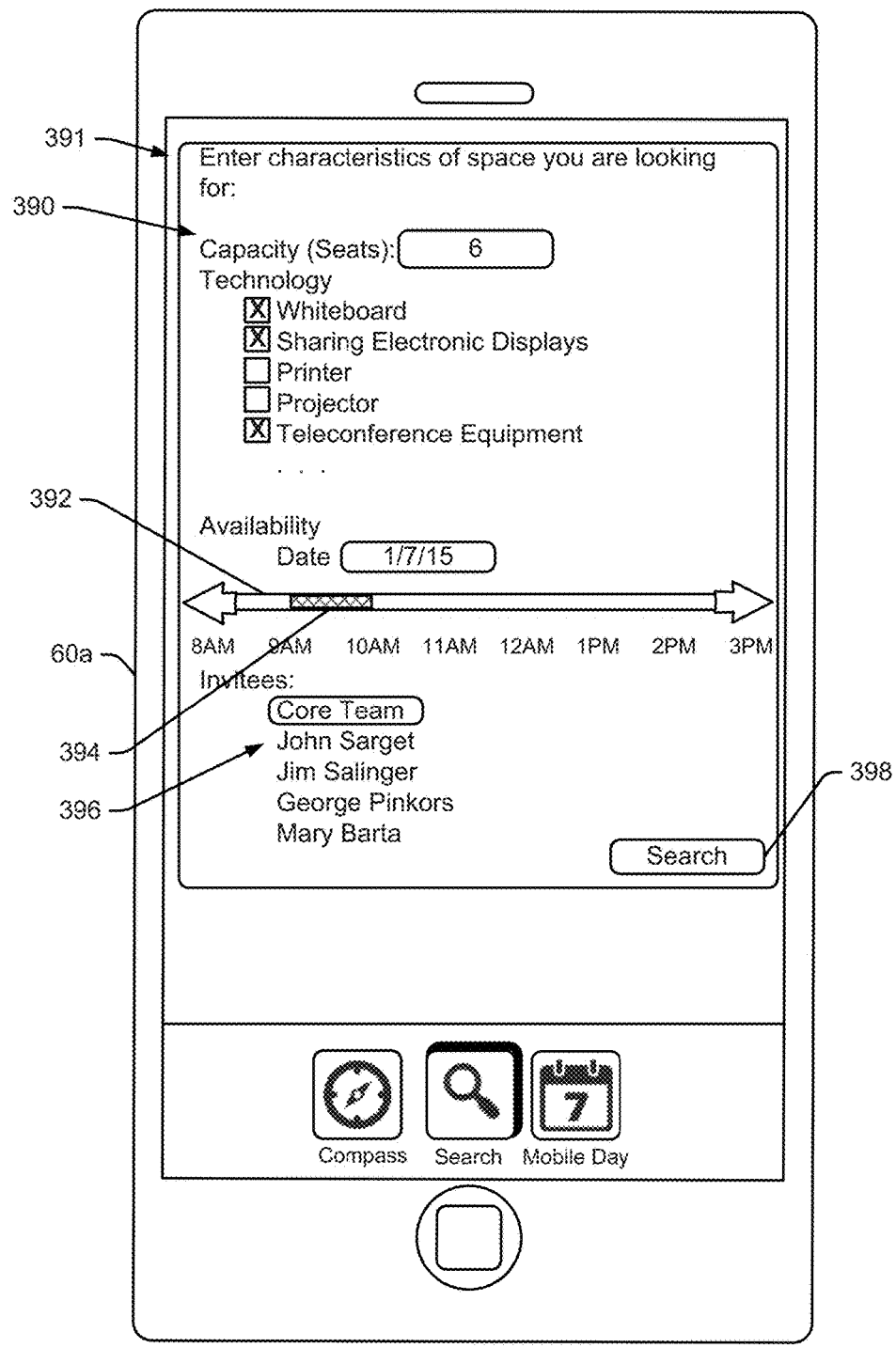
FIG. 22 is similar to FIG. 12, albeit illustrating another screen shot for selecting space characteristics to drive a space search function.

Referring again to FIG. 19, in other embodiments when the conference space icon 275 is selected, other search tools for identifying a specific space may be provided. For instance, referring also to FIG. 22, a screen shot 391 for selecting a conference space may enable an employee to specify a set of parameters or characteristics of a space sought. The exemplary screen shot 391 includes fields 390 for entering specific space parameters including a capacity selecting field and boxes that may be selected to identify affordances needed in the space sought. Exemplary selectable affordances include a whiteboard, sharing electronic displays, a printer, a projector, teleconferencing equipment, etc. The screen shot also includes time selection tools 392 and 394 and, in at least some cases, will include a tool 396 for selecting people that will use the space along with the employee. The invitee selection tool 396 may automatically populate with teams that the specifying employee is on as well as other employee names for selection. After parameters for the search have been specified, the employee selects search icon 398 to submit the request to server 12 and to generate notices to other employees regarding the scheduled activity.

Referring again to FIG. 19, when the personal space icon 277 is selected, space specifying tools akin to those described above with respect to the conference space icon 275 may be presented via other screen shots.

Figure 23:
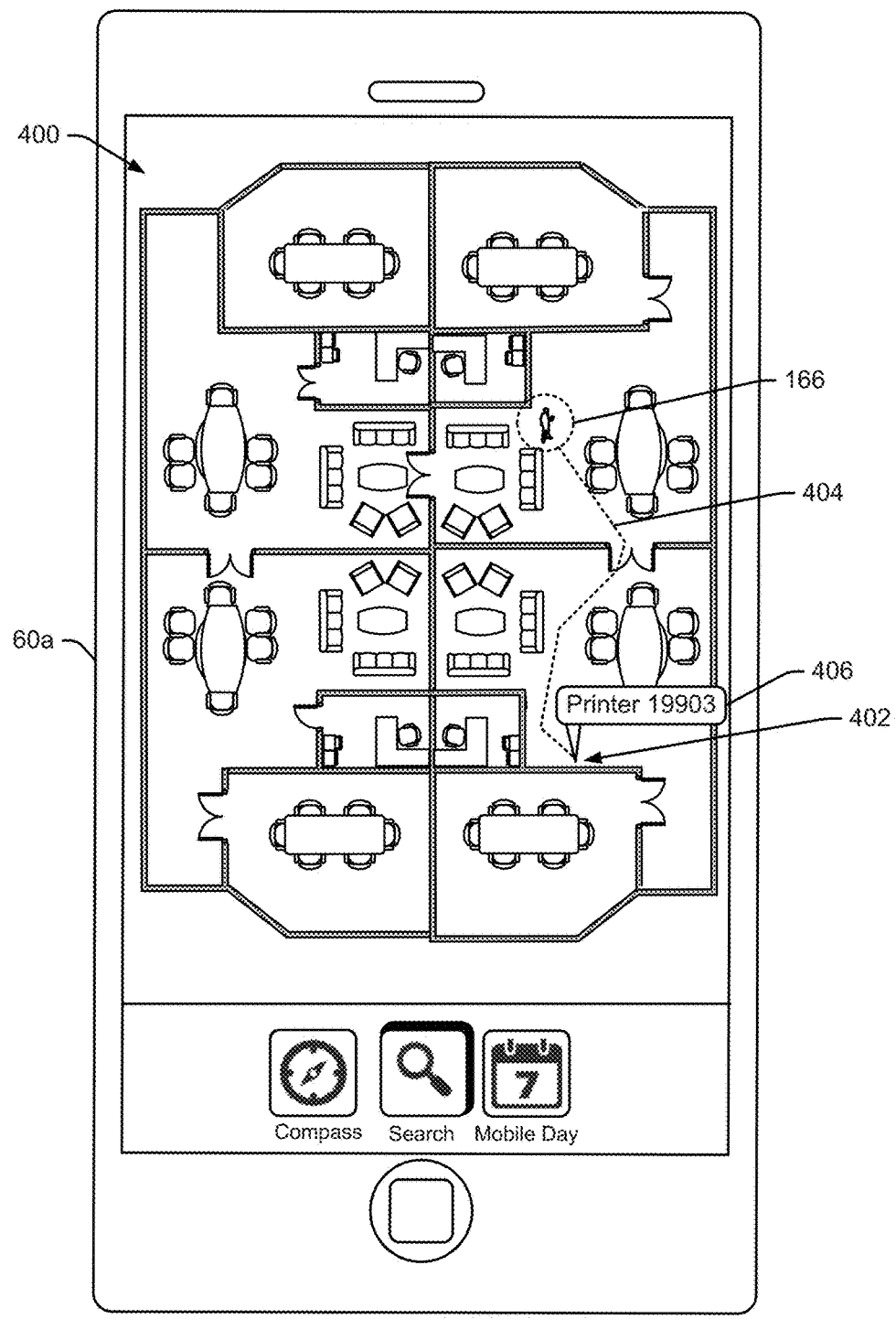
FIG. 23 is similar to FIG. 12, albeit illustrating a graphical floor plan view showing a portable device user and a path to a nearest printer that is consistent with at least some aspects of the present disclosure.

In FIG. 19, when printer icon 281 is selected, server 12 may identify the current location of the device 60 user and the current location of a nearest printer that the user can use and present information related thereto. To this end, see FIG. 23 where a screen shot 400 shows the location of a device 60 user at 166 and the location of a printer at 402 as well as a most direct path 404 to the printer location and a printer name label 406. Here, the employee using device 400 may follow the path 404 in the representation to the printer at 402 and then use the printer. In the alternative, the device user may select the printer name icon 402 to obtain on screen tools for selecting a document or other materials to print and for controlling the printer identified in the name label. Although not shown, the device 60 user may be able to select a view that shows the user in real time which turns to take along a path to the printer or some other resource.

Referring yet again to FIG. 19, the person icon 279 is separate from the facility icons 271 and 273 because many employees move from facility to facility and therefore searching for a specific person in a specific facility often times does not make sense. Tools for searching for specific people are described hereafter.

The ability to show real time locations of resources on a map as well as to access electronic schedules of enterprise resources enables various other advantageous tools to be implemented. For instance, see FIG. 24 that shows a graphical day schedule for a device 60 user based at least in part on the user's schedule (e.g., schedules and unscheduled time slots) and that may be presented to the user when mobile day icon 192 is selected. In particular, the view shows a facility map and indicates a sequence of scheduled activities (e.g., meetings, personal reserved time, etc.) at specific locations within the facility at 424, 426, 428, 430 and 432 that are sequentially labeled "1", "2", "3", "4" and "5", respectively, to indicate the sequence in which and location at which the activities are scheduled to occur. In addition, lines or other graphical connectors are provided in phantom between sequential activities to provide an intuitive graphical understanding of the user's day. In addition to the activity indicators, other scheduling information may be presented either immediately upon accessing the mobile day view or when the device 60 user selects some feature on the presented image. For instance, when the fourth activity icon 430 is selected, information about a meeting associated with the icon 430 may be presented in a pop up window 436. As another instance, when a line (e.g., the line between icons 424 and 426) between scheduled activity icons is selected, when free time exists between scheduled activities, a pop up window 440 may be presented that indicates the duration and period of free time which is visually associated with a line between scheduled activities by, for instance, a graphical pointer as at 438.

In other cases pop up activity and free time windows akin to windows 436 and 440 may be presented for each of the activity icons and lines between those icons or some subset thereof. For example, where the duration of a free time between sequential activities is less than thirty minutes the free time may not be indicated but if the free time between activities is 30 minutes or greater, the free time may be automatically indicated via a pop up window when the mobile day view is initially accessed.

In still other cases, server 12 may be programmed to indicate other information when free or available time exists within an employee's schedule. For instance, when a first employee has 30 minutes of time free between other activities, server 12 may be programmed to identify other employees that are also free and that are scheduled to be in the same general area as the first employee during the free period and may indicate that information to the first employee and, in some cases, to the other employees as well. Locations and availability of other employees may be gleaned from electronic schedules for those employees and/or via actual real time location information and sensed activity information (e.g., sensing if an employee is currently in an impromptu and unscheduled meeting with another employee). To this end, see the indicator 442 associated with the free time label 440 that indicates that two other employees are scheduled to be free and proximate during the specified free period). Which employee schedules are contemplated for notices like the 442 notice would be customizable for each employee so, for instance, an employee may only want notices related to other favorite employees or specifically selected employees as opposed to any enterprise employee.

Figure 24:
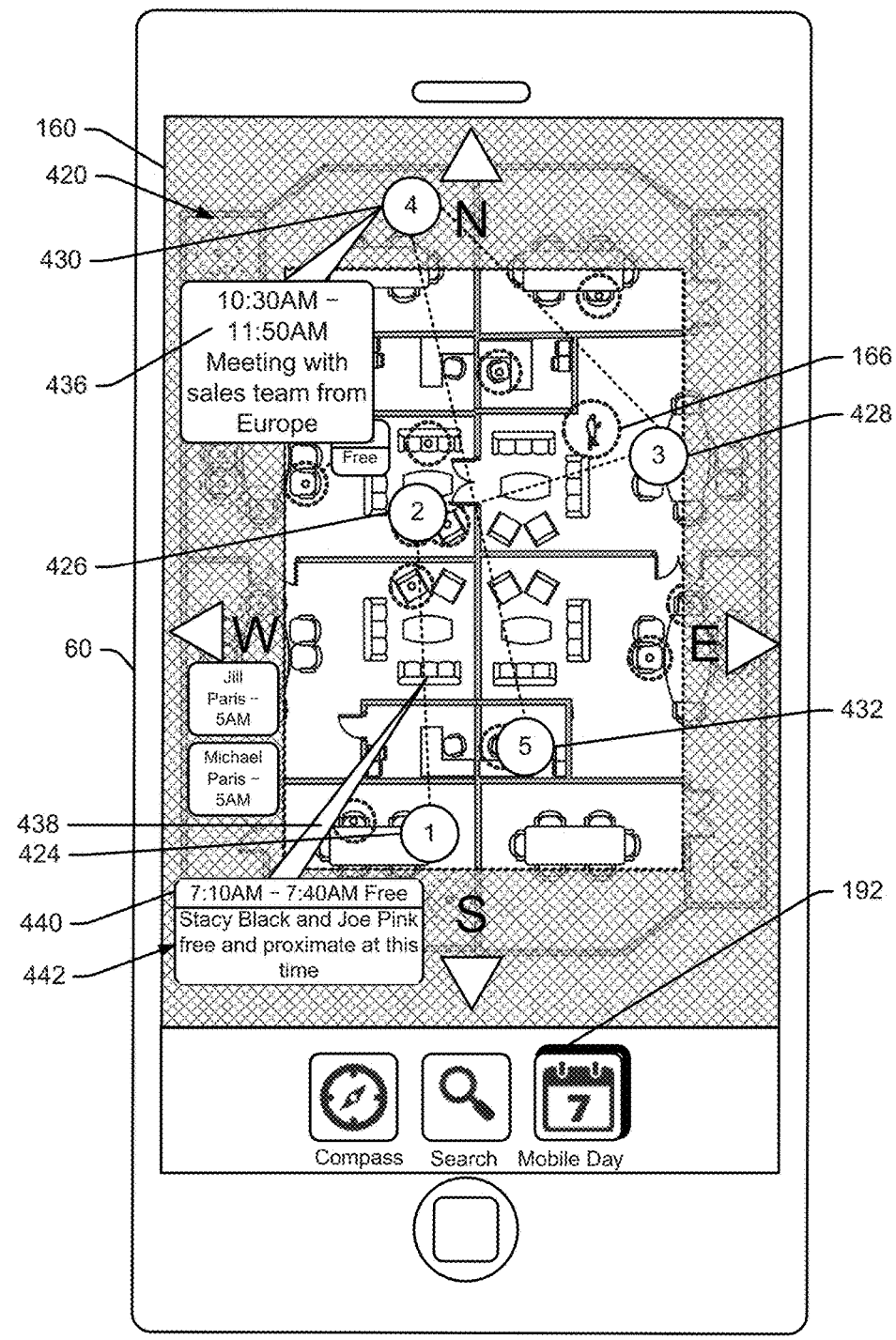
FIG. 24 is similar to FIG. 12, albeit illustrating a mobile day representation showing meetings that a device user is to attend during the course of a day.

Thus, in at least some embodiments it is contemplated that server 12 may be able to consider employee schedules as well as schedule locations and employee preferences (e.g., an employee's favorites list) when identifying opportunities for meetings to suggest to a specific employee. Where a first employee has indicated a desire to know when a second employee is going to be proximate and available or when two other employees are going to be proximate the first employee and available, server 12 may generate an indication via the mobile day view. In some embodiments a notification indicating a possible face-to-face meeting may also include a suggest space (see 442 in FIG. 24) for the possible meeting. In this regard, in addition to analyzing employee schedules, server 12 may be programmed to examine schedules for space within the vicinity of the location that will be common for each employee associated with the notification to identify one or more available spaces. In FIG. 24, selection of icon 442 may enable a device 60 user to reserve the space indicated (e.g., at the end of the pointer 438) and may transmit e-mail or text initiations to other employees in the notification automatically. Space and device 60 user schedules may indicate tentative busy status until at least one of the other initiated employees accepts the invite at which time schedules would be updated as busy. Other notifications of such opportunities may also be transmitted via e-mail, text, etc., to an employee.

Referring again to FIG. 19, when person search icon 279 is selected, device 60 may present simple search tools for locating enterprise employees such as, for instance, a field in which a person's name can be typed. Once located, the location and other information associated with the employee like current status, city, weather, next available time on the employee's schedule, etc., may be presented to the device 60 user.

While the graphical map based interfaces described above are useful and will be advantageous for some applications, it has been recognized that much simpler and for at lease some people, more intuitive interfaces can be provided for locating and scheduling resources. For instance, in many cases simple text based interfaces may be optimal for certain applications. For this reason, in at least some cases other tools for locating enterprise resources are contemplated. For instance, another general type of corporate maps interface may indicate approximate distances between an employee using a device 60 and enterprise resources. To this end see FIG. 25 that shows a different general type of interface screen shot or resource representation at 500 that includes an information field 501 and a navigation tool field 502. Navigation icons including a "compass" icon 570, a "search" icon 572 and a "favorites" icon 574 are provided in tool field 502. Compass icon 570 is a default icon in this case. Here, the compass symbol for the screen shot in FIG. 25 is meant to indicate that a device 60 user is given a bearing regarding relative positions of resources (e.g., spaces, other employees, etc.) relative to the device 60 user's current location.

The exemplary information field 501 includes information that is developed based on the current location of device 60 and the employee that uses the device 60. The information in field 501 includes an image 504 of the employee using device 60 as well as the user's name and a text description of the user's current location at 506 which is presented at the top of field 501. In addition, field 501 includes a distance scale at 508 that extends downward from image 504 and that includes distance labels along the scale to indicate distance from the user presented in image 504. Thus, for instance, the exemplary scale 508 indicates 10 m, 30 m, 50 m, etc., to indicate 10, 30 and 50 meters from the location of the device 60 user. Here, the distances may be direct (e.g., as the flies) or may be most direct path distances through facility spaces.

Figure 25:
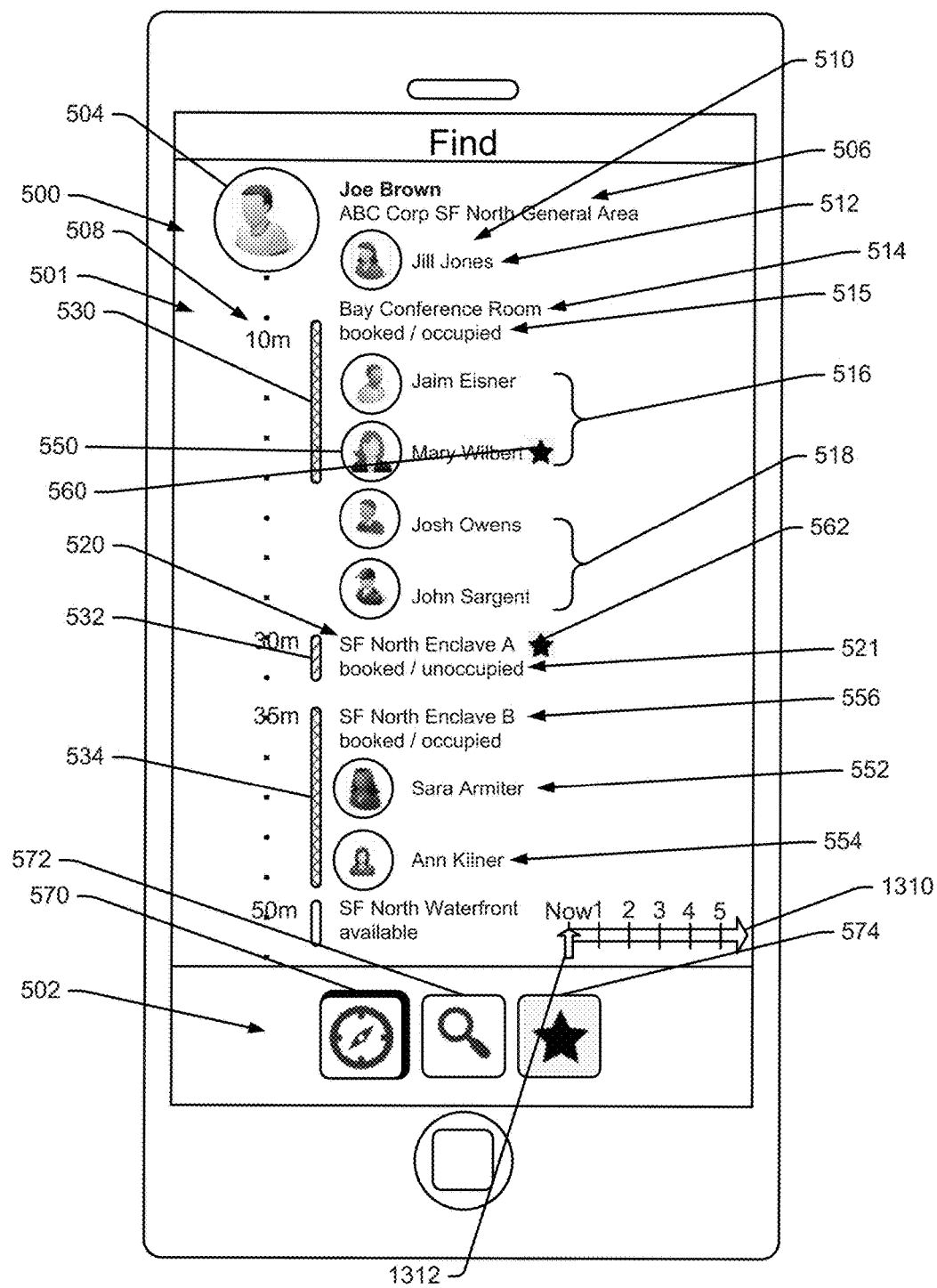
FIG. 25 is similar to FIG. 12, albeit showing a screen shot where resource locations relative to a device user are shown in list fashion with a distance scale.

Referring still to FIG. 25, field 501 further includes a list of enterprise resources in a resource column along the right side of scale 508 where resources are aligned with the scale at locations that are consistent with the actual distances of the resources from the location of the device 60 user. Thus, for instance, the resource column 510 includes the name "Jill Jones" and an associate image corresponding to Jill Jones at 512 near a 5 meter location on the scale 508 to indicate that Jill Jones is proximately 5 meters (e.g., may be in the next office) from the device 60 user. Other names and associated images are also provided in column 510 near other distance locations on the scale 508 to indicate the distance between the device 60 user and other enterprise employees. In addition to including employee designations, the resource column 510 also indicates other resources like conference spaces by name where each conference space name is provided at a location along the scale 506 that corresponds to the actual distance between the device 60 user and the conference space. For instance, a "Bay Conference Room" indicator is presented at 514 at approximately the 10 meter scale location to indicate that the Bay conference room is approximately 10 meters from the current location of the device 60 user, a "SF North Enclave A" indicator is presented at 520 at approximately the 30 meter scale location to indicate that the SF North Enclave A is 30 meters from the current location of the device 60 user, and so on.

A status indicator is provided just below each of the conference room indicators to indicate a current status of the conference room. For example, see indicator 515 below the Bay conference room indicator 514 that indicates that the current status of the Bay room is "booked/occupied" and the indicator 521 associated with the SF North Enclave A indicator 520 indicating that that conference room is also "booked/unoccupied".

A vertical occupancy bar 530, 532, 534 is provided for each conference room indicator that extends between the distance scale 508 and the resource column 510 to indicate which employees are currently located within each conference room. For instance, bar 530 extends from the Bay conference room indicator 514 downward to a location just below an image 550 of employee "Mary Wilbert" to indicate that all of the employees listed in the resource column 510 between indicator 514 and image 550 as well as Mary Wilbert are currently located within the Bay conference room (see 516). Employees listed at 518 below the bar 530 are not in the Bay conference room but are approximately 10 meters from the device 60 user's location. As another instance, bar 534 indicates that Sara Armiter 552 and Ann Kilner 554 are located in the SF North Enclave B conference room indicated at 556.

In the illustrated embodiment, the occupancy bars are color coded or otherwise visually distinguished to indicate different statuses of the conference rooms. For instance, in the illustrated example in FIG. 25 a double-cross hatched bar (e.g., 530, 534) indicates that an associated conference room is currently booked and occupied, a single hatched bar (e.g., bar 532) indicates a booked but currently unoccupied space, and an un-hatched bar indicates that the associated room is un-booked and available for use. Again, shading may correspond to different colors (e.g., red for booked and occupied, green for available, etc.). More than three types of highlighting or visually distinguishing characteristics for indicating other room statuses are contemplated such as, for instance, a unique highlighting color to indicate that a room will be occupied shortly (e.g., within the next 30 minutes), an indication that an occupied room will be unoccupied shortly, an indication that a room that is not scheduled is currently occupied, etc.

In addition to the information described above, "favorites" indicators are provided for resources in the resource column 510 that are on a favorites list for a device 60 user. For instance, in FIG. 25, a star 560 is provided adjacent the names Mary Wilbert and a similar star 562 is provided adjacent the "SF North Enclave A" indicator to indicate that Mary and the Enclave A are favorite resources of Joe Brown, the device 60 user. Thus, the device 60 user can locate proximate favorite resources quickly by identifying starts and associated resources via the screen shot 500.

Referring still to FIG. 25, it should be appreciated that the distance scale 508 shown is compressed in at least some cases so that the distance indicators may not reflect actual dimensions on the scale. For instance, if the closest enterprise resource is 50 meters from device 60, a 50 meter indicator may be located at the location of the 10 m indicator in FIG. 25. If five resources are located at the 50 meter distance from device 60, those five resources would be listed and then if the sixth closest resource is 100 meters from device 60, a 100 m designator may be presented with the sixth resource indicated in column 510, and so on, so that as much information is possible is presented on the screen of device 60 without any blanks in column 510.

The exemplary view in FIG. 25 presents resources in a list arranged by distance, indicates employees that are in conference together, indicates conference room availability or status and indicates favorite resources of a device 60 user. As device 60 is moved about within a facility or as resources (e.g., other employees) move about within the facility, the information in screen shot 500 is updated substantially in real time to reflect new spatial positions of resources with respect to device 60 as well as availability of conference rooms.

Although not shown, in at least some embodiments it is contemplated that every resource in column 510 may be presented as a hyperlink to additional information related to the resource. For instance, the Enclave A indicator 520 may be selected to open a pop up window akin to window 380 in FIG. 21 including information about the Enclave A room and a schedule and scheduling tools for reserving time within the Enclave A room. As another instance, selection of one of the employee indicators (e.g., 512, 534, etc.) may open up an employee communication window like window 290 shown in FIG. 16.

Figure 26:
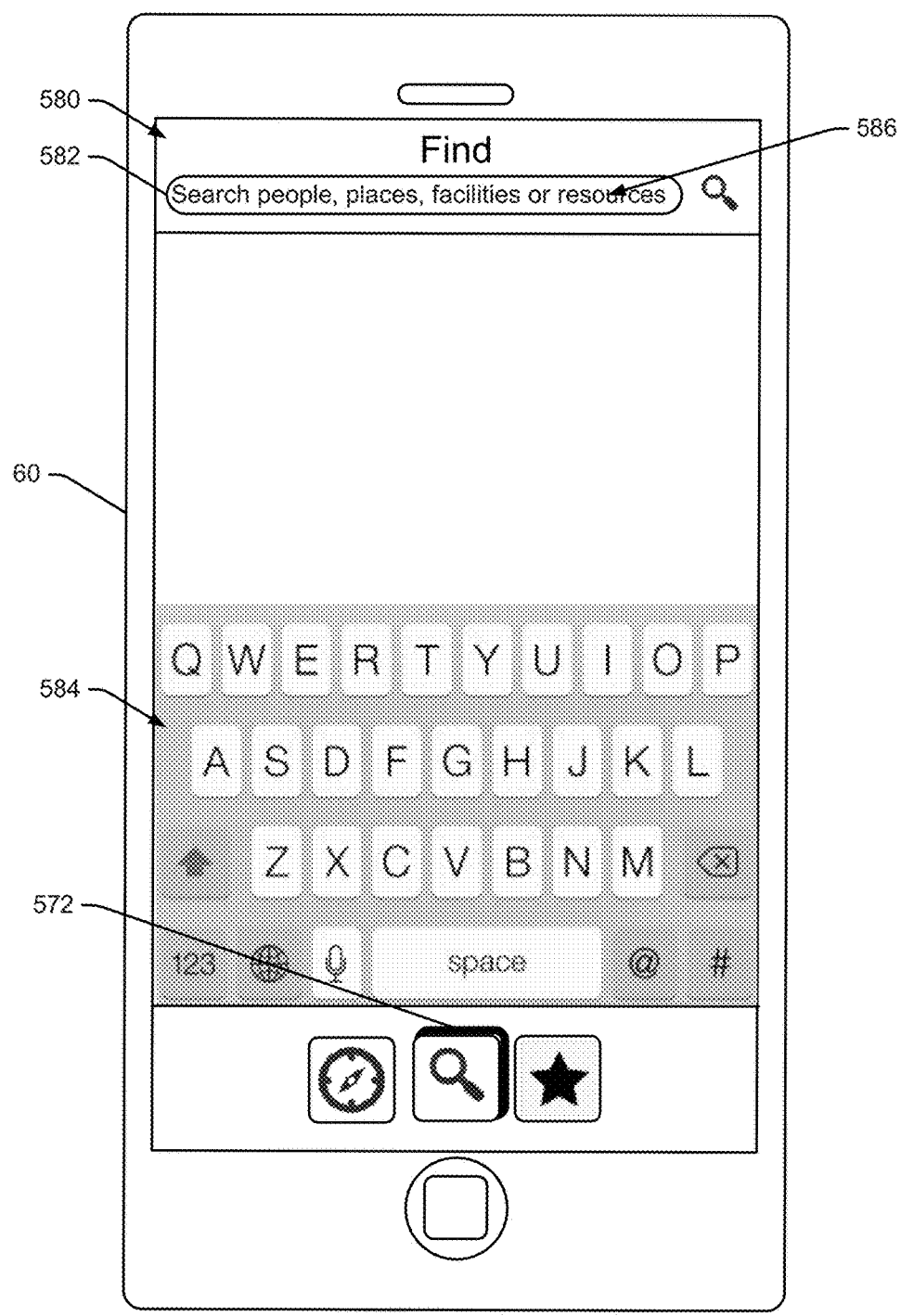
FIG. 26 is similar to FIG. 12, albeit showing resource searching tools that are consistent with at least some aspects of the present disclosure.
Figure 27:
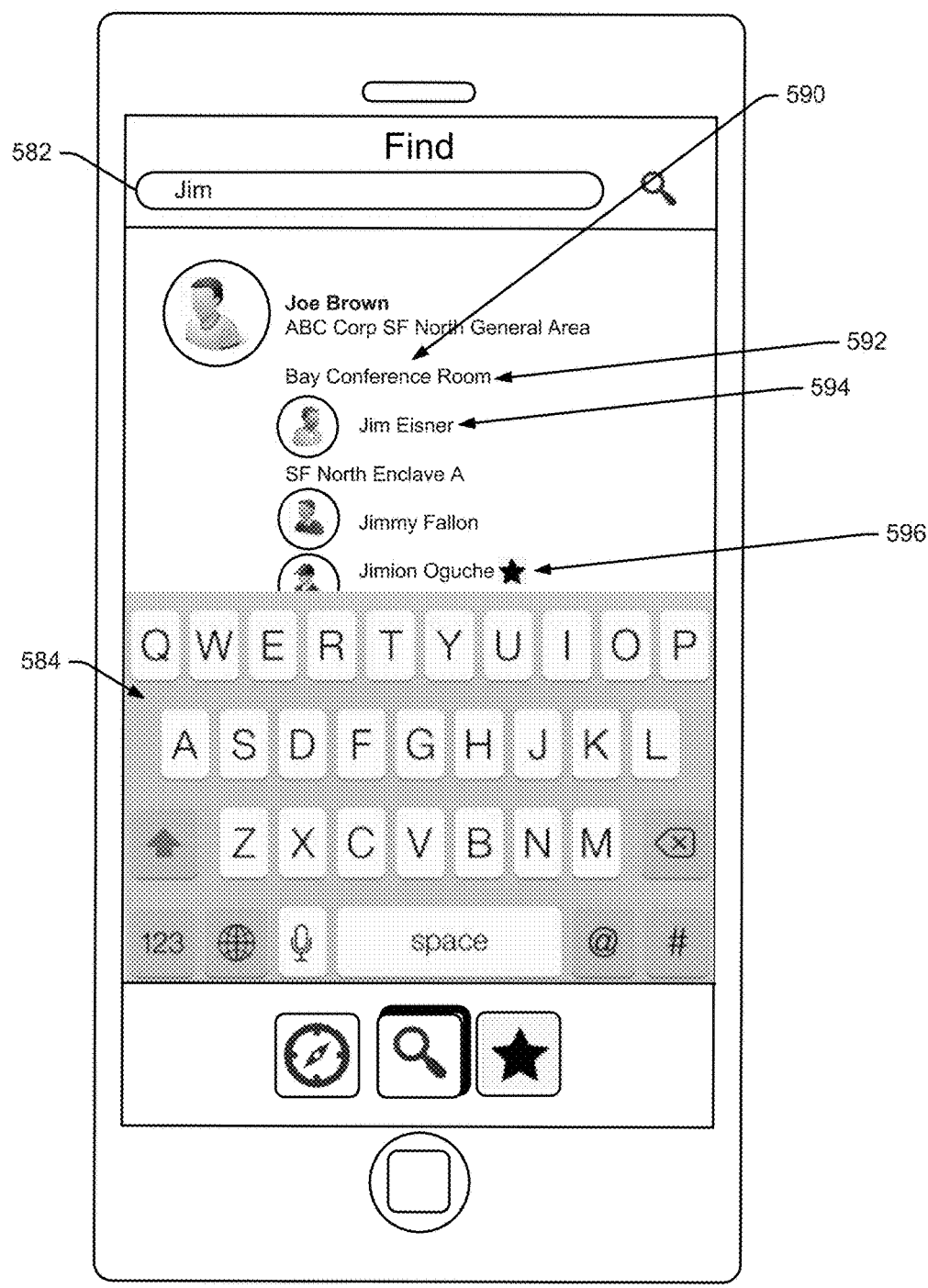
FIG. 27 is similar to FIG. 26, albeit showing dynamic search results generated as text is entered into a search field.

Referring again to FIG. 25, when the search icon 572 is selected, in at least some embodiments a simple search screen shot 580 like the exemplary one shown in FIG. 26 may be presented that includes a search field 582 and a virtual keyboard 584 for entering search terms. Field 582 initially includes text 586 (in at least some cases in phantom) to make clear that any enterprise resources can be searched including people, places, facilities, other resources. As shown in FIG. 27, as letters are entered into field 582, server 12 searches for resources matching the entered letters and presents the resources in a resource list or column 590. The list 590 indicates the current enterprise locations of each employee on the list. For instance, a "Bay conference room" indicator 592 is presented above an employee designator or indicator 594 to indicate that the employee associated with indicator 594 is located within the Bay conference room.

Figure 28:
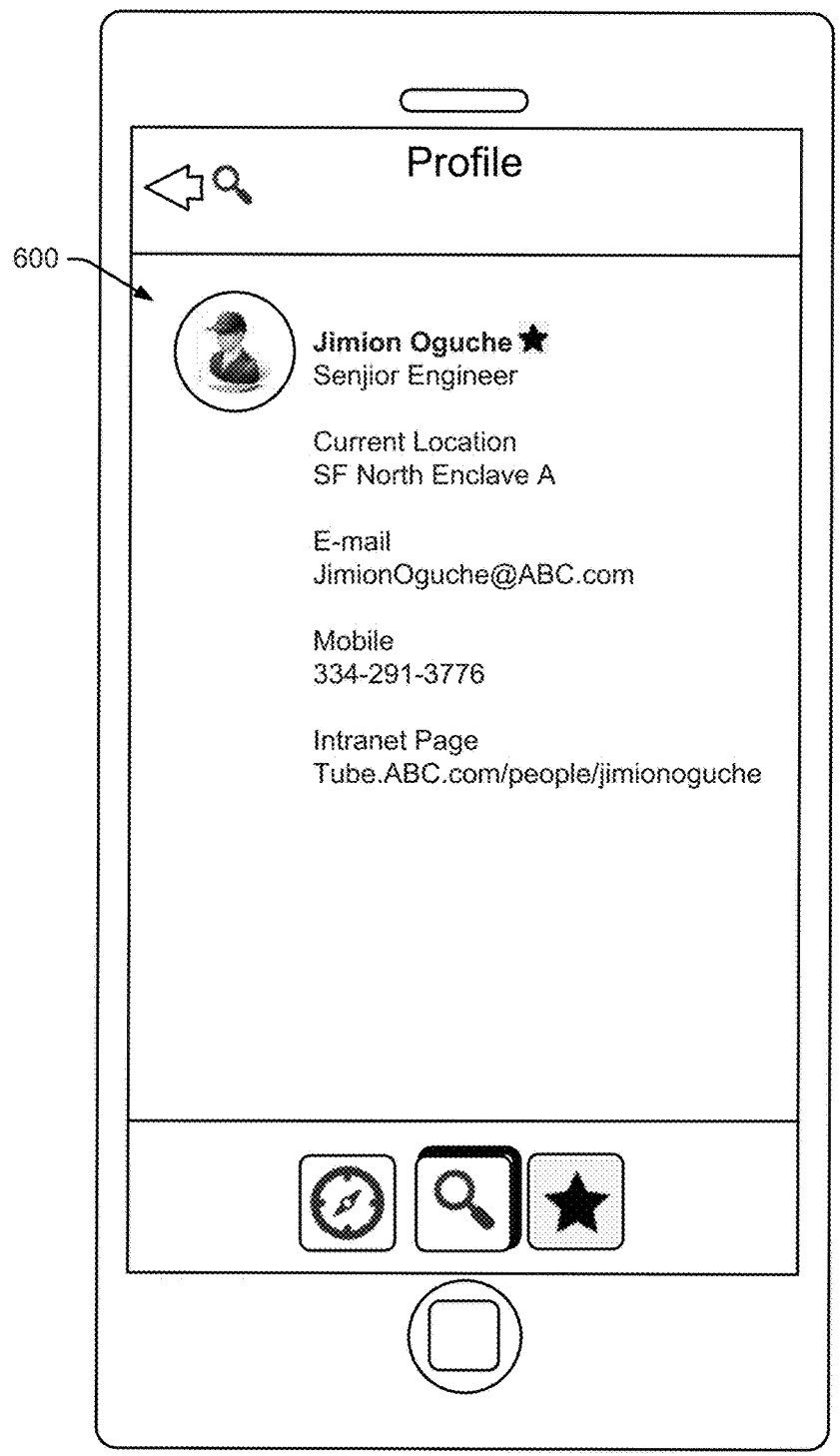
FIG. 28 is similar to FIG. 27, albeit showing employee information corresponding to an employee selected from a list of employees in FIG. 27.

Each name in the resource list 590 is presented as a selectable hyperlink for accessing additional information about an associated employee. For instance, if the name Jimion Oguchi 596 is selected in FIG. 27, device 60 may present the screen shot 600 in FIG. 28 that shows additional archived and real time information associated with the selected name 596. Contact information like the phone number, the e-mail address, etc., will be selectable in at least some cases to initiate a communication process with the employee indicated on the screen shot.

In at least some cases resources may be searched by specific name or a generic resource type. For instance, the Bay conference room may be searched for by typing in the name "Bay" or by typing in the phrase "conference room", either of which should yield the Bay conference room as at least one option on a list.

Figure 29:
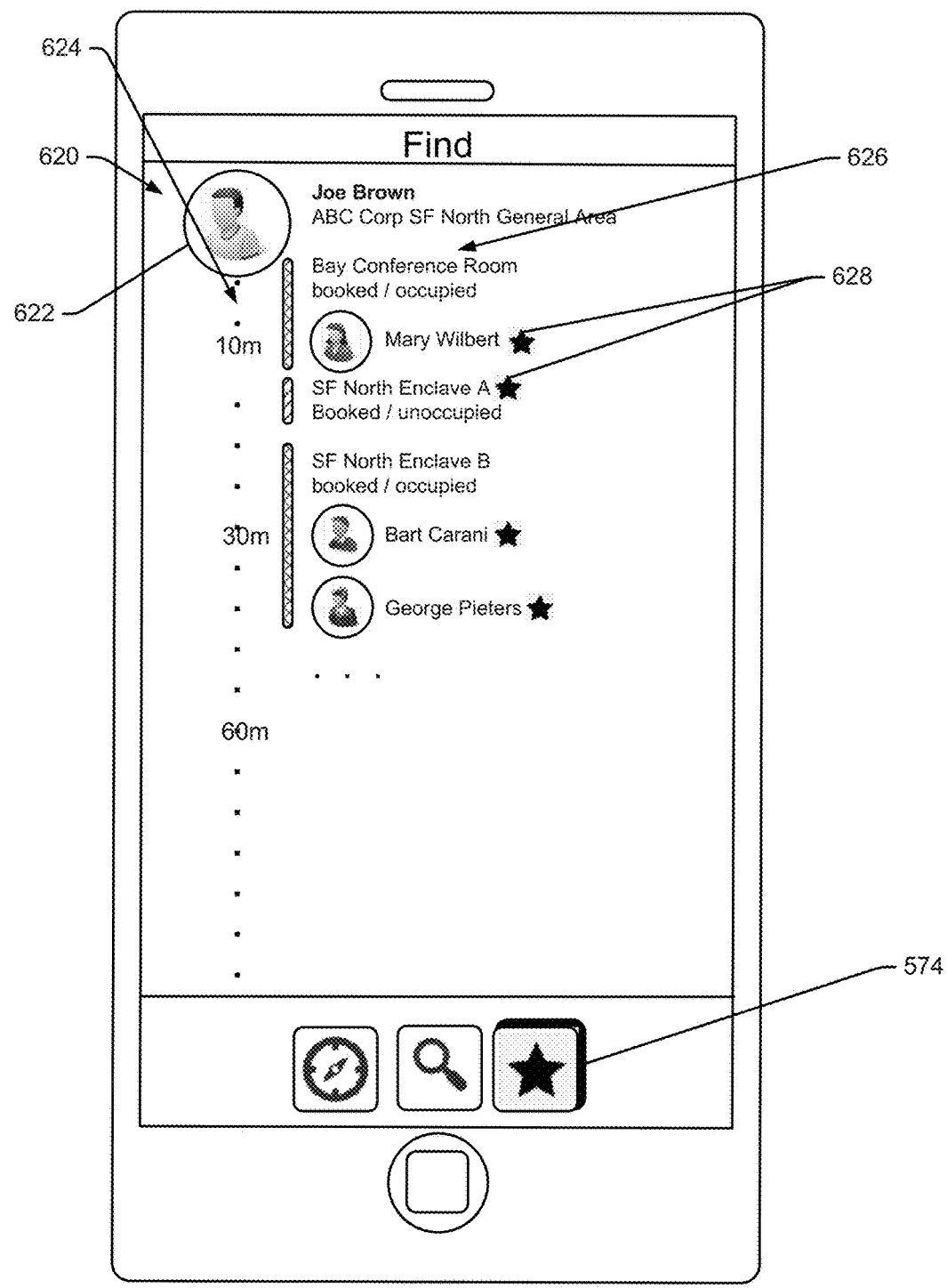
FIG. 29 is similar to FIG. 27, albeit showing a list of favorite resources relative to the location of a specific device user.

Referring to FIG. 29, when the favorites icon 574 is selected, the current locations of all resources on a favorites list for the device 60 user may be identified and used to create a screen shot similar to the screen shot shown in FIG. 25, albeit where all resources in a resource column include favorites or are somehow tied to favorites. To this end, see that screen shot 620 includes information regarding the device 60 user at 622 at the top of the image, a distance scale 624 extending down from the information 622 and a list of resources in column 626 arranged by distance where each resource is adjacent a location on the scale 624 that reflects a true distance of the resource from the device 60 and the device 60 user. Stars 628 indicate each favorite resource. Note that column 626 includes some conference room entries that are not starred. These conference room entries in column 626 are provided simply to indicate the locations of employees and not to indicate that those rooms are favorites. Similarly, where a favorite conference room appears in the resource column and is starred, in at least some embodiments all employees in that room will be listed under the conference room where favorite employees are starred and non-favorites are simply listed to give the device 60 user a sense of who is currently occupying the favorite conference room.

Figure 30:
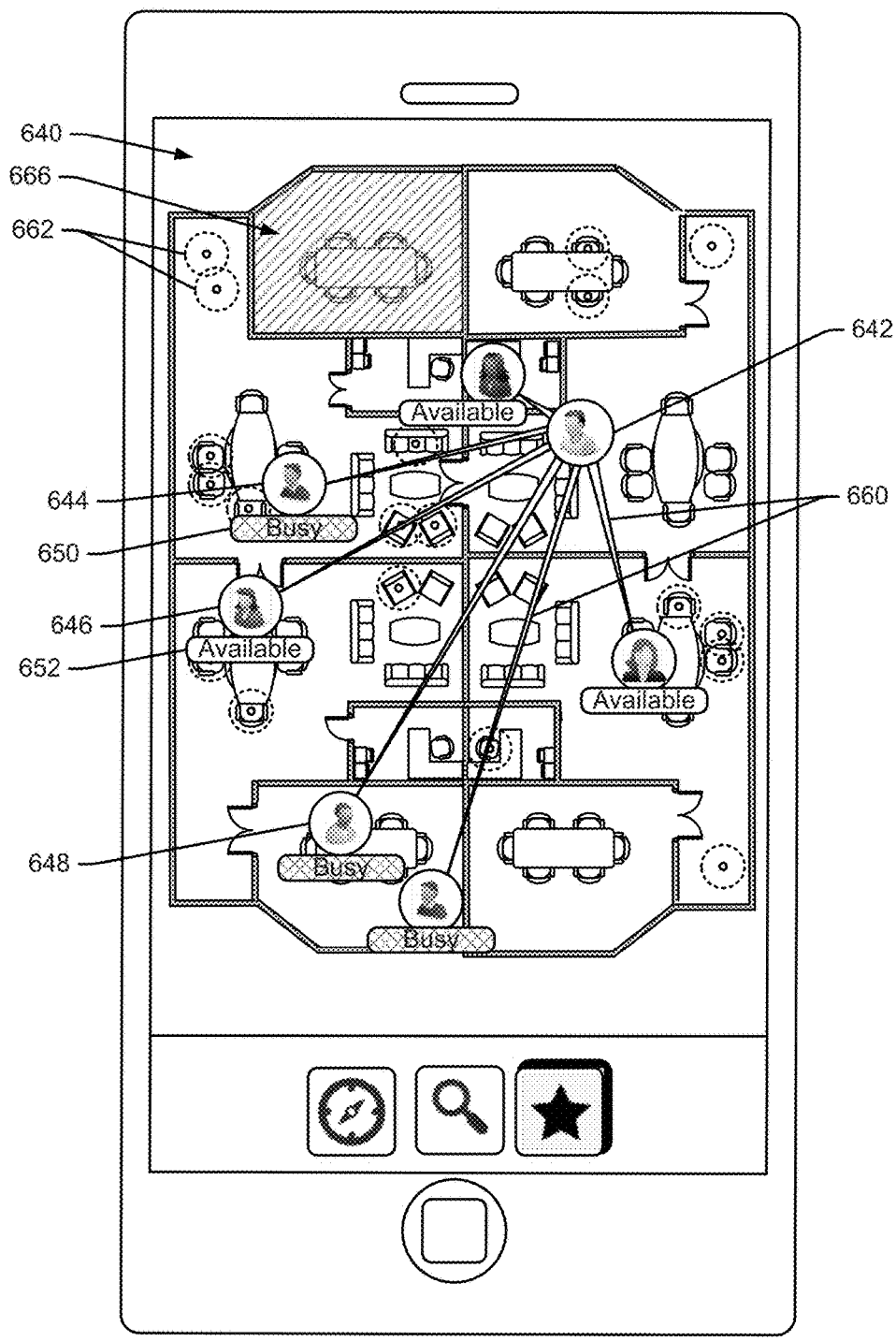
FIG. 30 is similar to FIG. 12, albeit showing a floor plan view with favorite employees' locations relative to a specific device user.

Another possible favorites view or screen shot 640 is shown in FIG. 30 where images 644, 646, 648 of each employee on a favorites list for the device 60 user are presented on a map at their current locations in relation to the location of the device 60 user at 642. For each image of another employee, a status indicator is presented such as "busy" 650, "available" 652, etc. The status indicators may be color coded to indicate different statuses. Here, lines, elongated triangles (see 660) or other connectors or links are provided between the image of the device user at 642 and images of each of the favorites to give the device user 60 a clear understanding of his position with respect to his favorites. As shown in FIG. 30, while images of each favorite are shown in the view 640, other non-favorite employees that appear on the view 640 are indicated via phantom circles (662) or otherwise are visually distinguished. Other ways to distinguish a device 60 user, favorite and non-favorite employees are contemplated. For instance, the image of the device 60 user may be highlighted in green while images of favorites are highlighted in yellow and non-favorites may be highlighted in red phantom color.

Referring still to FIG. 30, favorite spaces on the map shown may also be highlighted differently to distinguish those spaces from others. For instance, space 666 is shown cross hatched to indicate a favorite status that distinguishes space 666 from other spaces. In some cases current status of each space may also be indicated via some type of visually distinguishing appearance. For instance, any favorite space that is currently occupied may be colored red while open favorite spaces are colored green and currently occupied spaces that are scheduled to be unoccupied in the next 20 minutes may be colored yellow.

In addition to being used to locate and determine the current status of enterprise resources, in at least some embodiments portable or other computing devices like device 60 may be useable to set notifications to indicate changes in resource statuses. Here, many different types of status changes are contemplated. Two general types of status changes include employee initiated changes and tracked changes. Employee initiated changes are simply messages generated from one employee to others such as a message indicating that cookies are available at a specific facility location or that some information posted in a specific conference room should be reviewed by an employee.

Tracked changes include statuses of one employee or resource that another employee has indicated should be reported via a notice. For instance, an employee's status may change from busy to available when the employee leaves a conference room in which a conference was progressing. As another instance, an employee's status may change when the employee enters a specific enterprise facility or space or when the employee moves to within 30 yards of another employee. As still one other instance, when a conference room becomes unexpectedly available because a meeting therein ends early, the status of the room may change from occupied to unoccupied or even available.

Figure 31:
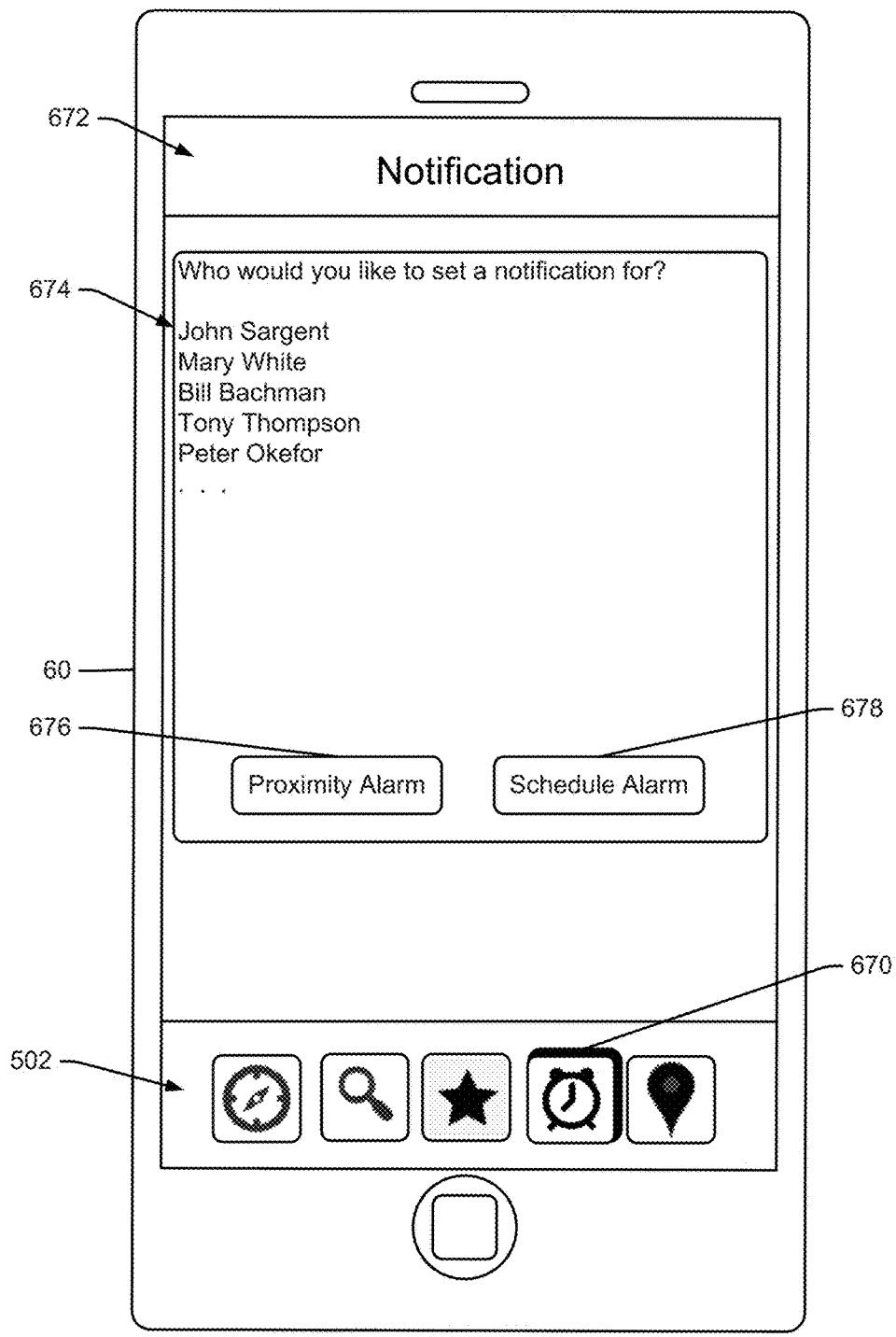
FIG. 31 is similar to FIG. 12, albeit showing a notification interface useable to set a resource status notification.

Referring to FIG. 31, in at least some cases a toolbar 502 may include a notification icon 670 that, when selected, causes device 60 to generate a screen shot 672 for setting different types of notifications. In FIG. 31, a list of employees for whom notifications may be set is presented at 674 and proximity and schedule alarm types are presented as options in icons 676 and 678. Here, a device 60 user selects an employee from list 674 for which an alarm or notification is to be set and then selects one of the two alarm types via icons 676 and 678. If a proximity alarm is to be set, other tools for specifying distance from the device 60 user or spaces are contemplated and if a schedule alarm is to be set, other tools for indicating specifics about the alarm type are contemplated.

Figure 32:
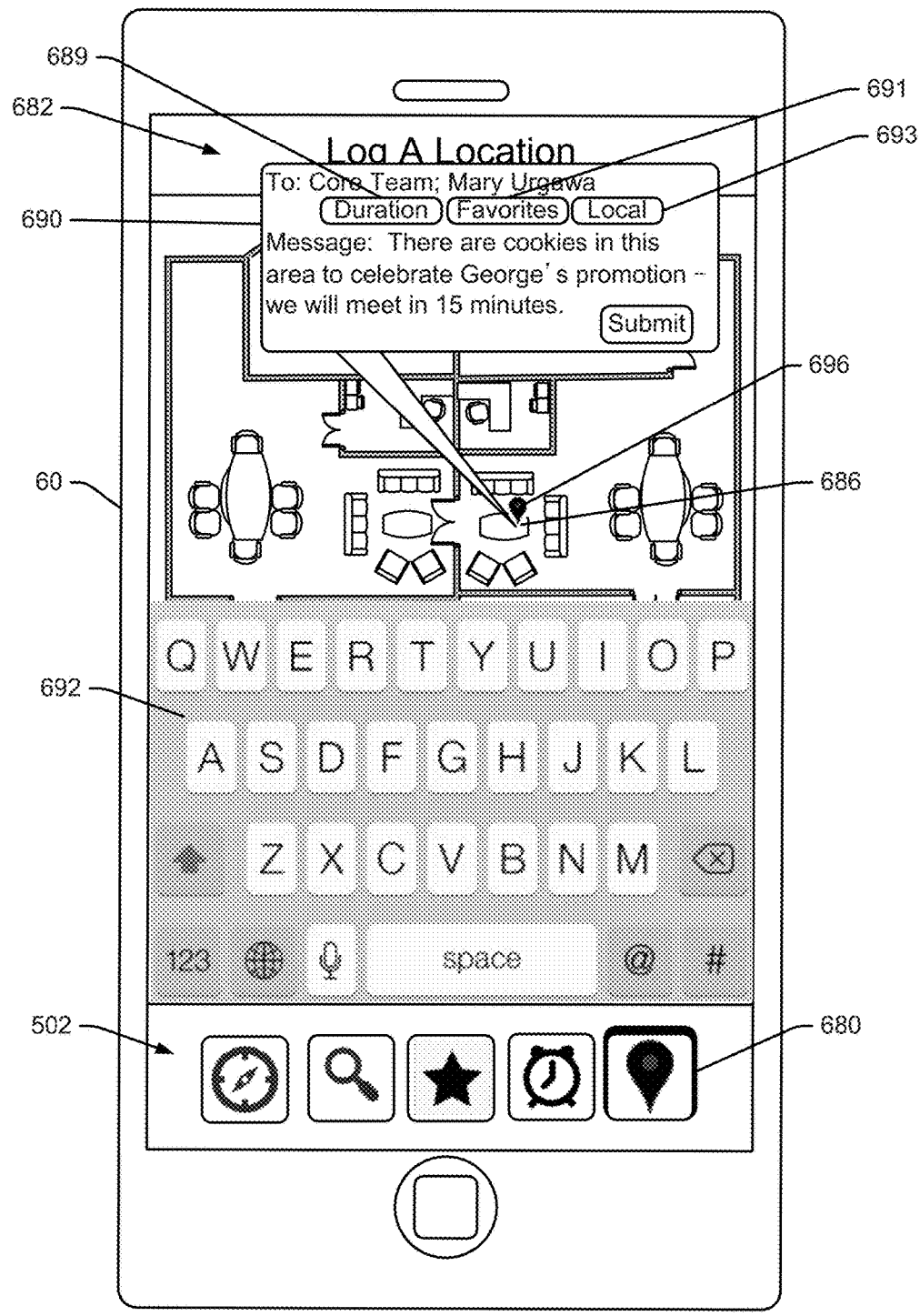
FIG. 32 is a view similar to FIG. 12, albeit showing tools for indicating a specific point of reference and related information on a floor plan view of a facility space.

Another function that may be performed within the system described above is to assign information or notices to specific locations within a facility that is associated therewith for some reason. For instance, where a specific travelling employee will be stationed in a remote office for a day, an administrator may want to mark the office and indicate that the employee will be generally around so that users of devices 60 can easily see the location of the space to be occupied by the employee. As another instance, where someone brings in cookies to celebrate another employee's promotion, the location of the cookies can be marked for others to see and as a guide to the cookies. To this end, see FIG. 32 where a point of interest icon 680 within the toolbar 502 has been selected to access a screen shot 682 for specifying a point of interest on a facility map. After icon 680 is selected, the device user would be instructed to select a point (e.g., 686) on the map after which the message window 690 is opened allowing an employee to select recipients of the point of interest message and to craft a suitable message. A keyboard 692 for navigating the window 690 and for typing in the message is provided as well as a submit icon 694 for submitting the message. Once a point of interest message has been submitted, the system provides a notice to each of the employees targeted with the message and, if one of those employees opens a map view as in FIG. 32, a point of interest icon 686 is presented to indicate the location of the point of interest.

In at least some cases when screen shot 682 is initially accessed, device 60 will present a default point of interest location corresponding to the current location of the device 60. Here, the default may be changed via touching another location on the presented map. In at least some embodiments, a favorite icon 691 may be presented in window 690 for adding all favorite employees to the recipient list for the message. In some cases a local icon 693 may be presented in window 690 for restricting the message to delivery only to recipients within a specific enterprise area such as, for instance, a local facility, a floor of a facility, an area of the floor, etc. Thus for instance, where "local" corresponds to a floor of a facility and both the local and favorites icons 693 and 691, respectively, are selected, the point of interest 698 may only be indicated to favorite employee's of the device 60 user when the employees are located on the specific facility floor.

In some cases points of interest may only be set for finite periods. For instance, where a point of interest indicates cookies at a specific location, the notice related thereto may only be set to persist for 2 hours. In this regard see duration icon 689 that may be selected in FIG. 32 to set a notice duration for an associated point of interest.

While various aspects of at least some embodiments of the present disclosure are described above in relation to different types of interfaces, still other interface types that represent the described aspects are contemplated where the other interfaces types may be more intuitive to most system users. For instance, in at least some embodiments it is contemplated that different applications may be presented for locating and communication with employees on one hand and for locating and reserving other resource types (e.g., conference spaced, personal spaces, etc.). In this regard see again FIG. 3 that includes two other application icons including a compass icon 163 corresponding to an employee or personnel tracking/notification application and a room peak icon 165 corresponding to a space locating and reserving application.

Figure 3:
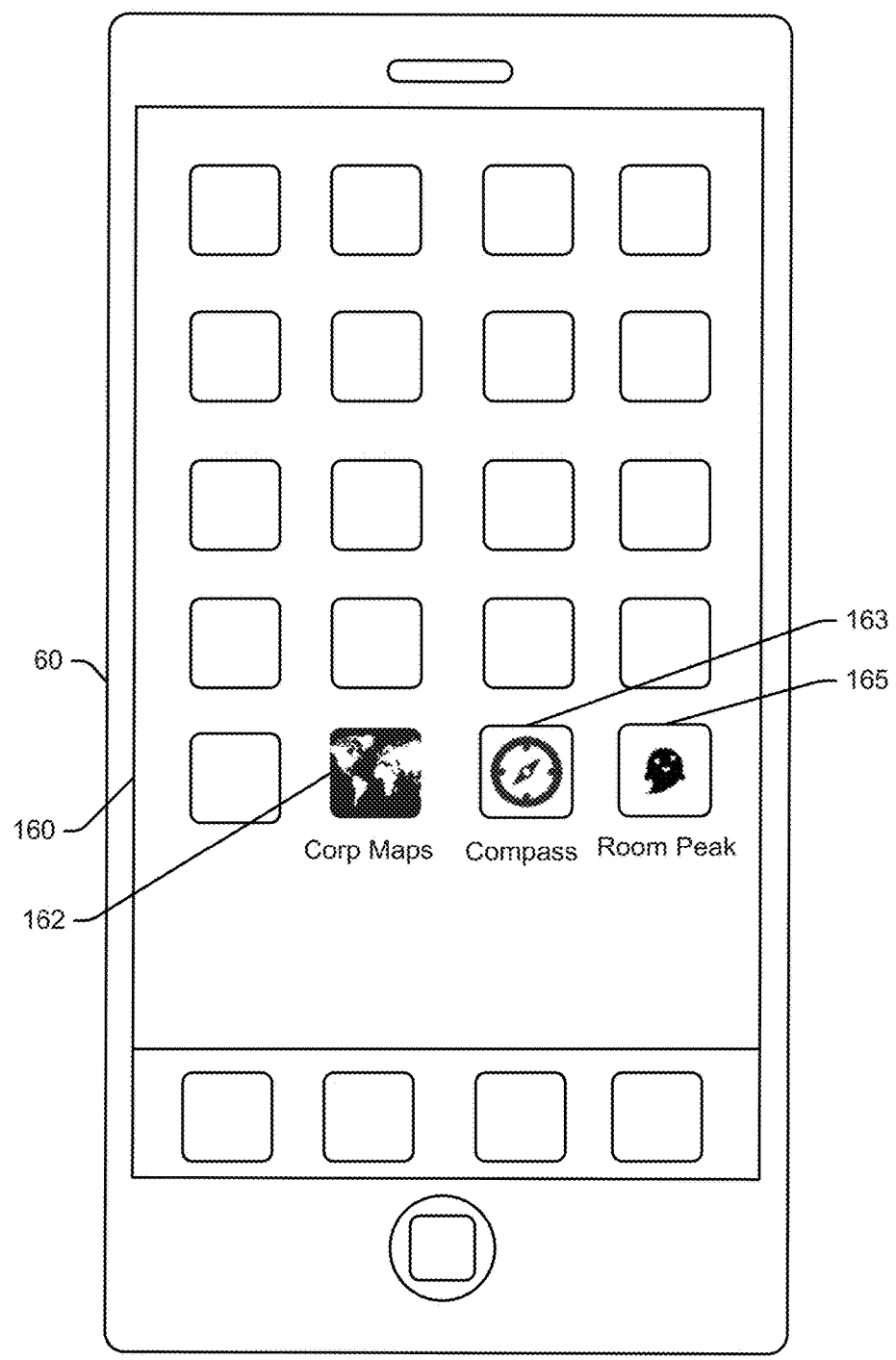
FIG. 3 is a schematic view illustrating a portable electronic computing device that may be used to facilitate various aspects of at least some embodiments of the present disclosure.
Figure 33:
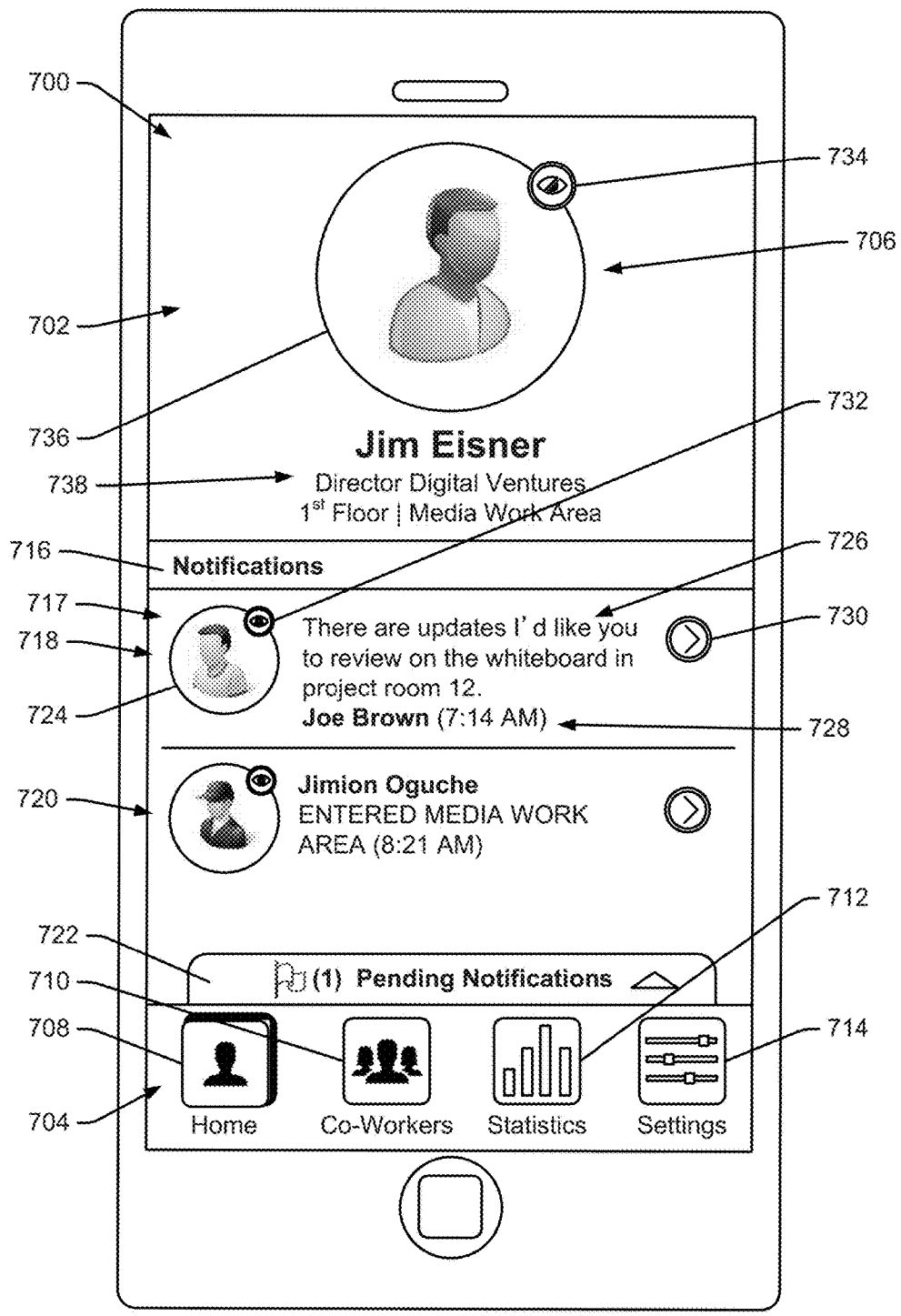
FIG. 33 is similar to FIG. 12, albeit illustrating a notifications interface consistent with at least some aspects of the present disclosure.

Referring to FIG. 33 a compass screen shot 700 for employee tracking is shown that may be presented when the compass icon 163 in FIG. 3 is selected. Screen shot 700 includes a lower tool bar section 704 and an upper information section 702. Tool bar section 704 includes four exemplary icons including a "Home" icon 708, a "Coworkers" icon 710, a "Statistics" icon 712 and a "Settings" icon 714, each of which is selectable to access a different compass functionality. The default functionality is associated with the home icon 708 which is initially highlighted or otherwise visually distinguished to indicate its initial default selection. The home view shown in the information section 702 includes information at the top related to the device 60 user as well as a notifications section 716 there below. The device user information includes an image of the device user at 736 and the user's name and title and current location at 738.

The notifications section 716 includes a list 717 of notifications received by the device 60 user as well as a tab 722 for accessing all notifications that the device 60 user currently has pending or specified. The exemplary notification list 717 includes notifications 718 and 720. Each of the notifications includes similar information and therefore, in the interest of simplifying this explanation, only notification 718 will be described here in detail.

Notification 718 includes an image 724 of an employee associated with the notification (e.g., the employee whose status the notification is associated with), a message 726, the name of the employee associated with the notification and the time 728 that the notification was generated. Notice 718 indicates that "There are updates I'd like you to review on the whiteboard in project room 12" and that the notice was generated by Joe Brown at 7:14 AM. An expander icon 730 may be selected to expand the notice to obtain additional information. For instance, the additional information may include a map to project room 12, a schedule for project room 12, a way to access a communication application for communicating with the employee associated with the notice, etc. Notice 718 is an example of an employee initiated notice (e.g., a notice generated by one employee for a second employee) while notice 720 is a tracked notice that was set by the device 60 user to indicate when the status of a second employee has changed. Thus, notice 720 indicates that a second employee has entered a media work area at 8:21 AM.

Referring still to FIG. 33, in addition to the information described above, "visibility" indicators 734, 732, etc., are provided for each of the employees shown in the view 700. While resource and specifically employee tracking and related notifications are useful tools, it has been recognized that at least some enterprise employees will not want their status to be tracked all the time, may only want certain statuses to be trackable or visible to others, or may only want a subset of other employees (e.g., favorites) to be able to view their status. Indicators 732, 734, etc., indicate currently set visibility of specific employees to other employees. For instance, indicator 732 that shows an open eye indicates that Joe Brown (e.g., the associated employee) has no visibility restrictions so that any enterprise employee has the ability to track any status of Joe Brown. As another instance, indicator 734 associated with Jim Eisner shows a half closed eye indicating that there are at least some restrictions to visibility of Jim Eisner's status to at least some enterprise employees. For instance, Jim Eisner's status may only be reported on a facility location basis and may not allow other employees to determine his specific location. As another instance, Jim Eisner's status may only be viewable by employees on Jim Eisner's favorites list and not by other employees. This sort of visibility control function is useful in the context of the notification features described herein and also in the context of other aspects of this disclosure such as, for instance, identifying employee locations in a view like the view shown in FIG. 25.

To view current visibility restrictions for any employee, a visibility icon (e.g., 732, 734) for the employee may be selected in at least some embodiments. The visibility indicators 734, 732, etc., presented may depend on which device 60 user is using a device 60. For instance, a first employee may restrict visibility to a second employee but not to a third. In this case, if the second employee is using her device 60, that employee would see a restricted visibility indicator (e.g., half closed eye) while the third employee using his device 60 would see an unrestricted visibility indicator (e.g., a fully open eye) for the first employee.

The pending notifications tab 722 can be selected to access specified notifications that are currently set for the device 60 user to indicate the status of other employees to that user. To this end, when tab 722 is selected, a sub-window 740 shown in FIG. 34 may be opened that includes a list of pending notifications. In the illustrated example only a single pending notification is shown at 742 that includes, consistent with the style of the notifications in section 716, an image 744 of the employee associated with the pending notification and the name 746 of the employee. A notification statement or specification 748 is presented in plain English (or in some other suitable language) for the device 60 user to examine. The exemplary notification statement 748 states "Notify me when Jimion is nearby."

Figure 34:
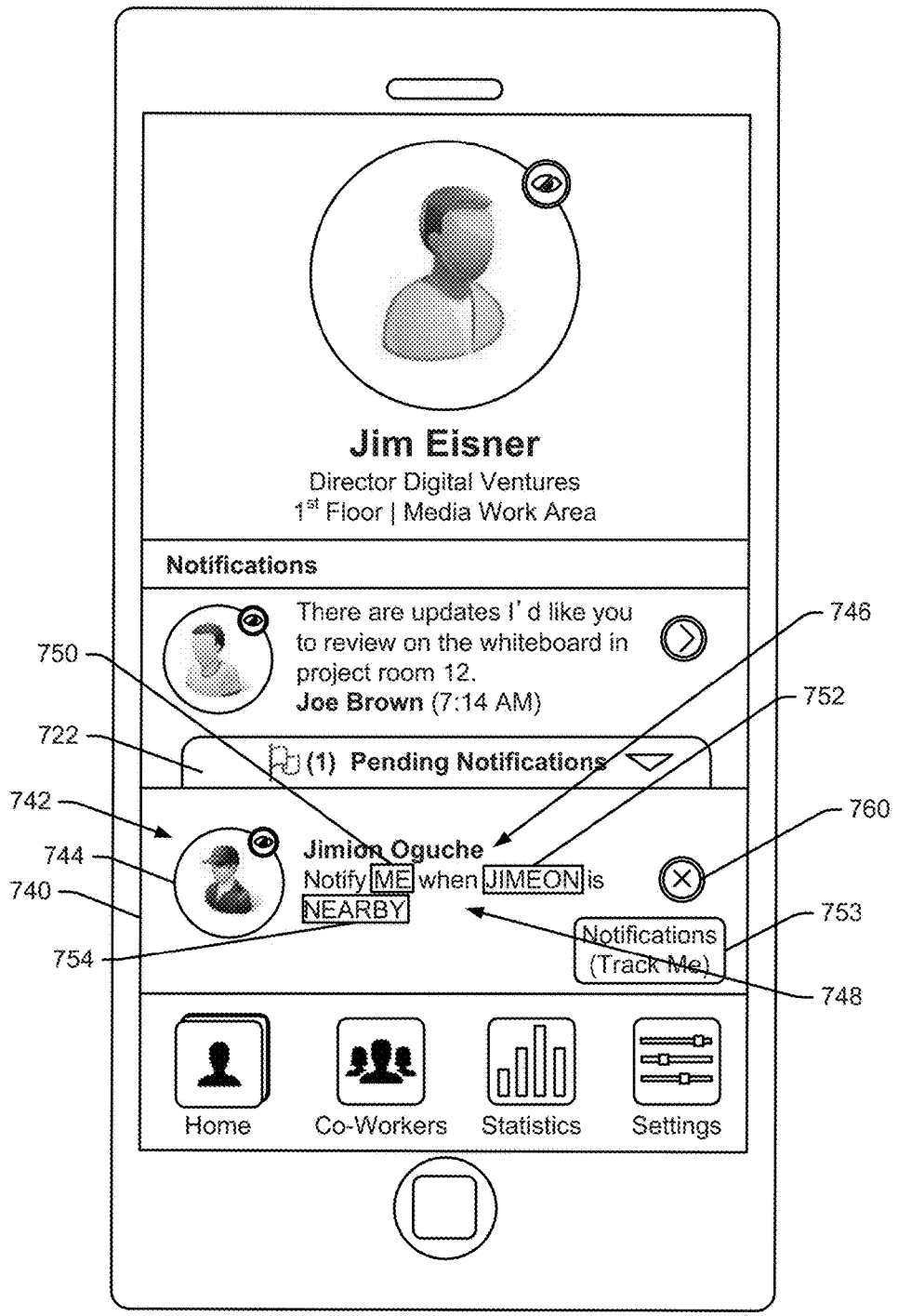
FIG. 34 is similar to FIG. 33, albeit illustrating a sub-window opened up to show pending notifications for a device user.

Referring still to FIG. 34, it has been recognized that there are a small set of notice factors or parameters that need to be specified in order to fully define a typical notification. In the statement 748 there are three parameters specifying fields 750, 752 and 754, for specifying different aspects of the notification. The fields 750, 752 and 754 are referred to herein as the "recipient" field 750, the "tracked" field 752 and the "status" field 754. The recipient field 750 specifies who should receive the notification once generated. Here, options typically include the device 60 user (e.g., "me") or some other enterprise employee. Other recipients are contemplated such as, for instance, "maintenance crew", "facility administrator", "caterer", "IT specialist", etc. The "tracked" field 752 specifies the resource for which status is being tracked. For instance, an employee's name, may be included in field 752. The status field 754 specifies the status of the resource in field 752 that should be reported or noticed. For instance, noticed statuses may include available, busy, nearby, within a specific facility, within a specific space, nearby and available, etc.

Referring still to FIG. 34, in at least some embodiments it is contemplated that a device 60 user may be able to select any one of the fields 750, 752 and 754 to access options for setting those parameters. For instance, a touch to field 750 may open a drop down menu enabling the device 60 user to select from a list of employees or other recipients for the notice, a touch of field 754 may open a different drop down menu enabling the device 60 user to select from a list of possible statuses (e.g., nearby, within 50 meters, within a specific facility, within a specific facility space, busy, available, travelling, with a specific second employee, etc.) to be noticed, etc.

Window 740 also includes a "Notifications (Track Me)" icon 753 that may be used to access a list of notifications that track the user of device 60 and that report to some other employee. This feature is useful for a device 60 user to determine if visibility or privacy settings should be modified. The track me list would likely be similar to the list 742 shown in FIG. 34.

In at least some embodiments it is contemplated that a device 60 user or other enterprise employee may be able to set notifications that notify other employees of resource statuses. For instance, a first employee may set a notification to report when a second employee is within 50 meters of a third employee and may have the notice delivered to the third employee when the triggering status or parameter occurs. Similarly, a first employee may set a notification to report when a second employee is within 50 meters (e.g., a triggering status) of a third employee and may have the notice delivered to the first employee (e.g., the employee that set the notice).

It should be appreciated that any status of any enterprise resource may operate as a triggering status for a notification, that the recipient of a notification may be any enterprise employee and that any employee may be able to set any of the notifications in at least some embodiments. Thus, while not illustrated in FIG. 34 and related figures, a notification may be set based on sensed or scheduled status of a conference room. For instance, an employee may set a notification to receive a notice when a specific conference room is next unoccupied and unscheduled for at least 30 minutes. Here, the trigger status is unscheduled for 30 minutes and unoccupied. Many other triggering statuses are contemplated.

Figure 35:
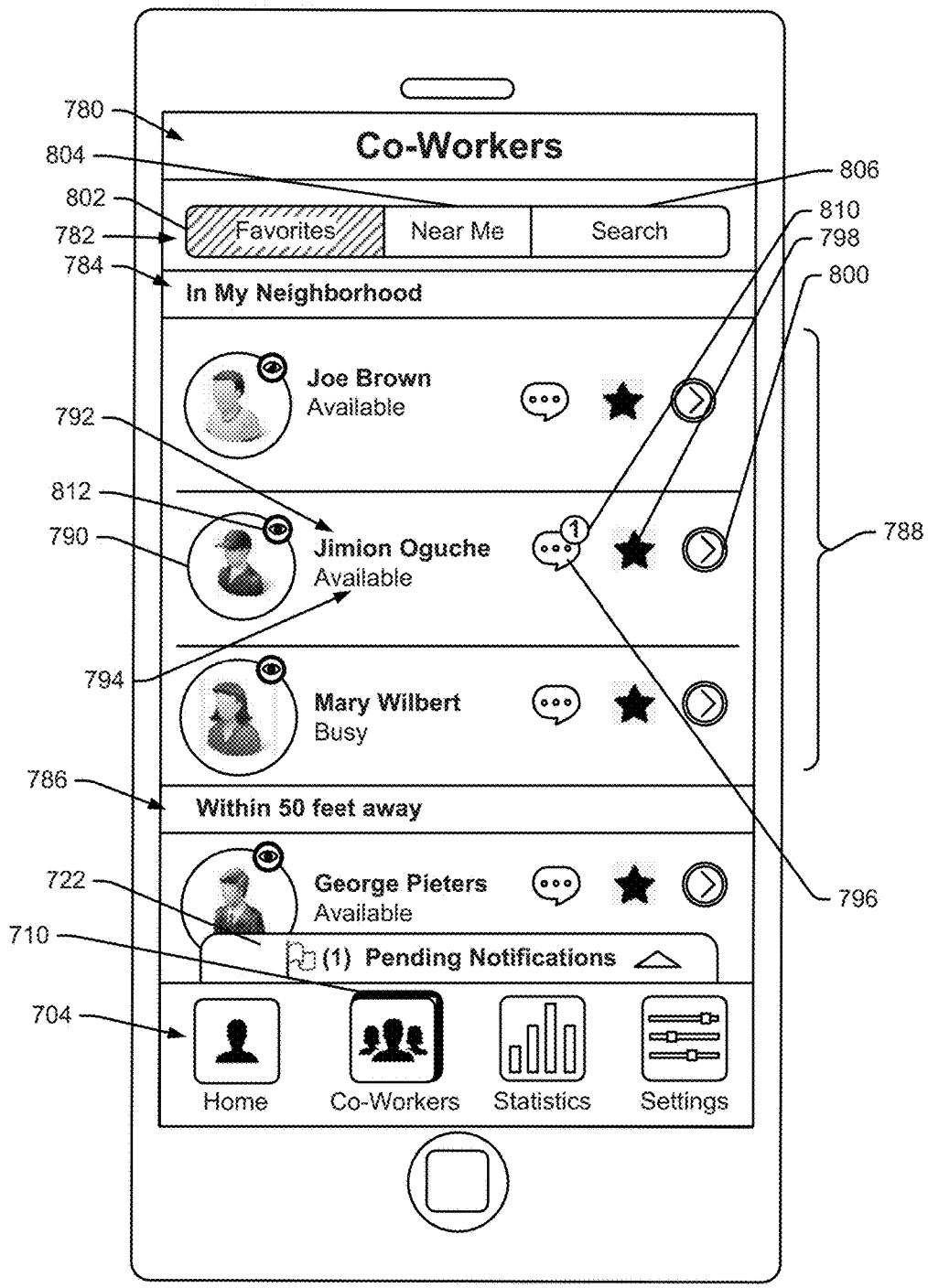
FIG. 35 is similar to FIG. 33, albeit showing a favorite co-worker's view presented to a device user.

Referring to FIG. 35, a screen shot 780 that may be presented in at least some embodiments of the present disclosure when the co-worker icon 710 is selected is illustrated. Screen shot 780 includes the same tool section 704 as describe above, albeit where co-worker icon 710 is highlighted as opposed to the home icon. The information section includes a sub-menu 782 and a current location reporting section including, in the exemplary shot, an "In my neighborhood" section 784 and a "Within 50 feet" section 786. The sub-menu section 782 includes a "Favorites" icon 802, a "Near me" icon 804 and a "Search" icon 806. Selection of favorites icon 802 causes a list of the device 60 user's favorite employees to be presented, selection of the near me icon 804 causes a list of employees near the device 60 user to be presented and selection of search icon 806 causes a search tool to be opened up as described in greater detail hereafter. In FIG. 35 the favorites icon 802 is shown highlighted to indicate selection thereof. In at least some cases the favorites icon 802 will be the default selection when co-workers icon 710 is selected.

Although icon 710 is a co-workers icon for searching for enterprise employees, in other embodiments the icon 710 may be a more general resources icon selectable to identify different resources proximate and available for use by a device 60 user. For instance, employees as well as conference and personal spaces may be locatable via icon 710 in some cases.

Referring still to FIG. 35, favorite employees are divided into groups as a function of their distance from device 60 where the groups include employees proximate the device 60 user and employees 50 feet or more away from device 60. For instance, three favorite employees are indicated at 788 within the device 60 user's neighborhood 784 (e.g., within 50 feet) and a single favorite employee is shown within the greater than 50 feet range. Other distance divisions are contemplated. Each employee listed includes an image 790 of the employee, the employee's name 792 and a status indicator 794 for the employee.

In addition, a notifications indication 796 and a favorites indication 798 as well as an expander icon 800 are provided for each listed employee. The notifications indication includes a count indicator 810 that indicates a number of notifications set by the device 60 user for an associated employee in the list. For instance, a "1" qualifier 810 spatially linked to the notification indicator 796 for a specific employee indicates that there is one notification specification set for the associated employee. Other notification indicators like 796 that do not include a number qualifier indicate that there are no currently set notifications for the associated employee.

A star 798 is provided for each of the employees in the favorites list because each of those employees is a favorite of the device 60 user. Again, each expander icon 800 can be selected to expand information related to the associated employee. A visibility indicator 812 is provided next to each image of an employee in the list to clearly indicate to the device 60 user whether or not notifications can currently be set for associated employees.

In at least some embodiments it is contemplated that where a notification tracking a specific employee is set but that employee is currently not visible or trackable (e.g., the employee has disabled the ability to track that employee or has at least disabled the type of tracking that the notification requires), inability to track the employee as required in the notification may be clearly indicated to a device 60 user so that the user knows not to rely on the notification features of the system. For instance, referring still to FIG. 35, where the employee associated with image 790 disables tracking of his location and status generally, the entire section of the screen shot associated with the employee may be shaded red to indicate that the currently set notification is not supported. This would give the device 60 user the option to attempt to contact the non-trackable employee in some other fashion. Other ways to notify a device 60 user that another employee has disabled tracking for that employee are also contemplated. For instance, referring again to FIG. 34 where notification 742 indicates that the device 60 user wants a notice when Jimion Oguchi is near him, if Jimion Oguchi disables tracking, the system may automatically identify any notifications associated with Mr. Oguchi and present an indication that the visibility or trackability of the employee has been altered.

In still other cases server 12 may be programmed to generate an e-mail, a text, a recorded voice message or some other type of communication to indicate to an employee whenever visibility required to support a set notification is disabled. Similarly, whenever one employee sets a new notification for another employee, server 12 may generate and transmit an e-mail or other communication to other the employee indicating that the notification has been set. In at least some cases the e-mail or other communication may enable the other employee to quickly and intuitively reject the new notification by, for instance, selecting a "reject" icon or the like in the e-mail. In other cases, prior to enabling a specified notification, a first employee receiving an e-mail or the like indicating that another employee has specified a notice to track the first employee may have to affirmatively agree to the tracking process via selection of an "accept" icon or the like in the electronic message.

Figure 36:
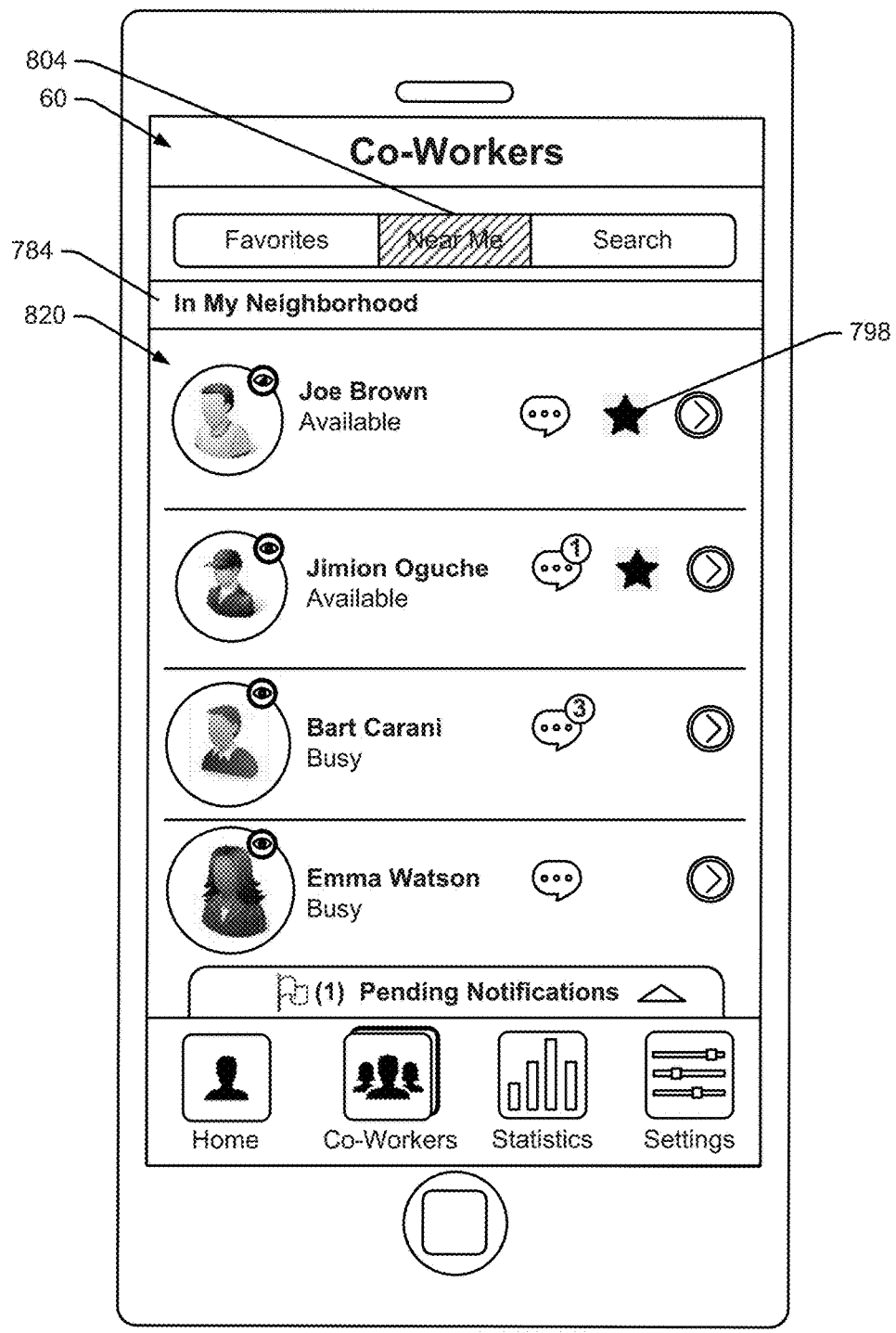
FIG. 36 is similar to FIG. 35, albeit showing a "near me" view of enterprise employees near a device user.
Figure 37:
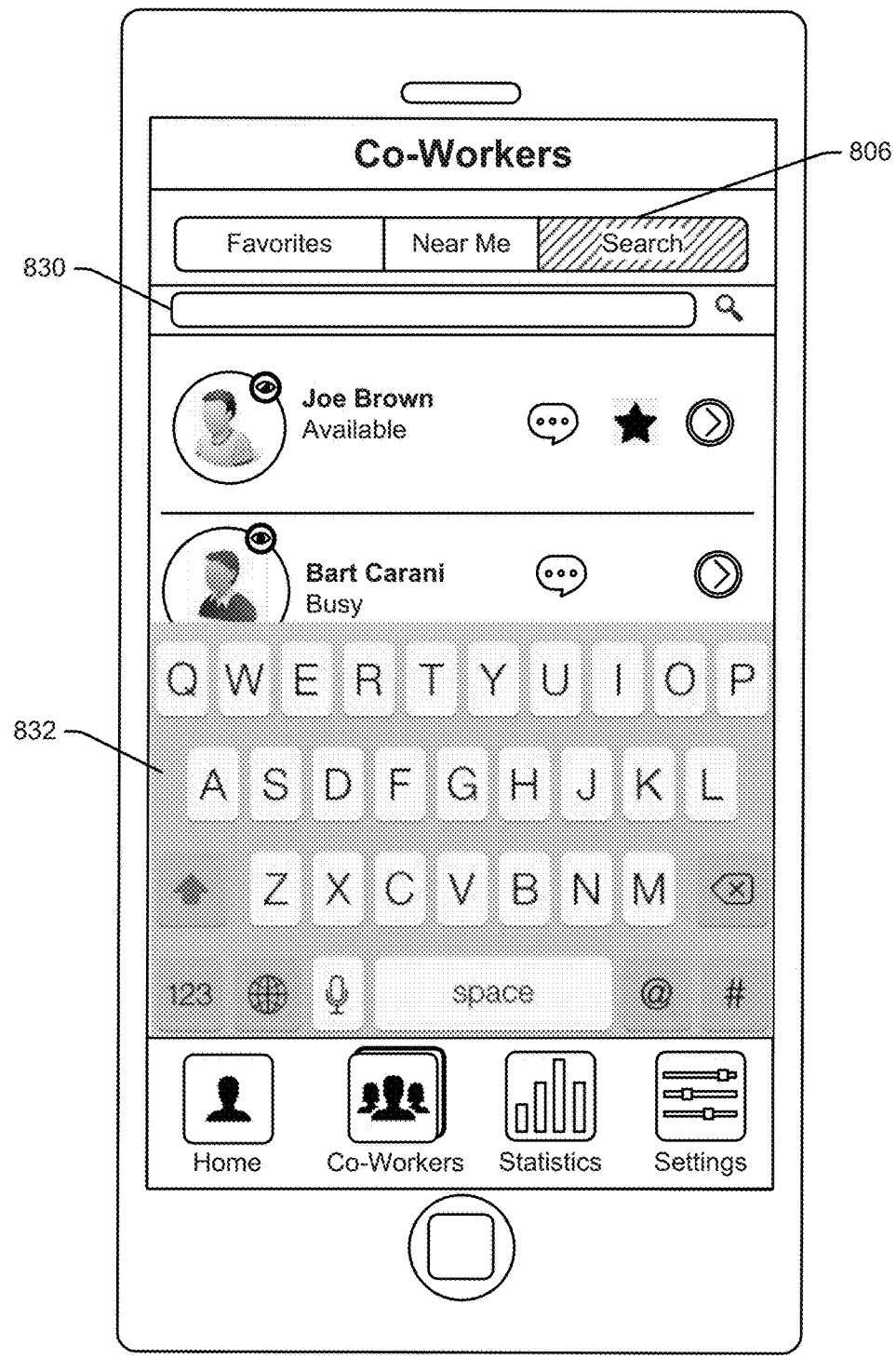
FIG. 37 is similar to FIG. 36, albeit showing a search view of co-workers for searching for co-worker proximate a device user.

Referring now to FIG. 36, when the near me icon 804 is selected, a list of employees ordered as a function of distance from device 60 is presented at 820. In this case, all employees and not just favorites are listed so that favorites indicating stars (e.g., 798) are presented only for employees on the favorites list for the device 60 user. When search icon 806 is selected, a search field 830 is opened and a virtual keyboard 832 is presented for entering search text for employees as shown in FIG. 37. Once a search is entered, a list of employees fitting the search criteria is presented below the search field 830.

Figure 38:
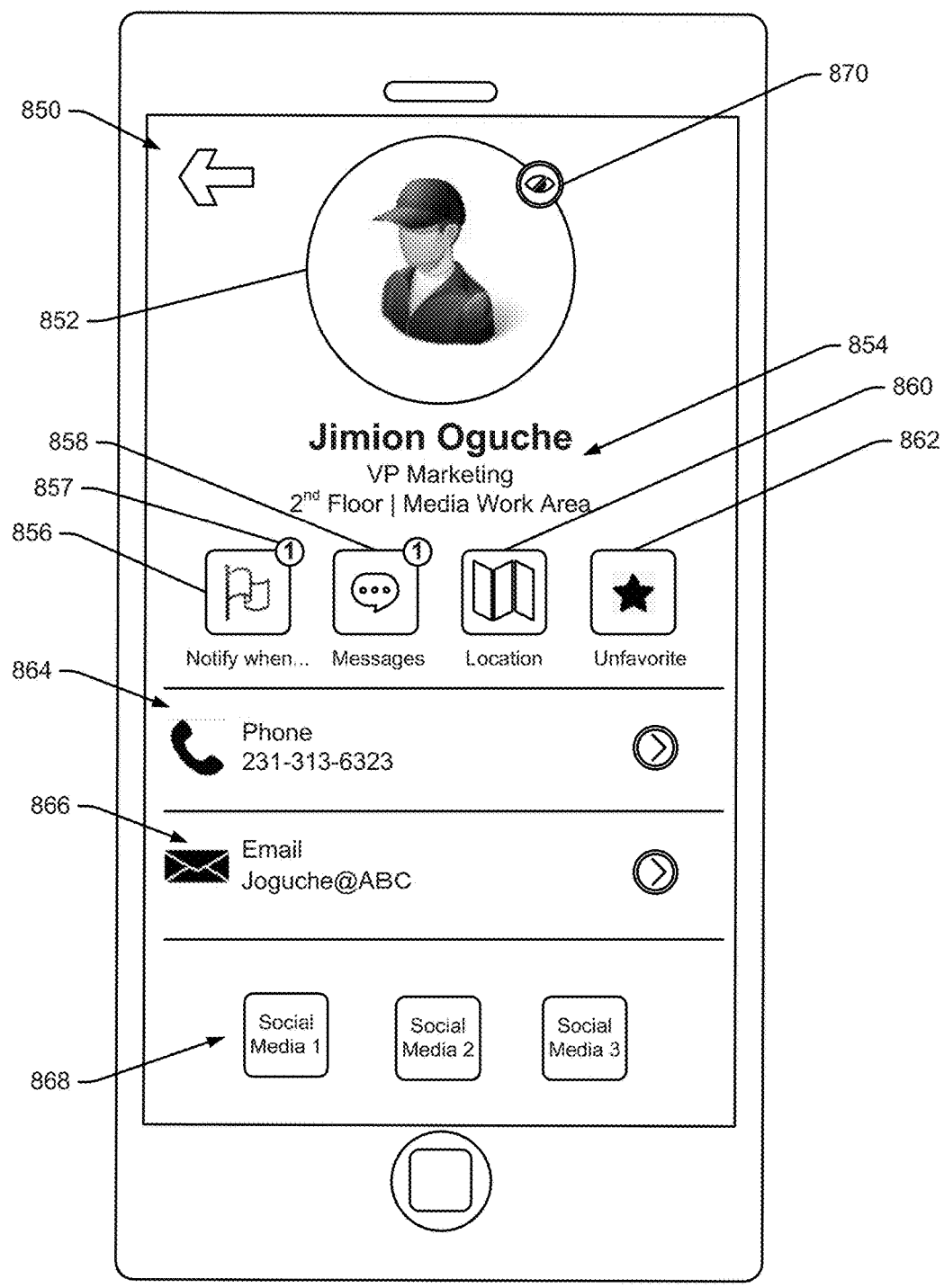
FIG. 38 is similar to FIG. 37, albeit showing notifications, messages and other communication tools corresponding to a specific employee of an enterprise.

Selection of an employee from any one of the lists in FIGS. 35 through 37 via one of the expander icons 800 or the like may open a screen shot akin to the screen shot 850 shown in FIG. 38 that includes expanded information related to the associated employee. The expanded information includes an image 852 and name and current location 854 for the associated employee along with a notifications icon 856, a messages icon 858, a location icon 860, a favorite (or un-favorite) icon 862 and contact information including a phone number 864, an e-mail address 866 and a set of social media applications 868 for contacting the employee via one or more applications. Any of 864, 866 or 868 may be selected to establish immediate contact with the employee. The notifications icon 856 includes a count indicator 857 that indicates that one notification is set where the "1" indicator can be selected to see the notification specification. Icon 856 can be selected to alter (e.g., add, delete or modify existing) notifications. The messages icon 858 can be selected to review existing messages or notifications from the associated employee the device 60 user. Location icon 860 is selectable to locate the associated employee on a virtual map like the ones described above. Icon 862 is selectable to toggle between favorite and un-favorite status for the associated employee. Again, a visibility indicator 870 is presented for the employee to indicate current ability to track the employee.

Figure 39:
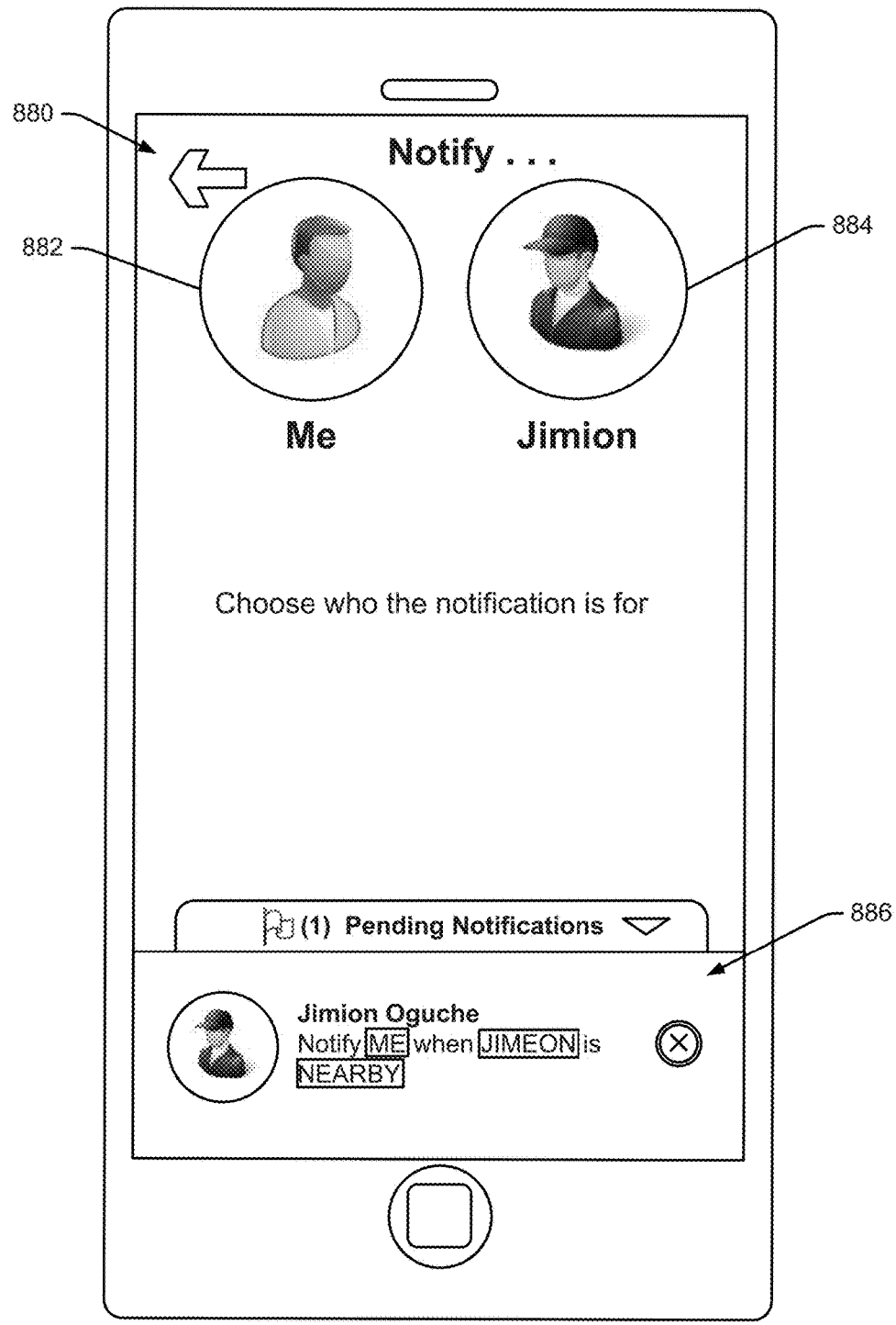
FIG. 39 is similar to FIG. 38, albeit showing an intermediate notification specifying interface.

In at least some embodiments setting a notification will be extremely simple and intuitive. To this end, see the set of figures beginning with FIG. 39 that show exemplary screen shots that may guide a device 60 user through the process of setting different types of notifications. In the case of any notification there is an employee (or other resource) being tracked and another employee being notified. To this end, when a device user selects icon 856 in FIG. 38 to specify a new notification associated with the employee in image 852, device 60 may present screen shot 880 presenting each of the device 60 user 882 and the other employee 884 as options (e.g., via images) to receive the notification. In addition, to help guide the device 60 user, device 60 may also present current notifications in a pending notifications window 886 related to the other employee 884 so that the device 60 user does not inadvertently specify a pending or substantially similar notification a second time.

Figure 40:
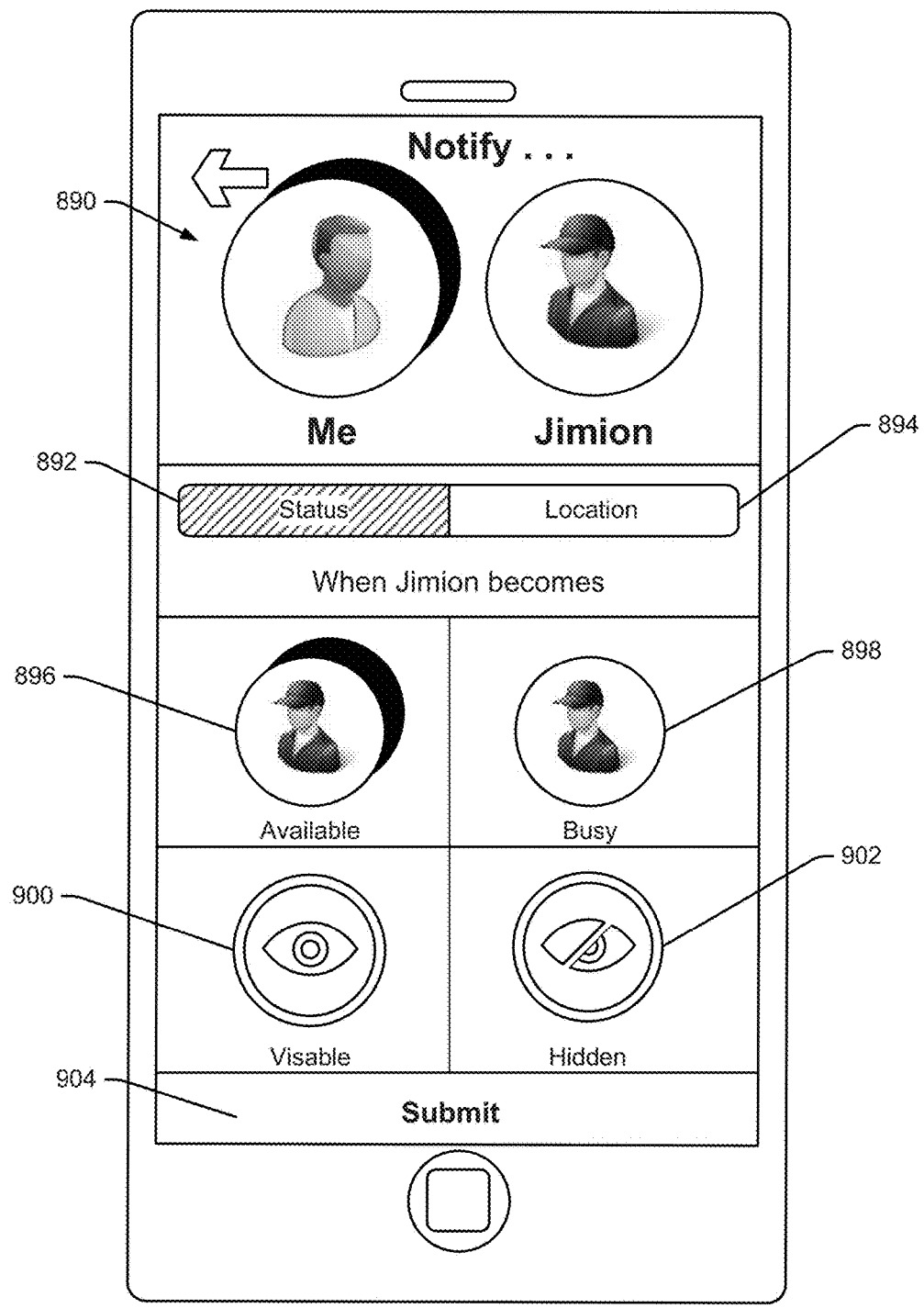
FIG. 40 is similar to FIG. 39, albeit showing an intermediate notification specification interface at a later point in the specification process.

Assuming the device 60 user want to specify another notification for himself tracking status of the other employee, the device user selects icon 882 and device 60 presents the screen shot 890 in FIG. 40. In at least some embodiments notifications will be one of two types, either status based or location based. Location based notifications are related to the location, either actual or relative location, of an employee. For instance, is the employee within 50 feet of me or is the employee within a specific conference room, etc.

Status based notifications include all other non-location based notifications. For instance, is an employee currently available, is the employee currently busy, is the employee's visibility status currently set to visible or hidden, etc. In at least some cases notification type will automatically default to the status type or the location type to reduce the selections required by a device 60 user by at least one. In FIG. 40, notification type icons for status 892 and location 894 are shown with the status icon shaded or otherwise visually distinguished to indicate that the status icon has been defaulted to. Basic status options for selection are presented at 896, 898, 900 and 902 that correspond to available, busy, visible and hidden, respectively. Once a status icon is selected, a submit icon 904 can be selected to submit the specified notification.

Figure 41:
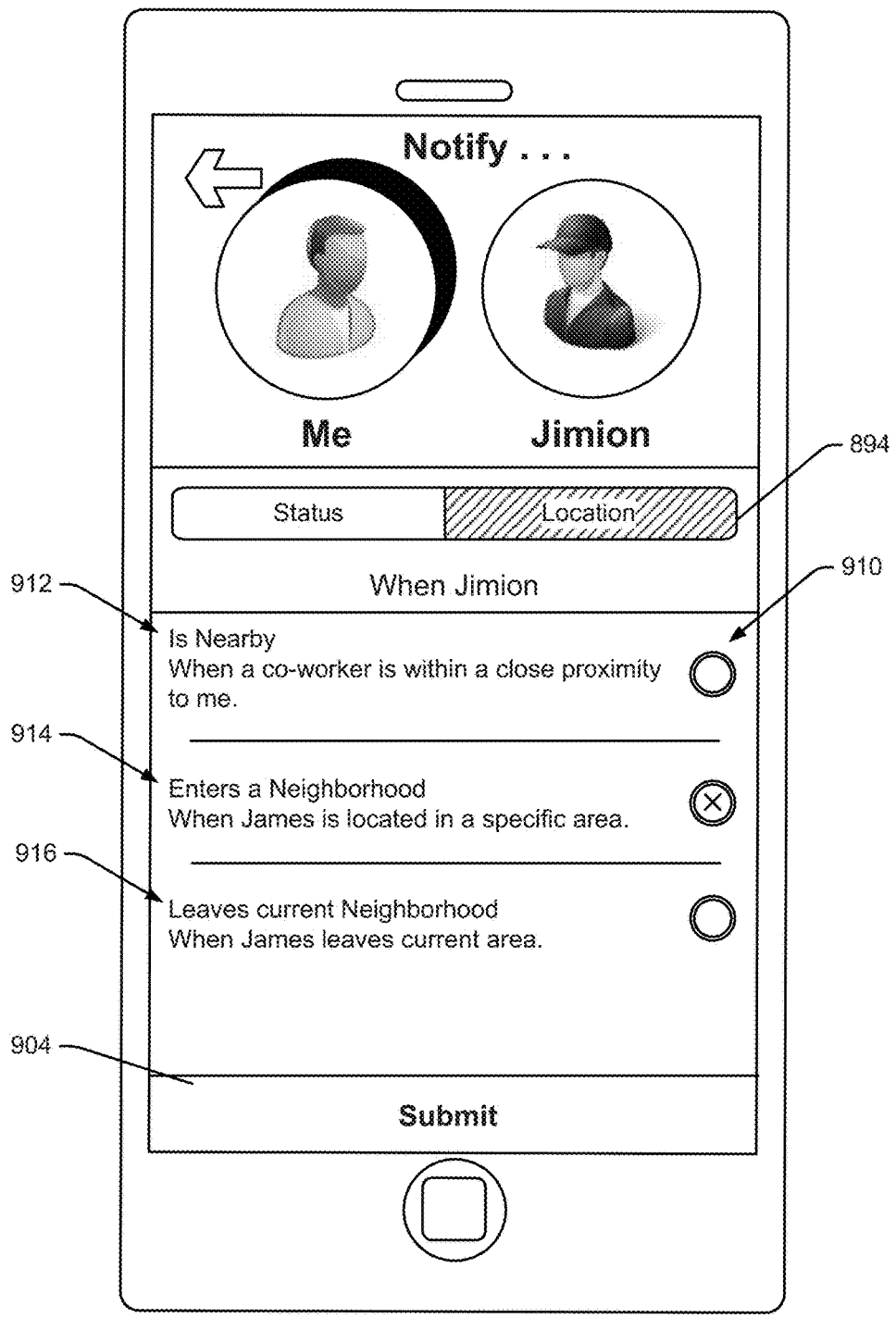
FIG. 41 is similar to FIG. 41, albeit showing a different notification specifying interface.

Referring to FIG. 41, when location icon 894 is selected, device 60, in at least some embodiments, presents a basic set of location options in a list 910 that includes "Is nearby" 912, "Enters a neighborhood" 914 and "Leaves current neighborhood" 916 options. Here, for instance, if the device 60 user wants to know when the other employee is near (e.g., within 50 feet of) the device 60 user, the device user would select option 912. If the device user wants to know when the other employee is in a specific neighborhood (e.g., a specific facility, a specific area of a facility, etc.), the device 60 user may select option 914, and if the user wants to know when the other employee leaves a specific (e.g., current or future) neighborhood, the device 60 user can select option 916. Icon 904 can be selected to submit a specified notification.

Figure 42:
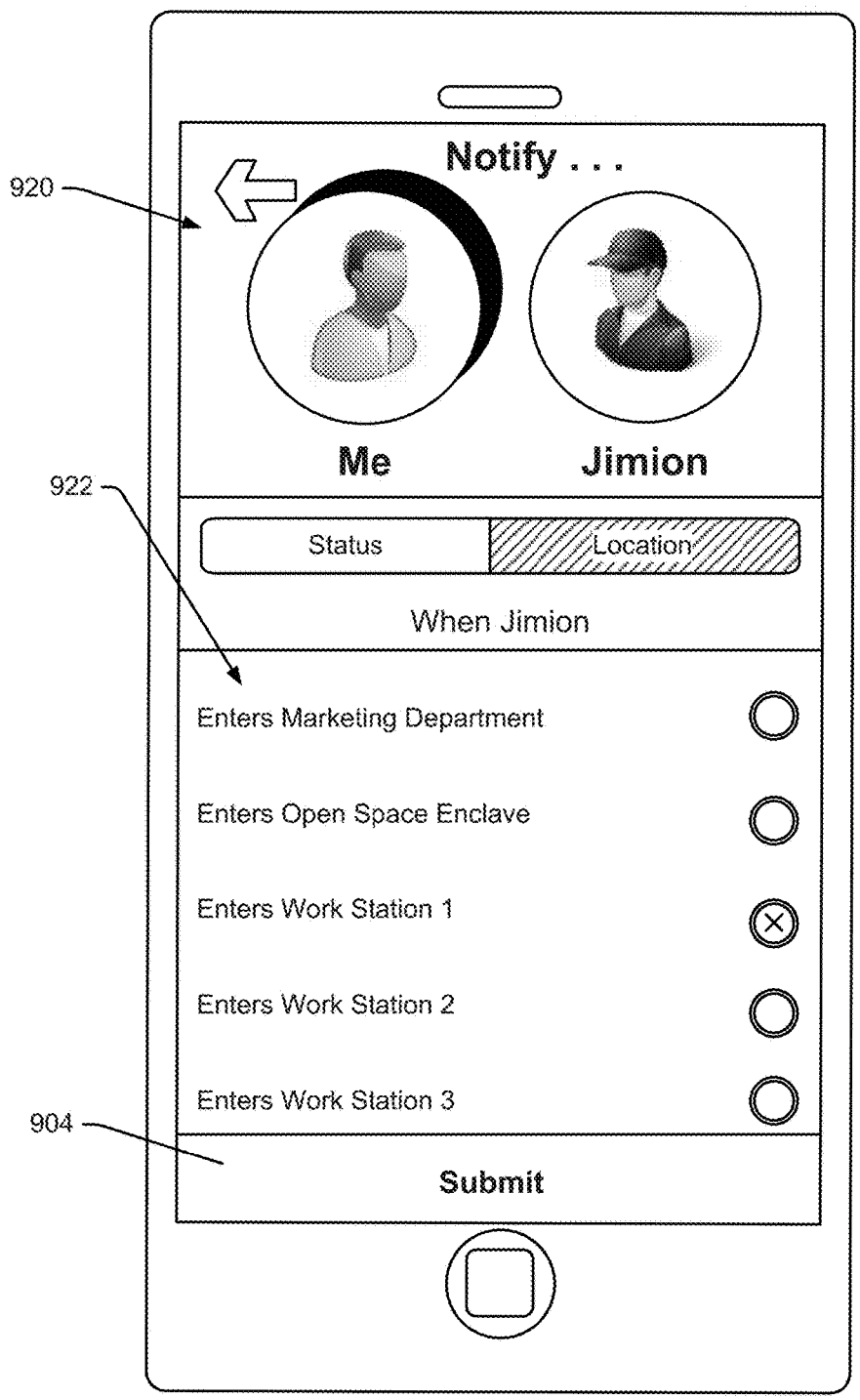
FIG. 42 is similar to FIG. 41, albeit showing a different time in the process of specifying a notification.

In FIG. 41, if the neighborhood option 914 is selected, device 60 may present a screen shot 920 as in FIG. 42 including a list 922 of possible neighborhoods (e.g., spaces) that can be selected as parameters for the notification specification. One or more of the spaces on the list may be selected and the notification specification can be submitted by selecting submit icon 924.

Figure 43:
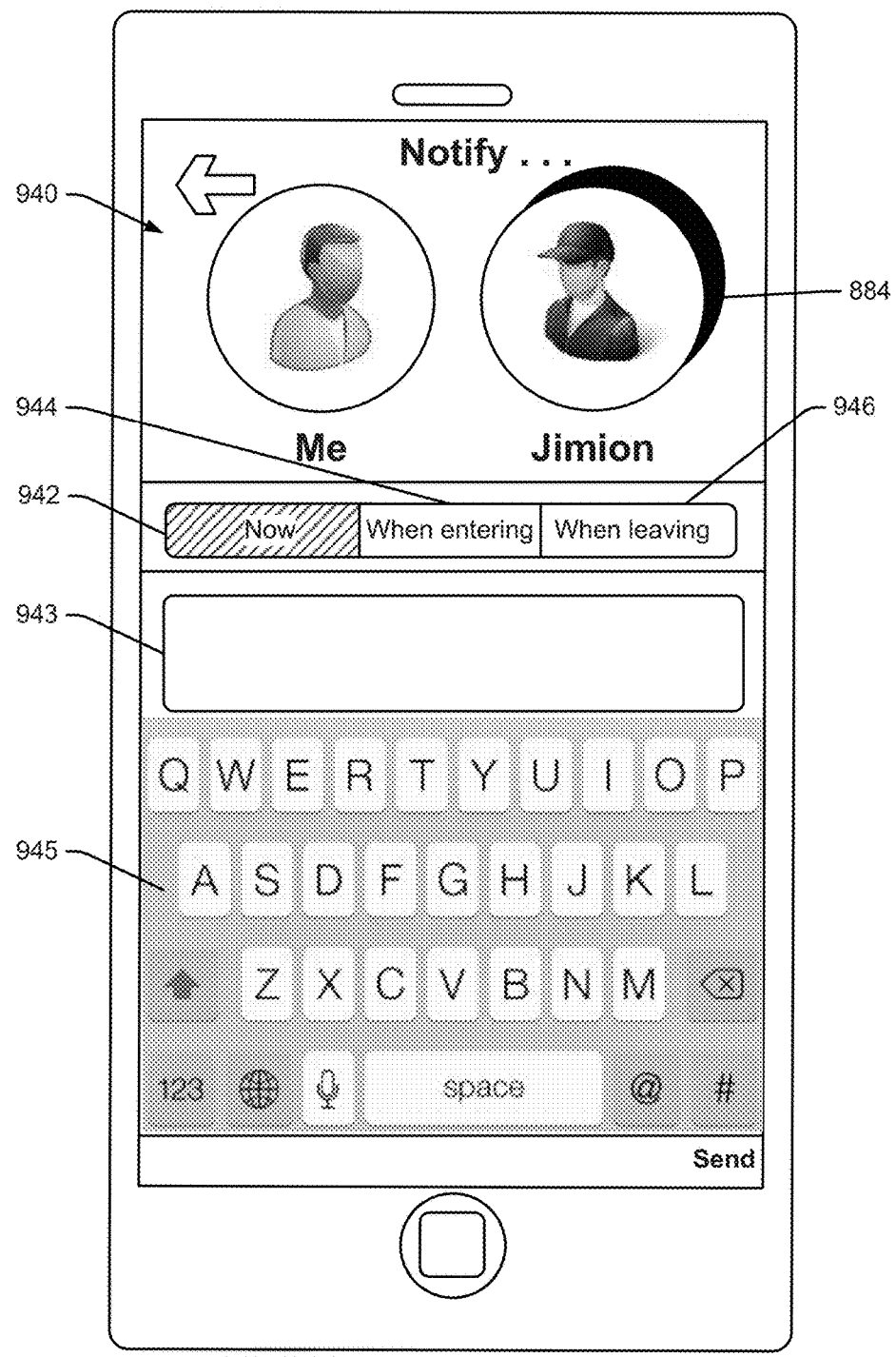
FIG. 43 is similar to FIG. 42, albeit showing an interface for generating a notification for another employee.

Referring again to FIG. 39, if the device 60 user selects the other employee icon 884, device 60 may present a screen shot 940 shown in FIG. 43 where icon 884 is highlighted or otherwise visually distinguished and options of notification types are presented as selectable "Now" icon 942, "Status" icon 944 and "Location" icon 946. In this embodiments, the status and location icons 944 and 946, respectively, may operate in a fashion similar to that described above. The now icon 942 and associated data entry tools are presented as an initial default enabling the device 60 user to generate a message for immediate delivery to the other employee indicated at 844. To this end the default tools include a field for entering a text message as well as a virtual keyboard 945 for text entry.

Figure 44:
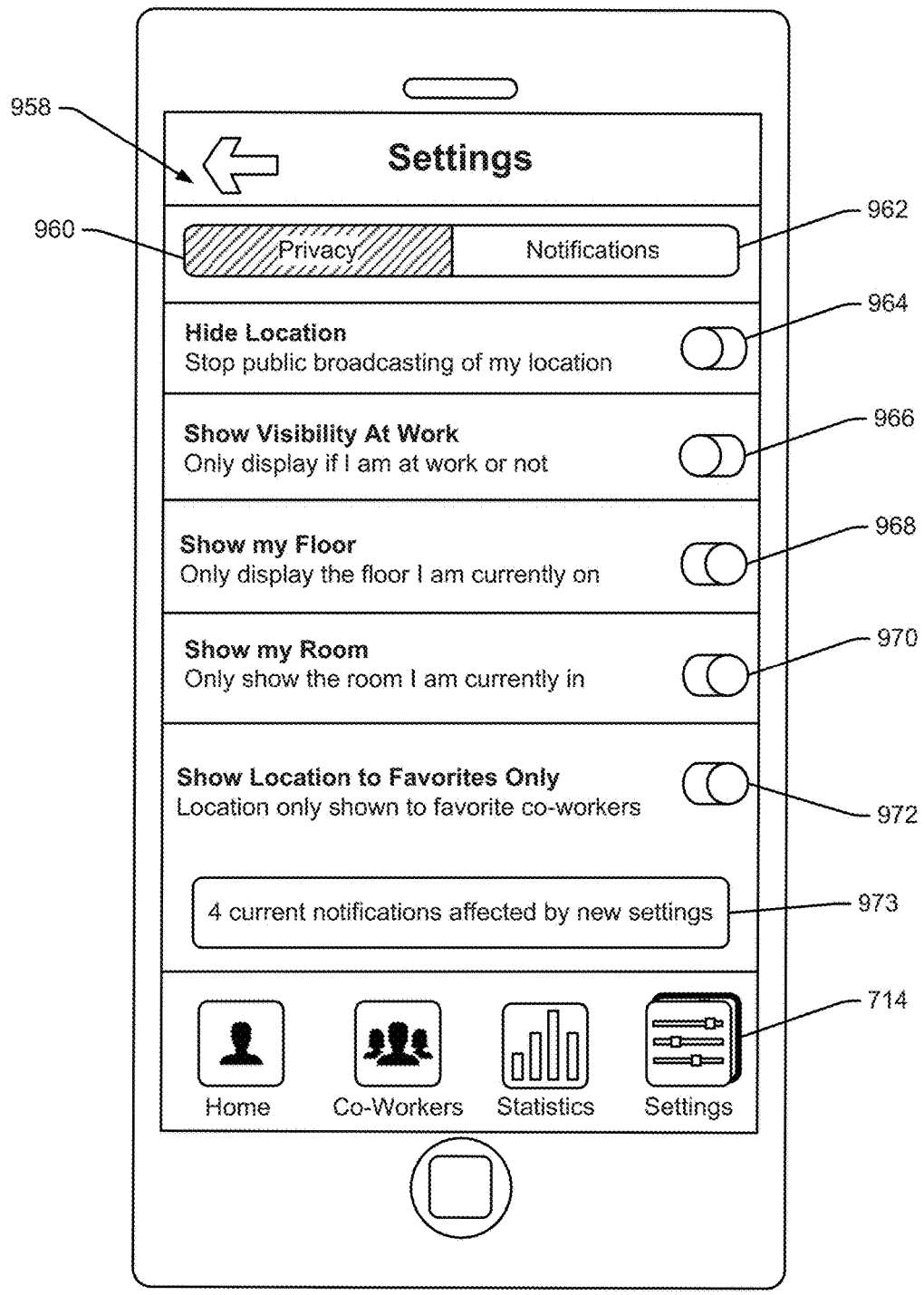
FIG. 44 is screen shot similar to the view shown in FIG. 33, albeit where a settings interface for specifying privacy and notification preferences is shown.

Referring to FIG. 44, when settings icon 714 is selected, a settings screen shot 958 is presented that enables a device 60 user to set privacy (e.g., visibility) and notifications settings. A default option may be that privacy icon 960 is highlighted and initially selected so that privacy setting tools are initially presented. The privacy setting tools include a "Hide location" setting toggle button 964, a "Show visibility at work" button 966, a "Show my floor" toggle button 968, a "Show my room" toggle button 970 and a "Show location to favorites only" toggle button 972. Button 964 either enables location tracking/visibility by other employees or turns the feature off. Button 966 enables or disables visibility of an employee while away from enterprise facilities (e.g., as reported by a GPS tracking application or the like to server 12). Buttons 968 and 970 enable or disable floor and room visibility, respectively. Button 972 allows a user to indicate whether or not all employees or only favorite employees have the ability to view or track the device 60 user's location. Other location or other status based privacy settings are contemplated (e.g., hide location when in specific facility space(s), hide location when with a specific other employee, show location when in scheduled meetings only, show location only when travelling between scheduled meetings when the travel time remaining is greater than 30 minutes, etc.).

Figure 45:
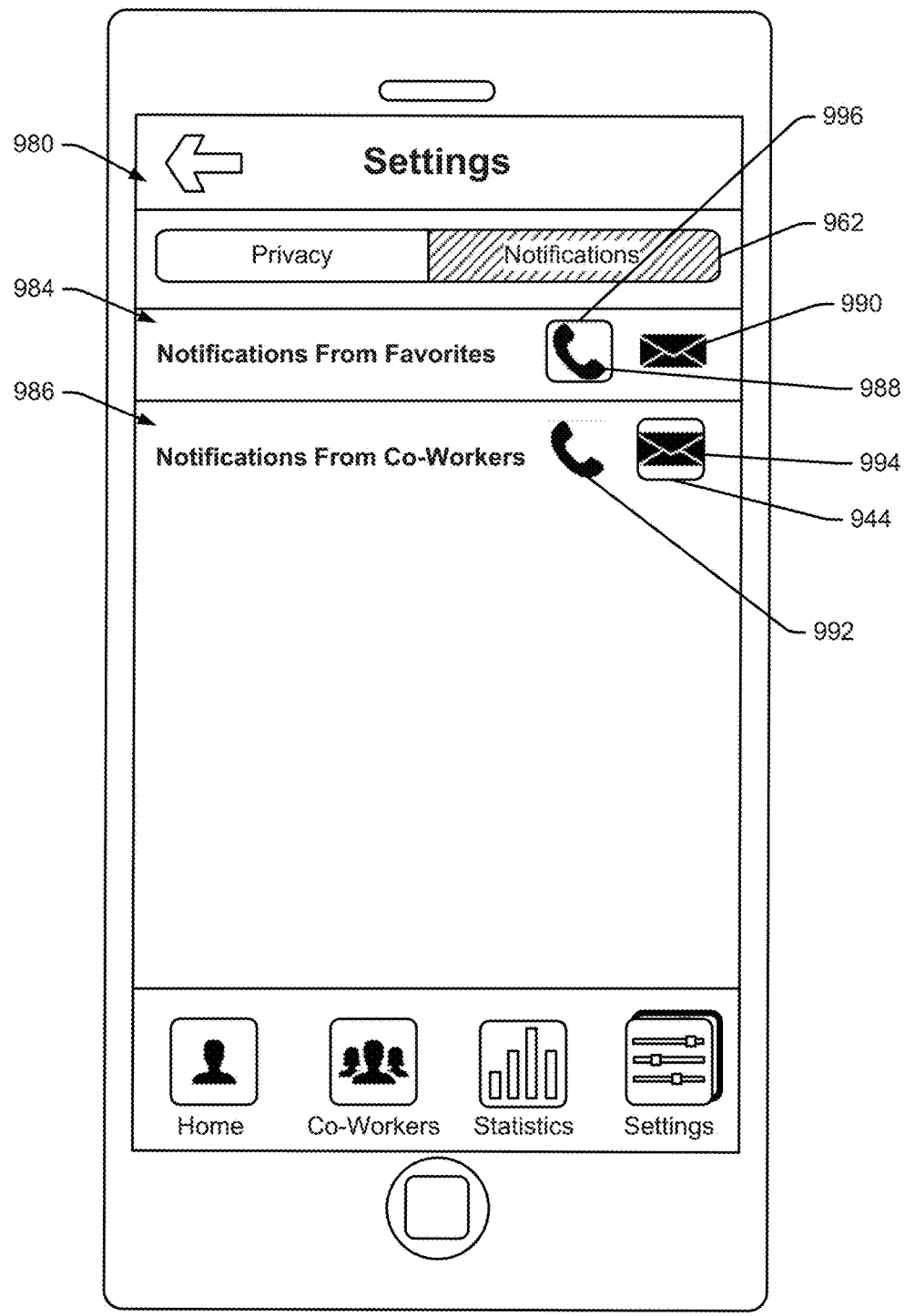
FIG. 45 is similar to FIG. 12, albeit showing another settings interface that is consistent with at least some aspects of the present disclosure.

In FIG. 44, when the notifications icon 962 is selected, device 60 may present the screen shot 980 shown in FIG. 45 that presents notification options for selection. In the illustrated example, the notification options include "Notifications from favorites" 984 and "Notification from co-workers" 986 designators along with notification type icons including phone icons 988 and 992 and e-mail options 990 and 994 for each of the designators 984 and 986. In FIG. 45, any of the icons 988, 990, 992 or 994 may be selected to toggle the notification types on and off for each of the designators 984 and 986. In FIG. 45 boxes or other highlighting 996 and 998 are shown to indicate currently selected notification types where non-boxed icons indicate notification types that are off. Thus, in FIG. 45, phone notifications are on for favorite employees while e-mail notifications are on for all co-workers of the device 60 user. Other communication types (e.g., instant messaging, etc.) are contemplated and would be supported as options via screen shot 980.

Figure 46:
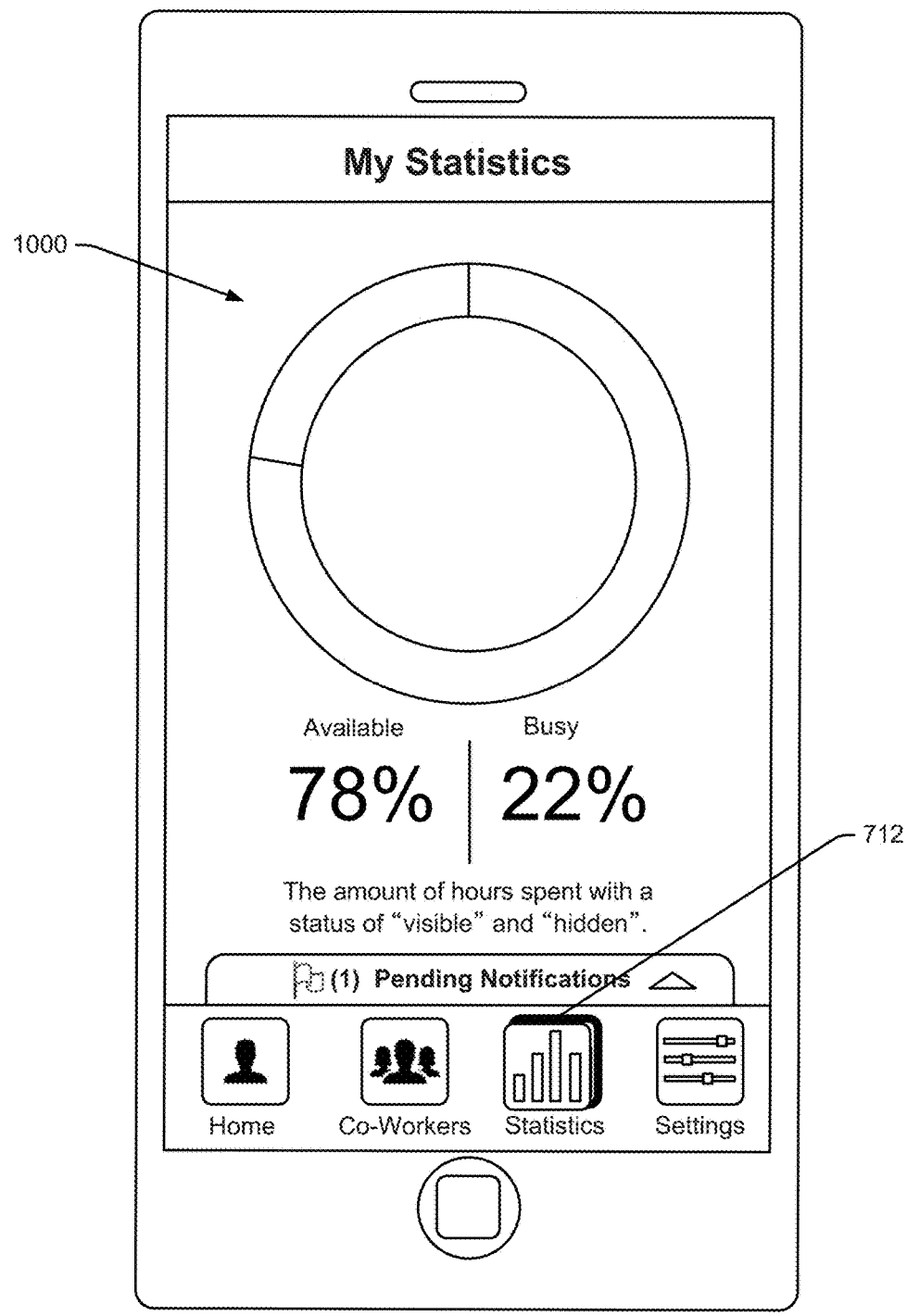
FIG. 46 is similar to FIG. 33, albeit showing a statistics screen shot that is consistent with at least some aspects of the present disclosure.

Referring yet again to FIG. 33, when statistics icon 712 is selected, a screen shot 1000 as in FIG. 46 may be presented that, for the device 60 user, shows various statistics. For instance, in FIG. 46 default statistics indicate the percent of a device 60 user's time that is scheduled as "available" and "busy". This view may help a device 60 user either maintain a more accurate schedule if the busy percent does not reflect the amount of actual scheduled time for the user or may help the user if the user recognizes that there is not enough available time in her schedule.

In at least some of the features described above the disclosed system attempts to optimize interface use by defaulting to a most likely set of selections. In other embodiments the system may be programmed to always default to likely selections to help expedite the specifying process. For instance, see again FIG. 40 that may represent a default most likely notification specification when "notify when" icon 856 in FIG. 38 is selected. As shown, the specification selects "me" as the employee to notify, selects the "status" type 892 of notification and selects the "available" status 896. Here, if the device 60 user likes the default notification specification, the user can simply select submit icon 904 to submit the notification to the system. Here, if the user changes any of the notification parameters, the system may again, based on the change, make a most likely selection of other parameters automatically. For instance, if screen shot 890 from FIG. 40 were presented and the device 60 user selected icon 884 so that the notice would be to Jimion, other most likely options in the other specifying fields (e.g., status or location, etc.) may be automatically selected.

Referring again to FIG. 3, room peak icon 163 corresponds to another application that may be used to identify space resource utilization and to schedule space use. The room peak application may present space options in yet another visual paradigm. To this end, it has been recognized that spaces can be generally categorized as a function of their affordances into a relatively small set of space type options and the type options can be presented to employees for selection so that the employees can forego the need to specify a list of preferred affordances. For instance, the space type "private phone booth" is sufficiently descriptive for an employee to know that a space of that type will include affordances optimized for a single person phone call without requiring further specification of desired affordances. Similarly, a space type descriptor "meeting room with video" is sufficiently descriptive for an employee to understand that the space is optimized for video conferencing.

Figure 47:
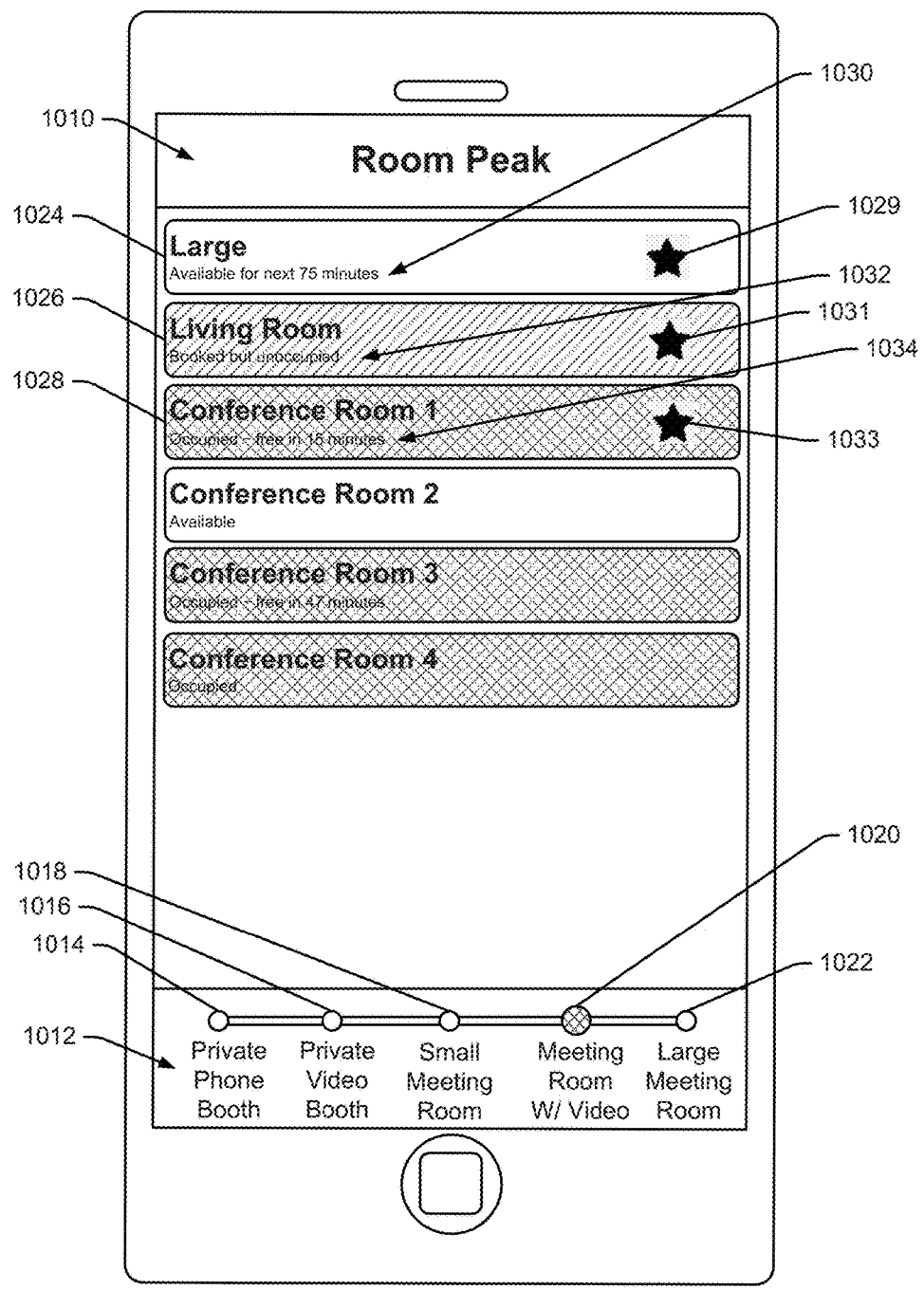
FIG. 47 shows another screen shot including yet a different view of facility space including information representing that status of each space.

Presenting space options based on general types is intuitive and can expedite use of search capabilities. See FIG. 47 that shown an initial room peak screen shot 1010 that may be presented when icon 163 in FIG. 3 is selected. Screen shot 1010 includes a list 1012 of basic space types along a bottom edge with associated selectable icons 1014, 1016, 1018, 1020 and 1022. Icon 1020 is shown highlighted to indicate selection but the highlight can be moved about from one space type option icon to another to select any one of the multiple different space types. Initially one of the selectable icons (e.g., 1014, 1016, etc.) may be selecte3d as a default when the Room Peak application is accessed. The selected space type is visually distinguished in some fashion from other space types in the list 1012. In FIG. 47 the space type options include a private phone booth, a private video booth, a small meeting room, a meeting room with video and a large meeting room where icon 1020 indicates that the meeting room with video option has been selected to visually distinguish that space type from others.

A space list including spaces that are consistent with the selected space type at 1020 is presented at the top of the screen shot and, in the illustrated example, includes six options including, among others, a "Large" space option 1024, a "Living Room" option 106 and a "Conference Room 1" option 1022. For each option in the list, the option is presented with a status indicator. For instance, for the large space, a status indicator 1030 indicates that the space is available for the next 75 minutes while an indicator for the living room space indicates at 1032 that the space is currently booked but unoccupied. Another indicator 1034 indicates that the conference room 1 space is occupied but will be available in 15 minutes. Other status indicator indicate occupied, available, etc. Using the screen shot 1010, an employee can quickly view all spaces that meet basic criteria associated with a selected room type. While occupied spaces are indicated in FIG. 47, in some embodiments only available spaces may be indicated.

As in embodiments described above, different space options in the presented list may be colored, shaded, highlighted or otherwise visually distinguished to indicate their current statuses. For instance, as seen in FIG. 43, all occupied spaces shown as double-cross hatched may be shaded red, all booked but unoccupied spaces shown in single cross-hatch may be shaded yellow and all available spaced may be shaded green.

Figure 48:
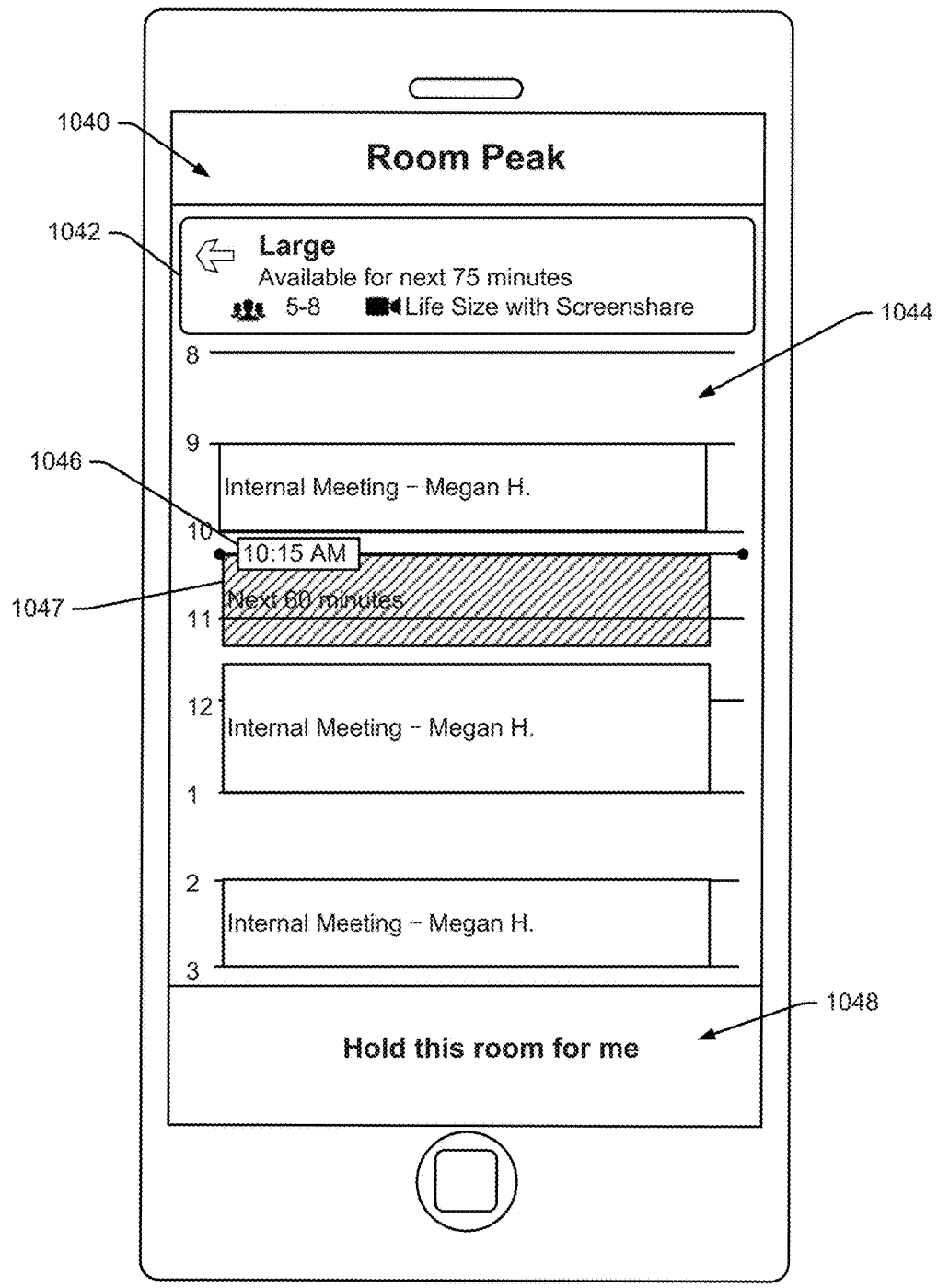
FIG. 48 is similar to FIG. 47, albeit showing information related to a specific one of the spaces represented in FIG. 47 after selection of that space representation in FIG. 47.

Referring to FIG. 48, once a space is selected from the list in FIG. 47, more information associated with the selected space is presented via a screen shot 1040. The additional information may include, for instance, a general description of the space 1042 and a schedule 1044 showing currently scheduled use of the space as well as a current time indicator 1046. A default duration (e.g., 60 minutes) suggested period 1047 may be indicated on the schedule to expedite a scheduling process. A selectable icon 1048 for scheduling use of the space within a free or available period is presented.

Figure 49:
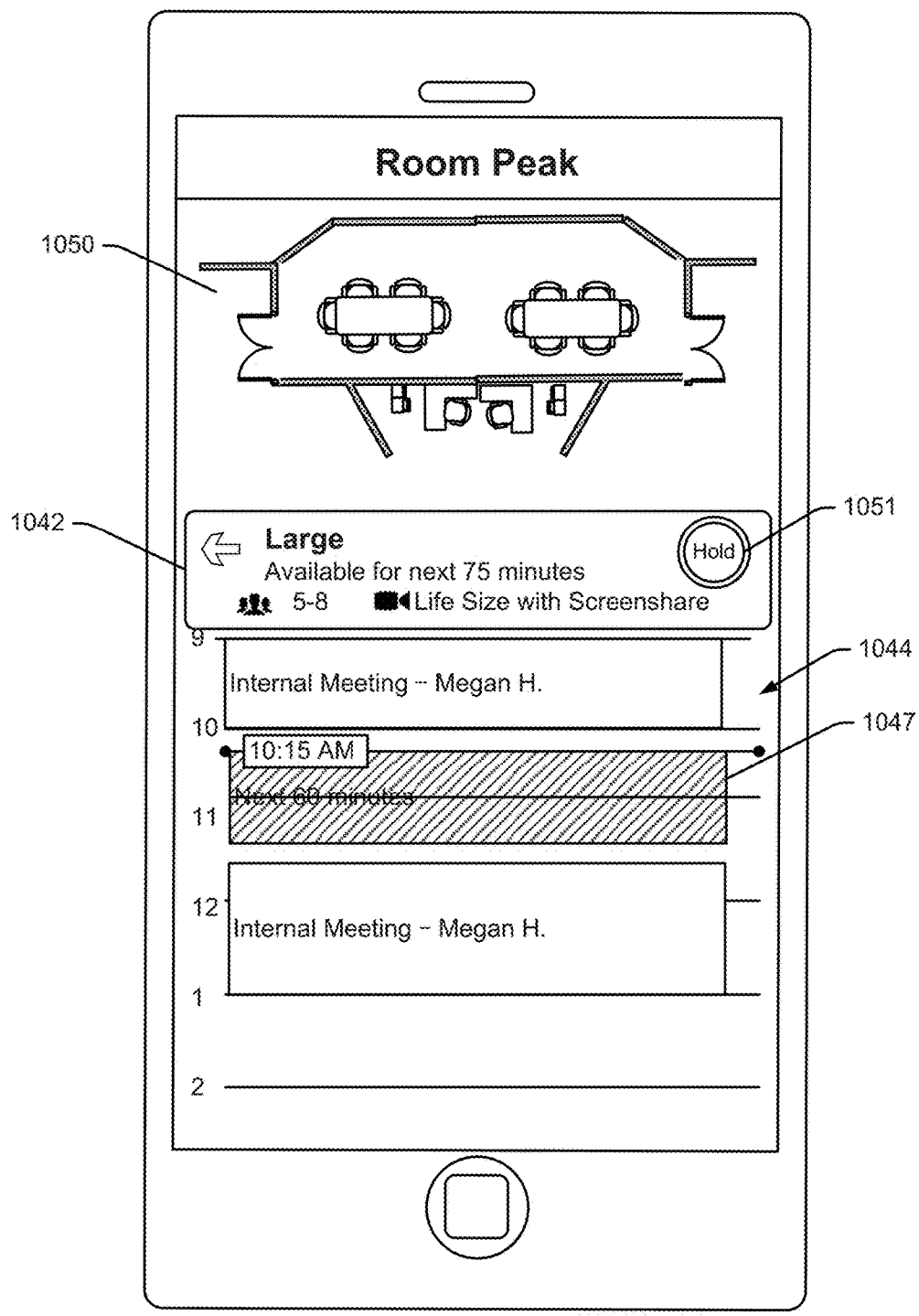
FIG. 49 is an alternate view that may be employed instead of the view shown in FIG. 48.

Referring to FIG. 49, in other embodiments the additional information presented when a space is selected from the FIG. 47 list may include a map of a top plan view of the space selected along with the general information 1042 and the schedule information 1044 with a hold icon 1051.

Figure 50:
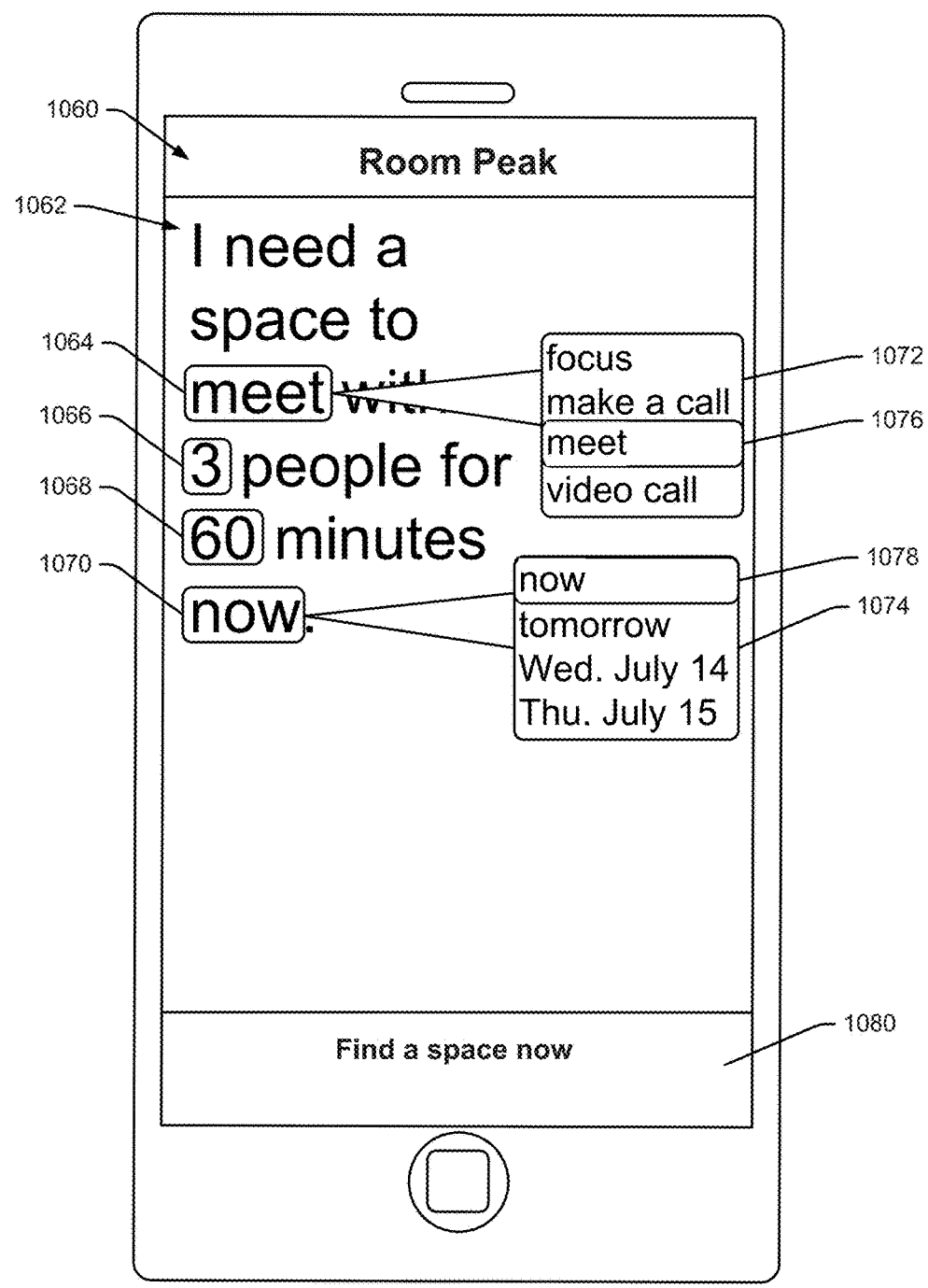
FIG. 50 shows a device screen shot presenting a space query or search in sentence form where different search parameters can be modified in an extremely intuitive fashion.

It has been recognized that many device 60 users prefer a natural language interface for searching for available resources. In at least some cases the room peak or other applications may be based on natural language searches as opposed to other specifying types of interfaces. To this end, see FIG. 50 that shows one screen shot 1060 of a natural language type interface for locating an enterprise space that is available for use. In FIG. 50, the interface includes a simple natural language statement 1062 with some default parameters initially set in an attempt to expedite the space locating process. The exemplary statement 1062 states "I need a space to meet with 3 people for 60 minutes now". Here, the statement includes four qualifiers or parameters that may be altered from the initial default settings to customize the search statement where each of the qualifiers is shown in a rectangular field. In at least some embodiments, instead of showing a rectangular field about each qualifier, the qualifier may be visually distinguished in some other fashion such as, for instance, via highlighting with yellow or a different color, underlining, bolding, etc. The four fields include an activity qualifier field 1064, a number of participants qualifier field 1066, a time field 1068 and a start field 1070.

The activity field 1064 is for specifying an activity type for the space sought which may affect which spaces are suggested as options for a device 60 user. For instance, where the activity is a video call, only spaces including hardware for facilitating a video call may be identified. The participant's field 1066 allows a user to specify a number of persons that need to be supported within the space and the time field 1068 allows the user to specify the duration of the meeting to occur. The Start field 1070 allows a user to indicate when the meeting has to start (e.g., now, tomorrow, some future date, etc.).

Any of the fields 1064, 1066, 1068 and 1070 may be selected to open a drop down selection window with options to be selected by the user. For instance, two drop down windows 1072 and 1074 are shown for fields 1064 and 1070, respectively, where a box 1076 and 1078 in each window can be moved to change the selection in the associated field 1064 or 1070. After a statement 1062 has been altered to reflect a space required by the device 60 user, a search or submit icon 1080 near the bottom of the screen shot 1060 is selectable to submit the search query to the system server 12.

Figure 51:
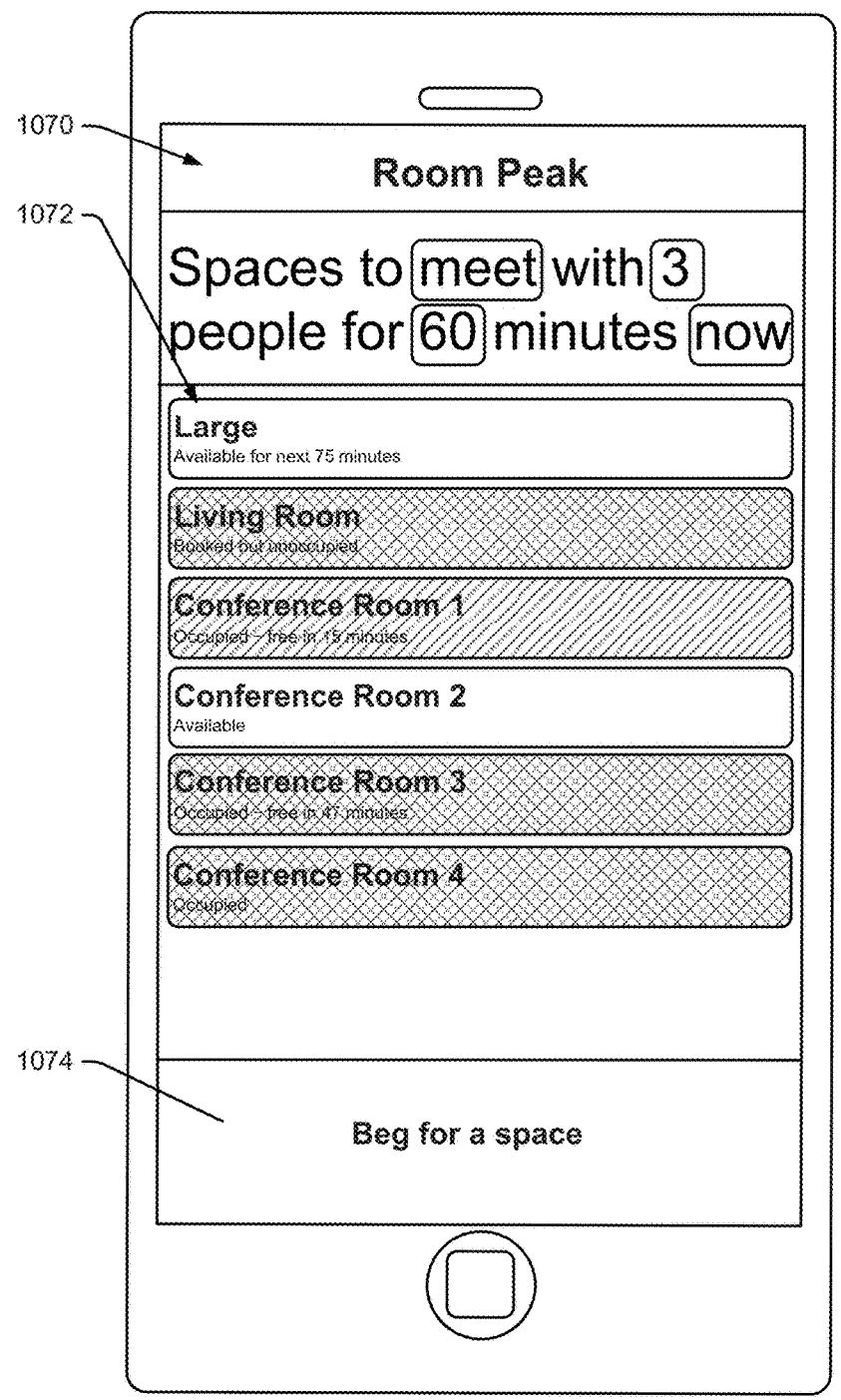
FIG. 51 shows the results of a search performed via the interface of FIG. 50 in yet another screen shot.

Once the statement from screen shot 1060 has been submitted, server 12 identifies all facility spaces that meet the required characteristics and presents those spaces in another screen shot 1070 as a list 1072 as shown in FIG. 51 along with status indicators similar to those described above.

The screen shot in FIG. 51 also includes a "Beg for a space" icon 1074 that can be selected by a device 60 user to request a space with specific affordances. For instance, if all spaces in a facility that include video conferencing capabilities are currently scheduled for a specific time, an employee may use icon 1074 to specify a request to other employees that have space with video conferencing capabilities reserved in an attempt to free up one of the spaces for use. Where a specific occupied space is required or strongly desired for some reason, an employee may be able to request the specific space. For instance, in FIG. 51, an employee may be able to select icon 1076 corresponding to conference room 4 to highlight that space and then select the beg for a space icon 1074 to send a message to the occupier of that space to request use.

While the interface in FIG. 50 includes four query parameter fields 1064, 1066, 1068 and 1070, in other embodiments less or more fields may be provided. While more fields may be provided, the idea here is to require the minimal number of fields to identify a reasonable number of available space options and therefore less fields are often better. Thus, while particularly useful interfaces include four or even three fields, in other embodiments it may be useful to have eight or less fields.

Figure 52:
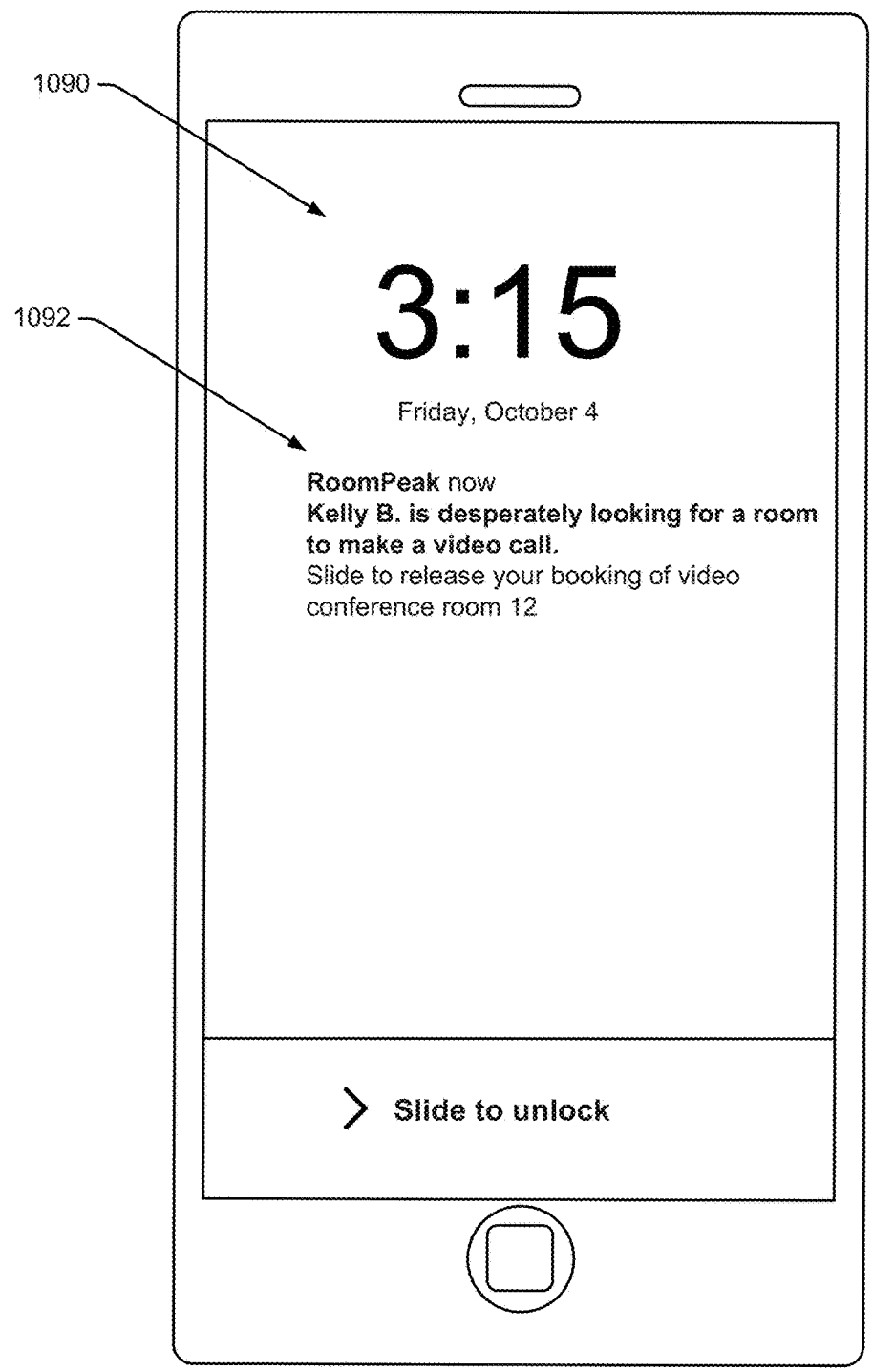
FIG. 52 shows a screen shot including a text message that is consistent with at least some notification aspects of the present disclosure.
Figure 53:
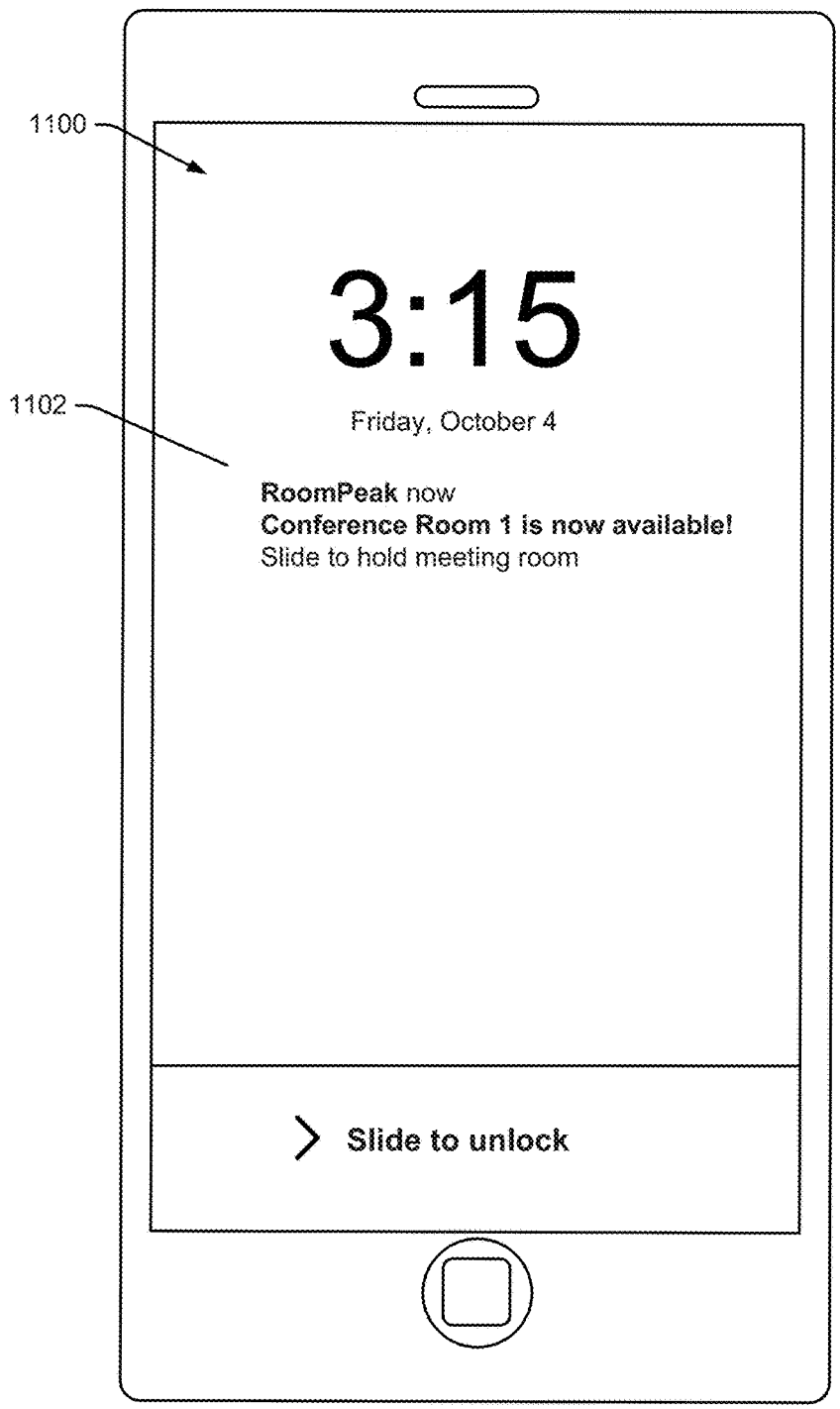
FIG. 53 is similar to the FIG. 52 illustration, albeit showing a different text message.

As described above, in at least some cases notifications related to tracked resources may be issued via communication applications that reside outside the corporate maps, compass and room peak applications that initiate the notices. For instance, see FIG. 52 that shows a screen shot 1090 including an exemplary text message 1092 that would be transmitted to and presented by a device used by an employee currently occupying a space that has video call capabilities when another employs (e.g., Kelly B) is begging for such a space. The text message indicates the need for the space and offers a simple way to release the space. As another instance see FIG. 53 where a screen shot 1100 includes a text message 1102 indicating that a conference room 1 is now available to a device 60 user that also includes instructions for holding the room. Text message 1102 would be generated by the room peak or perhaps corporate maps application and transmitted via an existing text message application.

Figure 54:
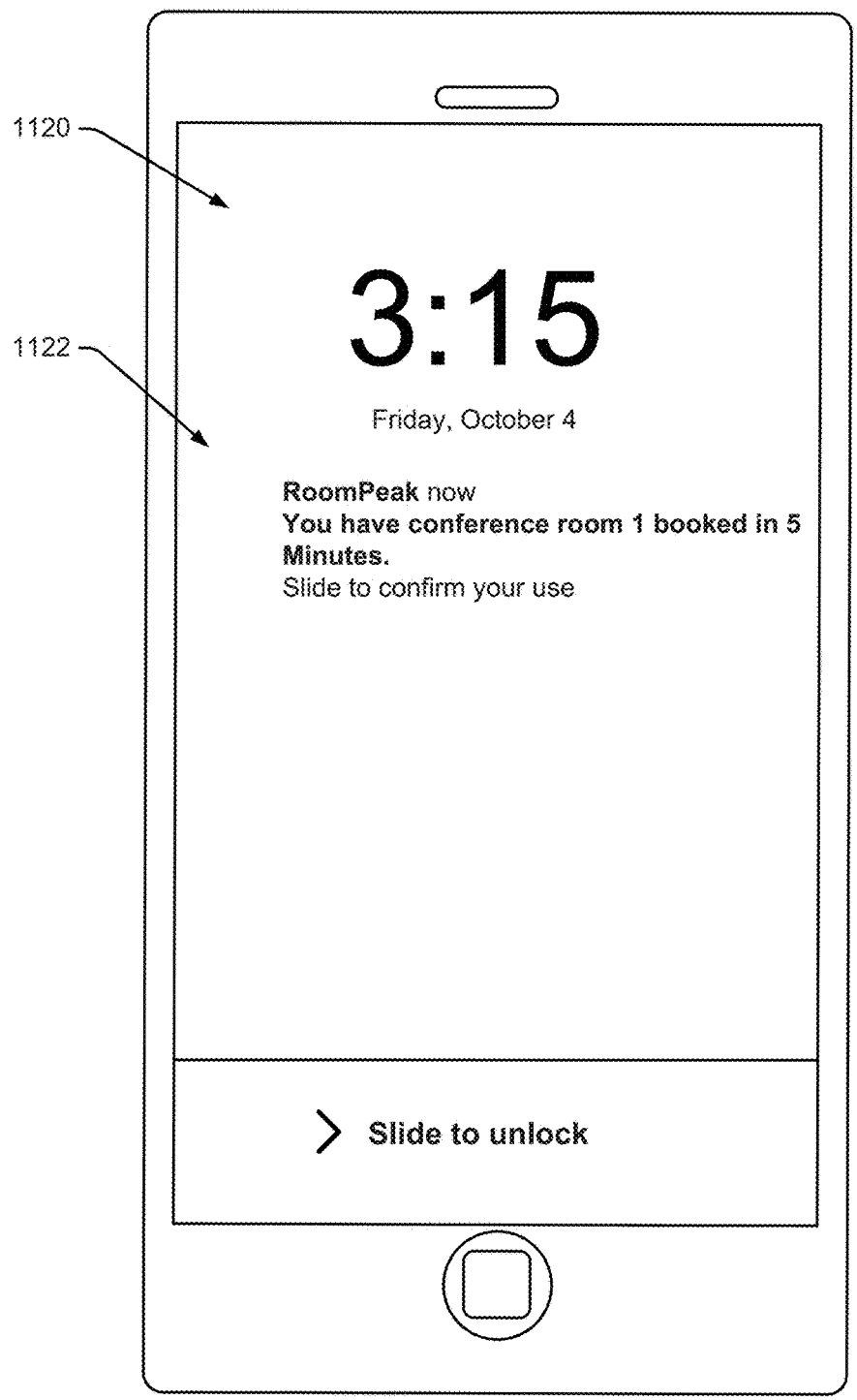
FIG. 54 is similar to the FIG. 52 illustration, albeit showing another text message.
Figure 55:
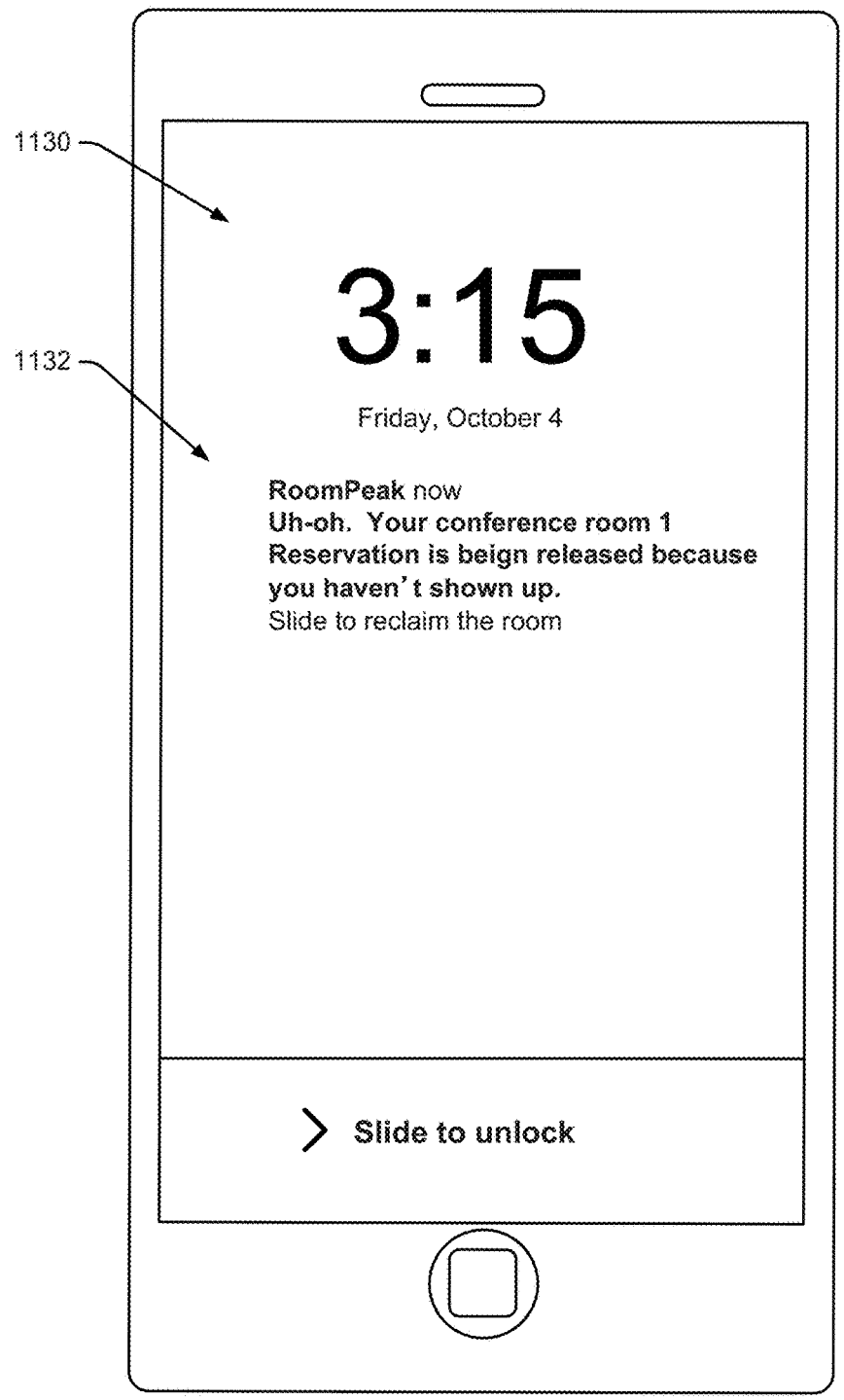
FIG. 55 is similar to the FIG. 52 illustration, albeit showing yet another text message.

In addition to supporting the concepts described above, the room peak or other applications may provide other functionality to manage resources. For instance, where an employee has booked a conference space for a specific time period but has not entered the booked space within some threshold period prior to the booked period, server 12 may generate screen shot 1120 in FIG. 54 including text message 1122 indicating that the employee has the space (e.g., conference room 1) booked in 5 minutes and may allow the employee to confirm a need to maintain the booking or to release the booking. As another instance, if an employee that has reserved a space has not entered the space within 10 minutes of the reserved time, server 12 may generate a screen shot 1130 as in FIG. 55 notifying the employee via text 1132 that the space is being released unless some affirmative step is performed to reclaim the space.

The rules for when to generate different text messages may be far more complex. For example, where an employee has not entered a booked space within 5 minutes prior to the booked time, if the employee is located proximate the booked space (e.g., in a hallway outside the space), server 12 may forego the text message shown in FIG. 54. If other employees that were invited to a meeting in a space are located in the space during a scheduled time even if the employee that booked the space is missing, the server 12 may forego the text message in FIG. 57. Similarly, if there are many non-booked spaces that are comparable to a space that is booked by a first employee that are in the general area of the booked space, the system may forego any notice to the bookee querying about intent to use the space or in an effort to free up the space as, in this case, it is highly unlikely that the booked space would be needed.

Other views of enterprise space availability and affordances are contemplated. For instance, see the screen shot 1200 in FIG. 56 that includes general space descriptors "private phone booth" 1202, "private video booth" 1204, "small meeting room" 1206, "meeting room w/video conference" 1208 and "large meeting room" 1210 in a top row and separate columns of space representations under each general space descriptor listing facility spaces that are consistent with the general space descriptors. For instance, under the "private phone booth" descriptor 1202, five phone booth type spaces are listed at 1212 through 1216. Similarly, for the "small meeting room" descriptor 1206, five spaces are labeled 1220 through 1224. Each space representation also includes a capacity indicator and a video capability indicator. To this end, see exemplary capacity indicator 1230 that indicates that two people can be supported in space 1220 and video indicator 1232 indicating that space 1220 has video capability.

Figure 56:
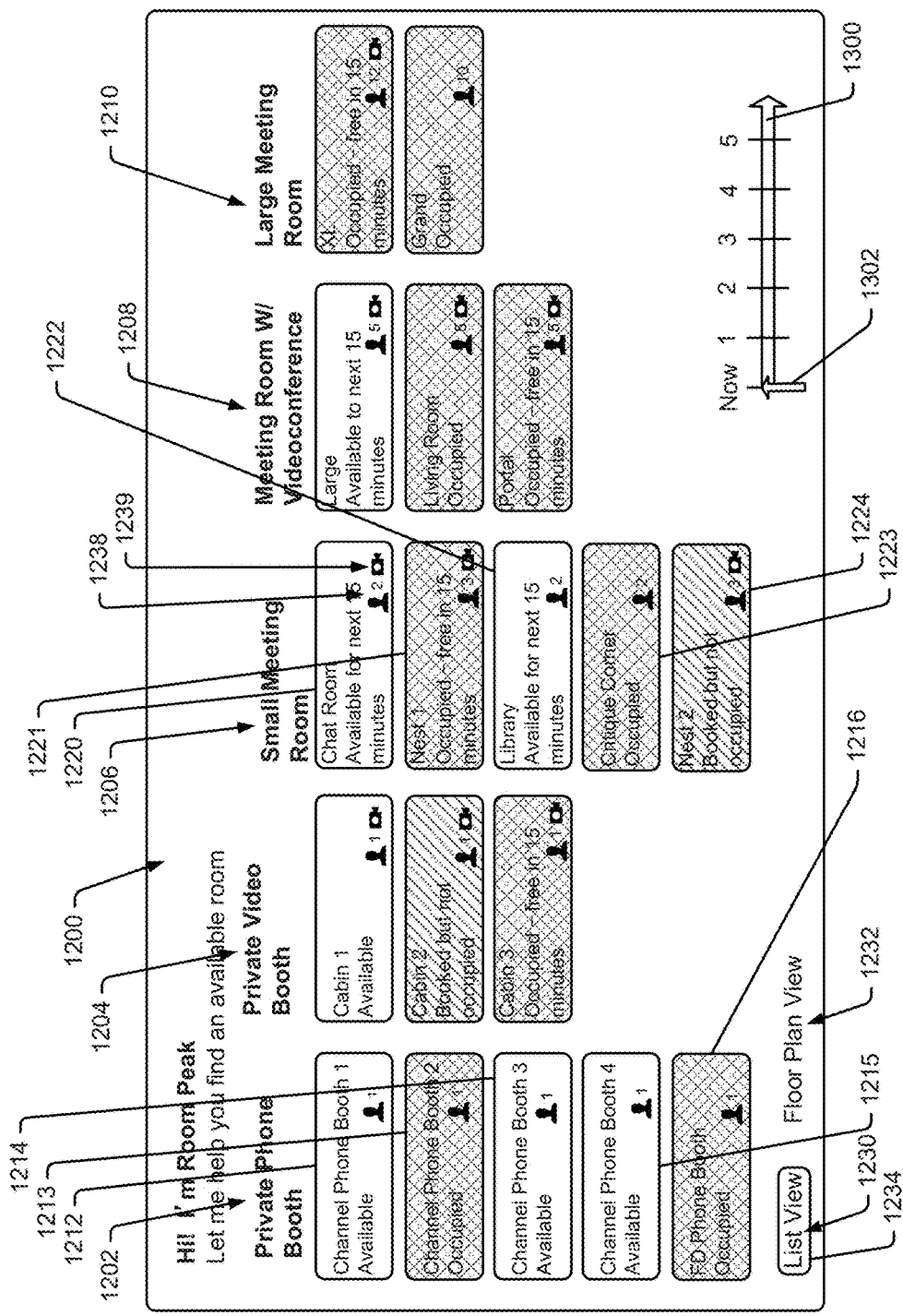
FIG. 56 is a schematic illustrating a device screen shot or interface representing facility space and indicating and status and affordances within each space.

Referring still to FIG. 56, each space representation also includes text indicating current status as occupied, available, etc. In addition, each representation is shaded or otherwise visually distinguished to indicate space status. For instance, all representation is associated with occupied spaces are shown double-cross hatched to indicate red shading, all representations associated with booked but unoccupied spaces are shown cross-hatched to indicate yellow shading and all representations associated with available spaces are shown unfilled to indicate green shading. Thus, a device 60 user viewing screen shot 1200 can quickly identify general space types within a facility, can identify specific instances of each space type, can assess which spaces are available, occupied or booked and unoccupied and can assess space capacity and at least availability of video affordances within each space. If a space of interest is identified, the device 60 user can select the space representation to access additional information.

Again, while occupied and unoccupied spaces are all included in the FIG. 56 view, in other cases only available spaces or spaces that will become available shortly may be presented. While other views are contemplated, it is believed that showing the status of all spaces as in FIG. 56 may be advantageous as an employee can confirm statuses of all spaces and may avoid being confused if occupied spaces are off the lists. In some cases, available spaces may be presented at the top of each column followed by scheduled but unoccupied spaces, followed by soon to be available spaces and then occupied spaces. Where certain spaces are favorites of a device 60 user, those spaces may be presented above others generally or within their status grouping (e.g., favorite available spaces may be presented above non-favorite available spaces). In some cases, spaces may also be organized in the columns as a function of other parameters. For instance, other parameters may include duration of current status (e.g., spaces available longer may be above spaces available for shorter periods; spaces to be available relatively quickly may be above spaces to be occupied for shorter periods, etc.), capacity (e.g., spaces with video capability or some other affordance may be listed above spaces that do not have such capabilities).

Figure 57:
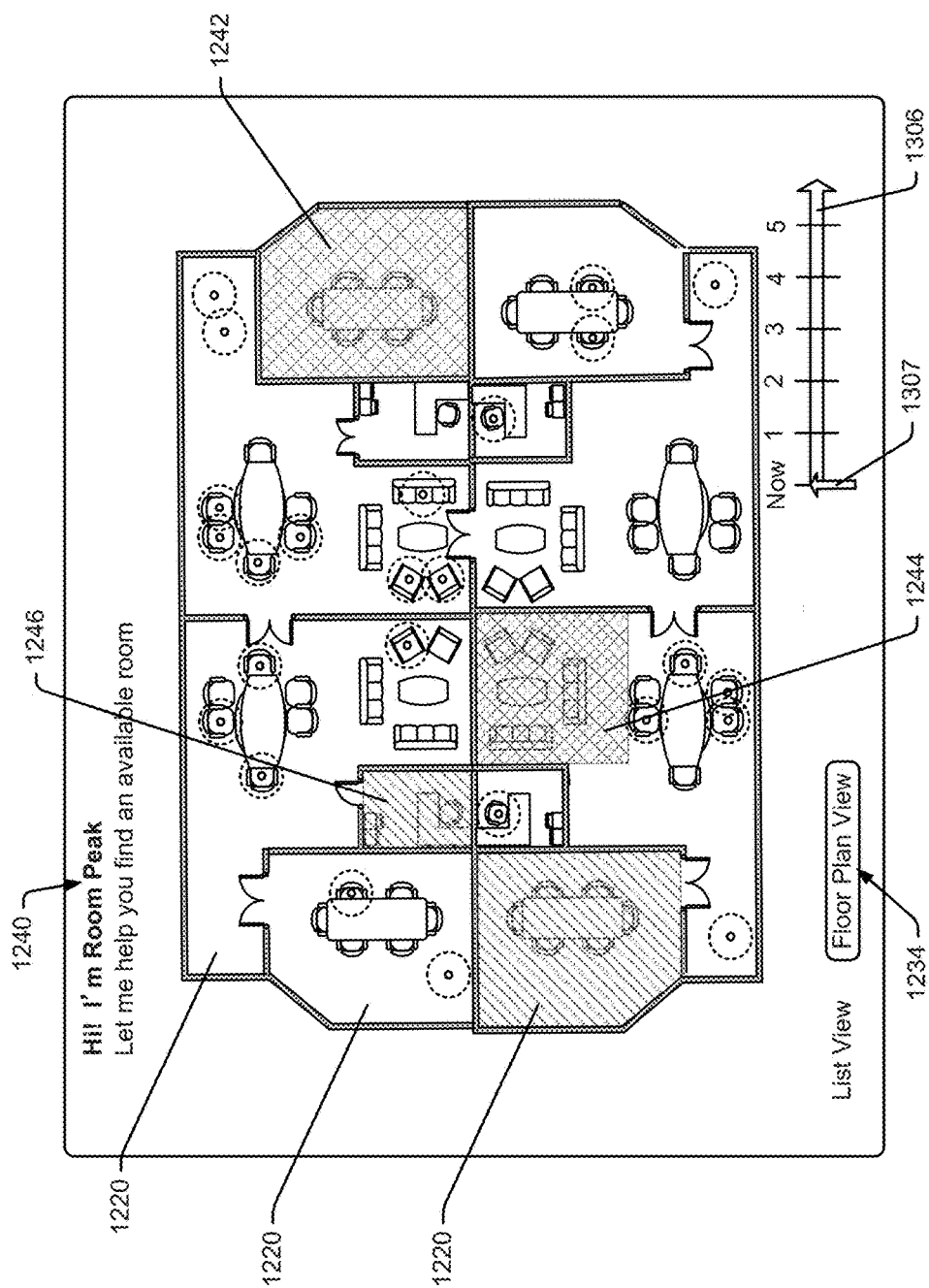
FIG. 57 is similar to FIG. 56, albeit showing similar information in a graphical floor plan view.

In FIG. 56, there are two view specifiers including a "list view" corresponding to the view shown in FIG. 56 and a floor plan view 1232. The two views are alternatives and can be selected by touch or some other interface to move a selection box 1234 from one to the other. When specifier 1232 is selected, device 60 may present screen shot 1240 as shown in FIG. 57. Screen shot 1240 shows a map or floor plan view showing facility space where the different spaces are shaded to indicate current status (e.g., available, occupied, booked but unoccupied, etc.). To this end, double-cross hatched spaces 1242 and 1244 indicate red shading associated with occupied space, single cross-hatched spaces 1246, 1248 indicate booked but unoccupied spaced that may be yellow and spaces 1250 and 1252 that are not filled indicate available spaces that may be green.

While the invention may be susceptible to various modifications and alternative forms, specific embodiments have been shown by way of example in the drawings and have been described in detail herein. However, it should be understood that the invention is not intended to be limited to the particular forms disclosed. For example, the collector subassembly 49 shown in FIGS. 6 and 7 may have other forms. For instance, in some cases the assembly may not include separate satellite units 50*a*, 50*b* and instead the base 52 may include collectors for obtaining data directly from devices 40. While this type of system may not work well in some environments, it may be sufficient in others (e.g., a small personal office) where devices 40 are relatively proximate bases 52.

As another example, while many of the views described above are current or real time views of resource statuses, other embodiments contemplated may enable system users to specify a temporal aspect to a view to obtain other useful resource status information. For example, see in FIG. 56 that a time line 1300 is provided that indicates a current time (e.g., now) at a left and a rolling time indicator to the right thereof. Here, a selected time is indicated by arrow 1302. Arrow 1302 (e.g., a time selection tool) can be moved along line 1300 to select a different time. The time indicated by arrow 1302 in FIG. 56 is a current time. When arrow 1302 is moved to a different time on the line 1300, the statuses of the spaces represented in screenshot 1200 would be modified to reflect scheduled statuses for the spaces. For instance, an occupied space that is available at a future time selected via line 1300 would be indicated as available. Here, in addition to changing the status indicators, where rules (e.g., available listed prior to occupied, etc.) govern the order in which spaces are represented in the columns, the orders of the columns would be reshuffled accordingly. Similar time selection controls 1306 and 1307 are provided in FIG. 57 where space shading in the image presented would be changed to reflect future use.

As another example, see FIG. 25 where the screen shot includes a time line 1310 like the timeline 1300 in FIG. 56 that can be used to select a subsequent time to view scheduled locations of other employees related to the scheduled location of a device 60 user. When selector 1312 is moved on line 1310 to select a different time, the information at 501 is altered to reflect scheduled locations of employees relative to the scheduled location of the device 60 user.

A temporal aspect may also be added to notifications in at least some embodiments. For instance, see FIG. 58 that is similar to the view shown in FIG. 34, albeit where the plain English notification specification 1390 includes a fourth parameter field 1400 for specifying a time associated with the notification. Here, it has been recognized that in at least some cases a first employee will want to know in advance when another employee will be in the vicinity of the first employee. For example, a first employee may want to know any time a second employee is scheduled to be within the vicinity of the first employee in the next hour, in the next twelve hours, etc., to give the first employee an opportunity to attempt to schedule a face-to-face meeting with the second employee.

Figure 58:
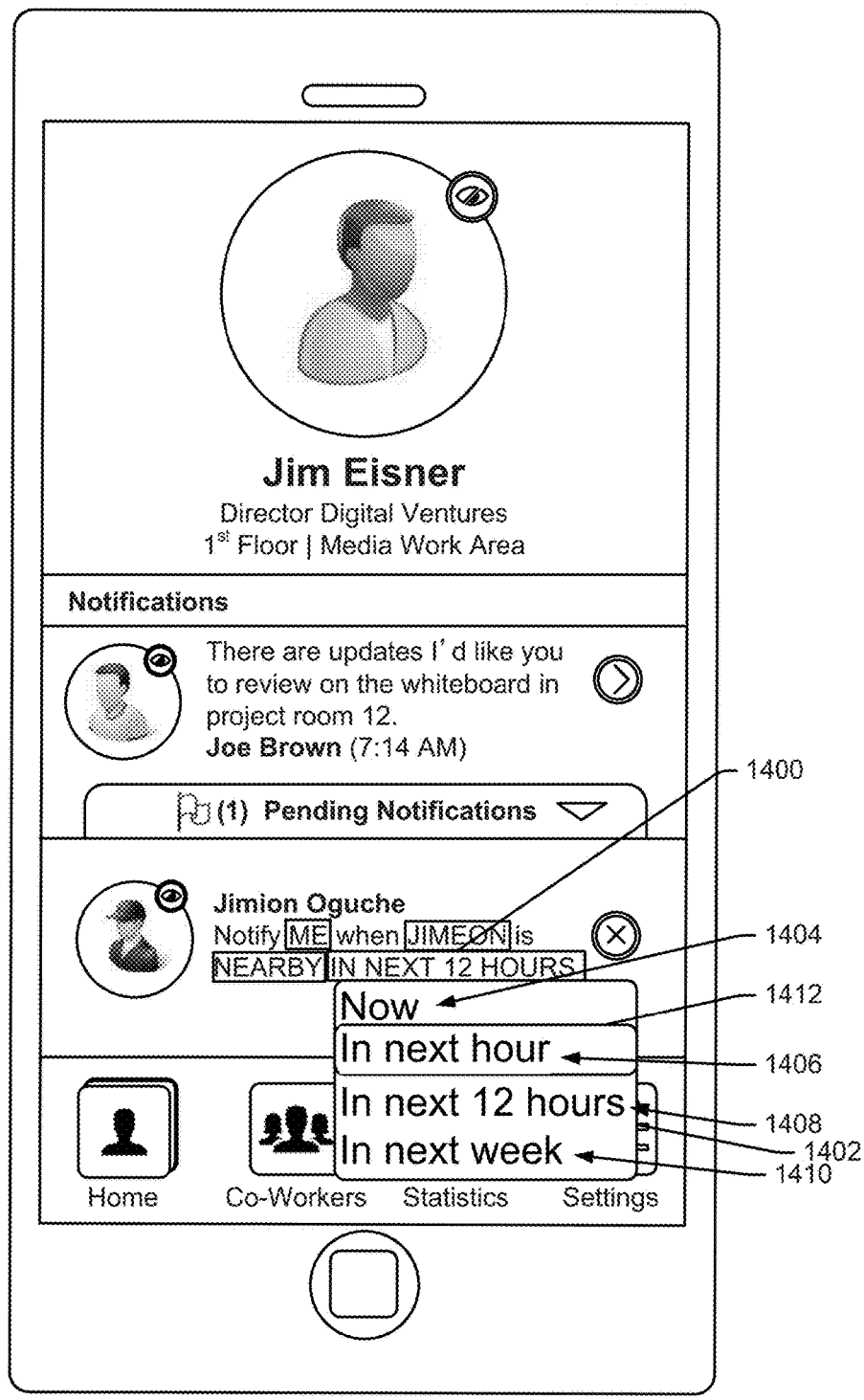
FIG. 58 is a schematic similar to FIG. 34, albeit including a fourth parameter setting field.

In FIG. 58, a pop-up window 1402 is shown that may be presented when parameter field 1400 is selected which includes a set of pre-canned period options including "now" 1404, "in the next hour" 1406, "in the next 12 hours" 1408 and "in the next week" 1410. A period selection box 1412 can be moved about to select one of the four options. Where, for instance, the "in the next 12 hours" option 1408 is selected, server 12 monitors schedules of both the device 60 user and the other employee whose location is being tracked during a following rolling 12 hour period and generates a notification (e.g., in a list as at 717 in FIG. 33, via a text or e-mail, etc.) when the schedules indicate that the two employees are generally in the same location (e.g., in the same facility).

As still one other example, when an employee adjusts privacy setting, server 12 may be programmed to indicate to that employee any notification that will be affected by the newly selected setting. In this regard, see again FIG. 44 where a selectable icon 973 reports the number of notifications affected by new settings. In FIG. 44 it is assumed toggle button 970 has been toggled and icon 973 reports that four notifications are affected by the change. Here "affected" may mean enabled or disabled. To obtain more information on the affected notifications the device 60 user can select icon 44. In still other embodiments it is contemplated that other data collector devices may be used in the above described system such as, for instance, space or room cameras (see 9 in FIG. 1) for collecting information useable to drive processes described above. For instance, a Kinect camera as sold by Microsoft or other camera device 9 may be able to obtain images of a space useable to detect occupancy, number of persons in a space, locations and juxtapositions of affordances, etc., for driving resource locating, notifications and scheduling. Camera images may be used in conjunction with data collected by other devices. For instance, where signals from a portable device 60 received by an access point 38 cannot be used to distinguish if the device 60 is located in space 20*b* picks up an image of a single employee in space 20*b* and no employee is located in the images generated by camera 9 in FIG. 20*e*, server 12 may be programmed to recognize that the device 60 is located in space 20*b*. Here, in at least some cases, the locating algorithm may be modified as a function of feedback based on the camera images to better tune the location process. Other combinations of camera data and other sensed data are contemplated.

In at least come cases stationary or mounted display screens may be used to present resource information and interface tools to employees instead of or in addition to portable computing devices. For instance, a Room Wizard (TM Steelcase) as manufactured and sold by Steelcase Corporation, mounted outside a conference space may present resource availability information including information akin to any of the types of information described above as well as scheduling, notification and other parameter setting tools. In still other cases Room Wizard type devices may be presented at individual desks or work spaces within a larger open space. As another instance, larger Room Wizard type screens may be presented at entry locations to various spaces such as in front of an elevator to a floor, a doorway into a specific department, etc., to greet employees, present resource information (e.g., who is on premise, open and occupied or scheduled spaces, etc.

Additional Specification

Data collection in enterprise space can be important for several reasons. First, data collected within a space can be used to track employee space use and to generate reports on space use that can be provided to an enterprise entity (e.g., to a space or affordance purchasing client). The enterprise entity may then use the reports to assess space effectiveness and how well employees are using space and affordances that are provided in that space. The entity can then determine if some remedial activities are required to increase effective use of enterprise space and affordances. For instance, where specific affordances are not being effectively utilized, the enterprise may increase training for employees in order to increase familiarity with affordance use and therefore foster greater and more effective use. Thus, an enterprise administrator (e.g., an enterprise employee responsible for enterprise space and affordances design and layout) may use space use data to better understand enterprise needs and current space/affordance effectiveness.

Second, space use data can be used to automatically provide guidance to employees that work within a space and that use affordances within the space. For instance, in cases where height adjustable tables are provided for employee use so that employees have the option to stand or sit while working at workstations, a system server or other processor may, based on sensed sitting or standing position and duration of time in that position, provide a message to a workstation user to change position (e.g., from sit to stand or vice versa). As another instance, a system server may, based on the time an employee has been located at a workstation, encourage the employee to take five minutes to stand up and stretch. Many other personal and group guidance activities may be driven by sensed space use data.

Third, space use data may be used by a space and affordance designer or manufacturing or configuring company to develop insights into better space and affordance configurations. For example where collected data makes clear that a first conference space design is used substantially more than other conference space designs, an inference may be drawn that the first conference space design is better for some reason and therefore a space configuring company may decide to encourage use of the first conference space design before others to future clients. As another example, where a first workstation design clearly enables employees to enter a state of flow (e.g., highly focused individual work activity, in at least some cases) more rapidly than others, a space configuring company may look for ways to incorporate more of the first workstation design into their space layouts in the future. In addition, in either of the above two cases, the configuring company may also develop re-design plans for enterprise space from which the driving space use data was derived which could result in additional sales of the first conference spaces as well as the first workstation designs.

Fourth, ambient or environmental state data can be correlated with various other sensed information to asses how ambient control affects employee activities within space. Here, the phrase "ambient state" is used to refer to ambient conditions such as, for instance, temperature in an enterprise space, the amount of natural light, synthetic light intensity, noise level, air flow, energy intensity in space, etc. For example, the ability of employees to enter a flow state may be correlated with ambient noise levels to generate insights into how noise affects employee focus and that information may be used to provide feedback to a service client, to drive design of other spaces and affordances, etc.

Fifth, space use data can be used to develop new and more accurate applications and algorithms that use the space use data to determine user states. Hereinafter the phrase "user state" will be used to refer to any individual or group user condition that can be identified including but not limited to physiological parameters or conditions (e.g., present, hot, cold, positional (e.g., sitting, standing, etc.), fidgetiness, etc.), mental states or conditions (e.g., in flow, distracted, collaborating, content generating, content evaluating, content presenting, degree of verbal participation, degree of attention or engagement, etc.) or effectiveness of result (e.g., quantity and/or quality of work product, etc.). If user states are accurately determined, those states, can be used to drive more insightful client reports, provide better employee guidance and to develop better insights into space and affordance designs and configurations to support enterprise employees in the future.

One particularly useful type of sensor device is a camera based sensor. Complex machine vision algorithms have been developed that can examine images or video of a space or scene and identify many different user and affordance states. For instance, machine vision algorithms exist for detecting user presence in space, for counting occupants of a space, for identifying locations of occupants within a space, for recognizing movement in space, etc.

While cameras are useful in some applications, it is expected that in many environments or enterprise facilities personal privacy (e.g., employee privacy), group privacy (e.g., who is meeting with whom), and data privacy (e.g., privacy related to work product development on conference spaces, at workstations, etc.) concerns will result in enterprise restrictions on camera use in many spaces. For instance, an enterprise may want to prohibit cameras in conference spaces as part of a data security program. As another instance, employees at enterprise workstations may not want cameras trained on their workstations all the time for sensing user states throughout the day. Many other privacy concerns are expected to limit or prohibit camera use in many enterprise spaces.

In spaces where cameras cannot be used or can only be used in a limited fashion, for all the reasons described above, there is still a compelling need for sensing user states and ambient states throughout enterprise space. For this reason, in at least some embodiments a sensor ecosystem has been developed that can sense various user states and ambient states or can generate data to drive system algorithms and applications that yield user states and ambient states where the ecosystem does not necessarily require cameras. Here, the challenge is to generate data without cameras that can be used to accurately determine user and ambient states that drive all of the above described functionality. A further challenge is to generate additional types of data that go beyond the types of data a camera can generate to drive additional types of algorithms and applications so that the above described functionality can evolve and provide additional value.

In at least some embodiments it is contemplated that an entire sensing/tracking ecosystem (hereinafter a "sensing ecosystem") may be configured and operated within enterprise space where, for any given space, the ecosystem can be configured in many different ways to achieve many different sensing and tracking goals to varying degrees and where system analysts can provide feedback regarding system output or to develop new system algorithms and reports which are used to increase accuracy and value of the system output over time. In at least some cases, the system output from one enterprise can be used to add value in other enterprises (e.g., for other ecosystem clients) as conclusions rendered or algorithms developed by the system for one enterprise or specified by one analyst for one enterprise often prove valuable to other enterprises.

A. System Architecture

Figure 59:
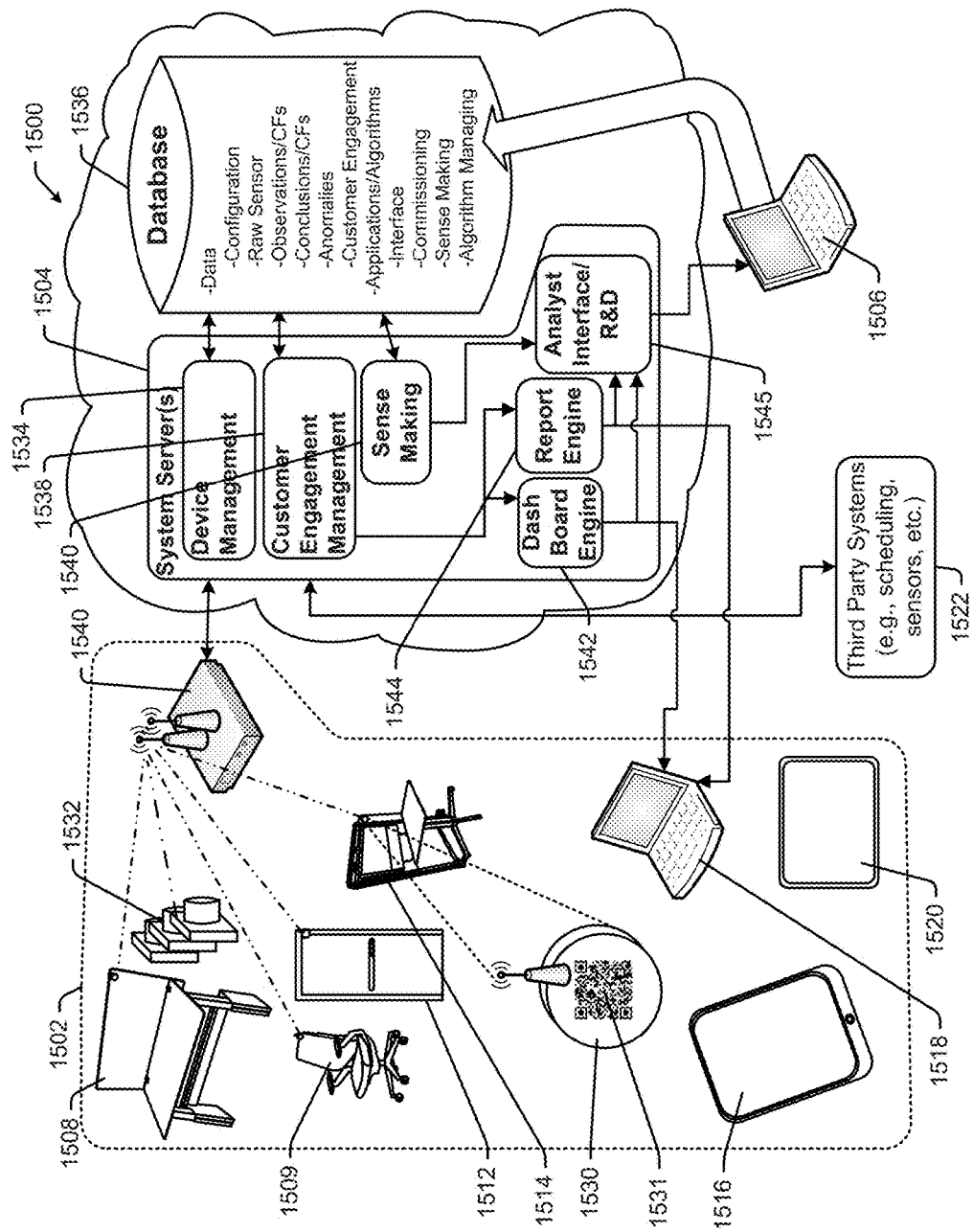
FIG. 59 is a schematic diagram illustrating a sensing ecosystem and associated enterprise that is consistent with at least some aspects of the present disclosure.

Referring now to FIG. 59, an exemplary sensing ecosystem 1500 is illustrated which includes, among other things, a system server 1504 that is linked to an enterprise (e.g., facilities associated with a business or other entity) represented by phantom box 1502. The server 1504 is shown in the "cloud" to indicate that the server is, in at least some cases, remotely located from the enterprise 1502. In other cases server 1504 may be located at an enterprise facility. While shown as a single server 1504, the server may include a plurality of servers that are linked via the internet or some other type of communication network. Server 1504 is described in more detail below.

Referring still to FIG. 59, exemplary enterprise 1502 is shown schematically as a set of devices and affordances but, in reality, would typically include a set of buildings or other associated real estate facilities that are owned or operated by or at least used by some type of business as well as affordances like workstations, chairs, thresholds (e.g., entry and exit ways), whiteboards, electronic display screens, telepresence assemblies, projectors, etc., that are located within the facilities. Exemplary affordances in FIG. 59 include a workstation 1508, a task chair 1509, a threshold 1512 and a telepresence station 1514. While only four affordances are shown in FIG. 59, in most cases an enterprise will include hundreds or even thousands of affordances within their facilities.

Referring again to FIG. 59, enterprise 1502 also includes a wireless network gateway 1540 that is linked to server 1504 via a network like the internet, a local area network, a wide area network, or some other type of computing or communications network. While only one gateway is illustrated, in most cases an enterprise would provide several gateways within facilities so that robust wireless communication can occur with sensor devices, stationary and portable employee computing devices (see 1516, 1518 and 1520 in FIG. 59), and other computing devices at any location within enterprise space.

Referring again to FIG. 59, third party computing systems or software applications represented at 1522 may be linked to the system server 1504 for providing information that can be combined with sensed information in at least some cases to yield more sophisticated sensing, tracking and other results. For instance the third party systems may include scheduling software, other types of sensors in space provided by other service providers, etc. Here, there may be a specified format for receiving data and other information from third party systems or server 1504 may be programmed to examine third party data and glean required information automatically therefrom. Server 1504 may also be programmed to provide various data and calculated results to one or more third party systems 1522 for further processing, archiving or presentation to one or more interested persons.

Figure 60:
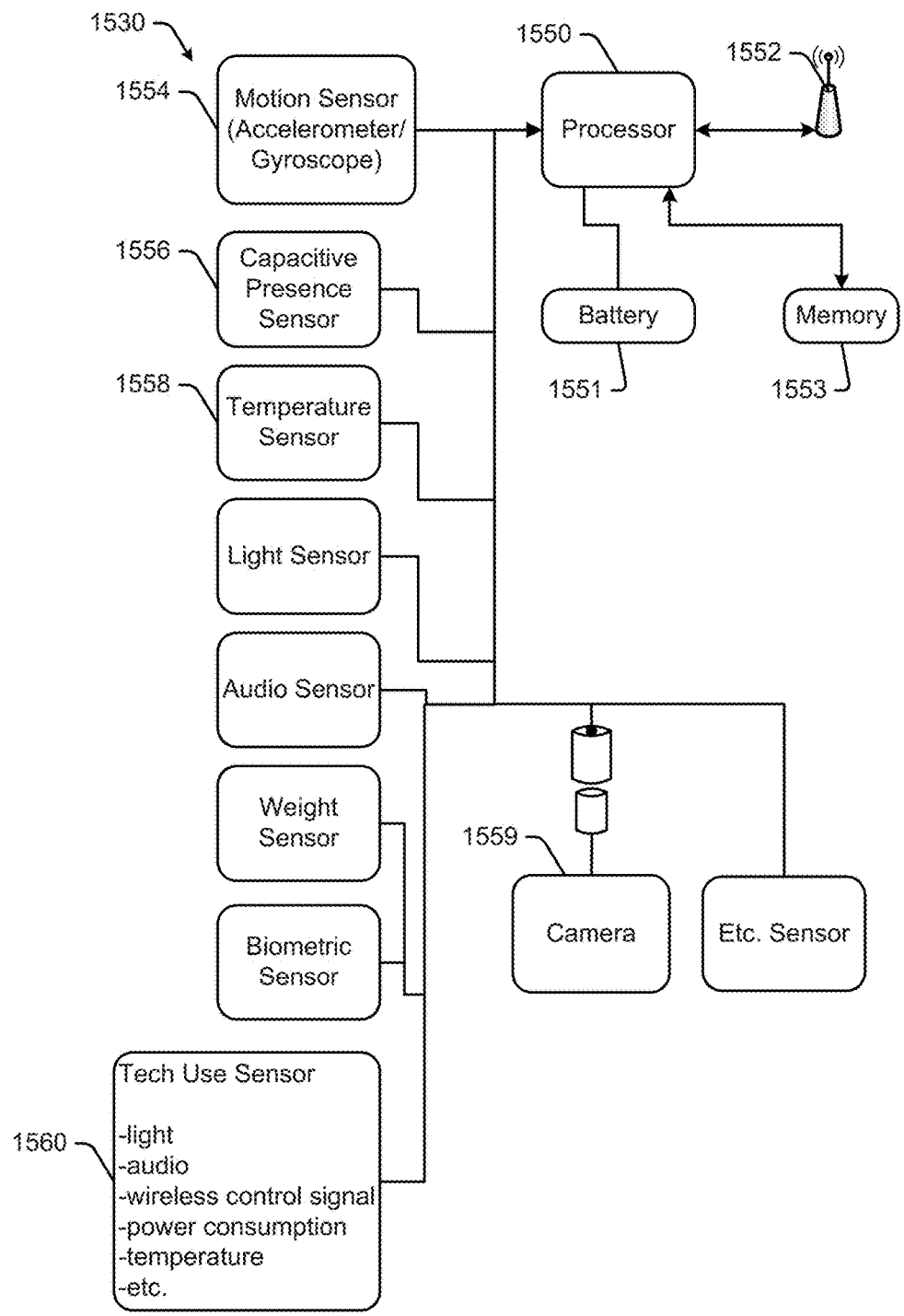
FIG. 60 is a schematic diagram of an exemplary multi-capability sensor device that is consistent with some aspects of the present disclosure.

Referring again to FIG. 59, one exemplary sensor device is shown at 1530. Device 1530 is similar to the sensor devices 40 described above but has some additional features. In the interest of clarity, device 1530 will be described here in some detail. Referring also to FIG. 60, device 1530 includes a processor 1550, a transceiver 1552 (e.g., transmitter/receiver), a battery or other power source 1551, a memory or storage device 1553 and a plurality of different sensor subassemblies or sensor components, four of which are labelled 1554, 1556, 1558 and 1560. While shown to have a large number of sensors, device 1530 may include any subset of the sensors illustrated as well as other sensor types that can be packaged in a small sensor housing. In other words, the FIG. 60 sensors are not exhaustive and device 1530 may include many more sensors of different types and, in some cases, even duplicative sensors of certain types. Unless indicated otherwise, camera sensor or camera 1559 will be considered optional and may be linked via a connector cable or the like when needed and allowed in at least some cases (e.g., where the sensor device is used in a public or common space within an enterprise).

The exemplary sensors shown in FIG. 60 include a motion sensor 1554 (e.g., an accelerometer and/or gyroscope or other motion sensing device), a presence sensor 1556, a temperature sensor 1558, a light sensor, an audio sensor, an exemplary biometrics sensor (may be any of dozens of different types or any combination thereof including but not limited to temperature, heart rate, blood pressure, perspiration, movement, identification sensor, etc.), a weight sensor, a technology use sensor 1560, and may include other sensor types. While not shown in FIG. 60, device 1530 would also include, in at least some embodiments, a clock and an indicator (e.g., LED light device, audio output device, etc.), similar to the components described above with respect to FIG. 5 and sensor device 40.

While different sensor devices 1530 may have different sensor capabilities in some embodiments, in at least some cases, it is contemplated that each sensor in a sensing ecosystem may be designed to have at least some standard set of sensing capabilities where sensor functions or features can be activated and deactivated when needed. Thus, an exemplary sensor device 1530 may be designed to have all of the sensing capabilities shown in FIG. 60 and more in some cases, where processor 1550 may be programmable to activate or deactivate any subset of the sensing functions at any time.

There are several advantages associated with standard multi-capable sensor devices 1530. First, it has been recognized that, in many cases, device processor 1550 and transceiver 1552 represent a substantial portion of the cost associated with a sensor device and that adding additional sensing functionality to a sensor device represents only a minimal additional cost while adding substantial additional capabilities.

Second, in many cases it is believed that ecosystem sensing requirements will evolve over time as more data is collected and more insights into how to use that data and other types of data evolve. For instance, a facility administrator and/or a system analyst may initially be interested in simply counting occupants in a conference space to track the number of people that use a space and when during the course of each business day. In this case, it may be that simple motion or presence sensing capabilities can yield data useable to track occupancy number. Over time, however, as additional insights into how different data types and subsets can be used to discern user states in a space, other sensor capabilities may need to be activated in order to drive the results consistent with the additional insights. For instance, user locations, orientations, flow states, attention, etc., may all be of interest and data needed to discern those user states may require other sensor capabilities. By providing multi-capable and controllable sensor devices where sensing functions can be activated and deactivated, data to drive new insights can be obtained when needed.

Third, where only one sensor device type or a small number of sensor device types (e.g., a first type with many sensor capabilities but no camera and a second sensor type with many sensor capabilities and a camera 1559 (see again FIG. 60)) are manufactured and inventoried, manufacturing and inventory management can be streamlined and simplified which should reduce overall costs of fitting out a sensing ecosystem.

Fourth, where one or a small number of sensor device types are available, installation and configuration of the sensing ecosystem can be simplified and costs reduced. Thus, for instance, a device installer may simply take 100 sensor devices to an enterprise space and start installing those sensors to pre-existing space fixtures and affordances without regard to which sensor type is mounted to which fixture or affordance. Because all sensors would be of the same type, any sensor may provide functionality required at any location within the ecosystem. Many other advantages of multi-capable and controllable sensor devices are contemplated.

In addition, it has been recognized that at least some sensor components (e.g., the presence sensor 1556) on a sensor device can be controlled or tuned differently to control their sensing capabilities to optimally fit required functionality. For instance, a capacitive presence sensor 1556 may be controlled so that the size of a presence sensing field associated therewith can be adjusted (e.g., changed from sensing within 6 inches to sensing within 3 feet). A light sensor can be controlled to compensate for the effects of changing ambient light throughout the course of a day or during different seasons of a year and an audio or sound sensor may be controlled to compensate for persistent ambient noise or sounds.

Consistent with the above, in at least some cases every sensor device 1530 may be fully equipped with each of a large set of sensing capabilities where device processor 1550 is programmable to turn sensing functionality on or off (e.g., activate and deactivate sensor components) as needed for different sensing tasks and to control sensing parameters or attributes (e.g., the size of a presence sensing zone, the zone in which audio is detected, etc.) optimally for different sensing tasks. Thus, for instance, each of 2,000 sensor devices 1530 in an enterprise facility may be equipped to sense 15 different parameters (e.g., light, sound, presence, movement, etc.) where any of the 15 sensing functions can be enabled or disabled and where sensing characteristics of five of the sensors can be adjusted to optimize for specific sensing tasks or to compensate for persistent ambient conditions. In at least some cases, sensor functions and characteristics can be set during an installation commissioning procedure.

In at least some cases sensor functions and characteristics can be controlled by server 1504 at any time to adjust the functions and sensing characteristics as needed on the fly for different sensing tasks (e.g., to generate data to drive different user state determinations) or to achieve different sensing goals. Automatic adjustment of sensing attributes may be based on any of a number of factors including but not limited to time of day, changes in season, data sensed by other sensors in the ecosystem (e.g., an ambient presence sensor may be used to wake up idle sensors in a conference space when a person is sensed by the ambient sensor), dynamic location of the sensor (e.g., a sensor on a task chair may be moved to various locations for temporary use and may be reprogrammed to collect different data in different locations to support different sensing and tracking and other more complex functions), who is using an affordance to which the sensor is attached or a space associated with the sensor (e.g., some employees may want to track certain biometric parameters and others may want to track a different set of biometric parameters), etc.

Referring again to FIG. 59, in at least some cases each sensor device 1530 may have a QR code 1531 or other visually or otherwise readable code applied to an outside surface of a sensor housing that can be used to obtain a unique identifier (e.g., a sensor ID) that is associated with the device 1530. A specialized code reader device or a portable computing device (e.g., a smart phone or tablet device 1516) that includes a camera may be used to read sensor device codes 1531. In the alternative, the code 1531 may be an RF ID device or other ID type device. While a code 1531 can be used at any time to identify a specific sensor device, the codes 1531 are particularly useful during a sensor commissioning procedure that will be described in detail below.

Referring still to FIG. 59, sensor devices 1530 may each include an adhesive applied to a rear or other surface so that the devices can be mounted to flat surfaces of any space affordances. As shown in FIG. 59, one device is applied to each of affordances 1508, 1509, 1512 and 1514. While a single device is applied to each of the affordances, in some cases two or more sensor devices 1530 may be applied to the same affordance. Thus, for instance, four capacitive presence sensing devices may be applied along and space apart along the front edge of a workstation tabletop so that presence at different locations along the front edge of the top member can be determined as opposed to general location at the station. As another instance, first and second sensors may be applied to a seat and a backrest of a single task chair, respectively, where the first device is activated to sense user weight and the second device is activated to sense user movement, respectively.

Referring again to FIG. 59, server 1504 manages several different ecosystem functions and runs software to perform the functions and to interface with different people that interact with the ecosystem in different ways. To this end, server 1504 has access to a database or digital storage device 1536 in which various types of data and applications/algorithms required to facilitate system functions are stored. The data includes, among other data, a system configuration specification that specifies sensor devices in the ecosystem and how each of those devices is configured (e.g., types of data sensed, interval of sensing, interval of reporting/transmission of data, generally referred to as sensor settings). The stored data also includes raw sensor data from each of the ecosystem sensor devices 1530. The data includes observations and conclusions based on the raw sensor data. For instance, an observation may be that, based on the raw data, there are five employees located in a conference space at a specific time.

A conclusion typically requires some type of synthesis in addition to simple observations and may be based on one or more observations as well as or in addition to a subset of raw data and/or based on other conclusions. For instance a conclusion may be that a specific conference room is utilized for its intended purpose 26% of the time during a one month period. Here, the server compares observations over the one month period to an intended use (e.g., to be used for three to five person meetings with telepresence link to at least one remote conferee) to generate the exemplary conclusion. Many other more complex observations and conclusions are contemplated and the results are stored as data in the database 1536.

In addition to storing observation and conclusion data, confidence factors may be assigned to each observation and/or conclusion that estimate or indicate how likely it is that the observations and conclusions reflect reality. For instance, in a case where the only data relied upon to determine the number of employees seated in task chairs in a conference space is motion data sensed for each chair, a confidence factor for a seated employee number observation may be relatively low (e.g., 2/10) as chair movement could simply reflect one employee bumping into several empty chairs. Here, if weight sensing in each chair were added to the motion sensing, the ultimate observation related to number of seated employees would have a substantially higher confidence factor (e.g., perhaps 8/10). Unless indicated otherwise, herein it will be assumed that confidence factors will be expressed as a number N where 10 is the maximum value for a confidence factor (e.g., a 2 confidence factor will indicate 2/10). Other confidence factor forms are contemplated and the one used here is only exemplary.

Referring still to FIG. 59, in at least some cases the data will also store anomalies that are detected within enterprise space. Here, an anomaly may include a set of data for which system algorithms have no way to generate an observation or a conclusion with a confidence factor above some threshold level. For instance, where sensors detect some activity in an enterprise space but system applications and algorithms cannot generate a reliable observation or conclusion based thereon, an anomaly may be automatically identified and stored in database 1536 to be examined by a system analyst.

Database 1536 also stores customer engagement data which can be used to track how often customers or service clients interface with the system server, which data the clients access, how the clients use the accessed data, etc. In addition, the customer engagement data may represent feedback from clients related to the data, observations and conclusions drawn by the server and may allow a client to suggest or render advisory observations and/or conclusions that an analyst may consider when subsequently examining system output. The customer engagement information may also specify how data is packaged and presented to clients like a space administrator that works for an enterprise.

Referring again to FIG. 59, the applications and algorithms stored in database 1536 include interface applications that provide various types of interfaces to different types of system users at different times. In this regard, different types of system users include an installation employee (hereinafter "an installer"), an enterprise administrator (hereinafter "an administrator"), a service provider analyst (hereinafter "an analyst") and a typical employee that uses (hereinafter "a user") the space and/or an enterprise affordance. In some cases one person may have two or more of the user roles described here. For instance, an installer may also operate as an administrator or an installer may operate as an analyst, etc.

An installer is a person responsible for installing sensor devices 1530 throughout enterprise facilities and for performing a sensor device commissioning procedure to instantiate the sensors within the overall ecosystem. Database 1536 stores interface applications used by an installer.

The database applications may also store logic that is used during configuration or commissioning to identify various functions and system algorithms that could be provided for enterprise spaces and to identify sensor placement and configuration options that are suitable for generating data needed to drive the various system algorithms or functions. Thus, for instance, in a case where a space includes only one workstation and an associated task chair, the system may only be able to support 5 different sensing functions while the system may be able to, if properly sensed, generate sensor data to support 50 different sensing functions for a conference space that includes 12 task chairs, three conference tables that can be arranged in different relative juxtapositions, three projectors, two electronic whiteboards, three thresholds, two lounge chairs, one sofa, etc. Here, an application may be able to use basic enterprise space and affordance data to identify all possible supportable functions and required as well as optimized sensor placement and settings to support all of the functions so that the server can suggest different options to a system analyst or designer or even to a sensor installer in some cases. In addition, the applications may include some capability to determine confidence factors associated with different sensor mixes and settings which can be presented to anyone using the system to help the users make better sensor ecosystem design and configuration decisions.

Once data is collected from sensor devices 1530, someone or something has to make sense of the collected data by making observations based on the raw sensed data and by generating conclusions based on the raw data and/or the observations. While sense making applications can automatically perform at least some or many calculations to generate observations and conclusions, in many cases an analyst may get involved to confirm the observations and conclusions at least periodically and to examine anomalies and other data, observations, conclusions and confidence factors to develop more observations and conclusions, eliminate observations or conclusions that do not seem to make any sense or to affirm or deny observations or conclusions in specific cases which can cause the system server to adjust or modify algorithms or to adjust confidence factors associated with specific algorithms so that the overall analysis of data for an enterprise becomes more robust and accurate over time. Database 1536 stores interface applications for use by an analyst and that are shown at 1545.

An administrator is typically an enterprise employee that is responsible for facility management, making decisions about facility affordances and space design, etc. Administrators may also provide feedback to the system server 1504 as part of the customer engagement function described above. Database 1536 stores interface applications for use by an administrator via a computing device like one of the devices 1516, 1518 or 1520 as shown in FIG. 59.

A space user is simply an employee that uses an enterprise space to perform daily work or other activities. In at least some cases an interface may be provided for a space user that encourages certain behavior and the type of encouragement may be based on the data from the sensor devices 1530. For instance, in a case where an administrator has decided that she wants every employee using enterprise space to stand periodically at their workstation for health reasons, sensors at a user's workstation may be used to determine when the user is present and whether or not the user is sitting or standing. Here, if a user sits for more than a threshold period of time, a signal may be provided to the user via a user interface at the workstation indicating that the user should stand. Other interface applications are contemplated.

Referring still to FIG. 59, database 1536 also stores a commissioning application program that is used to facilitate sensor device installation and instantiation where device operating features are set. Again, exemplary sensor device operating features include enabling or disabling sensor functions on a sensor device, setting sensing parameters (e.g., presence zone dimensions), setting sensing intervals and data transmission intervals, etc.

In at least some cases the commissioning algorithms can be used to reconfigure sensor devices after installation and operation in order to activate or deactivate various functions thereof, typically to optimize sensed data types required to increase accuracy of observations and conclusions or to support additional system algorithms. Thus, for instance, where a first sensor device on a first task chair in only initially enabled to sense motion, a system analyst or maintenance personnel may thereafter want to enable the temperature sensor and the weight sensor included in the first sensor device to obtain additional data for ascertaining if a user is currently sitting in the first task chair. A commissioning or reprogramming interface should enable the analyst to enable the additional sensing components and generate related data.

In at least some cases the system server 1504 may automatically employ a commissioning application or reprogramming procedure to reconfigure one or a set of the sensor devices 1530 for some reason. For instance, where five separate sensors are located within a specific enterprise space such as adjacent a front surface of an electronic whiteboard hung on a conference room wall, it may be that presence data generated by each or at least a subset of the sensor devices is redundant. In this case, even if all five sensors are initially programmed to periodically transmit presence data to server 1504, the server may recognize the redundant nature of the data received and may automatically reprogram one or more of the five sensor devices so that the device(s) stops reporting presence data. As another example, where each of 30 sensors in a conference space sense and report out temperature, where an algorithm for the conference space only requires ambient temperature generally, server 1504 may automatically reprogram 29 of the sensors so that they stop sensing and reporting out temperature. By turning off sensing and transmitting functionality, sensor device battery power can be conserved and network traffic can be reduced.

As another instance, server 1504 may be programmed to automatically identify different recurring periods of a day, days of the week or seasons during which sensing activities can be minimized or reduced through sensor device re-programming. For instance, each day between 7 PM and 6 AM it may be that essentially no one is located in an enterprise facility. In this case, if a sensor was initially programmed to sense motion and transmit motion data for a chair in the facility every second, after the server recognizes that no motion occurs at night over some threshold number of days, the server may automatically reprogram the sensors to only sense motion between 6 AM and 7 PM to reduce battery power consumption.

As one other instance, server 1504 may be programmed to automatically determine when an algorithm requires additional data from an existing sensor device within a space to support the algorithm. For instance, assume that a sensor device already exists within a single threshold into a first conference space and has been commissioned to detect only light intensity and generate associated light intensity data. Here, assume that an analyst decides that she also wants to set up the ecosystem to track number of employees in the first conference space at all times. Here, if the analyst indicates the new employee counting process, server 1504 may automatically reprogram the threshold sensor to sense presence or motion or temperature, etc., to generate data to feed an employee counting algorithm.

Database 1536 also stores sense making applications. A sense making application is a program that accesses raw sensor data in the database 1536 and generates observations and, in some cases, conclusions, automatically based on the raw data. In at least some cases a sense making application may also generate observations based on other observations or based on a combination of observations and raw data. In at least some cases a sense making application may also generate conclusions based on other conclusions, based on observations or based on raw data or based on any combination of raw data and observations and other conclusions. In many cases the output of the sense making applications is fed to the interface applications to drive the information that is presented to the different types of employees (e.g., analysts, administrators, installers, and users) that use the overall system.

Database 1536 further includes algorithm managing applications in at least some embodiments. As alluded to above, it has been recognized that as a sensing and tracking ecosystem is employed in an enterprise space, an analyst may be able to develop many additional and useful insights into observations and conclusions that can be drawn from sensed data. Here, it would be particularly useful for the analyst to be able to capture those insights in a meaningful way which can, in at least some cases, immediately affect how the overall ecosystem operates and the observations and conclusions that can be automatically generated based on sensed data. For instance, where a first algorithm generates output indicating a user sitting in a chair based on motion data from a first sensor device, an analyst may recognize that a sitting user can be more accurately identified by using both weight data and motion data from a single sensor device. Where both weight and motion data are already available, server 1504 may enable the analyst to manage the system to recognize a sitting user using both weight and motion data. While this is a simple example, the point here is that the algorithms and applications can, effectively, develop or progress over time and use to become smarter and more robust based on analyst input and via the algorithm managing application.

B. System Operation and Operating Interfaces

Referring again to FIG. 59, the system server 1504 performs, among others, several general functions using the data and applications stored in the database including device management as indicated at block 1534, customer engagement management as indicated at block 1538 and sense making as indicate at block 1540. Device management relates to sensor device commissioning, obtaining and storing data from the sensor devices, and reprogramming the sensor devices when needed.

Customer engagement management relates to managing communications between the server 1504 and customers or clients like, for instance, an enterprise administrator. Here, the idea is to present useful information to a client and, in at least some cases, the information may be manifest in two different ways including a dashboard tool generated by a dashboard engine 1542 and reports generated by a report engine 1544.

A dashboard typically includes one or a series of application output screens that present current status of the overall sensing and tracking system to a client. For instance, in some cases a dashboard may include a very simple summary output of current system status on a single display screen and may be accessible via a client's computer browser or some other type of interface device. As another instance, in some cases a dashboard may be more complex and allow a client to drill down into current data to see how that data has been generated, to assess confidence levels in observations and conclusions presented by the dashboard, etc.

In at least some cases the dashboard will also enable a client to provide feedback to the system that the server 1504 can memorialize for subsequent consideration by a system analyst. For instance, a client may, when reviewing a dashboard, identify some other event of interest that the client would like to have tracked such as, for instance, how often two employees are located at an electronic whiteboard at the same time or how often multiple whiteboards in the same conference space are used at the same time which may operate as tell tale signs that employees are collaborating or are working in small groups, respectively.

Figure 61:
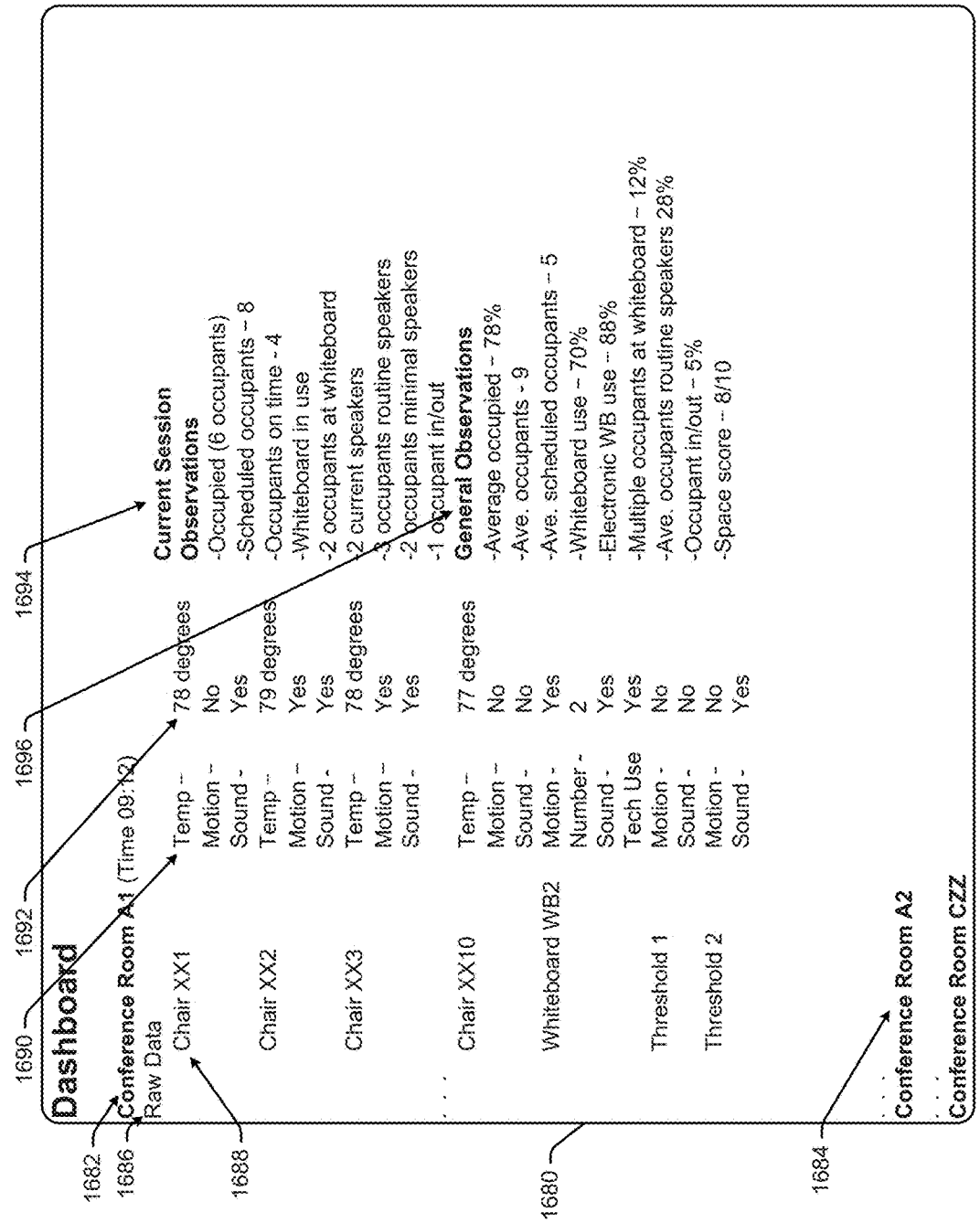
FIG. 61 is a dashboard interface that may be provided as output to a client or customer to report an instantaneous status of the sensing ecosystem.

An exemplary dashboard interface is shown in FIG. 61 at 1680. The dashboard is shown in a simplified form and, in most cases, would be much more graphical in nature, highlighting certain aspects for client consideration more readily and, perhaps, presenting other information for access on screen shots retrievable via hyperlinks or some other drill down interface tool (e.g., drop down menus). The dashboard is shown in a tabular format in the interest of simplifying this explanation. The exemplary dashboard 1680 includes a separate section for each space within an enterprise facility where first and second space sections are indicated by numerals 1682 and 1684. The first space is a Conference Room A1 and the related dashboard information includes raw data, automated current session observations and automated persistent observations.

Referring still to FIG. 61, exemplary raw data 1686 includes data for at least a subset of affordances in the first space where a list of affordances in the first space are shown at 1688. A separate list of sensed characteristics for each affordance in column 1688 is presented in a sensed characteristics column 1690. For instance, for a chair XX1 in the first space, the sensed characteristics include temperature, motion and sound and for a whiteboard WB2, the sensed characteristics include motion, number (e.g., persons adjacent whiteboard), sound and tech use (e.g., is the whiteboard currently in use). A column 1692 presents values for each sensed characteristic in column 1690.

Referring again to FIG. 61, a set of current session observations or user states for space 1682 is presented in tabular form at 1694 and a set of general observations is presented at 1696. Here, current observations include observations automatically generated by the system server 1504 running algorithms that process current session raw data (e.g., data collected during a recent period such as during a current meeting that is occurring in the first space) while general observations include observations generated by the server that correspond to longer periods of time such as, for instance, a week, a month, a 3 month period, etc. Again, observations are typically simple summaries of or simple conclusions related to subsets of the raw data as opposed to more complex synthesis of conclusions drawn from data and observations. While not shown, in at least some embodiments conclusions may also be provided via a client dashboard where the conclusions are either automatically generated via system applications or algorithms or where at least a subset of the conclusions are generated by a system analyst after the analyst considers data, observations and perhaps other conclusions. Also, while not shown, the dashboard may also present data, observations and conclusions associated with an entire facility or all facilities associated with a specific enterprise.

Referring again to FIG. 59, report engine 1544 generates more detailed reports about space and affordance use over extended periods like, for instance, a week, a month, a year, etc., that may include a mix of raw data, observations and conclusions based on the raw data and observations. In at least some cases conclusions will include prescriptive advice regarding optimal space and affordance updates, optimal changes to overall space layout and other information. For instance, here, a report may include a recommendation to replace old or dated task chairs in a first conference space if the first space is underperforming in relation to other spaces that have up to date seating affordances. As another instance, a report may recommend reconfiguration of an overall floor plan to add an additional coffee break station in the middle of a workstation space in order to increase overall level of activity and energy in that space generally. Many other recommendations may be generated.

Figure 62:
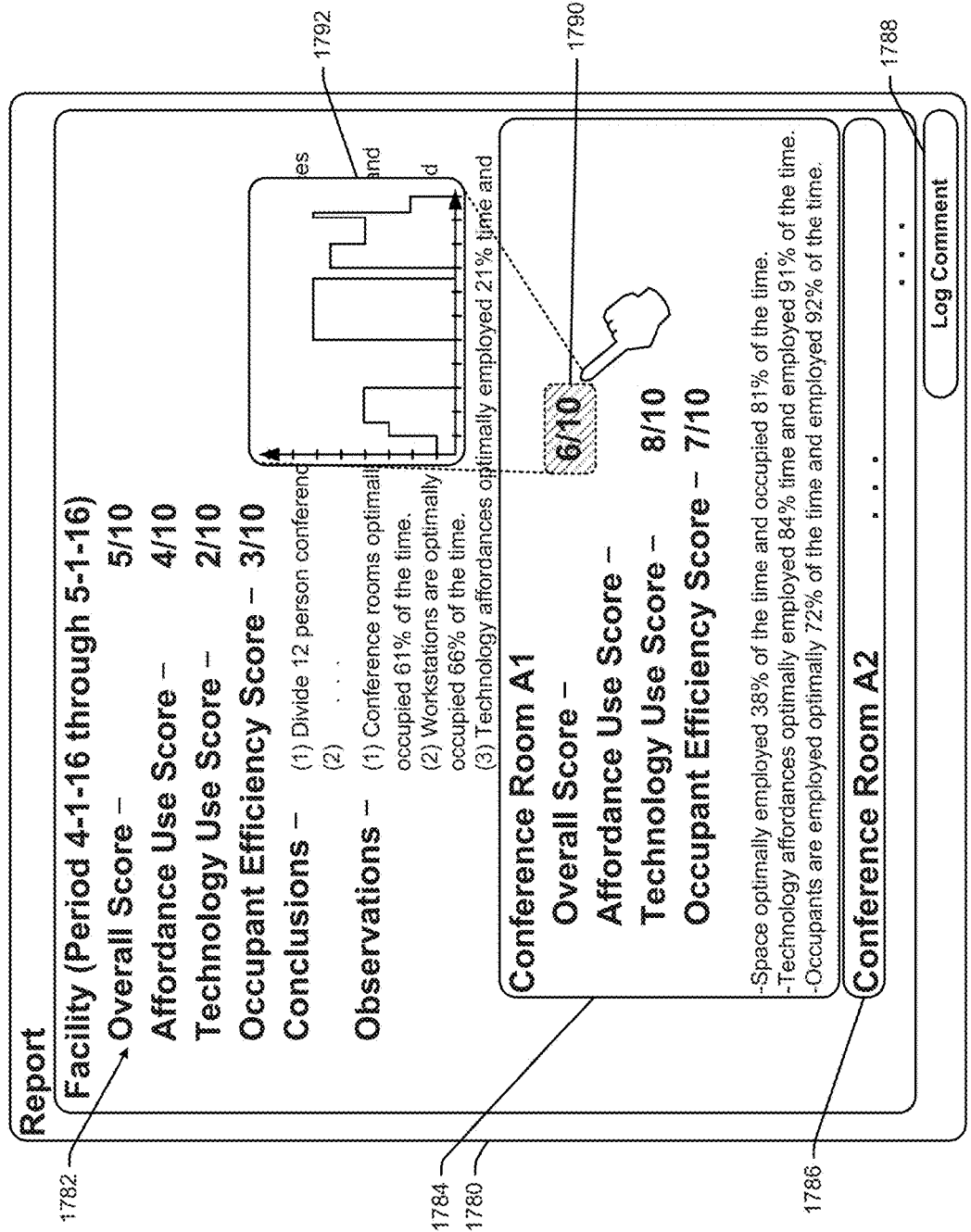
FIG. 62 is an image of an exemplary interface that presents a report to a system user where the report includes various types of information and, in particular, conclusions associated with sensed data in an enterprise space.

An exemplary report 1780 is illustrated in FIG. 62 and includes various information including information related to an overall enterprise facility at 1782 and information related to specific facility spaces at, for instance, 1784 and 1786. Many other data, observations and conclusions/recommendation types may be presented via a report. Here, the idea is that periodically or on a scheduled basis, a system analyst may examine facility data, observations and automated conclusions and may draw other conclusions and insights which may be captured and presented to a client in a more formal report which includes more prescriptive information than a typical dashboard. The exemplary report includes overall scores for a facility for a specified period (e.g., a prior month) as well as conclusions and observations. The report also includes separate information for each of various independent facility spaces. In many cases the presented information may be highlighted to indicate hyperlinks to more detailed information related to specific attribute values. For instance, see that a user has selected the overall score 6/10 for Conference Room A1 at 1790 which causes the server to present a graphical representation of the use of the space at 1792. A "Log Comment" button is presented at 1788 that may be selected by a client to log a comment (e.g., indicate other interesting things the client would like to track) for consideration by an analyst.

Referring again to FIG. 59, sense making includes two concepts. First, sense making relates to making sense of data already collected and observations automatically made by the system server. Second, sense making relates to changing the system to generate better data that can result in more robust and reliable results and changing the system to use data differently in automated algorithms. Regarding making sense of already collected data, the system presents one or more analyst interface/R&D tools 1545 for use by a system analyst that allow the analyst to view data and automated observations and conclusions and to confirm the observations and conclusions or to reject those observations and conclusions. Where the server assigns confidence factors to observations and conclusions and an analyst confirms an observation or conclusion, the system may automatically increase the confidence factor associated therewith so that future observations and conclusions based on the same algorithm or software application are automatically recognized as more reliable (e.g., have a higher confidence factor assigned). In a similar fashion, the system may automatically decrease the confidence factor associated with an observation or conclusion so that future observations and conclusions based on the same algorithm or application are automatically recognized as less reliable.

Figure 63:
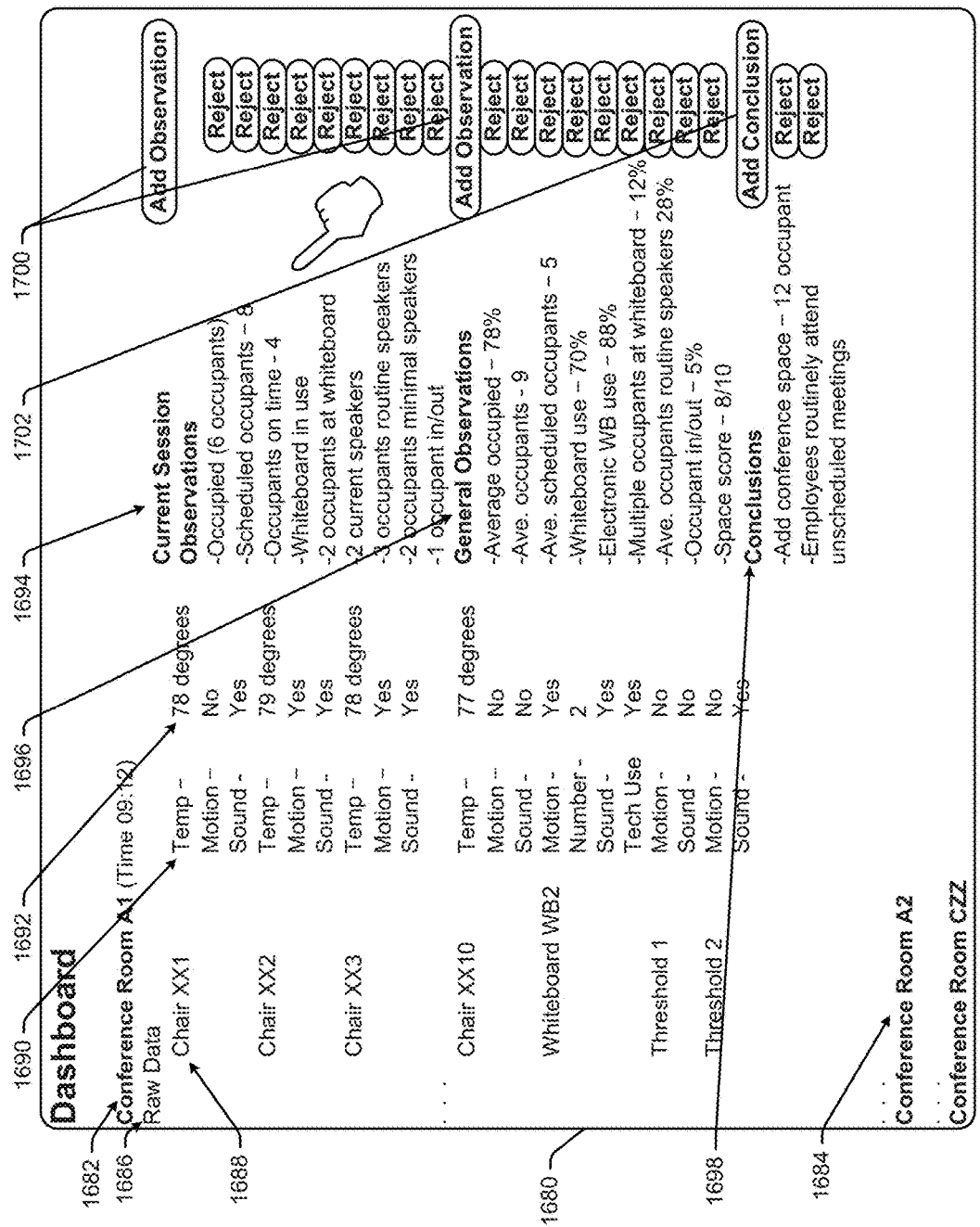
FIG. 63 is a dashboard interface image similar to the image shown in FIG. 61, albeit for presentation to a system analyst that can add additional observations and conclusions and that can reject existing observations and conclusions.

Interfaces presented to an analyst may be similar to the interfaces presented to a client, except that the analyst interfaces may include tools for an analyst to reject or accept observations and/or conclusions. To this end, for instance, see FIG. 63 that shows a dashboard type interface that may be presented to an analyst where the dashboard includes, in addition to the information shown in FIG. 61 (e.g., the client's dashboard), a set of conclusions at 1698 and, for each current session observation or general observation or conclusion, a separate "Reject" button that is selectable to reject the associated observation or conclusion. In the illustrated case, if an observation or conclusion is not rejected, it is assumed that the analyst accepts the observation or conclusion.

In at least some cases it is also contemplated that the system will facilitate an analyst adding additional observations and/or conclusions to the system. To this end, it has been recognized that, in many case, as an analyst views raw data, observations and in some cases also rendered conclusions, the analyst may identify other observations of interest or conclusions that can be drawn from the analyzed information. For instance, where a 12 person conference space is used 90% of a typical working day but only has an average of 2 people in the conference space during the day, one conclusion may be that at least one and perhaps more three to four person conference spaces should be built out because it is likely that other small group meetings are not being had in conference spaces due to overbooking. Here, recognizing the overbooking condition, the analyst may prescribe a conclusion that more small conference spaces should be built out.

Figure 64:
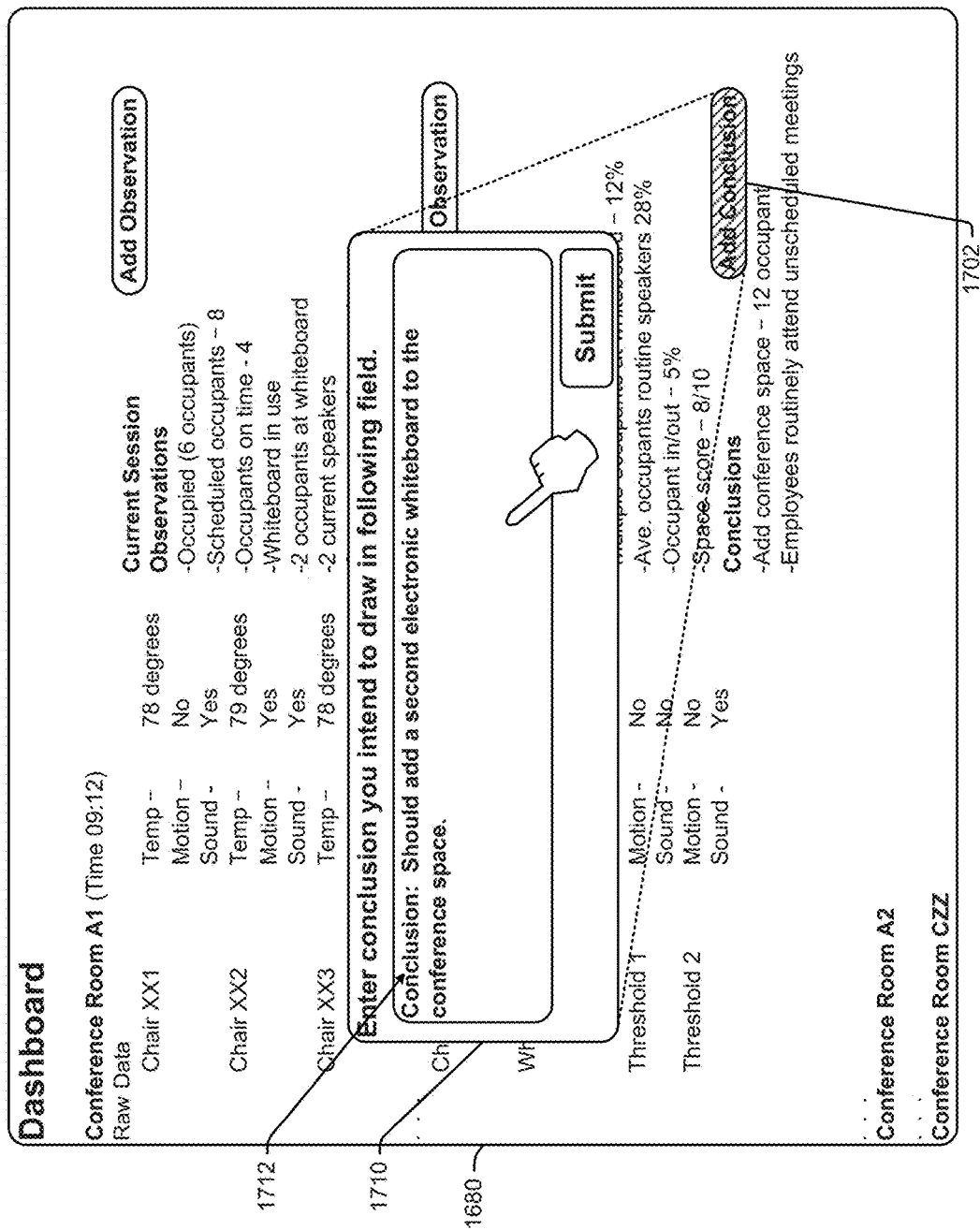
FIG. 64 is similar to FIG. 63, albeit further including a field in a pop up window that enables a system analyst to enter an additional conclusion based on the data reviewed by the analyst.

Referring again to FIG. 63, to enable an analyst to create a new observation or conclusion, the analyst dashboard includes "Add Observation" and "Add Conclusion" buttons 1700 and 1702, respectively. When one of the buttons 1700 and 1702 is selected, a window opens up to provide tools for the analyst to enter a new conclusion. For instance, see in FIG. 64 that when the Add Conclusion button is selected, a window 1710 opens up that provides instructions to an analyst to enter a new observation or conclusion to be stored with the data, observations and other conclusions for Conference Room A1. The window 1710 includes a field for entering the new conclusion as well as a "Submit" button for submitting the new conclusion to the system for storage. In at least some cases, when a new conclusion or observation is submitted, server 1504 may simply store the new conclusion as part of the data record to be presented to a client upon accessing a client dashboard or report and for subsequent access by the analyst. Here, the new conclusion may simply be stored and may not affect subsequent operation of the overall system in the sense that the conclusion may not be automatically drawn by a system application for similar conditions in the future.

In other cases, when an analyst enters a new conclusion or observation, the system may automatically query the analyst for data, observations or other conclusions that support the new conclusion or that justify the new conclusion so that a new algorithm for generating the conclusion can be specified for automatic subsequent use by the server. For example, if, upon reviewing raw data, the analyst decided that two observations based on the raw data support the new conclusion, the analyst would be able to identify the two conclusions as well as threshold values related to the conclusions that should be met to generate the new conclusion in the future. To this end, see FIG. 65 which may be presented to the analyst when the new conclusion is submitted in FIG. 64.

In FIG. 65, the new conclusion is represented in field 1722 and instructions for selecting the data, observations, etc., that support the new conclusion are presented at 1720. The exemplary instructions indicate that the analyst should select the data, observations, etc., from the report that support the new conclusion and, here, it may be that when data is selected, the selected data is highlighted (see 1724, 1726) within the report to help the analyst keep track of selected supporting information.

In some cases, when specific data, observations, etc., are selected, values associated with the specific conditions represented by the report may be used as requirements to generate the new conclusions. For instance, in FIG. 65, values include 70% and 88% whiteboard use and electronic whiteboard use, respectively and in that case, the 70% and 88% values may serve as requirements for the new conclusion in field 1722 to be rendered. In other cases the values 70% and 88% may be used as lower or upper thresholds for use in the justifying algorithm (e.g., the whiteboard use has to be 70% of the time or more and the electronic whiteboard use has to be 88% of the time or more).

Figure 66:
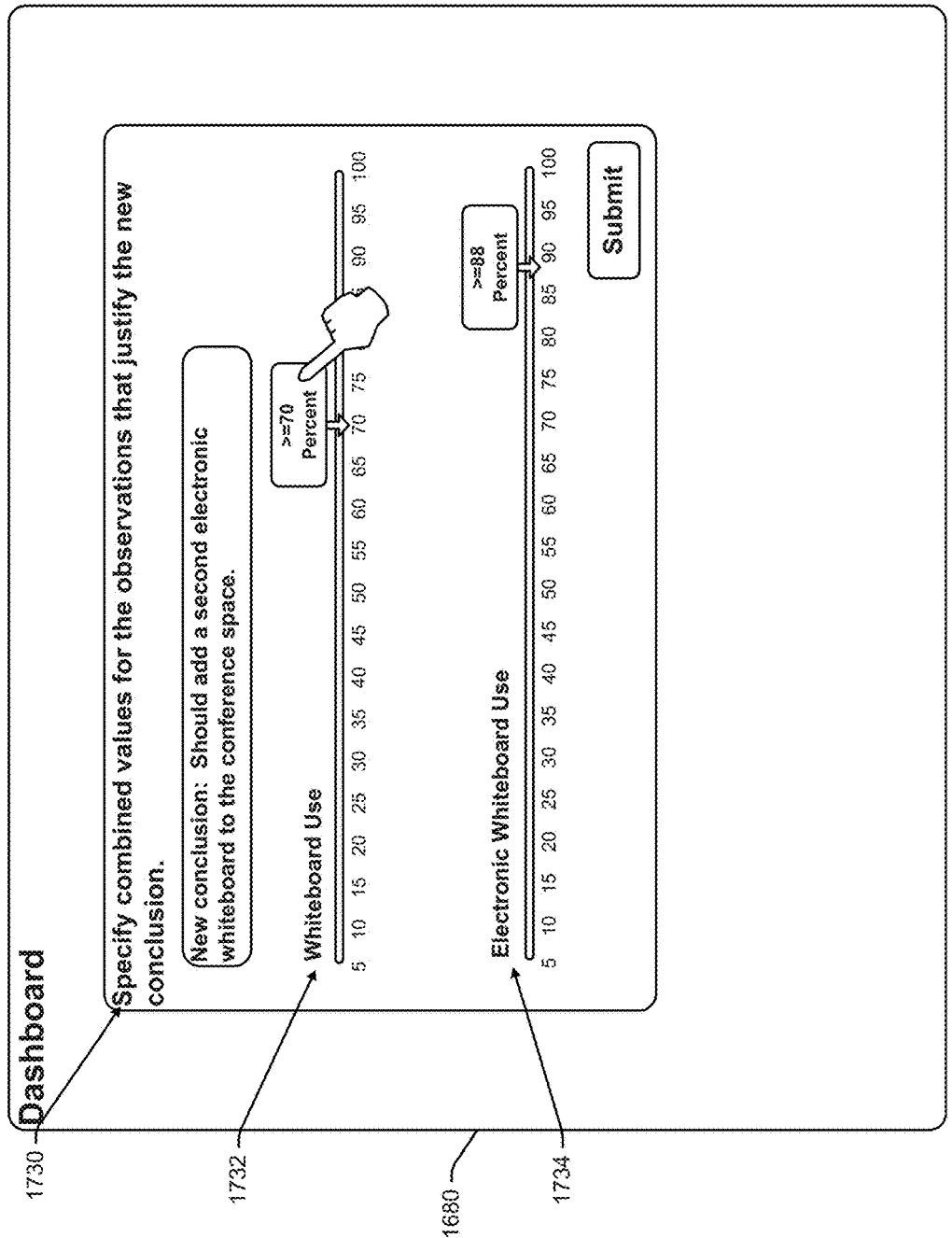
FIG. 66 is an interface where, after the analyst has indicated data, observations and conclusions that should be used to support the new conclusion entered using the FIG. 64 interface, the analyst is queried to set attribute thresholds or values for at least a subset of the supporting information that should be met for the new conclusion to be made subsequently.

In still other cases after data types, observation types, etc., that justify a new conclusion are indicates in FIG. 65 and the selections are submitted, the server may query the analyst for the justifying value thresholds for each data type associated with the new conclusion. To this end, see FIG. 66 where a window for specifying justifying thresholds for whiteboard use and electronic whiteboard use are shown at 1732 and 1734 along with instructions for selecting the thresholds. As shown, in at least some cases initial settings for the selected data or observations may reflect values from the report (see again 66). Here, an analyst may be able to select the setting and slide the setting left or right to change the selected threshold value. The analyst then selects the submit button to submit the selections to the server for creation of a new algorithm for rendering the associated conclusion.

Figure 67:
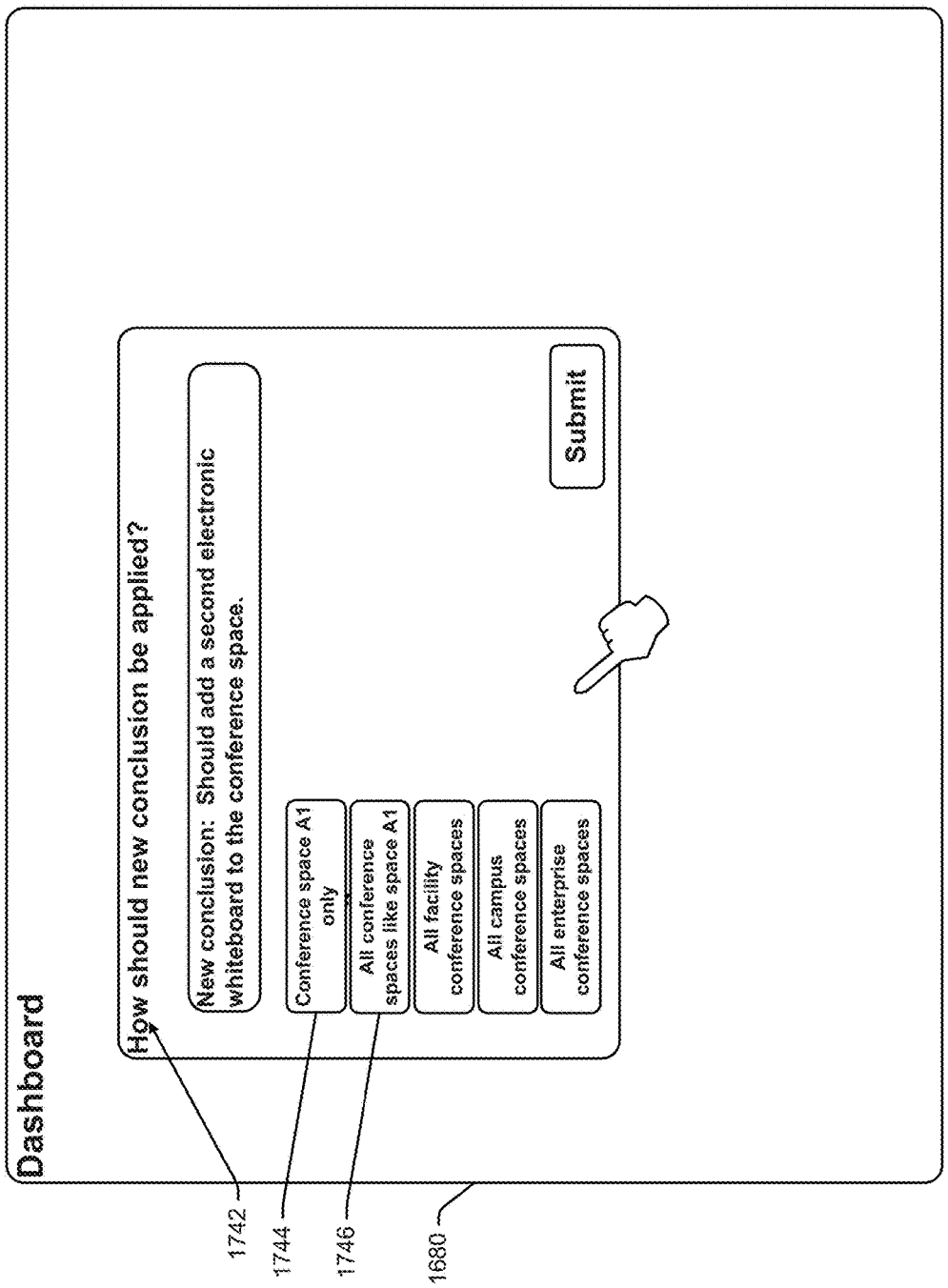
FIG. 67 is an interface where an analyst can identify how the new conclusion entered via the FIG. 64 interface should be applied in the future.
Figure 68:
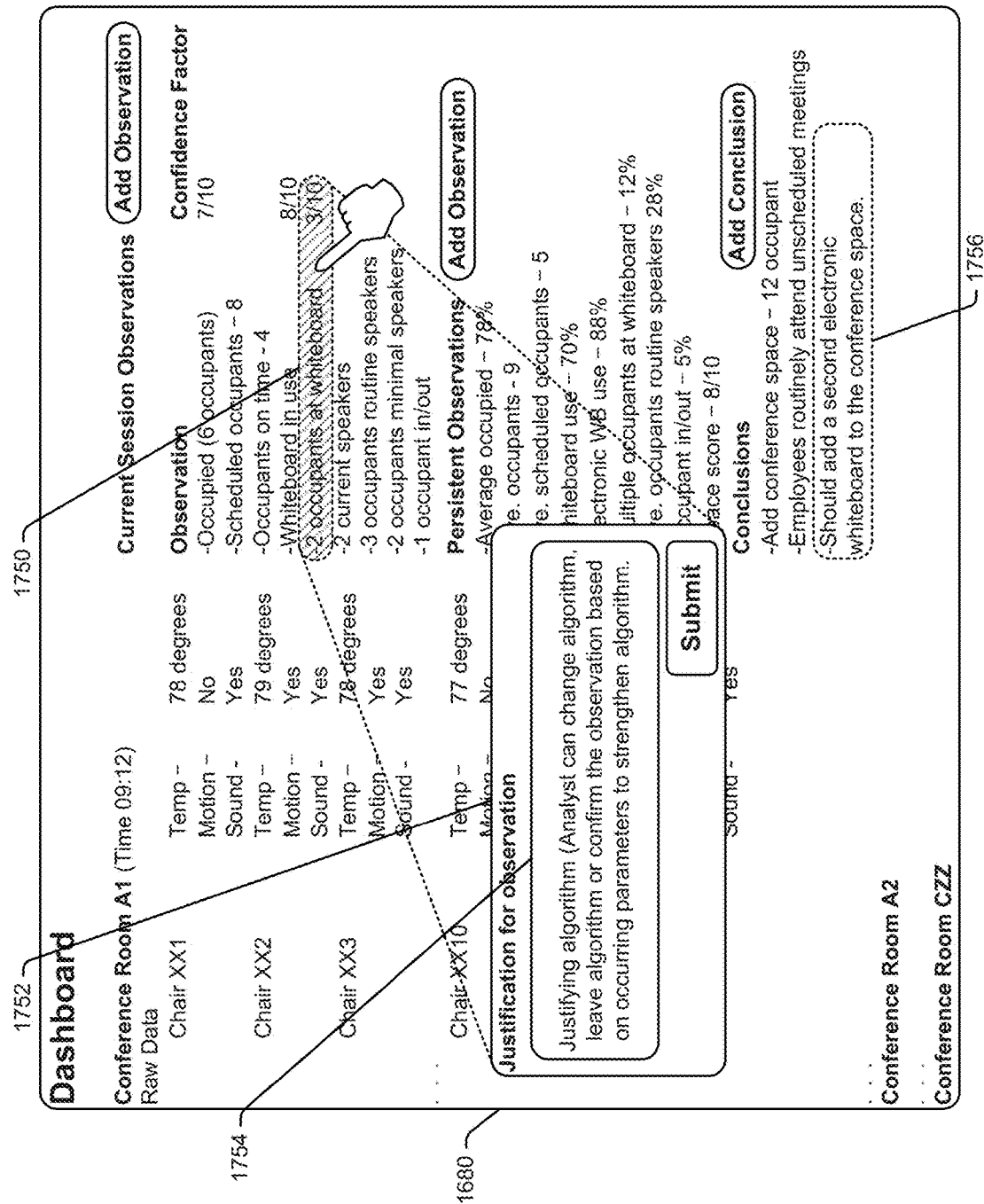
FIG. 68 is an interface like the FIG. 64 interface, albeit where a pop up window presents justification for an existing observation which can be modified by an analyst if the justification can be strengthened in some fashion.

Once the conclusion, supporting data, observations and threshold values have been specified, in at least some cases the system may query the user as to how the new conclusion and associated application should be applied. To this end, see FIG. 67 where instructions are presented at 1742 and where options for applying the new conclusion are presented as selectable buttons at 1744, 1746, etc. As shown, application options include applying the new rule to only Conference Space A1, all conference spaces like Conference Space A1, all facility conference spaces, etc. Here, for instance, if the new algorithm for the new conclusion is to be applied to only space A1, the new algorithm would be applied to space A1 from that point on and the conclusion would be presented in records and dashboards for space A1 any time the thresholds specified by the algorithm are met. Where the algorithm is to be applied for all spaces that are like space A1, if there is a comparable space that is sensored in the same way as the space A1 or in a way where the algorithm can be at least substantially applied, the algorithm would be applied for that type of space in addition to space A1. See FIG. 68 where the new conclusion has been added to the analyst's dashboard at 1756.

In at least some cases an analyst may be able to use a dashboard to access and modify an existing algorithm or application that yields an observation or a conclusion. To this end, see FIG. 68 where an analyst has selected an existing observation which is shown highlighted at 1750 and where the server 1504 opens up a justification window 1752 and presents justification for the observation in a field 1754. While only shown textually, it is contemplated that the data and observations and associated values that make up the rule/algorithm that yielded the selected observation at 1750 would be presented in field 1754. In addition, it is contemplated that an analyst may modify the justification algorithm within the field 1754 in some way. For instance, tools for changing data or other observations that are included in the algorithm may be presented as well as tools for changing thresholds or other values that are factored into the algorithm. Thus, an analyst can confirm or reject observations and conclusions, can create new observations and conclusions and associated algorithms and applications, and can modify existing conclusions, observations and associated algorithms and applications using the analyst interface.

C. Commissioning Procedure

As described briefly above with respect to FIG. 59, in at least some embodiments the system server 1504 may run a commissioning application program to help an ecosystem installer place and configure sensor devices 1530 throughout enterprise space in an optimized fashion. To this end, it has been recognized that there may be several different algorithms based on different sensed conditions in space that can be used to render observations where, while several algorithms render the exact same observation or very similar observations (e.g., occupancy count is 9 or that four employees in a space are participating in a single employee presentation as opposed to egalitarian content generation, etc.), the confidence factors associated with each rendering may be substantially different. For instance, in a simple case a simple algorithm may track motion through an egress into a conference space to count number of occupants in that space while a more complex algorithm may track task seat movement of each of 12 chairs in the space as well as movement through the egress to generate a more reliable occupant count. In this case, one motion sensor in a threshold can yield the less reliable count whereas 13 or more sensors, one in the threshold and 12 or more on the chairs would be required to yield the more reliable count. Several other more complex algorithms that require data from many more sensors may be able to generate even more reliable occupant count data for the space.

Thus, it has been recognized that, in at least some cases, where certain sensing functions or tasks have been expressed for an entire enterprise space or for each of a subset or all independent enterprise spaces, the system server may generate and store a sensor configuration specification that includes a minimum sensor placement (hereinafter a "MinSP") map as well as a maximum sensor placement (hereinafter a "MaxSP") map, each indicating sensor placements and how each sensor should be configured including parameters that should be sensed and when sensing should occur (e.g., intervals) and transmission intervals for transmitting the data to the server. Here, the MinSP map indicates the minimum sensor placements required, typically to support the least reliable algorithms and the MaxSP map indicates the maximum sensor placements required, typically to support the most reliable algorithms. Here, while a MaxSP map is contemplated, an installer would typically be free to install additional sensors in a space to provide redundancy when needed or desired for some reason. Where redundant sensor devices are installed, the system server may simply ignore data received from a redundant sensor or may control the redundant sensors to effectively turn those sensors off to conserve battery power until needed.

During sensor installation, in each enterprise space, the system server 1504 may present clear instructions to guide an installer to install the optimal number of sensor devices according to the MaxSP map. In the alternative, the server may enable the installer to determine the number of sensor devices to install with the caveat that at least the devices specified in the MinSP map be installed and instantiated. Where there are intermediately reliable algorithms that achieve the user state sensing and tracking requirements for a space, the system may also present the installer with other sensor placement options that require an intermediate number of sensor devices assuming the installer continues to indicate a desire to install additional sensors in a space.

Figure 69:
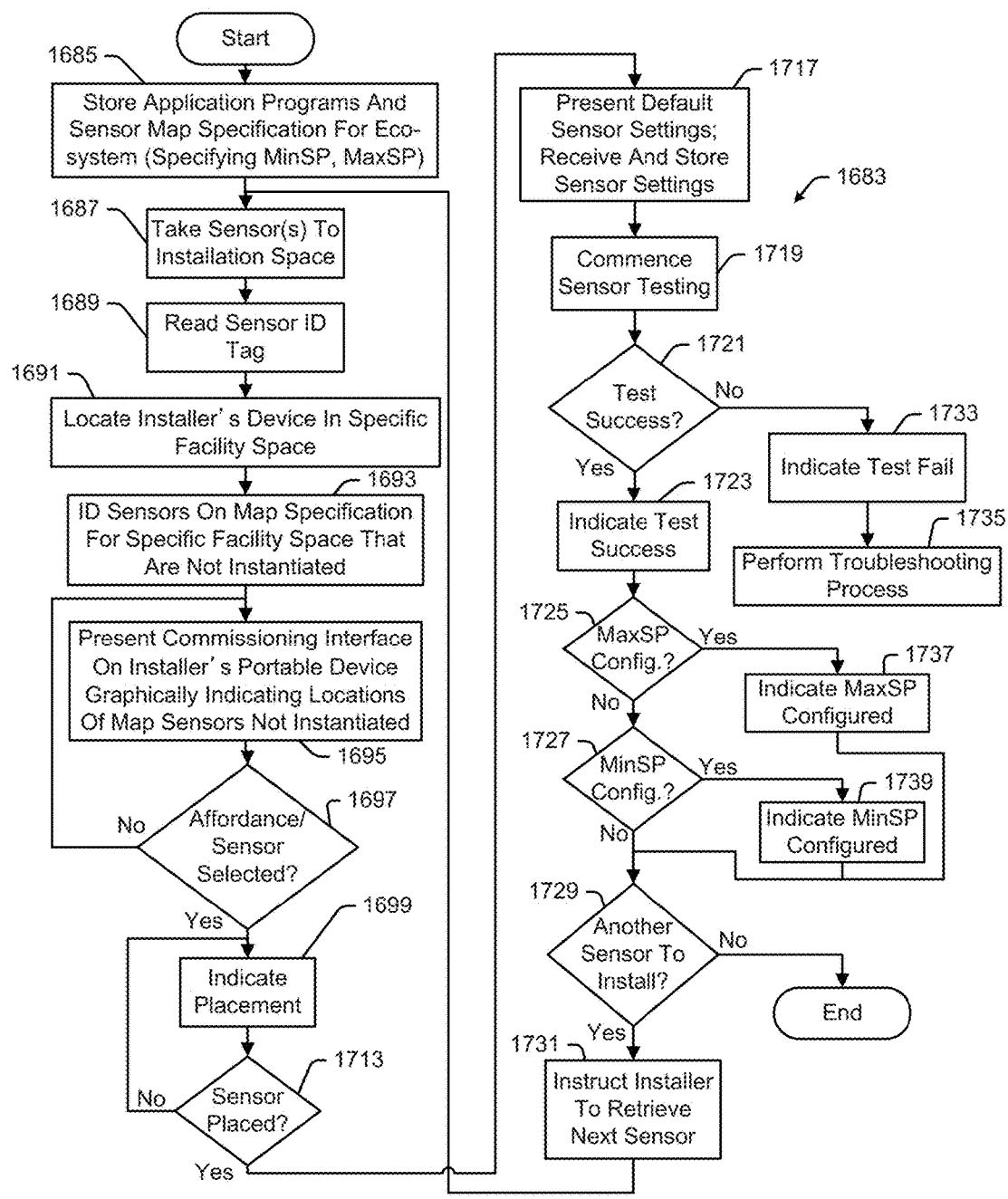
FIG. 69 is a flow chart illustrating a sensor commissioning process or method that is consistent with at least some aspects of the present disclosure.

Referring now to FIG. 69, a sensor and sensor system commissioning process 1683 that is consistent with at least some embodiments and aspects of the present disclosure is illustrated. At the beginning of the process, at block 1685, application programs and a sensor map specification for a sensing ecosystem are stored in a system database 1536 (see again FIG. 59). Here, as described above, in at least some cases it is contemplated that the system server 1504 may be programmed to automatically examine enterprise spaces and affordances located within those space and to identify sensing, tracking and other more complex statistical functions that may be associated with each space. Here, enterprise space defining data may be obtained from some other software application or a space specifying system that indicates space layouts as well as affordance placements within the spaces. The server would use a function/sensor requirements specification to identify all functions that can be performed for each space/affordance arrangement. Then, for each space and associated possible functions, the server may be programmed to generate MinSP and MaxSP sensor requirements including sensor placements and sensor programming required for each function. The MinSP and MaxSP specifications may then be stored at 1685.

For example, in the case of a conference room that includes a single conference table, ten task chairs typically arranged about the table, one electronic whiteboard and a projector supported on a credenza, a set of ecosystem defining rules may be used to identify 15 different sensing functions that make sense in that specifically afforded environment. Then, for each of the 15 functions, there may be four different sensing algorithms that yield the same or a similar result where each algorithm that yields a similar result requires data from a different set of sensor devices or a differently enabled set of sensor devices, some algorithms requiring more data and some requiring less data or sensor points. Here, a MinSP for each function may be identified and a MaxSP for each function may be identified. Then, as functions are enabled within a space, an analyst, administrator or installer would have the option to configure and instantiate or program at least the MinSP sensor set and attribute requirements, or the MaxSP sensor set and attribute requirements, or either of the other two sensor sets and attribute requirements associated with the other two of the four algorithms associated with each function. Where, for instance, 10 of the fifteen different possible sensing functions are enabled for a space, a cross section of the sensor sets and related attribute requirements needed for each of the 10 functions would be identified and used to specify MaxSP and MinSP requirements to support the 10 functions. Here, for each of the 10 functions to be supported by the sensing ecosystem, a user (e.g., installer, administrator, analyst, etc.) may select any of the possible four algorithms to yield results. For instance, MinSP requirements may be specified for five of the 10 supported functions while MaxSP requirements are specified for two of the 10 supported functions and other intermediately complex sensor placement and attribute configuration requirements may be specified for the remaining three of the 10 functions to be supported.

In the alternative, a programmer or ecosystem analyst may be able to specify space functions and sensor requirements in a more manual way by, for instance, accessing an enterprise space map, using a programming tool to generate functional algorithms that require sensor data from the space and then specifying sensors, sensor placements and sensor settings for the space that are required to drive the algorithms. In still other cases a server 1504 may be programmed to perform a hybrid sensor map specifying process whereby the server generates initial maps based on prior developed functional algorithms and space and affordance specifications where a programmer can then change sensor placements and attribute settings as preferred.

Herein, it will be assumed that a sensor installer (e.g., an employee charged with installing and commissioning sensing devices within a sensing ecosystem) uses a portable personal computing device to perform the installation and commissioning processes. The installer's portable device may, for instance, include a laptop computer, a tablet type computing device, a smart phone, a smart watch, or other wearable device, or other types of portable computing devices and, in at least some embodiments, will be equipped with a wireless transceiver, a processor, a memory, a camera and/or other data collection device that can be used during the commissioning process. Unless indicated otherwise, hereafter the installer's device will be described as a tablet type computing device like an Ipad or similar device in the interest of simplifying this explanation. To this end, see the exemplary installer's tablet type device 1516 shown in FIG. 70.

Referring again to FIG. 69, an installer may take a supply of sensor devices to an enterprise space with the intention of installing sensors in that space. Here, the space may already include a set of installed sensor devices or may not yet include any installed devices. When the installer arrives in the enterprise space in which she intends to install a sensor device at block 1687, she accesses a sensor device installation application on her device 1516 and uses the device 1516 to read a tag on one of the sensors at 1689. Here, the tag may take any form including a passive bar code, dot matrix code or other passive type tag that is machine readable or may include an active tag or identifier like an RF ID tag placed on the outside of the sensor device that can be interrogated by the installer's device. In the alternative, as the sensor device includes a processor, a transmitter and a memory, the tag may take the form of identifying data stored in the sensor memory device that can be transmitted upon interrogation by the installer's device 1516. In any event, the installer reads the sensor identifying tag data using her device or otherwise enters sensor identifying information (e.g., an ID number that may appear in human readable form on an exterior surface of the sensor housing).

At 1691, the system server 1504 performs a wireless signal triangulation method (e.g., using strengths of signals from wireless access points within the enterprise space proximate device 1516) or some other process to identify the location of the installer's device within one of the enterprise space (e.g., within a specific conference room). At 1693, the server identifies sensors on the map specification for the space occupied by the installer that have yet to be installed and, perhaps, locations of already installed sensors. At 1695, server 1504 presents a commissioning interface on the installer's device that graphically shows a map of the installer's current location and that indicates sensors in that location that still have to be installed.

Figure 70:
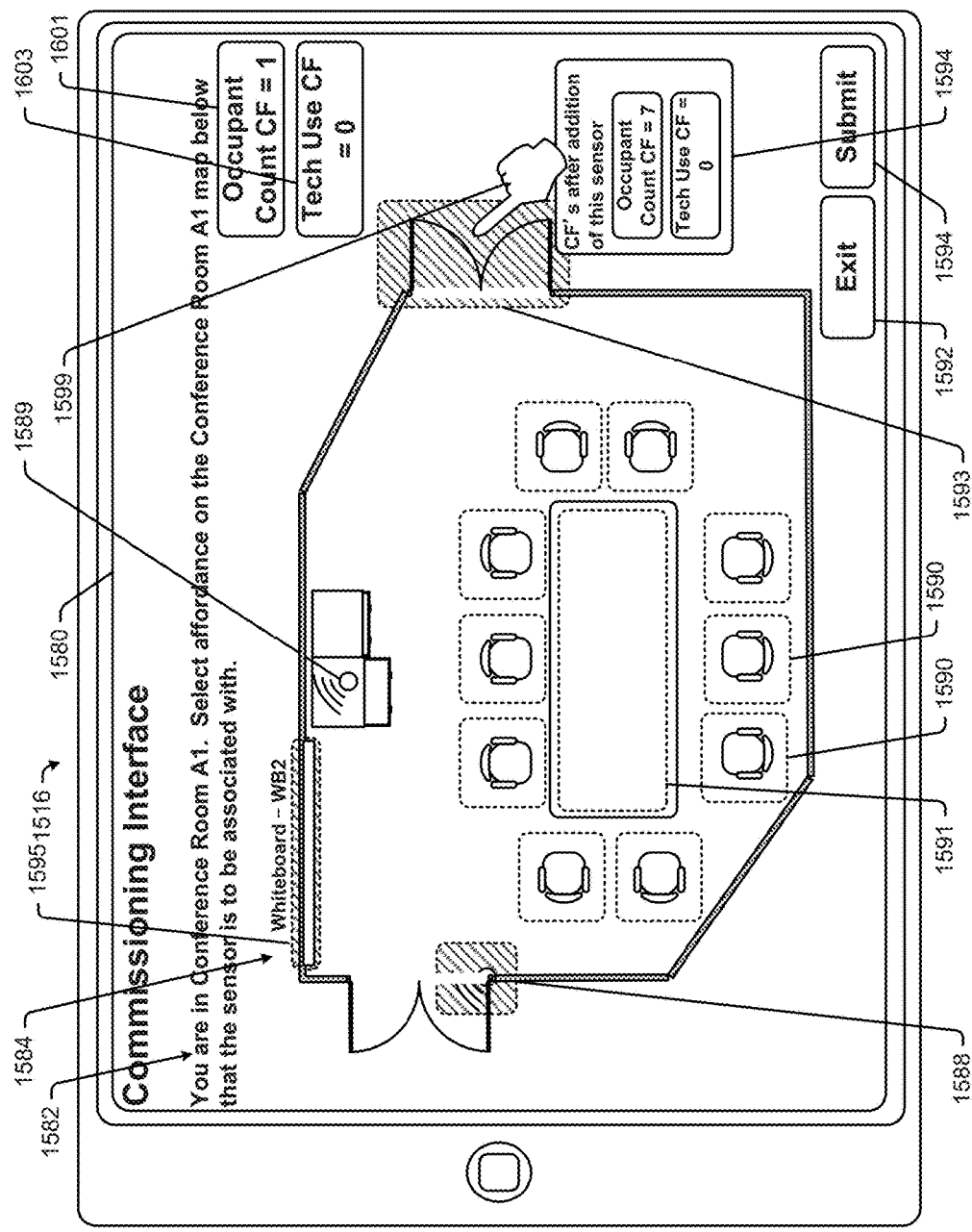
FIG. 70 is a an installer's interface that shows an installer a map of a space currently occupied by the installer along with guidance for where within the occupied space additional sensor devices may be or should be installed.

An exemplary simplified top plan view of a map for an enterprise space is shown as part of an installer's interface 1580 in FIG. 70. The exemplary installer's interface includes information indicating the installer's current location within the enterprise as well as instructions for initiating a sensor commissioning process at 1582. The exemplary information indicates that the installer is currently located in Conference Room A1 and instructs the installer to select an affordance on the map to which the sensor being installed is to be attached. The top plan view map at 1584 may include indications of sensors that have already been installed in the space as well sensors that, based on existing algorithms that could be or are associated with the space, could be added to or enhanced for the space. For instance, see in FIG. 70 that two icons 1588 and 1589 are shown as already installed sensors, one associated with a threshold entry into the space and the other associated with a credenza that supports a projector that is located within the space. See also that phantom boxes 1590, 1591, 1593 and 1595 are presented on the map 1584 to indicate other affordances and locations within the illustrated space at which sensors can or should be installed to support system algorithms. The boxes include a separate box associated with each of ten task chairs located in the space, two of which are labeled 1590, a box associated with a conference table at 1591, a box associated with a second threshold into the space at 1593 and another box associated with a whiteboard at 1595.

In at least some cases affordances that sensors can be attached to may be moveable such as, for instance, in the case of a chair or a cart mounted display screen or telepresence system. In these cases, the portable affordances may simply be shown in default positions on the space map 1584 such as, for instance in the case of a task chair, a default location adjacent the edge of a conference table, despite the chair being at some other location (e.g., stored against a wall) in the space. Default locations may be required as, in many cases, the system will not track exact locations of moveable resources in enterprise space and therefore there would be no way for the system to determine exact affordance positions. Here, the system may simply track number of chairs in the mapped space in some fashion so that the affordance representations on the map can be accurate in number.

In other cases it may be that specific chair positions as well as the positions of other mobile affordances within an enterprise space can be determined by the system server and therefore the interface may present a top plan view of the map that shows the chairs and other mobile affordances in their instantaneous positions within the mapped space. In some cases the position of the installer in the mapped space may also be indicated on the interface. Here, as the installer moves toward a chair or other affordance within the space with the intention of installing a sensor device, the installer observes the indication of her location on the mapped space moving toward the chair and therefore has a sense of which chair on the mapped space she is near.

As described above confidence factors may be assigned to function or algorithm results and, in at least some cases, confidence factor values will be affected by the number and types (e.g., what each sensor is sensing) of sensors installed within a space and sensor settings. For instance, simple threshold motion sensors may generate space occupant counts having a relatively low confidence factor but when combined with motion and weight sensing in each task chair in a space the occupant count confidence factor may be substantially higher. In at least some cases the installer's interface will include expected confidence factor information based on currently installed and instantiated sensors within the space occupied by the installer. For instance, see in FIG. 70 that occupant count and technology use confidence factors or expected factors are presented in labelled fields 1601 and 1603, respectively. As shown, the factors are relatively low at the instant presented which should be expected as only a small number of sensors (e.g., 1588, 1589) have been installed in the space and many others are suggested by the phantom boxes.

Referring still to FIG. 70, in at least some cases it is contemplated that the server will be able to assess how each additional sensor would affect each of the calculated confidence factors and may use that information to provide configuration feedback or guidance to the installer. For instance, in some cases if an installer touches one of the affordances within one of the phantom boxes on interface 1580 in FIG. 70, the interface may indicate how installation of a sensor on that affordance is expected to change each of the confidence factors in fields 1601 and 1603. In some cases the confidence factor values in the fields 1601 and 1603 may be changed temporarily to reflect how addition of the sensor would affect the values and once the installer stops touching the affordance box, the factor value would revert back to its prior value. In other cases when the installer touches one of the phantom boxes associated with an affordance, a pop up window may be opened to indicate the effect that an associated sensor installation would have on the confidence factors. To this end, see the exemplary pop up window shown at 1605 in FIG. 70 that shows CF values that should result after a second threshold sensor is installed.

In some cases the system server may track which uninstalled sensor on the presented space map would have the greatest impact on CF values or other metrics associated with system functions and may provide guided sensor installation information to the installer to encourage the installer to install the most impactful sensors first followed by less impactful sensors. Thus, for instance, referring again to FIG. 70, clearly a second threshold sensor at affordance 1593 would have a greater effect on occupancy count sensing than a single task chair sensor and therefore, if occupancy sensing was the only function to perform for a space, the system may visually distinguish affordance 1593 from all other affordances on the map to encourage an ordered installation of the sensors. In other cases the server may simply not present the other affordances to be sensed until after a most impactful sensor has been installed.

In addition to indicating installed sensors and also affordances on which other sensors can be installed per the MinSP and MaxSP requirements, sensors required to meet the MinSP requirements that are installed and/or affordances to which additional sensors may be attached may be visually distinguished on the map from other sensors and affordances. For instance, again referring to FIG. 70, the box 1593 and the box 1595 are shown left up to right cross hatched to indicate that those boxes are visually distinguished (e.g., highlighted or in some other fashion) to convey that additional sensors need to be installed on the second threshold and the whiteboard to meet the MinSP requirements specified for the space. Similarly, the already installed sensor at the first threshold at 1588 is shown highlighted by a left up to right crosshatched box to indicate that that sensor is also required to meet the MinSP requirements. The interface 1580 includes an exit icon 1592 and a submit icon 1594.

Referring still to FIG. 70, the installer may select any of the affordances highlighted by a phantom box on the map 1584 to indicate an affordance to which the sensor device associated with the tag that was read at 1689 is to be attached. Upon selecting submit 1594, the installer's selection is provided to server 1504. Referring also to FIG. 69, at block 1697 the server monitors for a sensor or affordance selection.

In other cases it is contemplated that each affordance or at least a subset of the affordances in a space may include an RF or other identification tag that may be interrogated using the installer's device 1516 to associate the affordance with a sensor during the commissioning process. For instance, here, after reading a sensor ID with the installer's device, the system may instruct the installer to take a picture of a dot matrix identification code that appears on an affordance using her device where taking the picture of the code suffices to indicate installer selection of the affordance with the sensor device. Here, the affordance codes would be unique and the server 1504 would track affordances to which sensors may, or should still be attached and which have already been sensored. Where the code of an already sensored affordance is imaged by the installer, the server may simply indicate that there is no need to install another sensor on the affordance and direct the installer to read a code from a different affordance.

In still other cases it is contemplated that where the server can identify exact locations of affordances in a mapped space as well as the location of an installer's portable device including its orientation in space, an augmented reality (AR) interface may be presented to the installer to help the installer associate a sensor with a specific affordance as well as to provide sensor mounting guidance. To this end, see, for instance, FIG. 75 where an installer's device uses a device camera (not shown but on the oppositely facing surface of the device 1516) to generate real time video of a conference space to be presented in an AR interface and, more specifically, to generate video of a plurality of chairs within a field of view of the camera. Here, the interface provides an aiming icon 2002 centrally within a video window to help the installer aim the camera at specific locations in the space.

Figure 75:
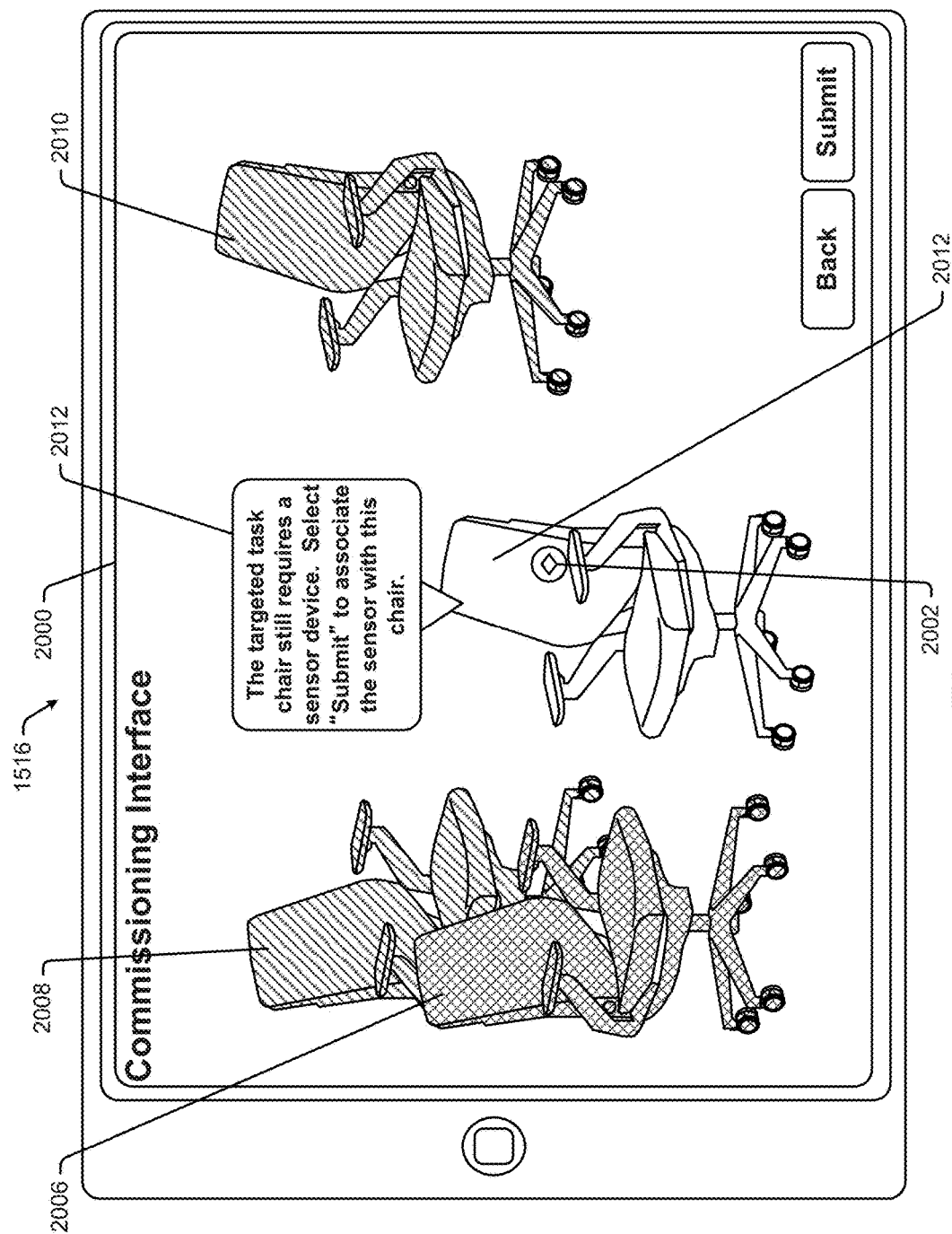
FIG. 75 is an augmented reality installer's interface that visually distinguishes sensed affordances, non-sensed affordances and a target affordance instantaneously associated with a sensor device.

In the AR interface case, the server may augment the video image presented to the installer by indicating affordances that are already sensored and affordances to which at least one additional sensor should or could be installed. In FIG. 75, affordances to which at least one more sensor can or should be added are shown in double diagonal cross hatch (see the chair labeled 2006) and chairs that are fully sensored are indicated by left up to right cross hatching at 2008 and 2010. A chair that is currently targeted by aiming icon at 2012 is visually distinguished. In the present example it is assumed that a sensor can or should still be added to chair 2012 and therefore, prior to targeting, that chair would have been highlighted or otherwise distinguished in the same fashion as the double cross hatched chair at 2006. As shown in FIG. 75, once a chair to which at least one additional sensor can be attached is targeted, a pop up window 2012 may be presented to instruct the user on how to select the chair (e.g., by selecting the submit button). Similarly, if the installer targets a chair that is already sensored, a pop up window would instruct the installer to select a different affordance to receive the next sensor.

Referring again to FIG. 69, once the installer selects an affordance or sensor at 1697, server 1504 provides instructions to the installer via the installer's device to guide the installer on where to attach the sensor device to the selected affordance, optimal orientation of the sensor, etc. Here, while the sensor devices may be similar in construction and capabilities, in many cases there may be optimal locations and orientations for the sensors based on the affordances to which they are attached and based on the sensing, tracking and other statistical functions to be performed with the data obtained by the sensors. For example, optimal sensor placement on a chair may depend on whether or not data from the sensor is required to detect user proximity or to detect each of proximity, weight, fidgetiness and heart rate. Other functional subsets that need to be driven by data from the chair attached sensor may require a different optimal sensor placement on the chair.

Figure 71:
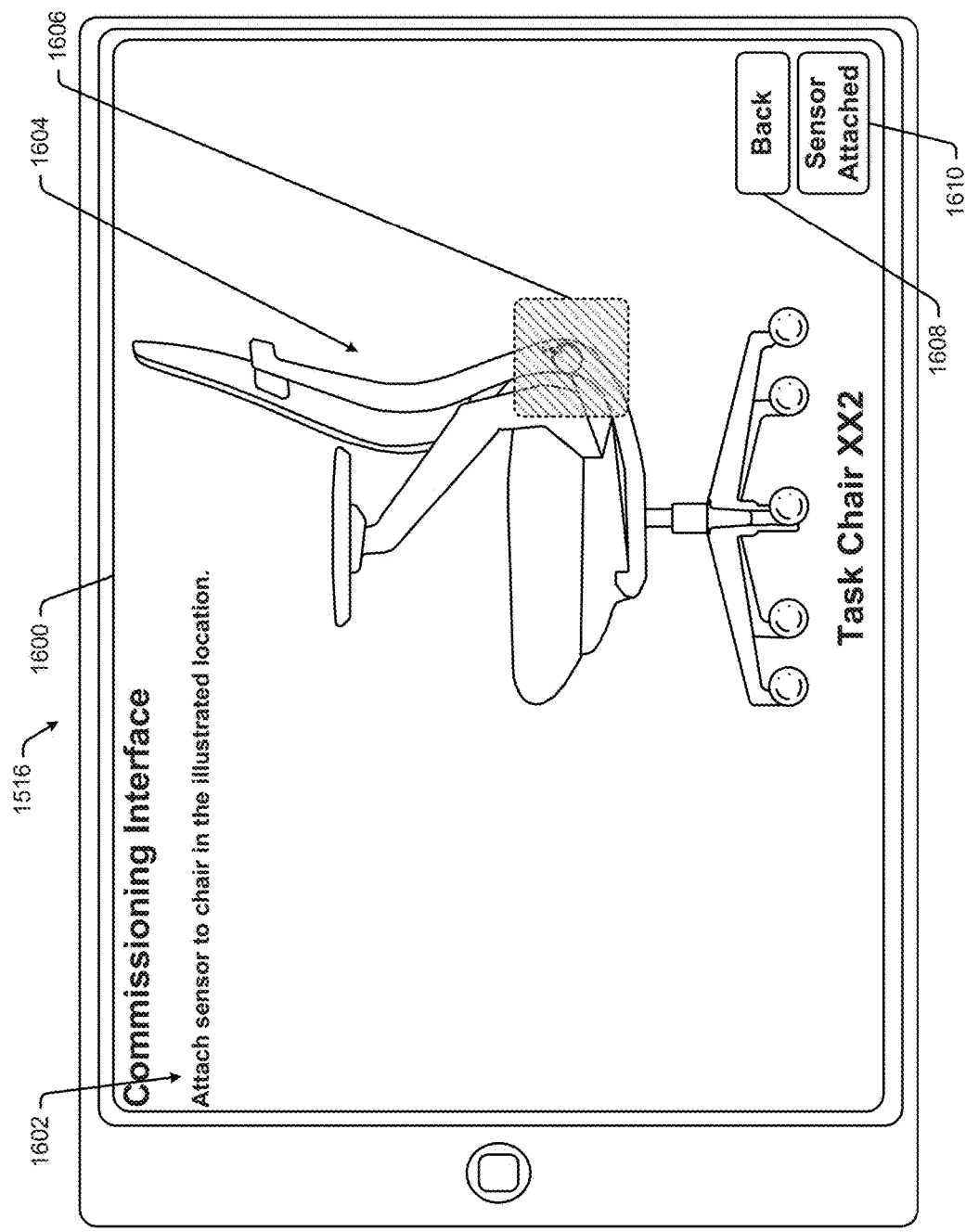
FIG. 71 is an installer's interface that guides an installer to install a sensor device at an optimal location on an affordance within a space.

Referring again to FIG. 70, if a user selects a task chair from the options presented in phantom boxes, device 1516 may present an interface screen 1600 as shown in FIG. 71 with instructions 1602 to attach the sensor to the selected chair as illustrated and an image of the chair at 1604 where the location at which to optimally attach the sensor based on the data that is required to support sensing and tracking and other functions in the space is highlighted or otherwise indicated as shown at 1606. A Back icon 1608 and a Sensor Attached icon 1610 are also presented to allow the installer to move back to the prior interface (see again FIG. 70) or forward within the commissioning process.

In the case of an AR interface, after a chair is selected for receiving a sensor, the installer may continue to target the chair for video generation and the interface may present a highlighted representation of the sensor at the optimal or preferred installation location on the chair as it appears in the video. Here, the user would simply install the sensor at the indicated location. After the sensor is installed, a subsequent video of the installed sensor on the chair may be obtained as part of a confirmation process where the video would be transmitted to the system server and evaluated to make sure that the sensor is properly installed. Any problems with sensor position or orientation with respect to the chair or other supporting affordance could be detected and conveyed to the installer so that the installer has the opportunity to reposition or reorient the sensor device.

Figure 72:
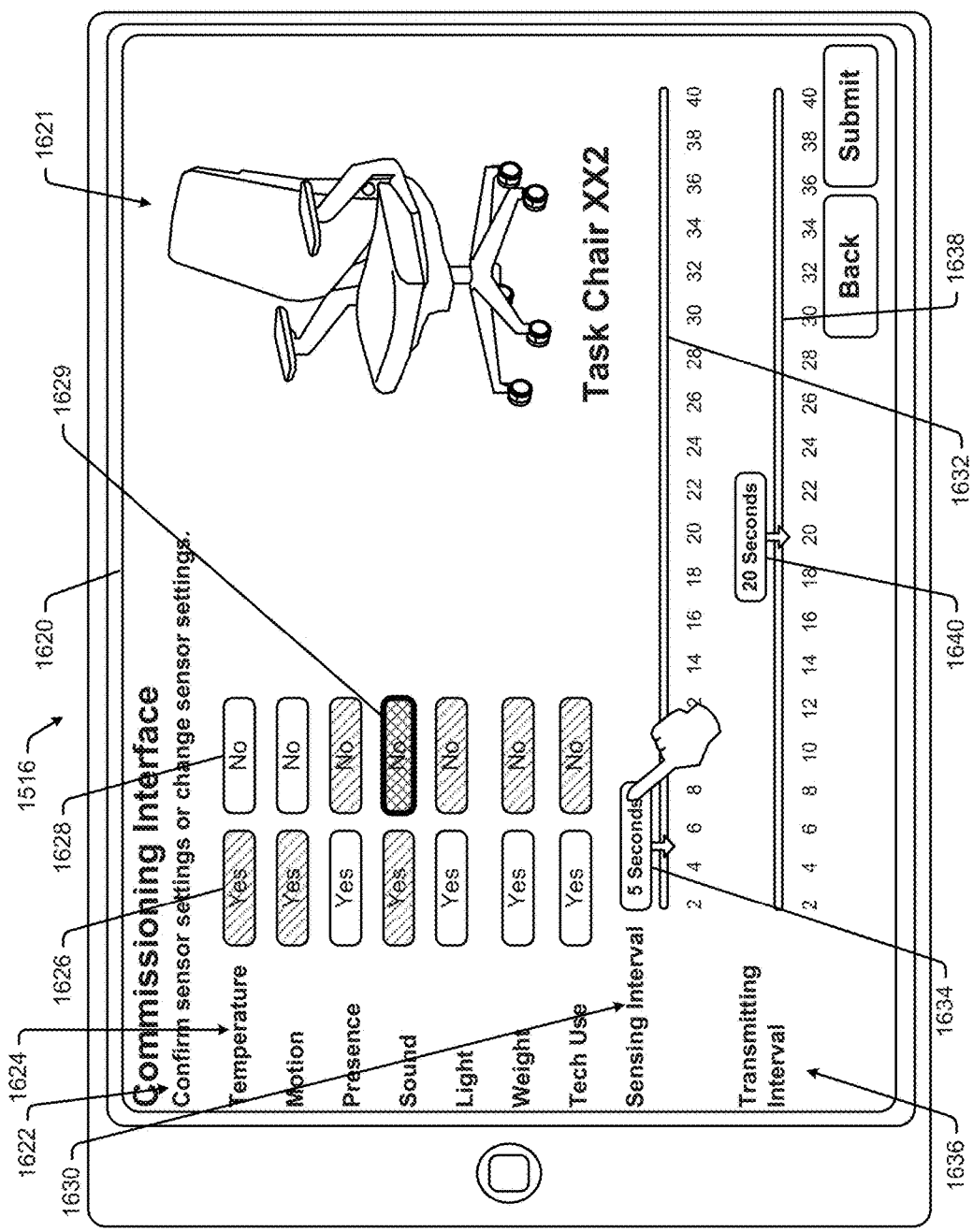
FIG. 72 is an installer's interface that enables an installer to set or confirm sensing capabilities and operating parameters for a recently installed sensor device.

Referring again to FIGS. 69 and 71, once the sensor is attached to the chair and icon 1610 is selected at decision block 1713, control passes to block 1717 in at least some embodiments, where the server, in at least some cases, next presets sensor settings for consideration by the installer. Referring also to FIG. 72, an interface screen is shown at 1620 that includes instructions at 1622, an image of the type of affordance to which the sensor was attached in a prior commissioning step at 1621, and a list of sensor setting options at 1624, 1630 and 1636. The sensor setting options include a list of environmental attributes that may be sensed at 1624 and interval type settings related to a sensing interval and a data transmitting interval at 1630 and 1636, respectively.

Exemplary attributes list 1624 includes temperature (e.g., ambient or affordance surface, etc.), motion, presence, sound, light, weight and technology use (e.g., whether or not a device (e.g. a projector, a telepresence system, etc.) is turned on, is operating, the state of the device, etc.). In at least some cases, based on the predefined sensing, tracking and other functions specified by the application programs associated with the space (e.g., as specified in block 1685 in FIG. 69), default attribute values may be automatically preset when the installer is presented with interface 1620 as indicated by the left down to right cross hatching of one field (e.g., "Yes" or "No") for each attribute in the list 1624. Here, an installer may be free to change the presets by selecting the other option via touch. In some cases, the presets may represent optimized attribute sensing states where the other optional state can be selected and still yield data sufficient to drive all pre-specified functions for the space, albeit in some cases with a reduced confidence factor value. In at least some cases default values may be required to drive pre-specified functions and, in that case, the non-default state may be shown but visually distinguished to indicate that the installer has no choice to select that state. To this end, in FIG. 72 see that the "No" option corresponding to the Sound attribute is double diagonal cross hatched at 1629 to indicate that the No Sound sensing state cannot be selected.

Referring still to FIG. 72, an interval duration range line 1632 and associated selection field/arrow icon 1634 are provided adjacent the sensing interval label at 1630 where icon 1634 can be selected and moved along the range line to select a sensing interval for the sensor device being commissioned. Similarly, a range line and field/arrow icon 1638 and 1640 are provided adjacent the transmitting interval label 1636. In some cases the intervals selected via icons 1634 and 1640 may be preset to default values. In any case, an installer can change the intervals by selecting and sliding the icons 1634 and 1640 along the lines.

While not shown, more complex attribute selection options and tools are contemplated. For instance, in at least some cases different sensing and transmitting intervals could be specified for each attribute in the list 1624. For example, ambient temperature may only need to be sensed and updated every 20 minutes while motion or sound may need to be sensed every second for certain system functions.

While the example here is described as presenting sensor attributes to an installer for consideration and possible change, in many cases the sensor settings for a given sensor in a sensing ecosystem will be completely specified for the functions that the data will be used for. In this case, it may be that the server does not present any opportunity for the installer to change sensor attribute states or other parameters and therefore the attribute interface shown in FIG. 72 may simply not be presented or, instead, an interface that simply indicates sensor attribute states (e.g., sensor capabilities that are activated as well as sensing and transmitting interval) in a summary fashion may be presented.

Figure 73:
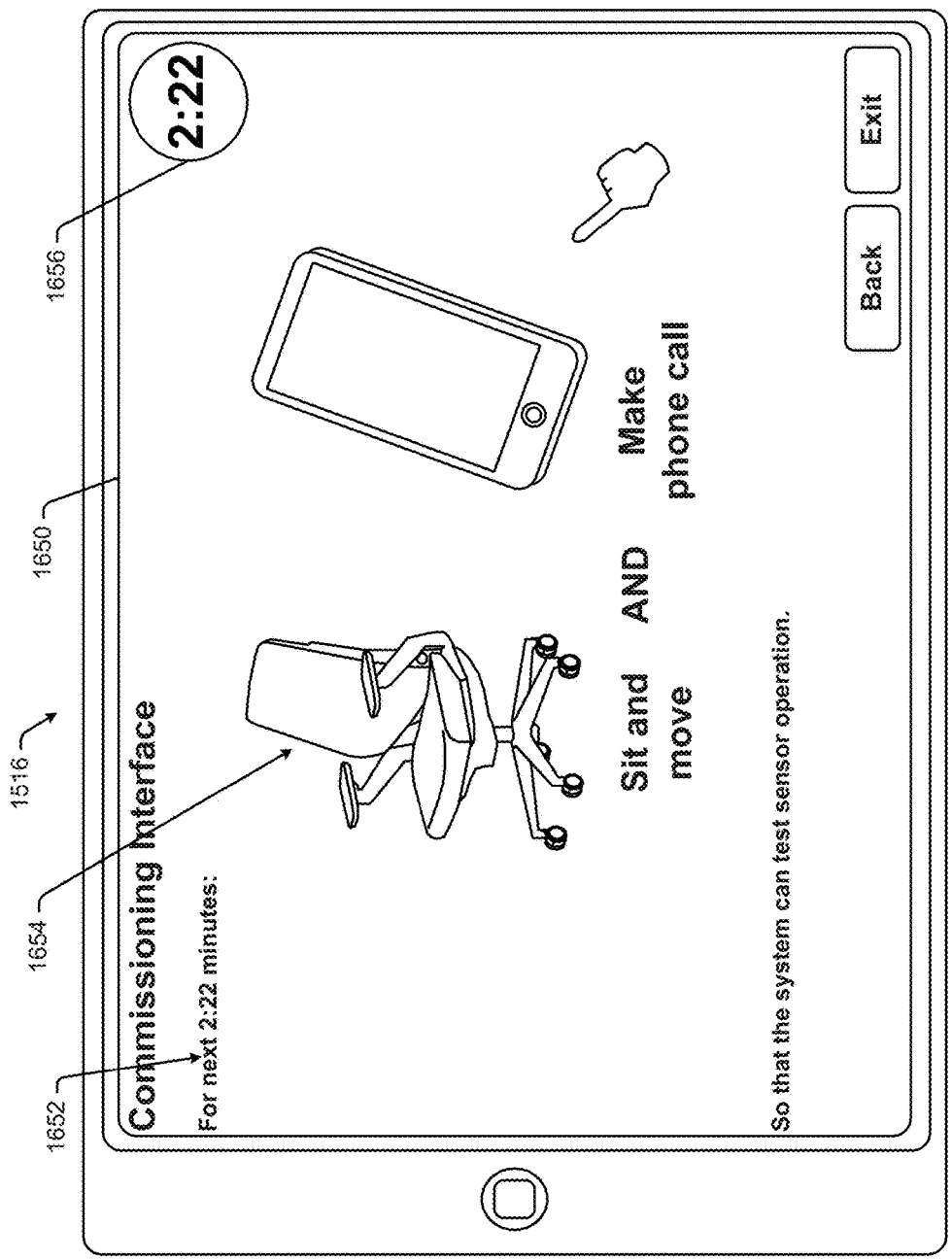
FIG. 73 is an installer's interface that instructs an installer to perform various tasks that are to be sensed to test operation of a recently installed sensor device.

After the installer confirms or sets attribute values/states and submits those to the system server, as indicated at 1719 in FIG. 69, server 1504 may instruct the installer to perform some sensor test to confirm proper operation of the just installed sensor device. Here, the idea is that the installer may perform scripted activities in the vicinity of the sensor device or at least that should be sensed by the sensor device and the device should sense those activities and generate data that the server can use to determine if the sensor is operating properly. For instance, in the case of a task chair where a sensor is supposed to sense weight, presence and movement, an interface like the one shown in FIG. 73 at 1650 may be presented that presents a test time or countdown clock at 1652 and instructions for the installer to sit in the chair, move in the chair, and make a phone call as indicated at 1654.

At 1721 in FIG. 69, the server determines if the testing was successful or not and indicates so at one of blocks 1723 or 1733. If testing was not successful control passes to block 1735 where the server performs a trouble shooting operation with the aid of the installer. For instance, the server may confirm with the installer that the sensor was properly mounted to or attached to the affordance, that there are no environmental conditions prohibiting the sensor from sensing required data or from transmitting a signal to the server, etc. If the sensor testing was successful, control passes to block 1723 where server 1504 presents an interface to the installer indicating that the sensor was properly installed. To this end, see interface 1660 in FIG. 74 that indicates successful testing at 1662 and 1664.

Figure 74:
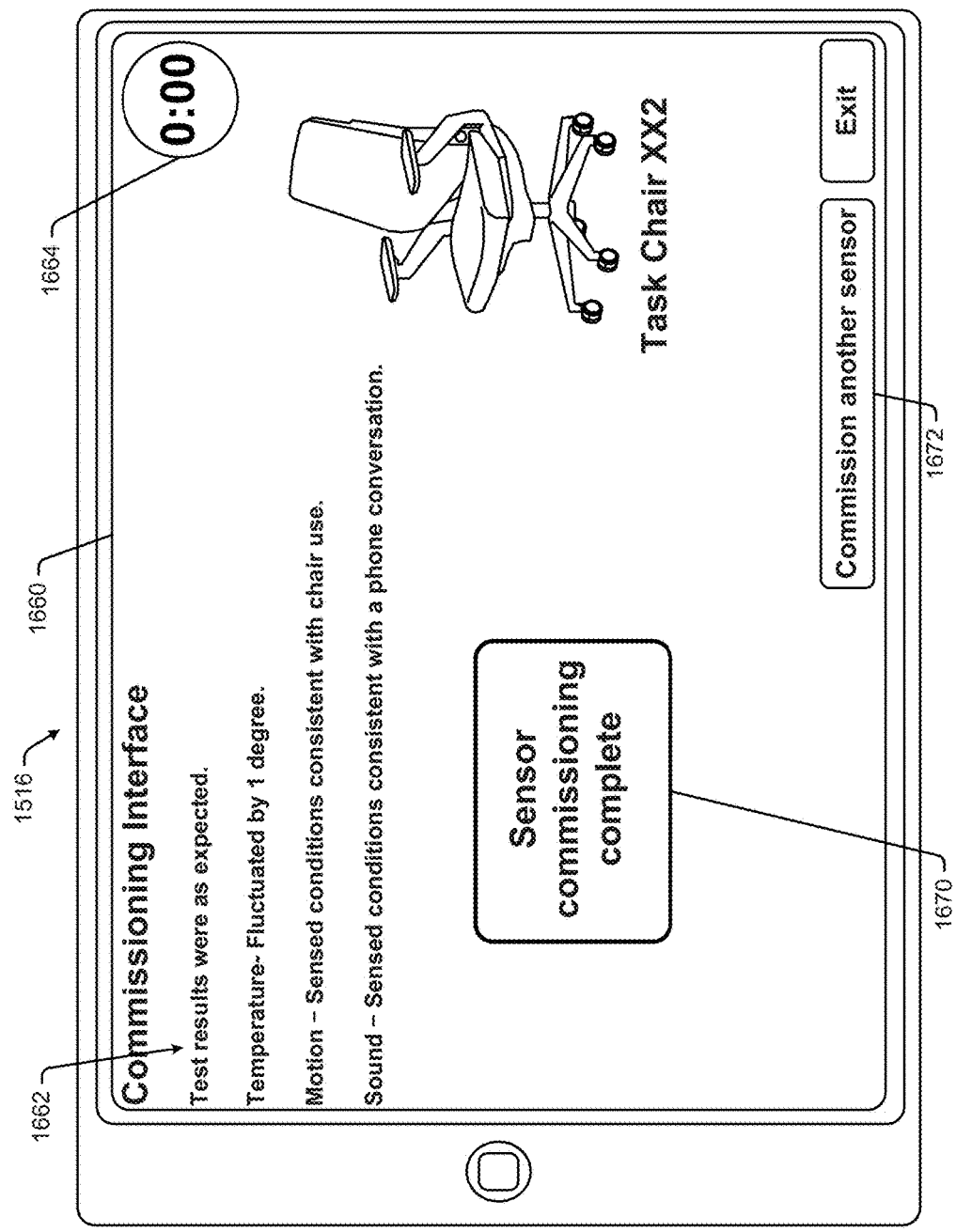
FIG. 74 is an installer's interface that confirms successful completion of a sensor device test and queries if the installer would like to install another sensor device.

At block 1725, server 1504 determines if the MaxSP (e.g., the maximum sensor placement) configuration or requirements have been met. Where the MaxSP requirements have been met control passes to block 1737 where the server presents a message to the installer that the MaxSP configuration has been installed. At that point, in most cases, an installer may simply end the commissioning process as all required sensors have been commissioned for all functions pre-specified by the application programs. Nevertheless even if the MaxSP requirements have been met, in at least some cases the server may still offer the installer the ability to install and commission other sensor devices in the space as indicated at block 1729 and as shown in FIG. 74 at 1672.

Referring again to FIG. 69, if the MaxSP requirements have not been met control passes to 1727 where the server determines if the MinSP requirements have been met. Where the MinSP requirements have not been met, control passes to block 1729 where the server presents an interface to the installer indicating that more sensor devices have to be installed prior to the system operating for its intended functions and querying the installer if she wants to commission another sensor in the space. If the MinSP requirements have been met, the server indicates that the minimum requirements have been met at 1739 after which control passes to block 1729 to query if another sensor is to be commissioned. If no other sensors are to be commissioned at 1729, the commissioning process terminates at least for the time being.

An installer can always re-enter a space and start another commissioning process to add other sensors to the ecosystem and to commission added sensors after installation. Similarly, for sensors already installed in and commissioned for a space, an installer can re-enter the space and start to reprogram one or a subset or all of the sensors to perform other sensing tasks and to have other operating attributes. Reprogramming of installed sensors may also be automatic by the system server or may be done remotely by a system administrator or analyst via the server and wireless access points or the wireless communication system associated with the sensing ecosystem. In addition, the installer may be able to change the location or locations of one or a subset of the sensor devices a space so that the devices are used for other purposes. Here, again, the operating attributes or states of each sensor device may be reprogrammed to support different functions and algorithms.

Referring again to FIG. 69 and specifically again to the testing block at 1721, in at least some embodiments the testing function may also comprise a sensor normalization process whereby space attributes that are detected are used to calibrate the sensors to their environments. For instance, if the light sensing capability of a sensor device is to be instantiated during the commissioning process, the sensor may sense ambient light during the testing session and calibrate itself for low light conditions or high light conditions or any other light conditions that are sensed. In this case, the installer may be queried to confirm different environmental light characteristics like, for instance, that all ambient lighting is on and adjusted to a high level, that natural light intensity is normal for the space, etc., and the server may use that user input to confirm proper sensor calibration. As another instance, in the case of sound or audio sensing, the sensor device may sense a persistent humming noise associated with an air conditioner. Here, either the server will automatically identify the persistent noise as an ambient noise and calibrate to compensate for that noise and volume level or the system may query the installer to confirm that the noise is expected to be persistent.

In some cases, the server will routinely calibrate the sensors to environmental characteristics that change over the course of a day or over a season. For instance, in most cases the amount of natural light in a space that includes exterior windows will change during a typical working day as the sun moves across the sky. If a persistent pattern of light emerges, the sensor may be calibrated differently throughout the day to compensate for semi-persistent ambient characteristics that change slowly over a long period.

After at least the minimum number of sensor devices are installed according to the MinSP map, once the commissioning process is ended and normal system operation begins, the system server will use whatever devices are installed in a space to perform optimized space sensing and tracking algorithms. In the event that another sensor is subsequently installed in the space at any time where that sensor could be used in sensing and tracking algorithms to increase the confidence factors associated therewith, in at least some cases, the system server will automatically use the additional sensor(s) to perform the more reliable algorithm(s) and generate more reliable sensing and tracking data. In other cases, the server may identify that newly added sensors in a space could be used to increase one or more confidence factors associated with currently instantiated algorithms and, in that case, may present the option to an installer, as the newly added sensors are commissioned, to use data from those sensors to drive more reliable algorithms.

Wherever possible, in at least some cases, use of installed sensors to increase reliability of results should be automated so that the system server is always using existing installed sensors to their fullest potential. To this end, in some cases it is contemplated that additional sensors may be at least temporarily located within a space in which the server is already running instantiated algorithms that could be rendered more reliable if data from the additional sensors was obtained and used to drive the algorithms or similar algorithms. For instance, two additional sensored task chairs may be moved into a conference space that already includes 12 chairs and, in that case, the server may recognize the existence of the additional chairs and sensors in the space and may automatically use data generated by those sensors to drive algorithms. In the alternative, the server may at least temporarily reprogram the sensors on the 13th and 14th chairs to collect and generate data useful in driving algorithms if those sensors are not already programmed to do so (e.g., if optimal sensing options are initially unselected). If those chairs are subsequently removed from the space, the server may automatically reprogram the sensors to perform their prior sensing and tracking data collection and transmission tasks or different tasks depending on instantaneous locations.

Thus, for example, a sensored chair that is usually located at a workstation outside a conference space may include sensors programmed to track motion, temperature, weight and various biometric parameters of a chair occupant while at the workstation. Here, if the chair is moved temporarily into the conference space, as the chair is moved through a threshold into that space, the server may be programmed to recognize that the chair is present in the conference space and may reprogram the sensor on the chair automatically to sense, generate and transmit data for use in an occupancy count calculation for the conference space. Once the chair is removed from the conference space and moved back to the workstation for use, the chair sensor may be automatically reprogrammed so that the sensor operates as before to generate data related to motion, temperature, weight and the other biometric parameters for a user at the workstation.

Similarly, in some cases a sensor attached to some space affordance may be moved out of a space and therefore data from that sensor may no longer be associated with the space. For instance, again, a sensor mounted to a task chair can be expected to be moved out of a conference space at least periodically when that chair is needed in some other space (e.g., an adjacent conference space). Here, where at least the MinSP requirements are still met by sensors within the space, the server may simply automatically use a simpler algorithm to generate sensing and tracking data where the simpler algorithm does not require data from the sensor that has been removed from the space.

If removal of a sensor from a space results in a sensor configuration that no longer meets the MinSP requirements, the system server may simply memorialize an inadequate sensor configuration as a reason why sensing and tracking activity in that space is missing from the system database. Here, the server may automatically place the remaining sensors in the space in a sleep mode or a heartbeat mode in which those sensors either stop sensing and transmitting data or sense and transmit a reduced data set until the MinSP requirements are again met. For instance, in a sleep mode, the server may continue to track sensors within the space by receiving a periodic heartbeat signal from each. In this case, when the server again identifies signals that meet the MinSP requirements, the server may again fully activate the space sensors to start generating required data to drive space algorithms (e.g., algorithms instantiated or enabled for the space).

In many cases it is contemplated that many different sensing and tracking and other more complex algorithms will be instantiated for each of a plurality of spaces within an enterprise. Here, in at least some cases, where active and operating sensor sets within the spaces are dynamic (e.g., at least some sensors may be moved between spaces along with supporting affordances, sensors may become disabled if battery charge drops below some threshold level, etc.), it may be that movement of one or more sensors out of a space may result in an inability to perform a subset of instantiated space algorithms while data generated by the space sensors can still drive other algorithms. In this case, the server would continue to obtain space data and drive algorithms that can be performed while halting other algorithms and data collection that is required for the halted algorithms.

In many cases there may be a large number of tracking and more complex statistical algorithms that can be run for each space within an enterprise if the right sensor set is configured and instantiated. In addition, as described above, for each data driven conclusion, there may be more reliable algorithms than others where the more reliable algorithms require more or different data sets than the less reliable algorithms. In at least some cases the system server may be programmed to use space arrangements and affordance sets within each space to identify all functions that may be performed in the space and, for each function, MinSP and MaxSP sensor sets and sensor settings (e.g., what is sensed, when sensed, when data is transmitted to the server, etc.) required to support the function.

Where less than the full set of functions and optimal sensor placements and settings are configured for a space, the server may identify the other functions and settings that are not currently configured and may present, when desired, information related to those other functions and settings. For instance, in at least some cases the system server may, based on affordances in a space instead of based on sensors in the space, identify a list of 20 different functional algorithm types that system administrators or analysts or other users may be interested in and may be able to present that list of functions to a system user or sensor installer for selection. As another instance, based on sensors currently installed within or associated with a space, the server may identify a set of functional algorithms that may be of interest. In either of these two or other cases where the server identifies other functions or capabilities of a space that are not currently supported or enabled, the server may present additional functions or other options to a user for consideration.

Additional functions and capabilities may take many different forms including but not limited to the following: (i) additional algorithms/functions for a space based on existing sensor mix and data already being generated by the sensors, (ii) additional algorithms/functions for the space based on existing sensor mix if the existing sensors are reprogrammed to collected additional data types, (iii) additional algorithms/functions that are consistent with the space attributes and affordances if additional sensors are added to the space and (iv) more reliable algorithms than similar currently operational algorithms (e.g., algorithms that yield the same result but have different reliabilities) for the space if existing sensors were differently programmed or if additional sensors were placed in the space and properly commissioned.

Additional options for a space may be presented as a list of options and associated requirements. Thus, for instance, one additional function may include discerning type of activity (e.g., collaboration, content generation, individual presentation, etc.) a group of employees is participating in within a conference space and requirements for discerning activity type may require installation of 6 additional sensors at various locations within the space. As another instance, a more reliable occupant count within a space may be achievable and, in addition to suggesting a more reliable occupant count algorithm, the server may indicate that existing sensors within the space simply need to be reprogrammed to collect a different subset of sensed data or to collect the same subset of data at shorter intervals or to transmit collected data at shorter intervals, etc.

In at least some cases it is contemplated that an installer may have the ability to change functional options sensed within enterprise space instead of those options being completely driven by a preset sensing ecosystem specification. For instance, an installer may be able to access a list of possible sensing and tracking functions for an affordance set within a specific enterprise space and may be able to select different sensing and tracking options from the list. In response, the server may generate an ecosystem sensor plan for the space including locations of MinSP and MaxSP sensors required to generate data needed to drive the selected options as well as optimized attribute states for each of the sensors in the MinSP and MaxSP sets.

Figure 76:
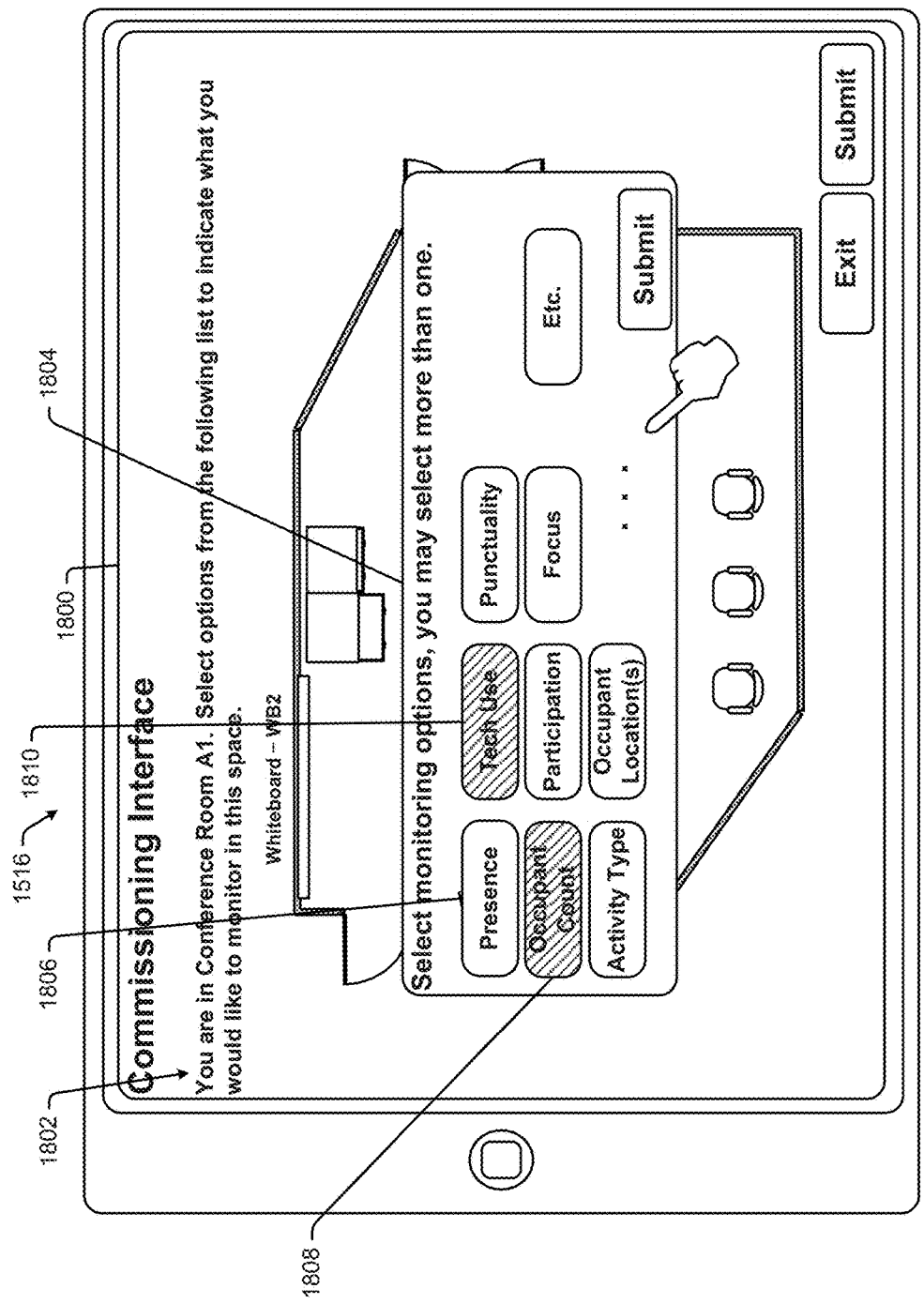
FIG. 76 is an installer's interface that slows an installer to select various sensing and other functions to be supported by an ecosystem of sensor devices.

See the exemplary installer's sensing option selection interface 1800 shown in FIG. 76 that includes instructions 1802 guiding the installer to select sensing options and a pop up window 1804 that lists sensing and tracking options as selectable icons, three of which are labeled 1806, 1808 and 1810. Here, it is assumed that, at least initially, while some functional options may already be selected, no sensors have been installed in the space currently occupied by the installer. Currently selected options are indicated in left down to right cross hatching (see 1808 and 1810) in FIG. 76. Once a desired functional option set has been selected, the installer submits the selections to the server.

Figure 77:
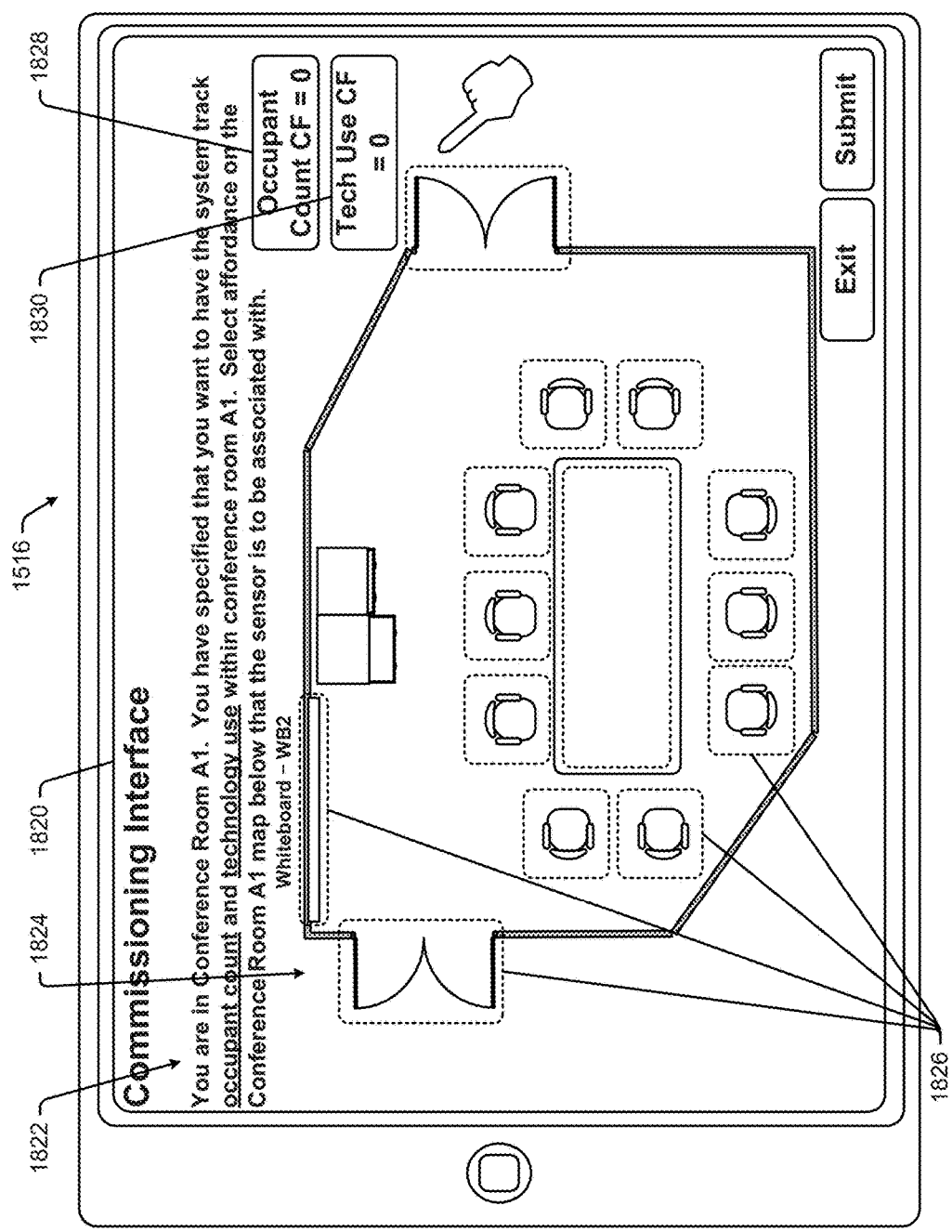
FIG. 77 is an installer's interface that allows an installer to select affordances for installation of sensor devices.
Figure 78:
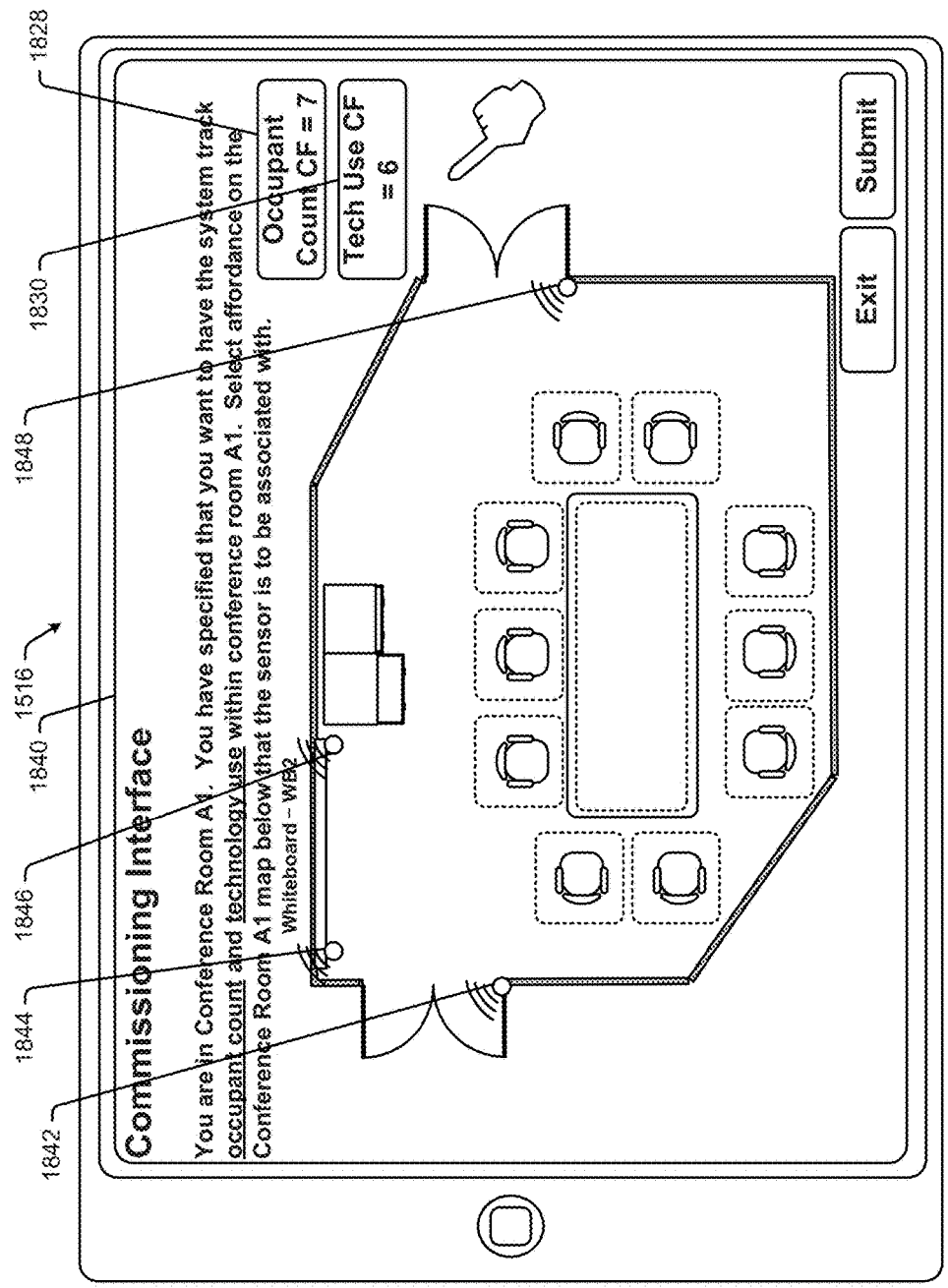
FIG. 78 is an installer's interface similar to the FIG. 77 interface, albeit showing a set of already installed sensor devices.

Referring to FIG. 77, in response to receiving the installer's selected sensing and tracking options, the server presents a commissioning interface 1820 that confirms the installer's selections at 1822 and presents a map 1824 of the conference room A1 space along with phantom boxes 1826 about each of the affordances to which a sensor may be attached to support system algorithms associated with the selected functions (see again FIG. 76). Again, occupancy count and technology use confidence factor fields are provided at 1828 and 1830 to indicate, based on currently installed sensors, how reliable the count and technology use determinations are expected to be. As shown in FIG. 78, as sensors are installed and instantiated within the space, the phantom selection box options associated with the installed sensors are removed and installed sensor icons as at 1842, 1844, 1846 and 1848 are added to the map to indicate sensor installations. In addition, the expected confidence factors in fields 1828 and 1830 are updated to reflect the expected effects of the currently installed sensors. The installation and commissioning process continues as described above with respect to FIG. 69.

While the system described above in relation to FIG. 59 has been described as one wherein all of the sensor devices have similar capabilities but where it is expected that only subsets of those abilities may be activated at any time, in other embodiments it is contemplated that at least a second class of sensor devices and perhaps even a third or more classes may be provided that have class specific sensing and other capabilities that may be specialized for particular uses. For instance, at least one additional sensor class may include an imaging device like a 2D CCD array that is capable of generating images and/or video of a space. Hereinafter, unless indicated otherwise, a sensor device that includes some type of imaging array for generating images and/or video will be referred to as an imaging sensor device and a non-imaging sensor like the ones described above will be referred to as a non-imaging sensor device. In at least some cases an imaging sensor device may include other types of sensor capabilities like temperature, sound, motion, etc., sensing capabilities where any subset of the capabilities may be activated or deactivated at any time like the non-imaging sensors described above.

In at least some cases imaging sensor devices will be able to substantially increase reliability of sensing functions as the amount and type of data collected by the device is particularly detailed and suitable for processing by a server or other system processor. Thus, for instance, occupancy count, movement, presence, locations, relative juxtapositions, orientations, etc., of employees in a conference space can easily be discerned by a server examining real time video of a scene in the conference space. Here, while non-imaging sensor devices may be used to generate at least some of this information, imaging devices are simply more reliable in many cases.

D. Embodiments Enhanced By Imaging Devices

In some embodiments where privacy is a concern at least some of the time in at least some enterprise spaces so that imaging sensor devices may be viewed as an invasion of personal or group privacy, imaging capabilities of those devices may only be used at specific times and other sensing capabilities of those devices may be used at other times to alleviate the privacy concern. For instance, in a simple case an imaging sensor device may be mounted within a conference space for sensing if any person is located in that space and, once a first person occupies the space, the system server may disable the imaging capability of the sensor device and activate other sensing capabilities of that device as well as other presence sensing capabilities of other non-imaging sensor devices in the area. Here, the idea is that the imaging capabilities of the imaging sensor device can be used to accurately sense presence within a large area and therefore other more localized non-imaging sensor devices can be disabled or placed in a battery conserving sleep mode until the server recognizes a first occupant in the space. By disabling the imaging capabilities of the sensor, the privacy concern in this case can be addressed.

As another instance, imaging capability of a sensor may be activated for imaging sensor devices that are located within common or typically non-private shared areas within a facility for sensing various parameters. Here, data from at least some cameras located near thresholds into more private spaces (e.g., into a conference space, into a space associated with a workstation, etc.) may be used independently for determining occupant count in certain spaces or in conjunction with data obtained within those private spaces by non-imaging sensor devices. For instance, where an imaging sensor device is mounted within a common area outside a plurality of conference rooms, images from the imaging sensor device in the common area may be examined to track the number of persons passing into and out of each conference room. Here, the count from the common space imaging sensor device may be used to track occupancy or may be combined with other data from within each conference space to track occupancy count.

Referring again to FIG. 60, a camera sensor capability is shown at 1559. Thus, in at least some cases non-imaging sensor devices (e.g., a first class of devices) may include all of the capabilities and components shown in FIG. 60 except for the camera functionality 1559 and imaging sensor devices (e.g., a second class of devices) may include all of the capabilities and components of FIG. 60 including the imaging capabilities represented by 1559. In at least some cases that camera components and functionality may be provided as a simple add on to a non-imaging sensor device. In this regard see in FIG. 60 that the sensor functionality is shown to plug into a link to the sensor processor to indicate the add on nature of that functionality.

In still other cases, at night when no employees are supposed to be located in an enterprise facility, where imaging capabilities exist, those capabilities may be turned on for at least some enterprise sensors where the imaging capabilities may be turned off during regular business hours when privacy may be a more legitimate concern. Here the camera functionality may operate as part of a security system at night to detect occupancy or presence in space and, during the day when the imaging functionality is off, other sensor capabilities may be activated to generate results required by instantiated functions.

E. Automatic Rule/Algorithm Testing and Formulation

In at least some cases it is contemplated that the system server may be able to operate independently to test existing rules and user state algorithms and to develop new algorithms and rules that may be applied in enterprise spaces either automatically or after presentation to and vetting by at least one system analyst. For instance, in public spaces or common areas within an enterprise where privacy is either not a concern or the expectation of privacy is very low, cameras may be operated in parallel with other sensing devices to generate parallel imaging and non-imaging data sets (e.g., first and second parameter value sets) that can then be used to either test existing algorithms and rules or as the basis for generating possible other rules for consideration by an analyst.

Regarding testing the strength of existing non-imaging algorithms and rules, cameras may be used in conjunction with other non-imaging sensor capabilities provided by any combination of sensors to generate imaging parameter value sets in parallel where the non-imaging parameter value sets where the value sets are then compared to identify mismatches or at leas mismatches above some threshold level. Here, rules for identifying user and ambient states in the imaging data and rules for identifying the same user and ambient states in the non-imaging data may be predefined. In at least some cases the server may be programmed to treat the imaging results as truth and identify any mismatch between the imaging and non-imaging results as an anomaly or weakness in the non-imaging algorithm. Here, a mismatch may include the imaging results identifying an associated user state when the non-imaging results for the same time period failed to identify the same user state or the non-imaging results identifying an associated user state when the imaging results for the same time period failed to identify the same user state.

Where a mismatch is persistently identified (e.g., more than a threshold percentage of times), the server may automatically reduce a confidence factor value associated with the non-imaging results for the common area. In addition, where the confidence factor value is reduced for the non-imaging result in the common area, the non-imaging algorithm will likely be globally weak and therefore confidence factors related to that algorithm in other enterprise spaces including private spaces where cameras are not employed may likewise be reduced.

In other cases where a mismatch between imaging results and non-imaging results occurs, the server may present the anomaly to a system analyst to consider how the anomaly should affect confidence in the non-imaging algorithm for the common space as well as in all enterprise spaces. Where imaging sensor device images are stored, the analyst may be able to view those images and assess if the imaging result is truth or if the non-imaging result more accurately reflects reality in the common space. Here, the analyst may be able to accept or reject either result as truth which would then be subsequently used to adjust confidence factors for the algorithms used in the future. Where the algorithms simply yield a wrong result, the analyst may change the algorithms so that the result better reflects reality.

Regarding the server using video of common areas to develop and suggest new algorithms, in at least some embodiments a system server may enable an analyst to view video of common or public spaces and to identify activities that occur in or other characteristics of the video as justifying a new observation or conclusion. In other cases predefined rules for identifying specific types of observations or conclusions in video images may be stored in a system database. For instance, a predefined algorithm for counting occupants in a public space may be stored in the database. Then the system server may be programmed to examine future video to identify the set of activities/characteristics in the video that the analyst associated with or that were predefined for the new observation or conclusion. The server may use non-imaging sensors to generate various types of sensed data for the same space and in parallel with imaging. The server may be programmed to search for or identify sets of non-imaging data that are persistently present when the observation or conclusion is generated based on the imaging data. In this case, the server may present the non-imaging data set to the analyst along with the new observation or conclusion so that the analyst can determine if the non-imaging data set should be used to generate a new non-image algorithm or rule to be applied in the common area or in other enterprise spaces to identify the observation or conclusion in the future.

In some cases it is contemplated that a server may persistently store data for common or public areas which can be used essentially immediately along with archived video of the common or public areas to generate possible non-imaging data sets to present as rules or algorithms for identifying specific user states or other interesting conditions. For instance, where an analyst reviews a first video of an activity occurring in a common area and identifies four characteristics of the video that are tell tale signs that content generation is occurring in the common space between four employees, the server may be able to access other video from the same or other common spaces that has been archived over the last six months and may be able to identify 30 other video clips that meet the four characteristics identified by the analyst in the first video. Here, for each of the 31 video clips, the server may also be able to access non-imaging data of many different types for the common area and may be able to automatically parse that data to identify a set of five non-imaging sensor states that are common to all 31 occurrences. In this case, the server could relatively quickly suggest the five non-imaging sensor states as the basis for a rule to be associated with the activity identified by the analyst. In some cases larger common subsets of non-imaging data that are consistent in most of the 31 occurrences (e.g., 7 sensor states may be consistent for 28 of the video clip occurrences) may also be presented as the basis for alternative non-imaging algorithms or rules.

Reviewing the suggested common non-imaging data, an analyst would have several options. First, the analyst could simply accept the non-imaging data set suggested as the basis for a rule and the server would then generate an appropriate rule. Second, the analyst could modify the non-imaging data set that was suggested and submit the modified data set to the server for generating an appropriate rule. Third, the analyst could change the four imaging characteristics to a different set and run the process again on the archived data to generate a different common non-imaging data set for consideration as the basis of a different algorithm/rule. In any case, the analyst may be able to set thresholds or other data requirements for one or more of the sensed data elements that make up the basis for a rule. Once the analyst is satisfied with the non-imaging data set as the basis for a rule, the analyst causes the server to use the data set to generate an appropriate algorithm or rule.

It is contemplated that in many cases enterprises may only sign up for a small subset of the services that can be offered once a sensing ecosystem has been installed and commissioned. Here, for instance, an enterprise may only sign up for 10% of the functionality of the sensing ecosystem and may not understand the additional value that could be added by the other functionality available. One additional service that may be added would be one where a service provider that owns or at least operates the system server 1504 runs various system algorithms, rules and applications on enterprise data to generate other useful results which are archived. Here, the service provider may, at least periodically, present at least a subset of the results to an enterprise administrator as a sort of marketing tool for the administrator to consider. For instance, at the end of each month of service, the provider may present space use results that are consistent with services that a client has purchased as well as more detailed additional space use results for a portion of the enterprise space. In some cases the additional results may simply be provided as part of a client dashboard or a more complex report. Here, if the client appreciates the value of the additional results, the client may be able to sign up for additional services.

The additional partial results including observations and conclusions may be automatically provided to clients as part of the overall service. In other cases, clients may have to affirmatively indicate that they want the additional partial results service prior to the provider generating and providing those results. While additional results may be based on data obtained from sensors that is required for the services that a client has signed up for, in other cases the additional results may also be based on other sensor data where other sensor device capabilities are enabled solely for obtaining data required to generate the additional results. In addition, in some cases additional sensor devices may have to be installed in a facility in order to drive the additional results.

In some embodiments it is contemplated that anonymous data from many different enterprises and rules/algorithms developed by may different analysts may be pooled together in order to develop more complete sets of data and, ultimately, better rules and algorithms for generating more accurate observations and conclusions. In this case, for instance, it is contemplated that where two or more analysts generate similar observations or conclusions based on data from different enterprises where the rules or algorithms applied by each are different, a system server may automatically identify the different rules/algorithms with similar results and suggest rule/algorithm options and associated requirements (e.g. reprogramming of installed sensors, addition of other sensors, etc.) to the analysts for consideration.

In many cases, as described above, an installer may simply be required to mount sensors at specific locations and to specific affordances in space and to perform some testing activities that enable the system server to determine if installed sensors are operating properly. Here, the installer may have no ability to change sensor attribute states or operating parameters, all of which would be automatically programmed by the system server based on a master ecosystem plan. In this case a system analyst may have the ability to modify the overall ecosystem plan in ways that would ripple through the ecosystem and that would affect sensor attribute states and other parameters in an automated fashion or may have the ability to change attribute settings of sensors on a sensor by sensor basis, on a supporting affordance basis (e.g., reprogram all task chair sensors to sense weight), on an enterprise space basis (e.g., reprogram all presence sensor in all conference rooms to sense employee presence in zones that are twice as large as current sensing zones, etc.).

In cases where one or more cameras are located at a station or proximate the station, the image processing may be performed either by a processor that is included within the camera or via a remote processor that is linked to the station via the internet or some other communication or computer network.

Thus, the invention is to cover all modifications, equivalents, and alternatives falling within the spirit and scope of the invention as defined by the following appended claims.

To apprise the public of the scope of this invention, the following claims are made:

What is claimed is:

1. A commissioning method for installing a sensor ecosystem, the process for use by a device installer using an installer's interface device that includes a display screen, the process comprising the steps of:
providing a plurality of similarly constructed sensor devices wherein each of the sensor devices includes a processor and a plurality of sensor components, each sensor component for sensing a different parameter, at least a subset of the sensor components controllable to turn the components on and off so as to activate and deactivate sensing capabilities of the different parameters;
providing a sensor configuration specification that indicates specified sensor placements and, for each sensor placement, sensor settings for a sensor device to be installed at the sensor placement, the sensor settings indicating sensor components to be activated to enable specific sensing functionalities;
using the interface device to obtain a sensor device identifier from one of the sensor devices;
determining the location of the interface device within the enterprise space;
receiving input via the interface from the installer;
using the input to identify one of the sensor placements from the configuration specification;
obtaining first sensor settings for the sensor device associated with the identified one of the sensor placements from the configuration specification;
receiving an indication that the sensor device has been installed at the identified one of the sensor placements, the sensor device that has been installed being an installed device;
transmitting the first sensor settings to the installed device;
using the first sensor settings to program the installed device by activating at least a subset of the sensor components to sense a subset of parameters;
presenting test instructions to the installer to perform various activities to be sensed by the installed device;
sensing, via the installed device, activities performed by the installer; and
examining the sensed activities performed to assess test success.

2. The commissioning method of claim 1 further including the step of indicating a plurality of sensor placements on the display screen where the installer may mount the sensor device wherein each sensor placement corresponds to a different one of the sensor placements from the configuration specification, the step of receiving input including receiving a selection from the installer of one of the plurality of sensor placements via the interface.

3. The commissioning method of claim 2 wherein the configuration specification includes an enterprise map, the step of indicating a plurality of sensor placements including presenting at least a portion of the enterprise map on the display screen and indicating the sensor placements on the map at which sensor devices are to be installed.

4. The commissioning method of claim 1 wherein at least a subset of the sensor placements specified by the configuration specification include specific locations on space affordances and wherein at least a subset of the space affordances include identification tags that include unique affordance identifiers, the step of receiving input including using the interface device to obtain an affordance identifier from an affordance in space and using the affordance identifier to identify a specific sensor placement in the configuration specification.

5. The commissioning method of claim 1 wherein the sensor settings activate less than all of the sensor components.

6. The commissioning method of claim 1 wherein the step of transmitting includes wirelessly transmitting the sensor settings to the installed sensor device.

7. The commissioning method of claim 1 further including the step of, after receiving input, presenting an installation image on the display screen illustrating the location on a space affordance within the enterprise space at which the sensor device is to be installed.

8. The commissioning method of claim 3 wherein there are at least first and second sensing algorithms that may facilitate at least one required functionality and wherein different subsets of data are required from the sensing ecosystem to drive the first and second sensing algorithms, the configuration specification specifying each of first and second sensor configurations required to generate data to perform the first and second sensing algorithms, respectively.

9. The commissioning method of claim 8 wherein placements of sensors on the map associated with the first sensing algorithm are visually distinguished from placements of sensors on the map that are not associated with the first sensing algorithm.

10. The commissioning method of claim 9 wherein the first algorithm is less accurate than the second algorithm.

11. An algorithm formulating system for use with a sensing ecosystem for identifying enterprise space states, the sensing ecosystem including a plurality of sensor devices mounted within an enterprise space wherein each sensor device is capable of sensing a plurality of parameters within the enterprise space, the system comprising:
  a processor programmed to perform the steps of:
  accessing a rule set that specifies a first parameter value set that corresponding to a perceived state within a first enterprise space;
  receiving sensor data from sensor devices within the first enterprise space;
  comparing the sensor data to the rule set to identify instances of the perceived state;
  examining sensor data to identify a second parameter value set that occurs at least a threshold percentage of time for the identified instances of the perceived state; and
  using the second parameter value set as the basis for a new rule set to be associated with the perceived state.

12. The system of claim 11 wherein the step of comparing the sensor data to the rule set includes comparing sensor data from at least a first sensor device to the rule set and wherein the step of examining the sensor data to identify a second parameter value set includes examining sensor data from at least a second sensor device that is independent of the first sensor device.

13. The system of claim 12 wherein the first sensor device is an imaging sensor device and the second sensor device is a non-imaging sensor device.

14. The system of claim 13 wherein the at least a second sensor device includes a plurality of non-imaging sensor devices.

15. The system of claim 12 wherein the at least a first device includes a first plurality of non-imaging sensor devices and wherein the at least a second sensor device includes a second plurality of non-imaging sensor devices.

16. The system of claim 15 wherein at least a subset of the second plurality of sensor devices is included in the first plurality of sensor devices.

17. The system of claim 11 wherein the step of using the second parameter value set as the basis for a new rule set includes presenting the second parameter value set to a system analyst for consideration.

18. The system of claim 11 wherein the step of using the second parameter value set as a basis for a new rule set includes the system processor automatically generating a new rule set of the perceived parameter and applying the new rule set to a second enterprise space that is independent of the first enterprise space.

19. A sensor device for use in a sensing ecosystem that includes a controlling system server, the sensor device comprising:
  a processor;
  a battery linked to the processor;
  a memory device linked to the processor;
  a transceiver linked to the processor, the transceiver configured to facilitate wireless communication with other ecosystem devices;
  a plurality of sensor components linked to the processor wherein each sensor component is configured to sense a different parameter within a space upon activation, the sensor components enabling at least four different parameters to be sensed when all of the sensor components are activated;
  a sensor device identifier that includes a unique sensor identifier;
  wherein the processor is programmed to perform the steps of:
    (i) receiving a control signal from the system server to activate only a first subset of the sensor components in the sensor device;
    (ii) activating the first subset of sensor components to sense associated parameters at sensing intervals; and
    (iii) transmitting sensed parameter data to the system server at transmission intervals.

20. The sensor device of claim 19 wherein the parameters to be sensed by the sensor components include at least a subset of motion, temperature, sound, presence, light, weight, user biometrics and technology use.

21. The sensor device of claim 19 wherein the sensor device identifier can be obtained from the sensor device via a portable reader device during installation.

22. The sensor device of claim 19 further including an attachment mechanism for installing the sensor device on an affordance within a facility space.

23. The sensor device of claim 22 wherein the attachment mechanism includes an adhesive mounting pad.

24. The sensor device of claim 19 wherein the control signal further specifies sensing intervals and wherein the sensor device uses the control signal to set sensing intervals.

25. The sensor device of claim 19 wherein the control signal further specifies transmission intervals and wherein the sensor device uses the control signal to set transmission intervals.

26. The commissioning method of claim 1 further including the steps of obtaining a sensor device identifier from at least a second of the sensor devices, installing the second of the sensor devices, using the input top identify a second of the sensor placements from the configuration specification, obtaining second sensor settings for the second sensor device and transmitting the second sensor settings to the second sensor device, and using the second sensor settings to program the installed second sensor device by activating at least a subset of the second sensor device components to sense a subset of parameters.

27. The commissioning method of claim 26 wherein the subset of parameters sensed by the first sensor device is different than the subset of parameters sensed by the second sensor device.

28. The method of claim 1 wherein the sensor settings further indicate sensing intervals.

29. The method of claim 28 wherein the sensor settings further indicate transmission intervals.

30. The method of claim 1 wherein the sensing intervals are different for different sensed parameters.

* * * * *